United States Patent [19]

Oji et al.

[11] Patent Number: 5,718,036
[45] Date of Patent: Feb. 17, 1998

[54] METHOD FOR MANUFACTURING A MAGNETIC HEAD

[75] Inventors: Masaaki Oji; Yoichi Masubuchi; Satoko Hisatome; Yoshimasa Akashi, all of Nagaokakyo; Keiko Ito, Amagasaki; Shinichi Seki, Nagaokakyo, all of Japan

[73] Assignee: Mitsubishi Denki Kabushiki Kaisha, Tokyo, Japan

[21] Appl. No.: 438,548

[22] Filed: May 10, 1995

[30] Foreign Application Priority Data

| May 10, 1994 | [JP] | Japan | 6-096458 |
| Aug. 5, 1994 | [JP] | Japan | 6-184822 |
| Aug. 5, 1994 | [JP] | Japan | 6-184825 |
| Aug. 29, 1994 | [JP] | Japan | 6-228619 |
| Oct. 11, 1994 | [JP] | Japan | 6-245619 |
| Dec. 9, 1994 | [JP] | Japan | 6-306137 |
| Dec. 28, 1994 | [JP] | Japan | 6-327599 |
| Mar. 28, 1995 | [JP] | Japan | 7-069664 |

[51] Int. Cl.$^6$ .................. G11B 5/127; B23K 26/06
[52] U.S. Cl. .................. 29/603.12; 29/603.1; 29/603.17; 29/603.18; 29/121.68; 360/119; 360/122
[58] Field of Search .................. 29/603.12, 603.18, 29/603.09, 603.1, 603.16, 603.07, 603.17, 603.19; 219/121.68, 121.69; 216/65; 360/119, 122, 125

[56] References Cited

U.S. PATENT DOCUMENTS

| 4,017,965 | 4/1977 | Brutsch et al. | 29/603.12 |
| 4,186,480 | 2/1980 | Kriegelstein et al. | 29/603.09 |
| 4,301,353 | 11/1981 | Suenaga et al. | 29/603.12 |
| 4,835,361 | 5/1989 | Strom | 219/121.68 X |
| 5,063,653 | 11/1991 | Sandaiji et al. | 29/603.18 X |
| 5,566,075 | 10/1996 | Syouji et al. | 29/603.12 X |

FOREIGN PATENT DOCUMENTS

| 51-29118 | 3/1976 | Japan . |
| 55-4706 | 1/1980 | Japan . |
| 55-67930 | 5/1980 | Japan . |
| 55-117726 | 9/1980 | Japan . |
| 57-567 | 1/1982 | Japan . |
| 61-260408 | 11/1986 | Japan . |
| 62-1106 | 1/1987 | Japan . |
| 2-236807 | 9/1990 | Japan . |
| 1570010 | 6/1980 | United Kingdom . |
| 1593310 | 7/1981 | United Kingdom . |
| WO9106962 | 5/1991 | WIPO . |

OTHER PUBLICATIONS

Patent Abstracts of Japan—61-196413 A, P-539, vol. 11, No. 26, Aug. 30, 1986.

Patent Abstracts of Japan—61-239410 A, P-556, vol. 11, No. 84, Dec. 24, 1986.

"Main Ponts of Technology for Machining the Magnetic Head", supervised by H. Hagiwara, published by Nihon Kogyo Gijutsu Center on Sep. 15, 1985, p. 15.

"Laser Processing" by C. Yamanaka, published by Nikkei Gijutsu Tosho K.K. on Mar. 10, 1990, pp. 100 and 185.

*Primary Examiner*—Peter Vo

[57] ABSTRACT

A method for manufacturing a magnetic head includes the process by which a curved sliding surface of a head chip for making contact with a recording medium and a penetrating window of a side surface of the head chip for determining a gap depth are formed by machining the head chip using a laser beam. The method includes placing the head chip on a working stage; placing a first mask in a light path of a laser beam from a laser source toward the side surface, the first mask being provided with a first slit for the purpose of forming the curved sliding surface of the head chip and a second slit for the purpose of forming the penetrating window of the side surface of the head chip; and irradiating the side surface through the first and second slits with the laser beam, thereby forming the curved sliding surface and the penetrating window in the head chip. The method also may include forming track grooves by irradiating the sliding surface of the head chip with the laser beam.

29 Claims, 102 Drawing Sheets

FIG. 35A
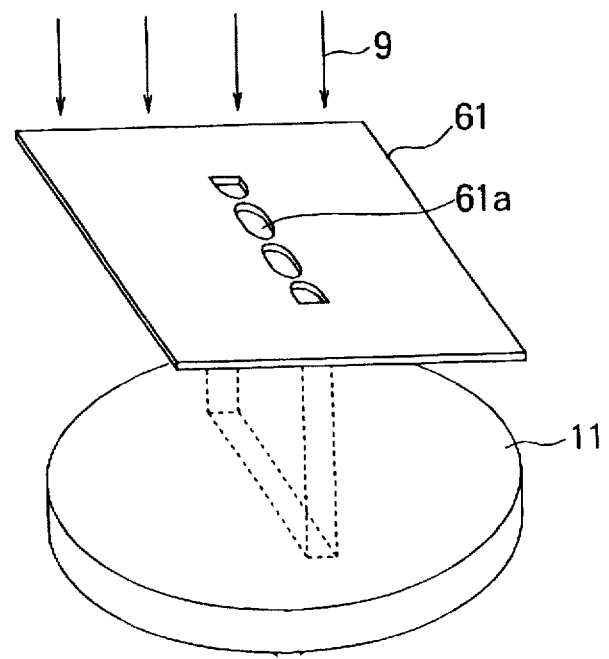
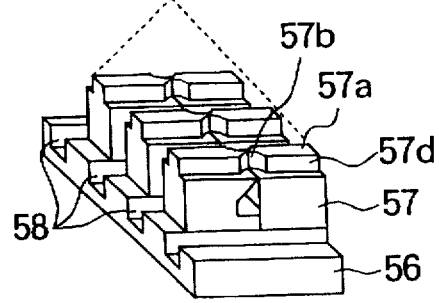
FIG. 35B
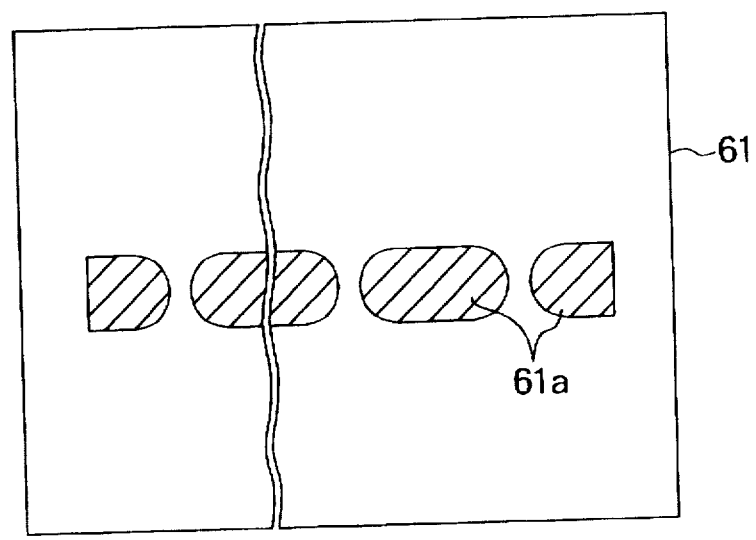

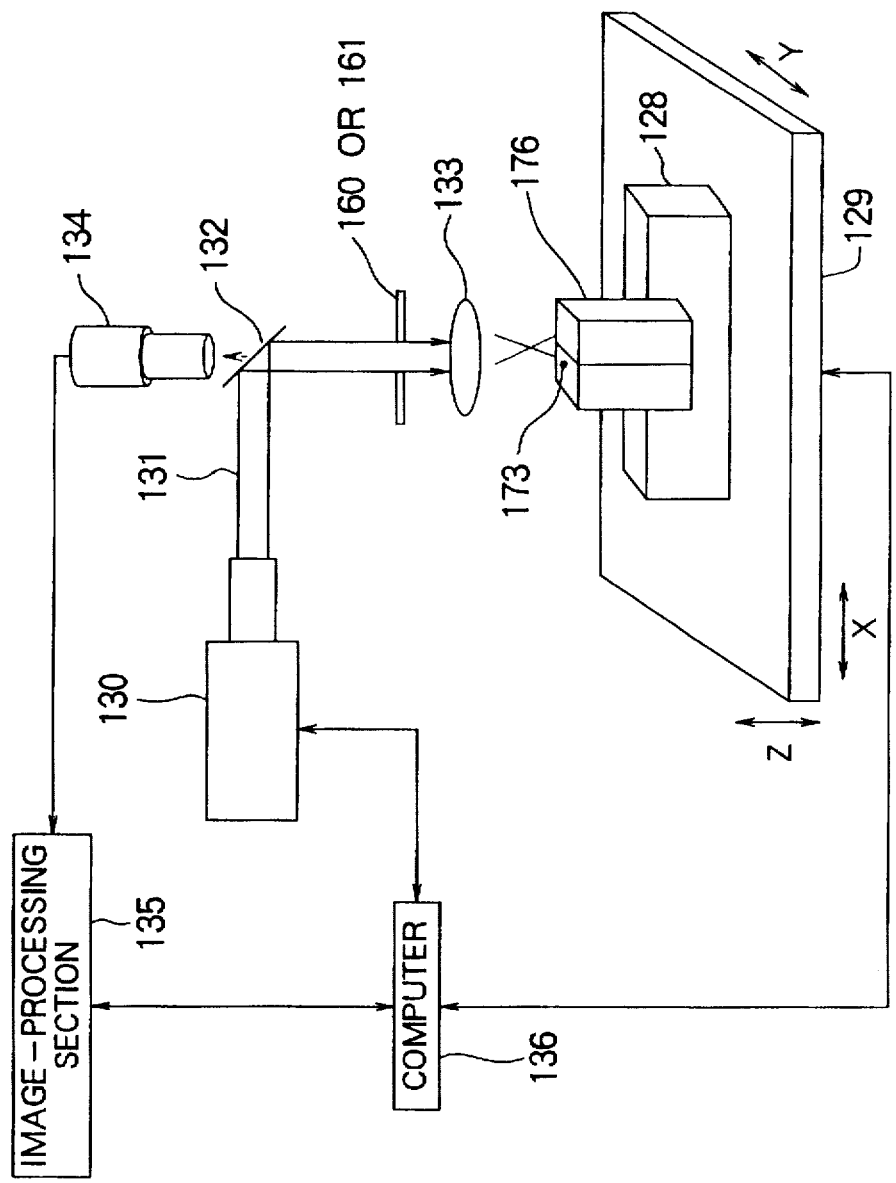

226

226

227a  230  231  227b 232  227

227

METHOD FOR MANUFACTURING A MAGNETIC HEAD

BACKGROUND OF THE INVENTION

1. Field of the Invention

The present invention relates to a magnetic head for use in a magnetic recording and reproducing device such as a video tape recorder (VCR), and to a method for manufacturing a magnetic head.

2. Description of the Background Art

FIGS. 132A–132C relate to a method for manufacturing a magnetic head according to prior art that is disclosed in Japanese Patent "Kokai" Publication No. S55-117726 (117726/1980). In this method, as shown in FIG. 132A, a laser beam 302 emitted from a laser source 301 passes a lens assembly 303 acting as a beam expander, a reflecting mirror (or a bend mirror) 304, slits 305a of a mask 305, and an image-forming lens 306, and impinges on a tape sliding surface (hereinafter referred to simply as "sliding surface") 307a of a head chip 307. Here, a pair of slits 305a are provided in the mask 305, as shown in FIG. 132B, in order to form track-forming grooves (hereinafter referred to simply as "track grooves") 307b which define the track width $T_w$ of the head chip 307 as shown in FIG. 132C.

In the manufacturing method of FIG. 132A–132C, the laser machining of the head chips 307 is accomplished by means of the mask 305, but a gap depth $G_d$ in the head chip 307 shown in FIG. 132C is not determined by the laser machining. Thus, while high dimensional accuracy can be obtained with respect to the track width $T_w$ of the head chip 307, it cannot be obtained with respect to the gap depth $G_d$. Thus, there is considerable deviation among the head chips with respect to $G_d$, thereby causing a problem in terms of lack of uniformity in the characteristics of the magnetic heads.

FIGS. 133A–133C relate to another method for manufacturing a magnetic head according to prior art that is disclosed in Japanese Patent "Kokai" Publication No. S55-67930 (67930/1980). In this method, as shown in FIG. 133A, a laser beam 302 emitted from a laser source 301 passes a lens assembly 303, a reflecting mirror 304, a slit 308a of a mask 308 and an image-forming lens 306, and impinges on a side surface 309b of a head chip 309 shown in FIG. 133B. Here, the mask 308 is provided with the slit 308a as shown in FIG. 133C, in order to form a coil window in the side surface 309b of the head chip 309.

In the manufacturing method of FIGS. 133A–133C, only the coil window of the head chip 309 is formed by the laser machining using the mask 308. Thus, it cannot be obtained with respect to a gap depth which is a distance from the sliding surface 301a to the upper part of the coil window 308a. Thus, there is considerable deviation among the head chips with respect to the gap depth, thereby causing a problem in terms of lack of uniformity in the characteristics of the magnetic heads.

FIGS. 134A–134C relate to another method for manufacturing a magnetic head according to prior art that is disclosed in Japanese Patent "Kokai" Publication No. S55-4706 (4706/1980). In this method, as shown in FIG. 134A, a head block 314 is first formed by interposing a gap 311 between a pair of ferrite core blocks (hereinafter referred to simply as "ferrite blocks") 312 and 313 and bonding the pair of ferrite blocks 312 and 313 across a gap 311. After that, as shown in FIG. 134B, an aluminum film 315 is formed by vacuum deposition on the upper surface of the head block 314, and apertures 315a are formed in the aluminum film 315 using photoresist technique. Next, a laser beam is emitted toward the aluminum film 315, and then track grooves 316a are formed on the head block 314 at areas where apertures 315a of the aluminum film 315 are provided. The aluminum film 315 is then removed by etching or some other method, resulting in the head block 314 in which the track grooves 316a are formed, as shown in FIG. 134C. The head block 314 is then cut along the broken lines to produce head chips 316.

The manufacturing method of FIGS. 134A–134C requires steps of forming the aluminum film 315 to serve as a mask by vacuum deposition or some other method, forming the apertures 315a by photoresist technique, and removing the aluminum film 315 by etching technique or some other method. As a result of the above-mentioned steps, the time required for the manufacture is prolonged, yield is reduced because of the increased troubles resulting from the added steps, and plant facilities are needed to implement the larger number of steps, with the resulting problem of increased manufacturing costs.

FIG. 135 relates to another method for manufacturing a magnetic head according to prior art that is disclosed in Japanese Patent "Kokoku" Publication No. S57-567 (567/1982). In this method, as shown in FIG. 135, on a working stage 321, the other stage 322 is positioned, and then a rotating drum 325 on which head chips 324 are fixed is mounted to a spindle 323 of the stage 322. The head chips 324 are then machined by irradiating them with laser beam 329 or 330 from the laser source 327 or 328, while monitoring them by a monitoring section 326 such as a microscope.

In the manufacturing method of FIG. 135, the position of the track of the head chip 324 is determined with reference to the rotating drum 325, which is not engaged with a fixed drum (not shown in FIG. 135). However in the conditions under which a recording and reproducing device is actually used, unlike those occurring during the laser machining, the rotating drum 325 rotates while it is engaged with the fixed drum. Thus, under actual conditions of use, there is a problem of deviation in the position of the track of the head chip track due to differences in the eccentricity of the spindle 323.

FIGS. 136A–136B relate to another method for manufacturing a magnetic head according to prior art that is disclosed in Japanese Patent "Kokoku" Publication No. H5-80725 (No. 80725/1993). In this method, as shown in FIG. 136A. a head block 334 shown on the right side of this figure is formed by joining ferrite block 331 in which is formed a coil window 331a and a ferrite block 332 in which is formed an apex groove 332a, in such a way that a gap 333 is interposed between them. A head block 338 shown on the left side of this figure is formed by joining a ferrite block 335 in which is formed a coil window 335a and a ferrite block 336 in which is formed an apex groove 336a, in such a way that a gap 337 is interposed between them. A laser beam 339 is then emitted and impinges on the gaps 333 and 337 for forming track grooves 340 which define the position and the width of the track on the head chip.

In the manufacturing method of FIGS. 136A–136B, each of track grooves 340 communicates from the sliding surface to the apex grooves 332a and 336a, thereby relieving the problem of magnetic material that was melted by heat from the laser machining of the track grooves 340 from adhering within the track grooves 340. This, however, creates the problem of poor productivity, since additional mechanical machining is required to form the apex grooves 332a and 336a in the ferrite blocks 332 and 336.

SUMMARY OF THE INVENTION

Accordingly, it is an object of the present invention to provide a method for manufacturing a magnetic head that enables high working accuracy of both the gap depth and the track width.

It is another object of the present invention to provide a highly efficient method for manufacturing a magnetic head, in which the position and the width of the track are defined with high working accuracy.

It is a further object of the present invention to provide a magnetic head and a method for manufacturing thereof that gives extremely high accuracy in the setting of the track position of the head chip with respect to a rotating drum.

It is a further object of the present invention to provide a magnetic head and a method for manufacturing thereof that reduces the chance of magnetic material melted by the laser machining adhering within the track grooves, and increases the working accuracy for the track width and the gap depth.

According to one aspect of the present invention, a method for manufacturing a magnetic head includes the process by which a curved sliding surface or a head chip for making contact with a recording medium and a penetrating window of a side surface of the head chip for determining a gap depth are formed by machining the head chip using a laser beam. The head chip is formed by bonding together pair of core pieces across a magnetic gap. The method comprises the steps of placing the head chip on a working stage; placing a first mask in a light path of a laser beam from a laser source toward the side surface, the first mask being provided with a first slit for the purpose of forming the curved sliding surface of the head chip and a second slit for the purpose of forming the penetrating window of the side surface of the head chip; and irradiating the side surface through the first and second slits with the laser beam, thereby forming the curved sliding surface and the penetrating window in the head chip.

According to another aspect of the present invention, the method for manufacturing a head chip comprises the step of mounting a plurality of head chips on a single head base, prior to the step of placing the head chip on the working stage, wherein the first mask is provided with a plurality of first slits corresponding to the plurality of the head chips fixed to the head base, and the second mask is provided with a plurality of the second slits corresponding to the plurality of the head chips fixed to the head base.

According to still another aspect of the present invention, the method for manufacturing a magnetic head comprises the steps of joining a head block to a cutting substrate, the head block is constituted by joining a pair of core blocks across a magnetic gap; cutting the head block to a depth reaching to the cutting substrate, thereby forming a plurality of head chips on the cutting substrate; placing the cutting substrate provided with the plurality of head chips on a working stage; placing a mask in a light path of a laser beam emitted from a laser source toward sliding surfaces of the head chips, the mask being provided with at least one slit selected from a first slit for forming track grooves that determines track width in the sliding surfaces, a second slit for forming cutaway portions that decrease a thickness of each of the head chips in the sliding surfaces, and a third slit for forming chamfered portions that render an end of each of the sliding surface arcuate; causing the laser beam from the laser source to pass through the at least one slit of the mask and to impinge on the sliding surface of the head chip; and separating the plurality of head chips from the cutting substrate.

According to yet another aspect of the present invention, the method for manufacturing a magnetic head includes the process by which an apex groove for determining a gap depth is formed on a side surface of a head chip by irradiating the head chip with a laser beam. The method comprises the steps of placing the head chip on it working stage; and moving the working stage or a light path of the laser beam from the laser source on the basis of a value of the gap depth, which is measured by measuring means, thereby forming the apex groove.

According to yet another aspect of the present invention, the magnetic head comprises a magnetic gap, and pair of core pieces bonded together across the gap; wherein only one of the core pieces is provided with a coil window; and the magnetic head comprises an apex groove that extends from the coil window until the coil window reaches the other core piece, has a width less than a width of the coil window, and determines a depth of the gap. The width of the apex groove may be less than the diameter of a conductor constituting a coil which is wound through the coil window. The width of the apex groove may decrease toward the leading end, and increase toward the coil window. The leading end of the apex groove may be provided with a portion that is substantially parallel to the sliding surface. The apex groove may be narrower than the coil window at a point connection between the apex groove and the coil window; and an angular portion of stepped configuration may be formed at the point of connection between the apex groove and the coil window so that the coil passing through the coil window and wound onto the core piece cannot be introduced into the apex groove.

According to yet another aspect of the present invention, the method for manufacturing a magnetic head comprises the steps of forming a head block by bonding a pair of core blocks across a magnetic gap; causing a laser beam from a laser source to impinge on a position on the head block, the position being determined with reference to a specific reference position on the head block which is detected on the basis of image data obtained by optically monitoring the head block by a monitoring means, thereby forming track grooves which determine a track width; and cutting the head block to form head chips. The reference position on the head block may be a step formed by joining the pair of core blocks of differing heights across the magnetic gap or a mark applied to the head block at a specified position.

According to yet another aspect of the present invention, the method for manufacturing a magnetic head comprising the steps of: monitoring optically the head chip by a monitoring means; detecting a reference position on the head chip on the basis of image data output from the monitoring means; determining a position to be irradiated on the head chip by a laser beam from a laser source with reference to the reference position on the head chip; and causing the laser beam to impinge on the position to be irradiated by the laser beam. The reference position on the head block may be a step formed by joining the pair of core blocks of differing heights across the magnetic gap or a mark applied to the head block at a specified position.

According to yet another aspect of the present invention, the method for manufacturing a magnetic head comprises the steps of mounting a head chip on a rotating drum; mounting the rotating drum to a spindle in such a way that the rotating drum is facing a fixed drum; placing the rotating drum together with the fixed drum on a working stage; and causing the laser beam from a laser source to impinge on the sliding surface of the head chip at a timing based on a signal corresponding to rotation of the rotating drum while the rotating drum rotates, thereby forming track grooves defining a width and position of the track on the head chip.

According to yet another aspect of the present invention, the method for manufacturing a magnetic head comprises the steps of: causing a laser beam from a laser source to impinge on a side surface of a head chip which is formed by butting together a pair of core pieces across a magnetic gap, thereby forming a penetrating window; and subsequently causing the laser beam from the laser source to impinge on a sliding surface of the head chip, thereby forming track grooves that communicate from the sliding surface to the penetrating window. The maximum length of the track grooves in an advancing direction of a magnetic recording medium in contact with the sliding surface of the head chip is less than the width of the penetrating window.

According to yet another aspect of the present invention, the method for manufacturing a magnetic head comprises the steps of causing a laser beam from a laser source to impinge on a sliding surface of a head chip which is formed by butting together a pair of core pieces across a magnetic gap, thereby forming track grooves having a predetermined depth; and subsequently causing the laser beam from the laser source to impinge on a side surface of the head chip, thereby forming a penetrating window in such a way that the track grooves communicate from the sliding surface to the penetrating window. The maximum length of the track grooves in an advancing direction of a magnetic recording medium in contact with the sliding surface of the head chip is less than the width of the penetrating window.

BRIEF DESCRIPTION OF THE DRAWINGS

FIG. 35A is an explanatory diagram showing the process in which the head chips shown in FIG. 34A are subjected the laser machining;

FIG. 35B is a plan view of a mask used in the process of FIG. 35A;

FIG. 82 is a structural diagram showing the equipment for machining the track grooves according to the manufacturing method of Embodiment 24, using a mark applied to the head chip as a reference point;

FIG. 95 is a plan view of another example of the position for mounting a head chip and a PC magnet on a rotating drum;

FIG. 96 is a timing chart showing the relationship of a PG signal and a laser output in the manufacturing method of FIG. 95;

FIG. 97 is a structural diagram generally showing the machining equipment for accomplishing the manufacturing method of Embodiment 28;

FIGS. 98A–98B are front views of the difference in height between two head chips mounted on a rotating drum;

FIG. 99 is a plan view showing one example of the position for mounting two head chips and two PG magnets on a rotating drum;

FIG. 100 is a timing chart showing the timing of PG signals detected by the PG coils and of the laser output in the manufacturing method of FIG. 99;

FIG. 101 is a plan view showing another example of the position for mounting a head chip and a PG magnet on a rotating drum;

FIG. 102 is a timing chart showing the timing of the PG signal detected by a PG coil and of the laser output in the manufacturing method of FIG. 101;

FIG. 103 is a plan view showing another example of the position for mounting two head chips and two PG magnets on a rotating drum;

FIG. 104 is a timing chart showing the timing of the PG output signals detected by a PG coil and off the laser output in the manufacturing method of FIG. 103;

FIG. 105 is a plan view showing another example of the position for mounting three head chips and three PG magnets on a rotating drum;

FIG. 106 is a timing chart showing the timing of the PG signals detected by the PG coil and of the laser output in the manufacturing method of FIG. 105;

Figure 107:
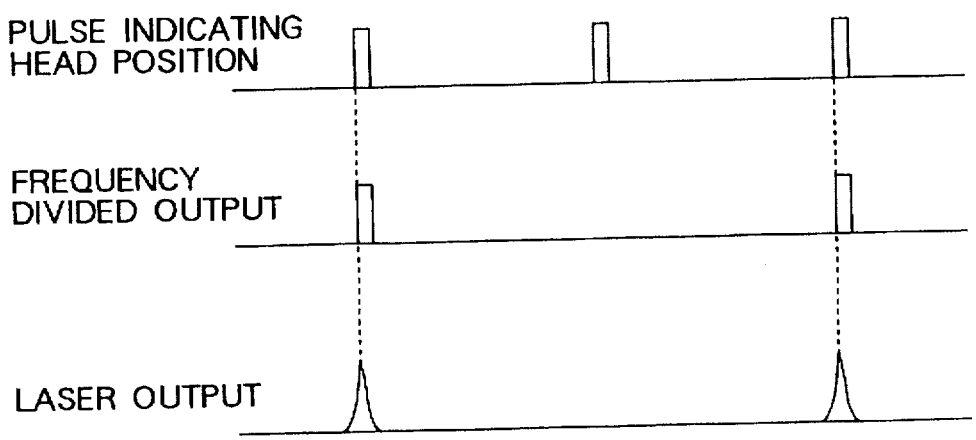
Figure 108:
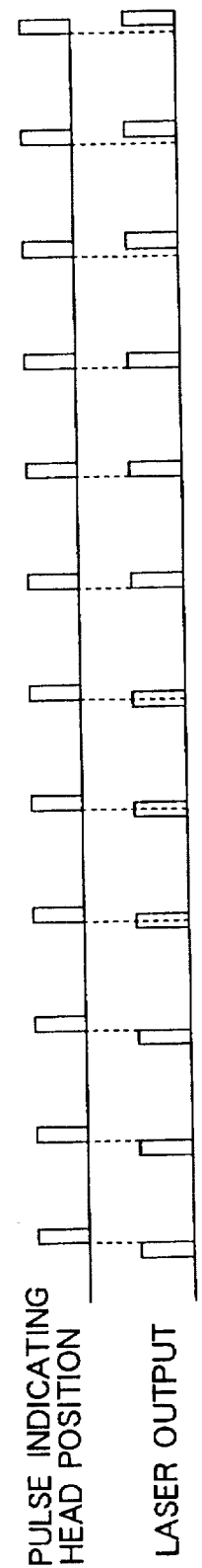
Figure 109A:
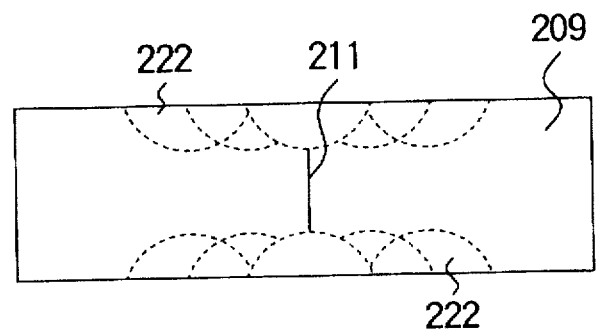
Figure 109B:
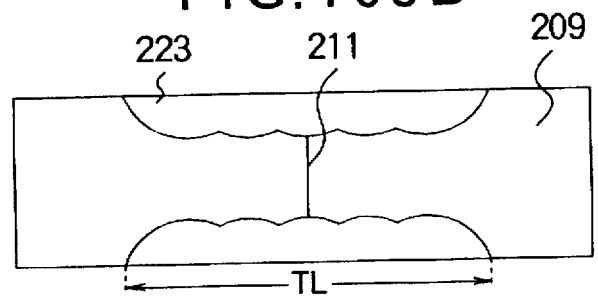
Figure 110A:
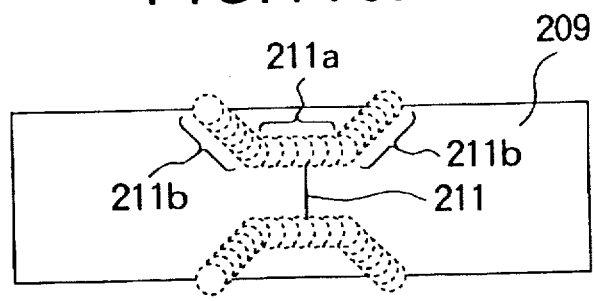
Figure 110B:
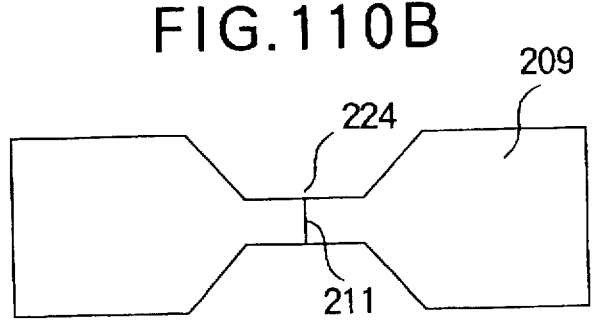
Figure 111A:
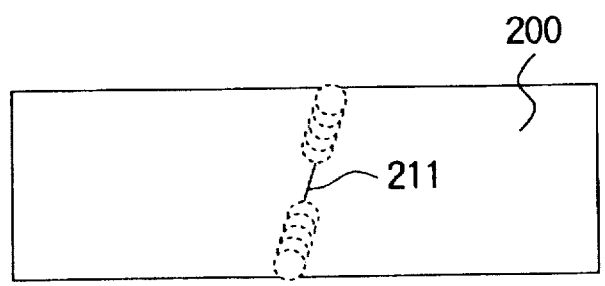
Figure 111B:
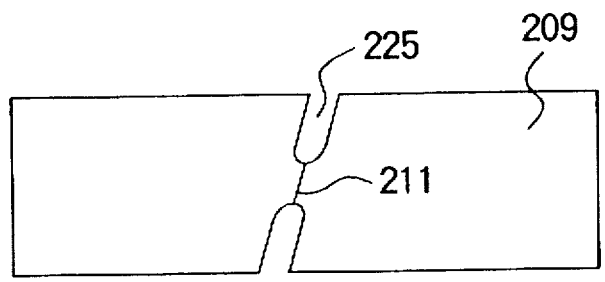
Figure 112:
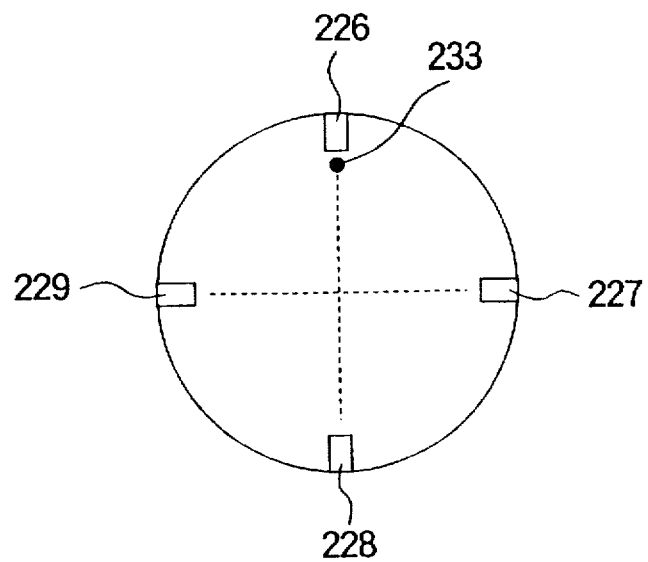
Figure 113:
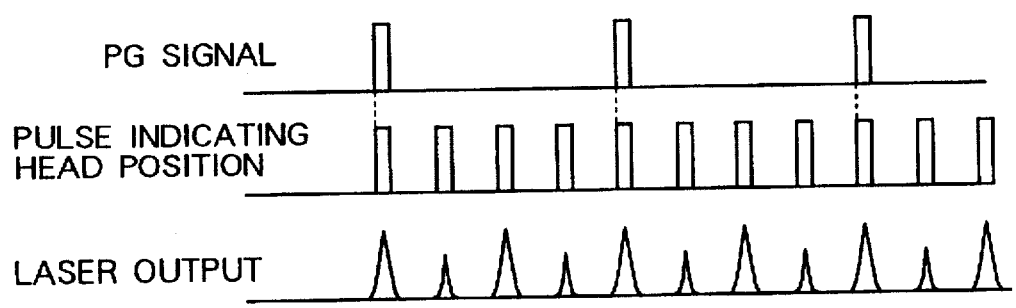
Figure 114A:
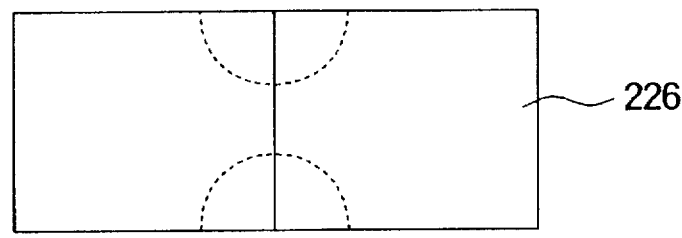
Figure 114B:
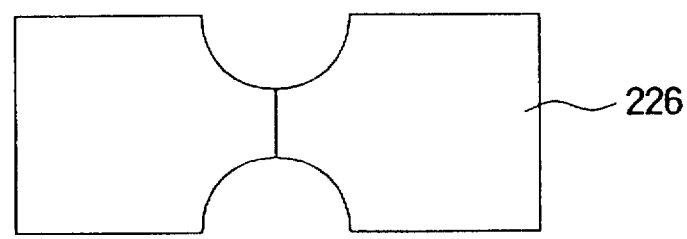
Figure 115A:
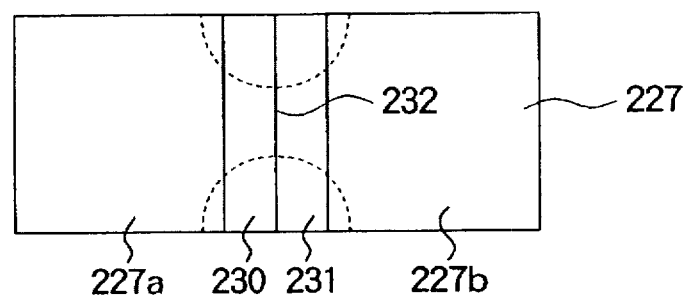
Figure 115B:
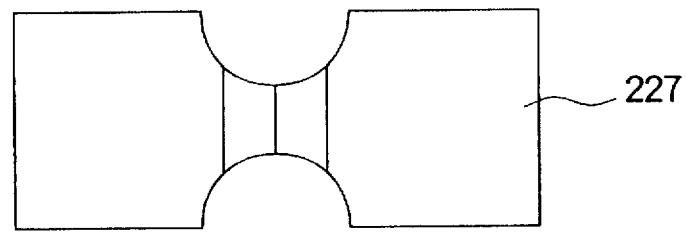
Figure 116A:
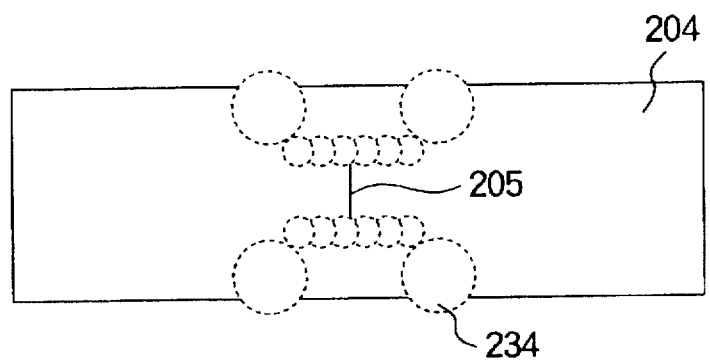
Figure 116B:
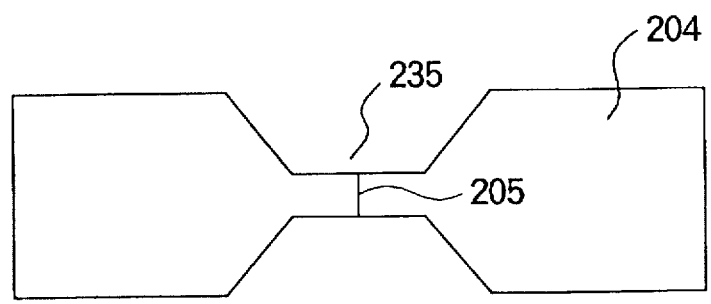
Figure 117A:
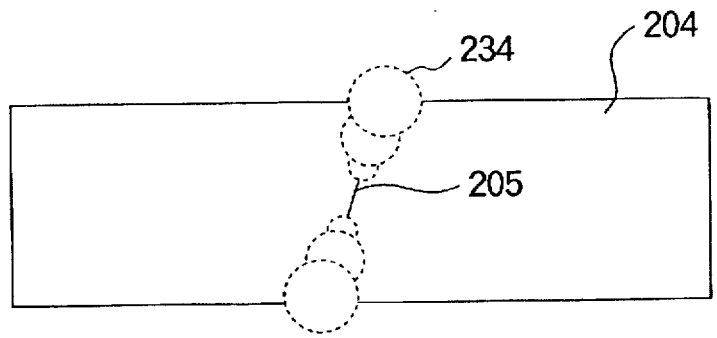
Figure 117B:
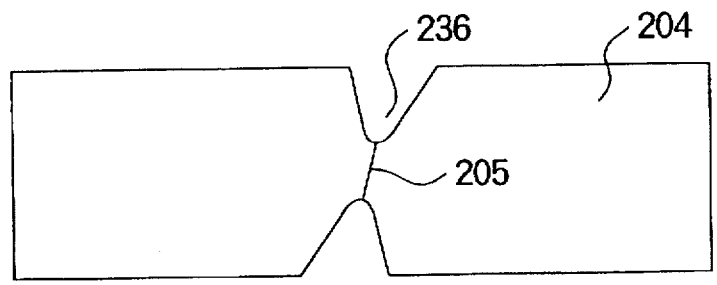
Figure 118:
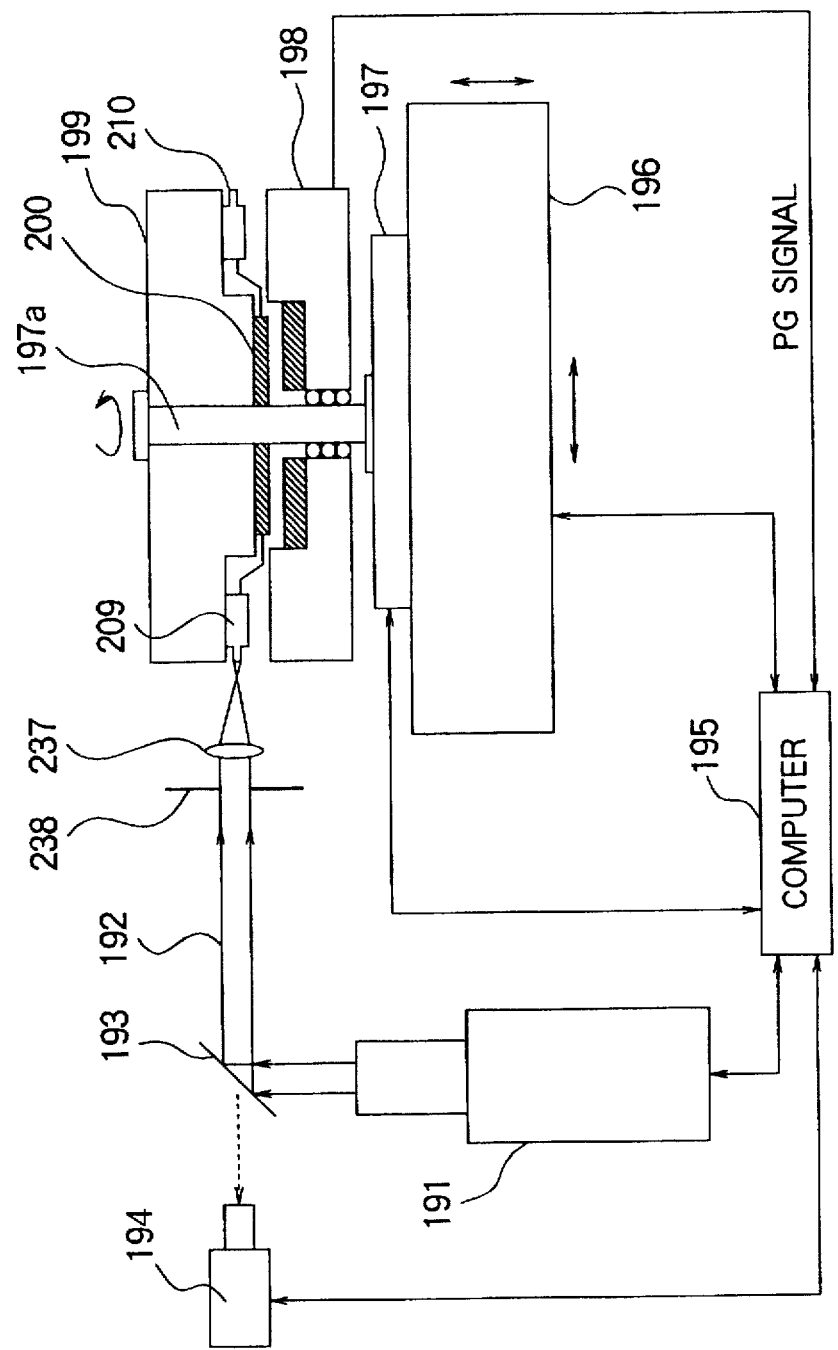
Figure 119:
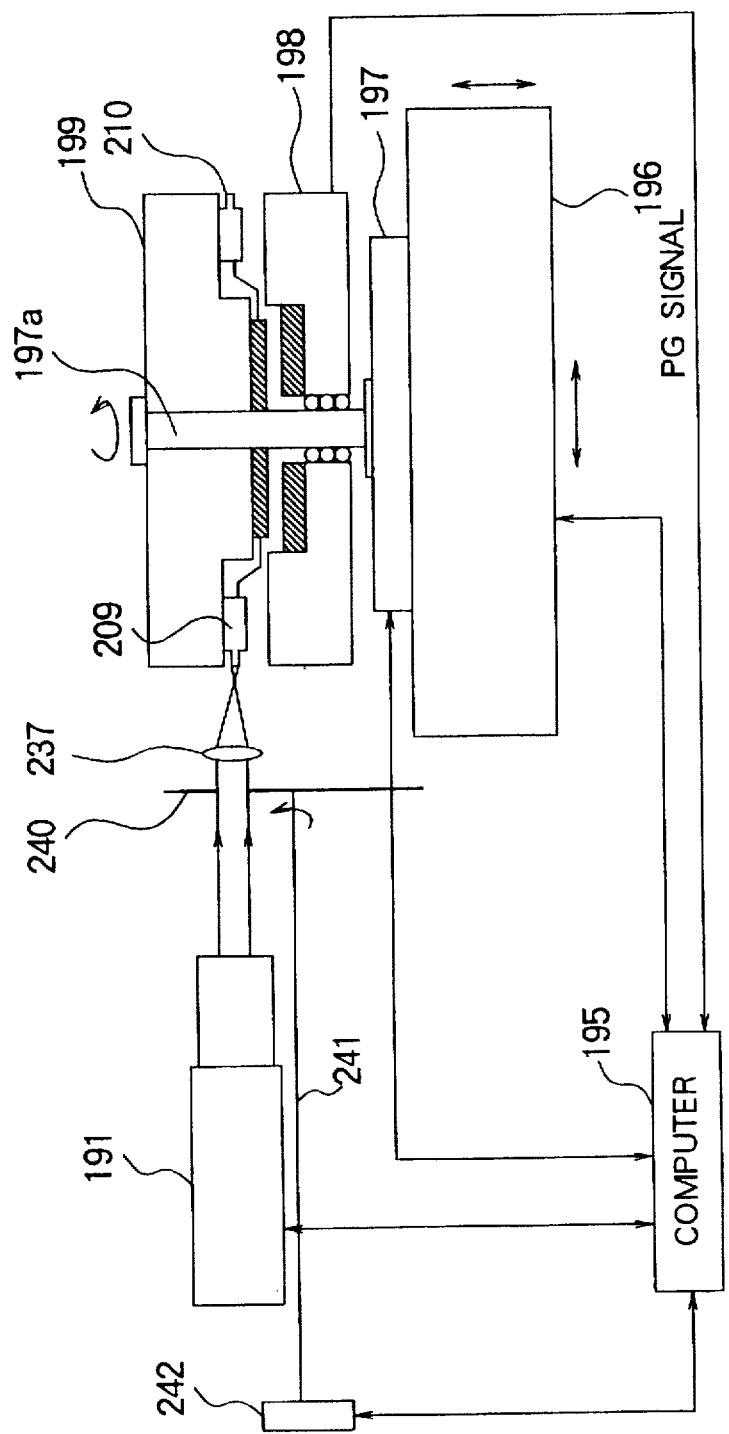
Figure 120A:
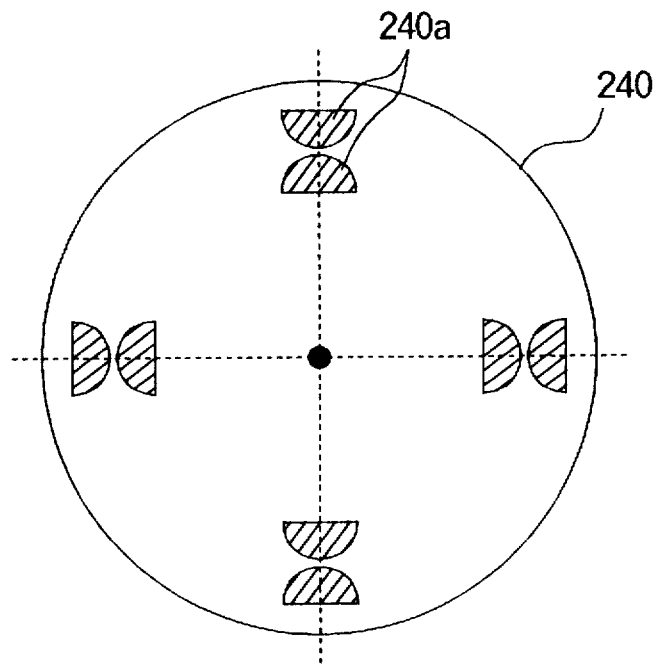
Figure 120B:
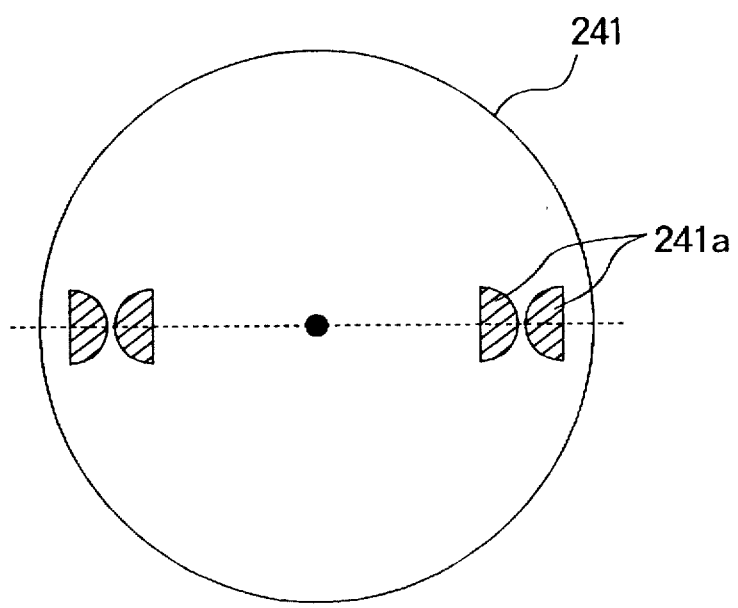
Figure 121A:
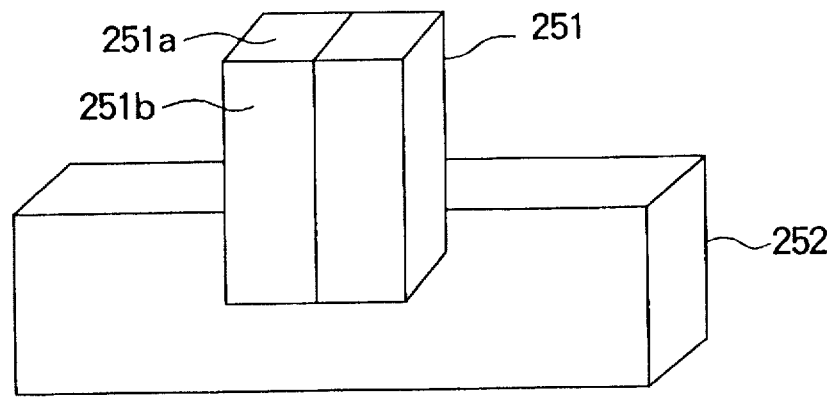
Figure 121B:
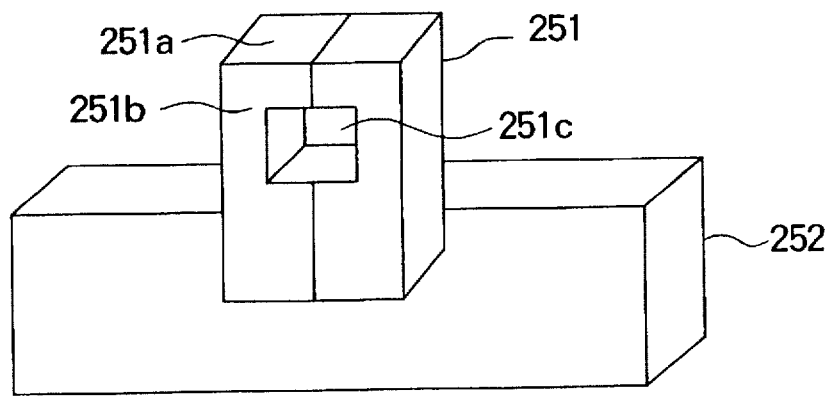
Figure 121C:
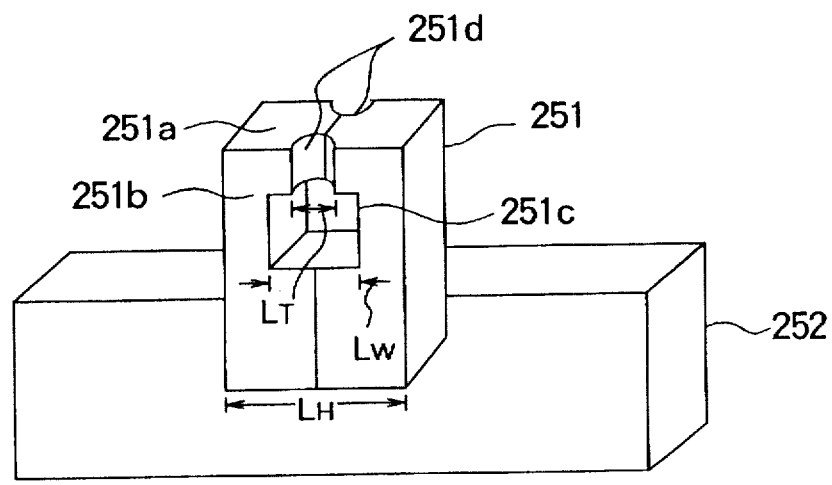
Figure 122A:
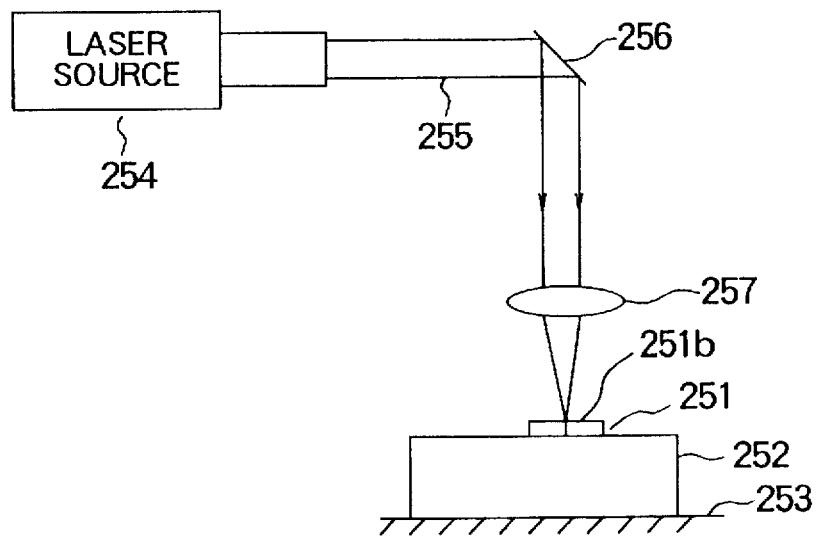
Figure 122B:
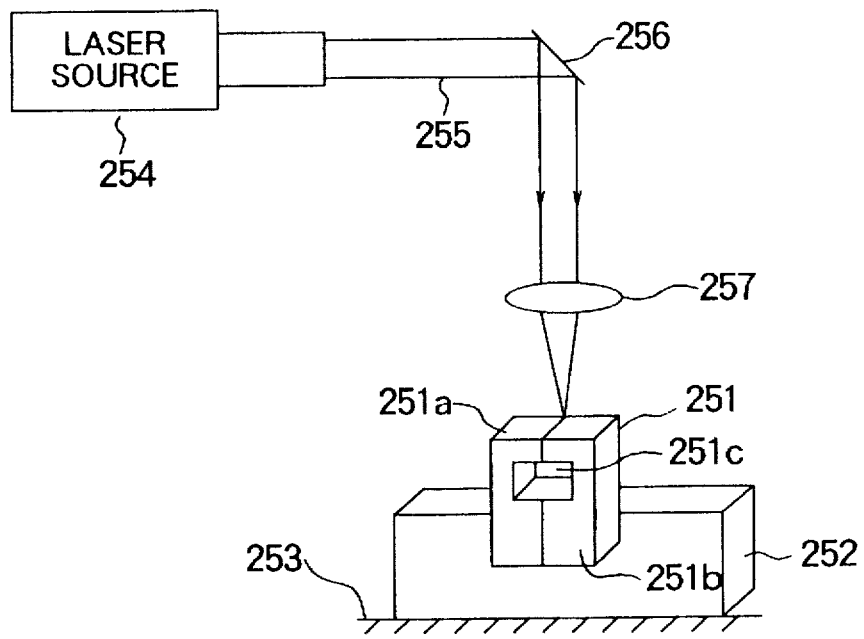
Figure 123A:
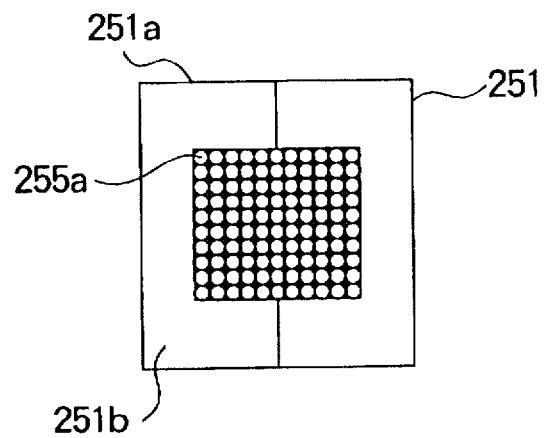
Figure 123B:
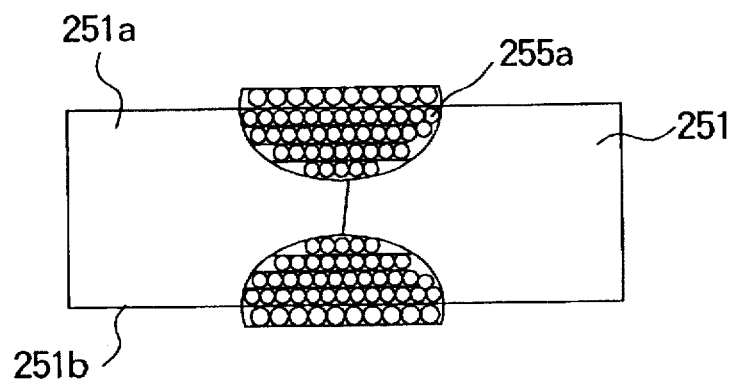
Figure 124:
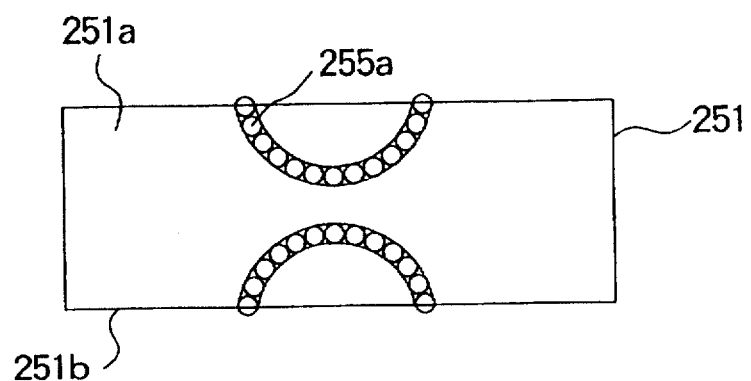
Figure 125A:
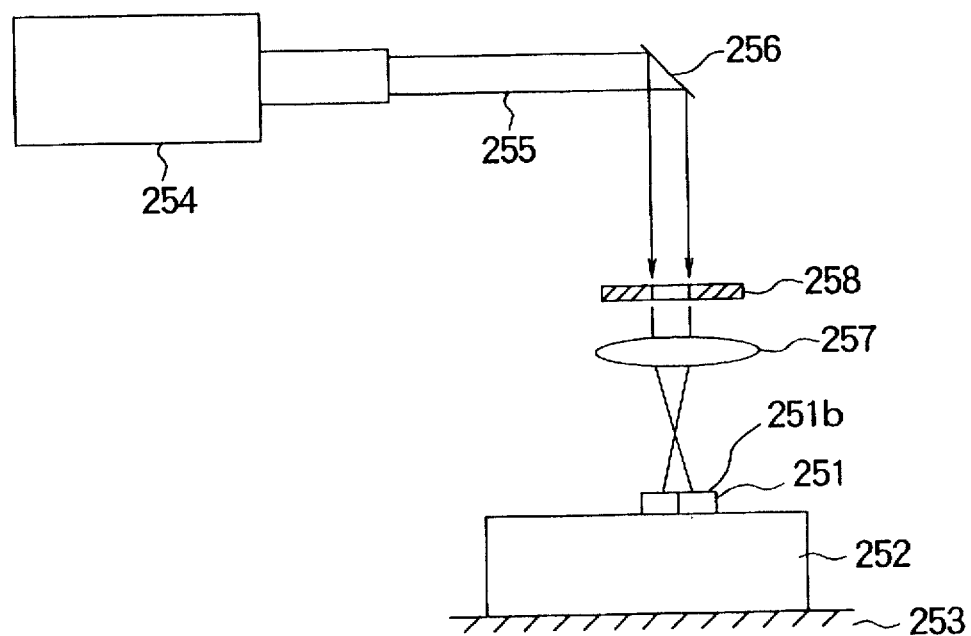
Figure 125B:
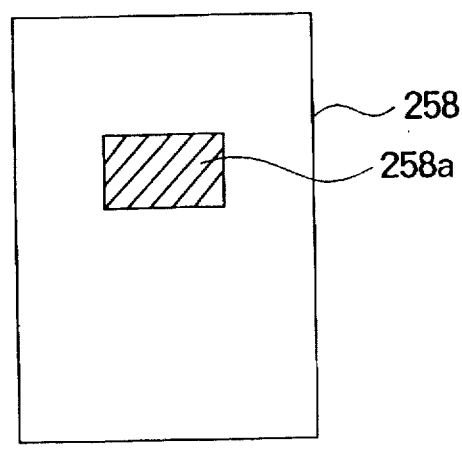
Figure 126A:
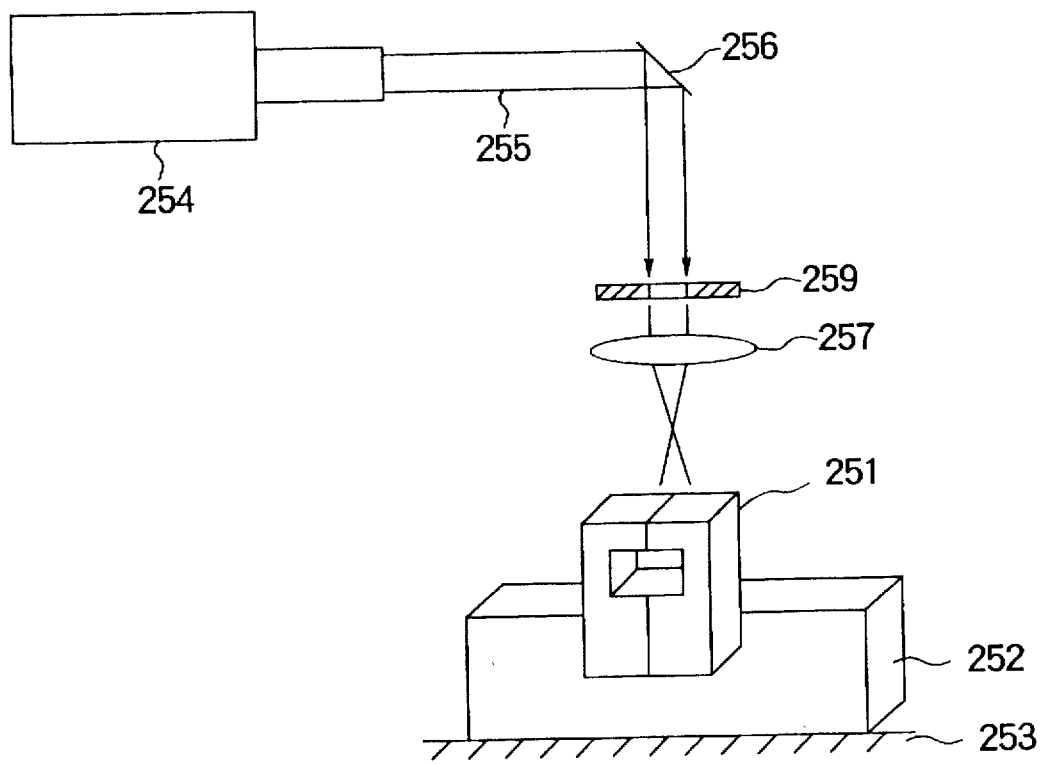
Figure 126B:
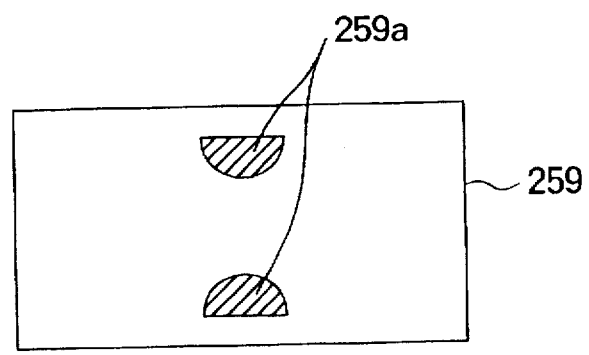
Figure 127A:
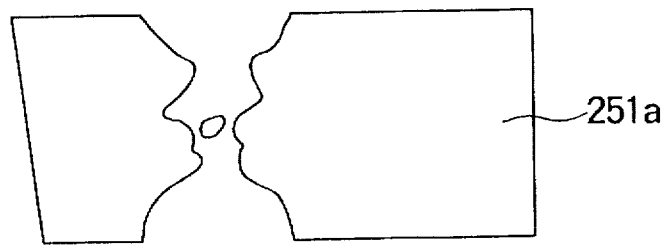
Figure 127B:
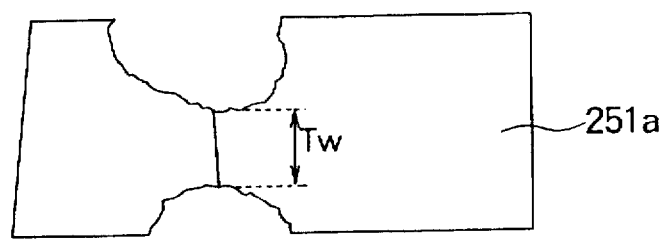
Figure 128:
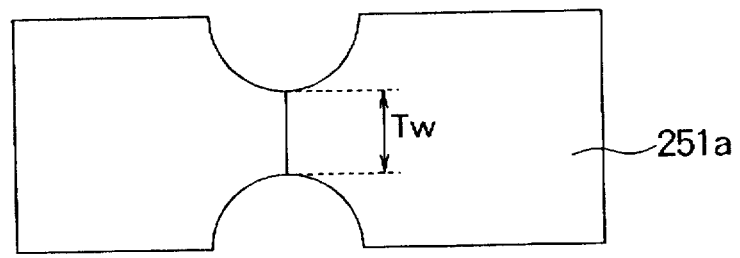
Figure 129A:
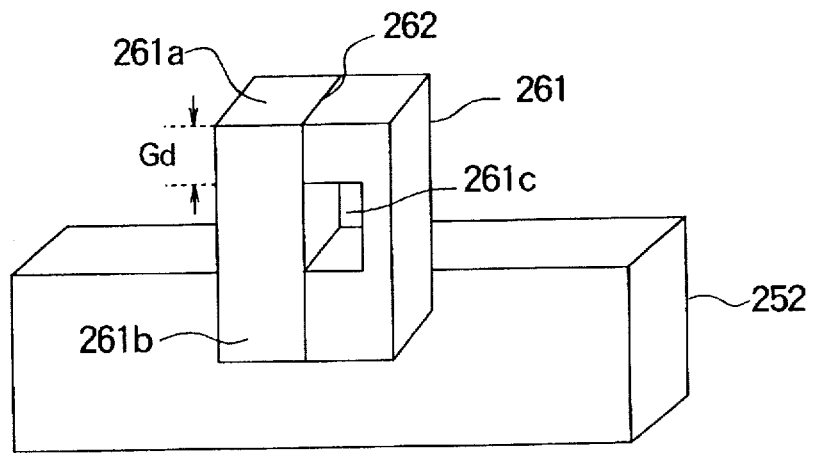
Figure 129B:
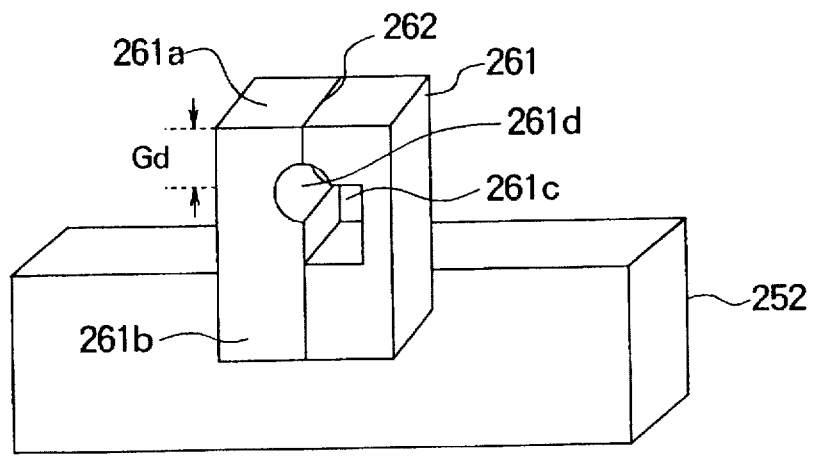
Figure 129C:
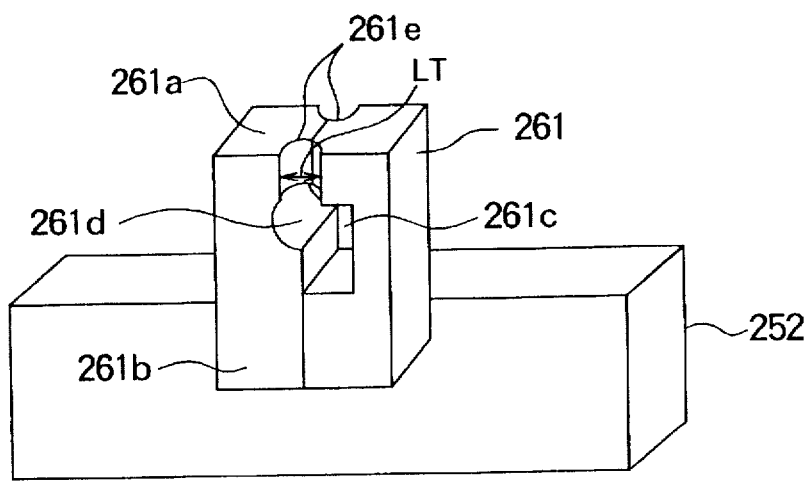
Figure 130A:
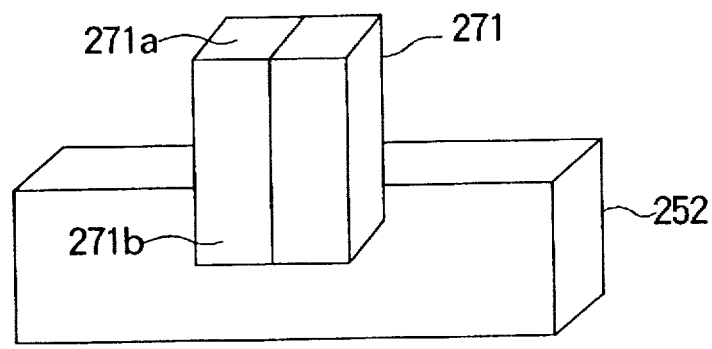
Figure 130B:
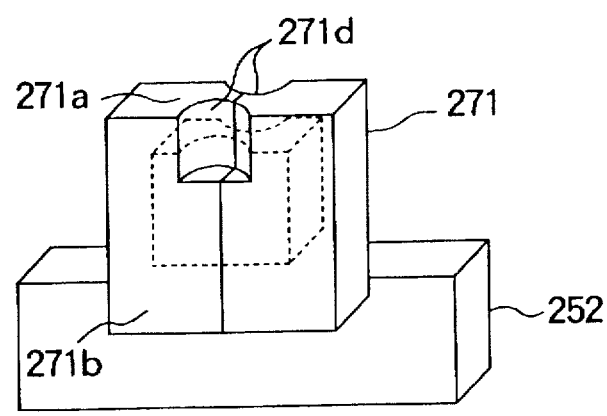
Figure 130C:
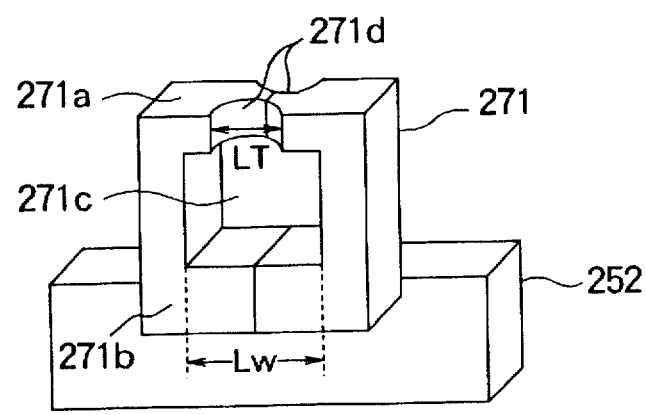
Figure 131A:
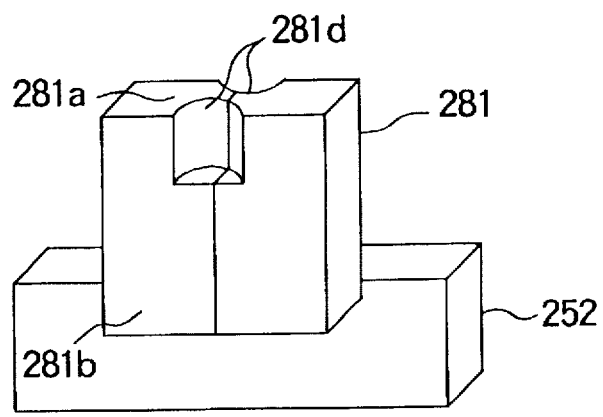
Figure 131B:
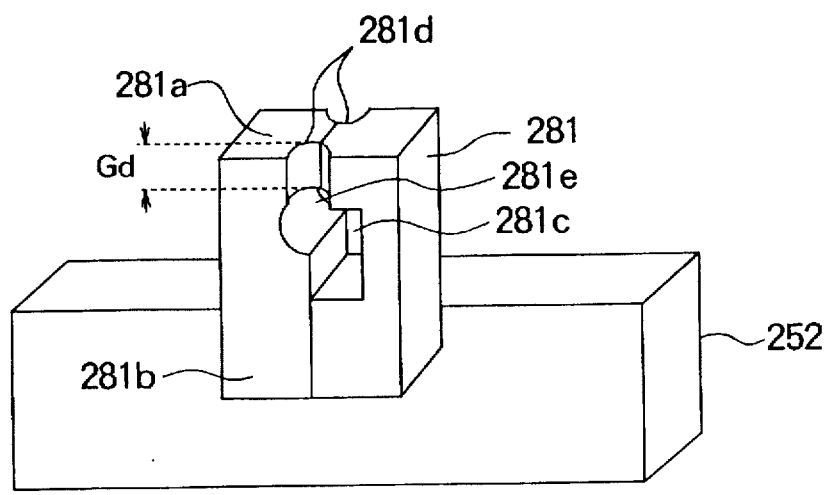
Figure 132A:
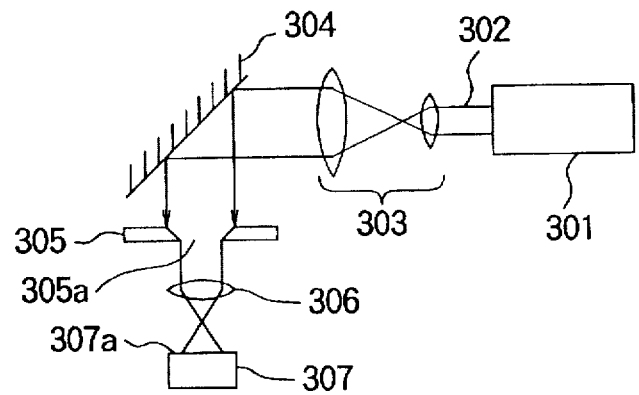
Figure 132B:
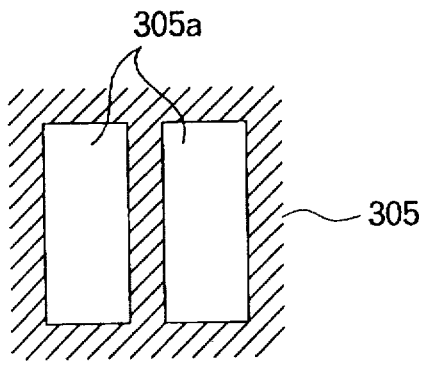
Figure 132C:
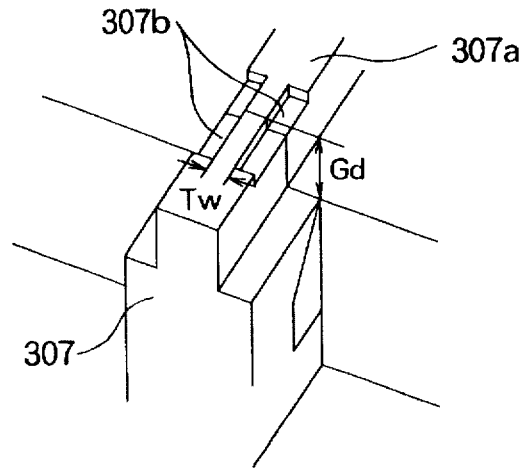
Figure 133A:
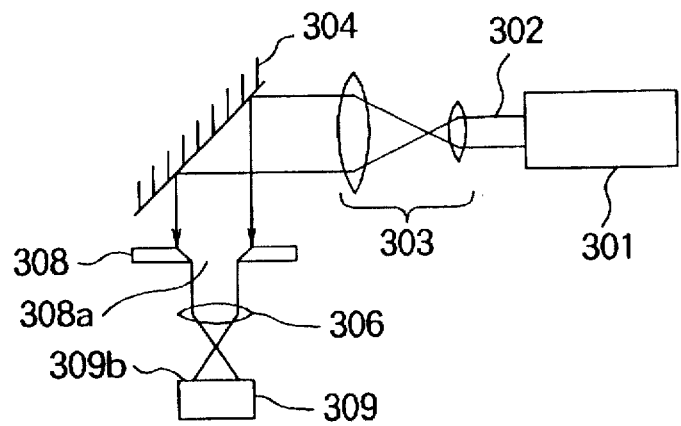
Figure 133B:
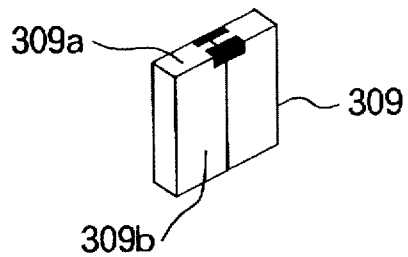
Figure 133C:
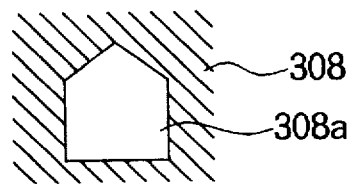
Figure 134A:
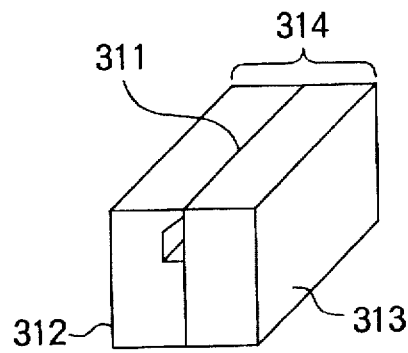
Figure 134B:
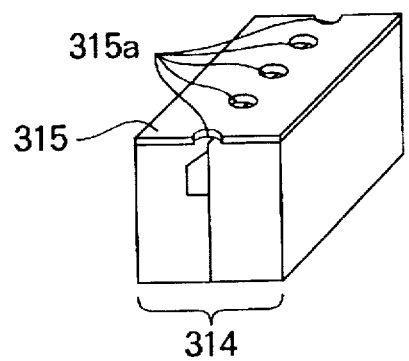
Figure 134C:
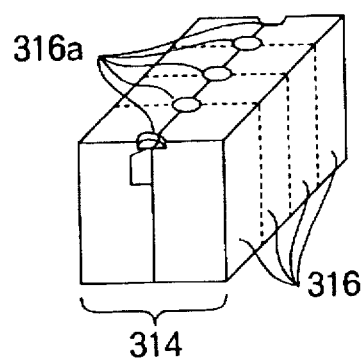
Figure 135:
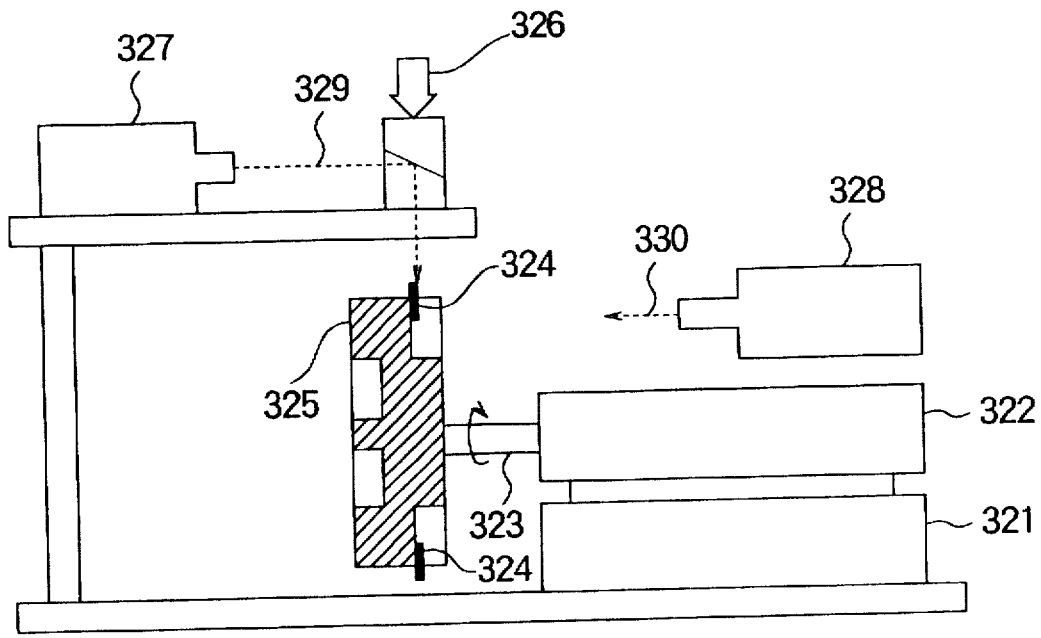
Figure 136A:
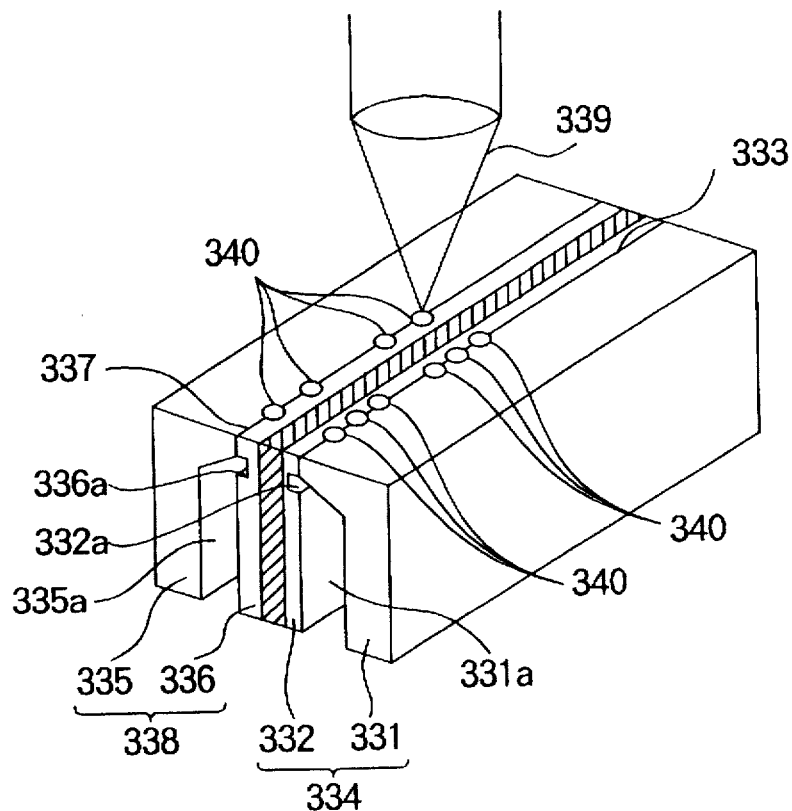
Figure 136B:
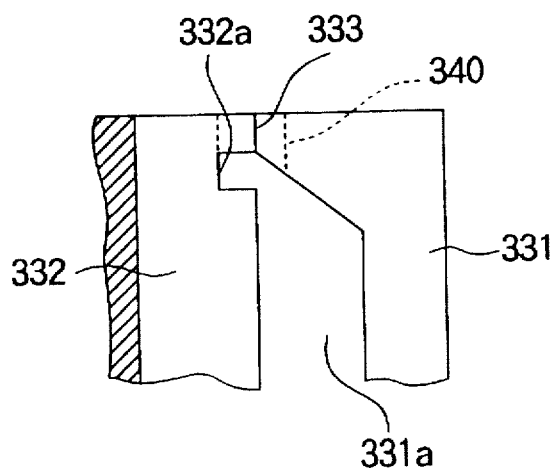

FIG. 107 is a timing chart showing the PG signal detected by the PG coil and the timing of the laser output;

FIG. 108 is a timing chart in which a delay is applied to laser irradiation by means of the manufacturing method of Embodiment 29;

FIGS. 109A–109B are front views of the head chip showing the portion to be removed by the laser machining according to Embodiment 29 and of the head chip after the laser machining;

FIGS. 110A–110B are front views of the head chip showing the portion removed by the laser machining according to Embodiment 29, and of the head chip after the laser machining;

FIGS. 111A–111B are front views of the head chip showing the portion to be removed by the laser machining according to Embodiment 21, and of the head chip after the laser machining;

FIG. 112 is a plan view in which four head chips are mounted at 90° intervals on a rotating drum used in the manufacturing method of Embodiment 30;

FIG. 113 is a timing chart showing the timing and intensity of laser irradiation in the manufacturing method of Embodiment 30;

FIGS. 114A–114B are front views of the head chip showing the portion to be removed by the laser machining according to Embodiment 30, and of the sliding surface after the laser machining;

FIGS. 115A–115B are front views of the head chip showing the portion to be removed by laser machining according to Embodiment 30, and of the sliding surface after the laser machining;

FIG. 116A is an explanatory diagram showing the diameter of the laser beam in the manufacturing method Embodiment 31;

FIG. 116B is a front view of the sliding surface after the laser machining;

FIG. 117A is an explanatory diagram showing the diameter of the laser beam in another manufacturing method of Embodiment 31;

FIG. 117B is a front view of the sliding surface after the laser machining of FIG. 117A;

FIG. 118 is a structural diagram generally showing the machining equipment for accomplishing the manufacturing method of embodiment 32;

FIG. 119 is a structural diagram generally showing the features of the machining equipment for accomplishing the manufacturing method of Embodiment 33;

FIGS. 120A–120B are plan views of masks used in the equipment of FIG. 119;

FIGS. 121A–121C are perspective views showing the configurations of a head chip at selected machining steps the manufacturing method of Embodiment 34;

FIGS. 122A–122B are explanatory diagrams showing the method of machining a head chip in Embodiment 34;

FIGS. 123A–123B are explanatory diagrams showing an example of the laser beam scanning method in Embodiment 34;

FIG. 124 is an explanatory diagram showing another example of the laser beam scanning method in Embodiment 34;

FIG. 125A is an explanatory diagram showing another method off the laser machining in Embodiment 34;

FIG. 125B is a plan view of a mask used in FIG. 125A;

FIG. 126A is an explanatory diagram showing yet another method of the laser machining in Embodiment 34;

FIG. 126B is a plan view of a mask used in FIG. 126A;

FIGS. 127A–127B are explanatory diagrams showing in typical form microscopic observations of the configuration of the sliding surface when track grooves are machined by laser beam;

FIG. 128 is an explanatory diagram showing in typical form a microscopic observation of the configuration of the sliding surface when track grooves are machined by the laser beam;

FIGS. 129A–129C are perspective views showing the configurations of a head chip at selected machining steps the manufacturing method of Embodiment 35;

FIGS. 130A–130C are perspective views showing the configurations of a head chip at selected machining steps the manufacturing method of Embodiment 36;

FIGS. 131A–131B are perspective views showing the configurations of a head chip at selected machining steps the manufacturing method of Embodiment 37;

FIGS. 132A–132(3 are diagrams for explaining conventional laser machining of a sliding surface of a head chip using a mask;

FIGS. 133A–133C are diagrams for explaining conventional laser machining of a side surface of a head chip using a mask;

FIGS. 134A–134C are perspective views for explaining conventional laser machining of a plurality of track grooves in the head block using a mask;

FIG. 135 is a diagram for explaining conventional laser machining of a head chip fixed to a rotating drum according to prior art; and FIGS. 136A–136B are diagrams for explaining conventional laser machining of a track groove in a head block.

DETAILED DESCRIPTION OF THE INVENTION

Preferred embodiments of the present invention will described below with reference to the accompanying drawings.

Embodiment 1

Figure 1A:
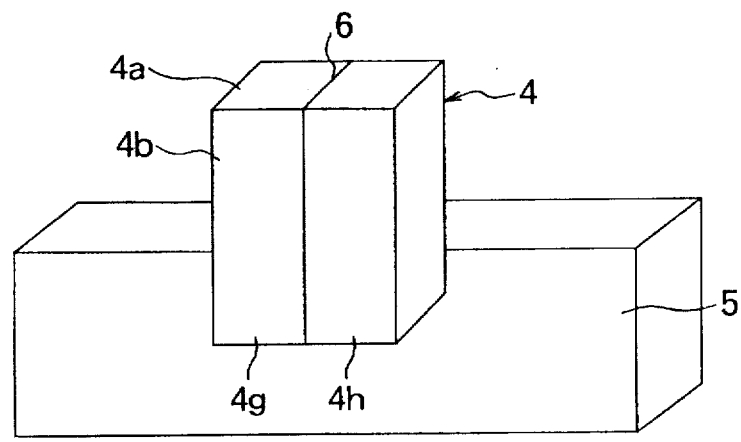
FIGS. 1A-1C are perspective views generally showing a configuration of a head chip at selected machining steps in the manufacturing method of Embodiment 1.
Figure 1B:
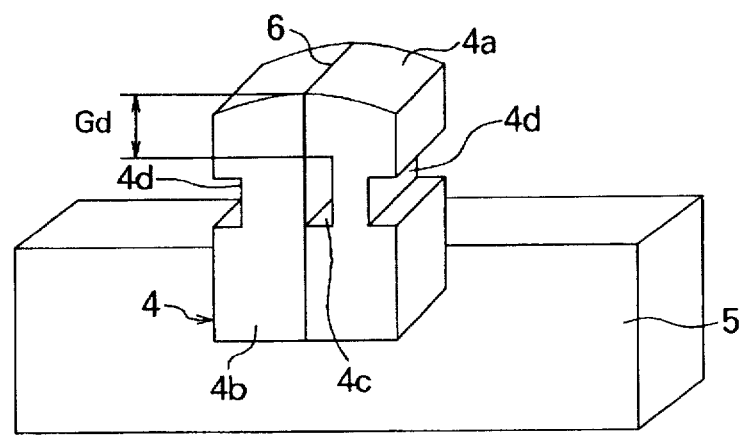
Figure 1C:
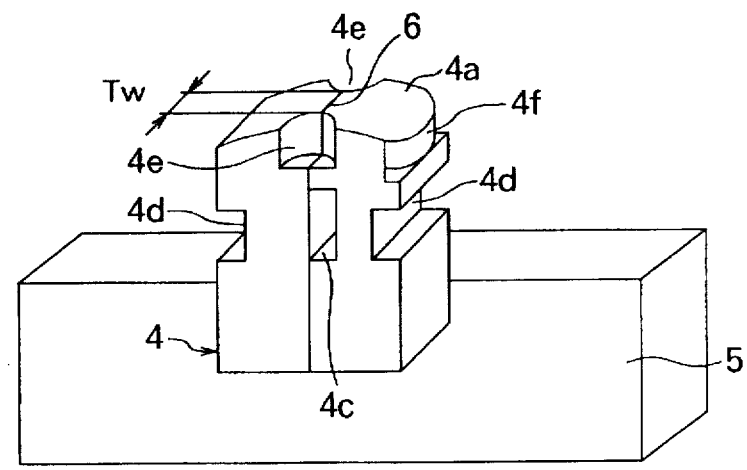
Figure 2A:
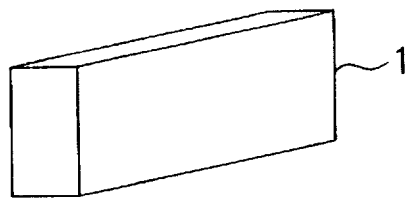
FIGS. 2A-2D are perspective views generally showing the steps of manufacturing the head chip of FIG. 1A from a ferrite block.
Figure 2B:
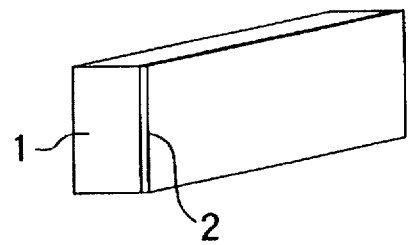
Figure 2C:
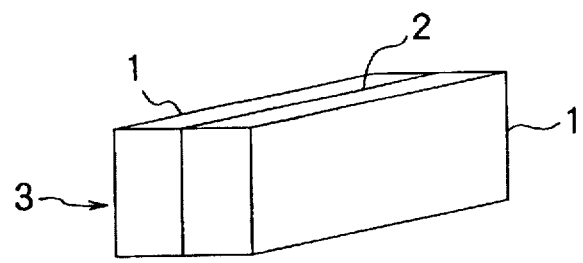
Figure 2D:
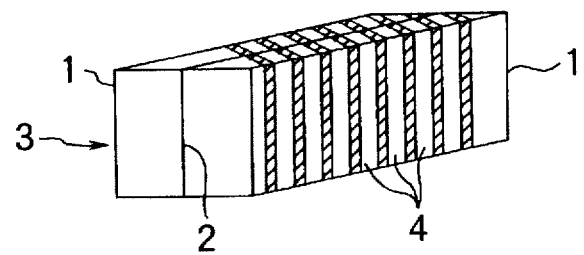
Figure 3A:
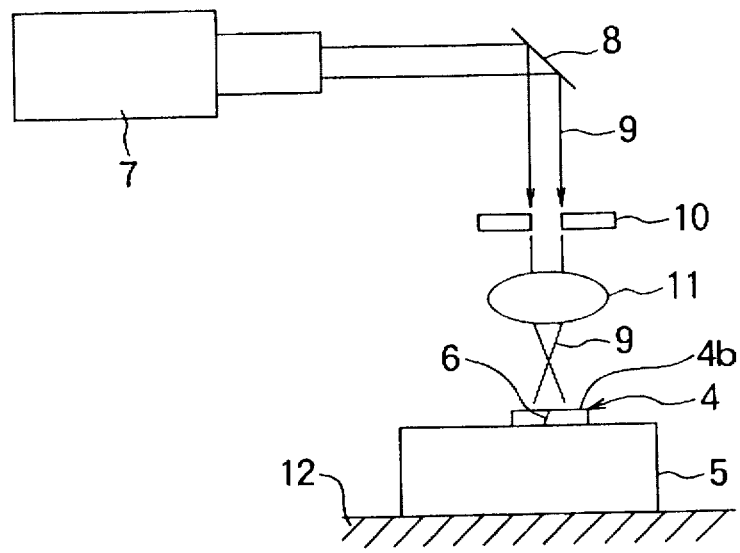
FIG. 3A is an explanatory diagram showing the process for machining the head chip of FIG. 1A into the configuration shown in FIG. 1B.
Figure 3B:
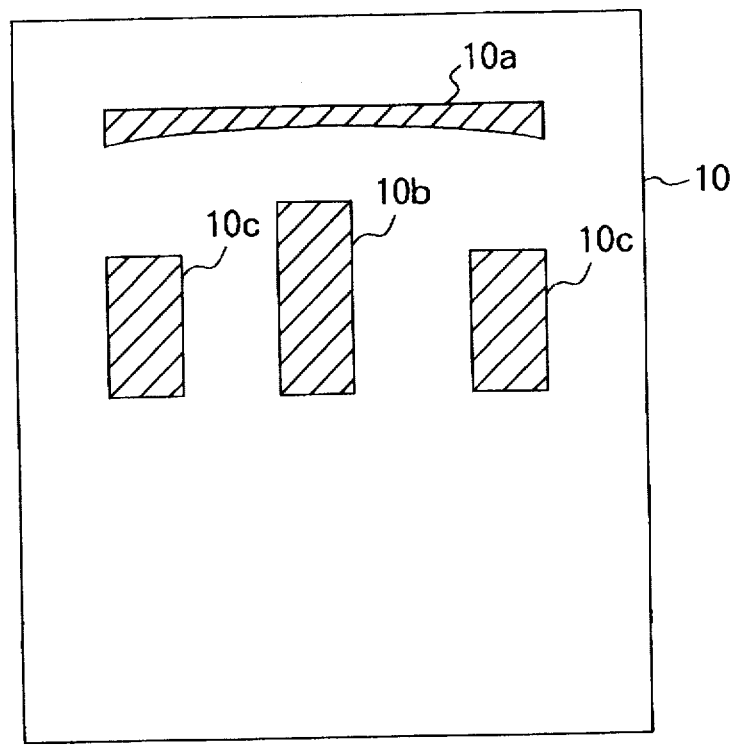
FIG. 3B is a plan view of a mask used in the process of FIG. 3A.
Figure 4A:
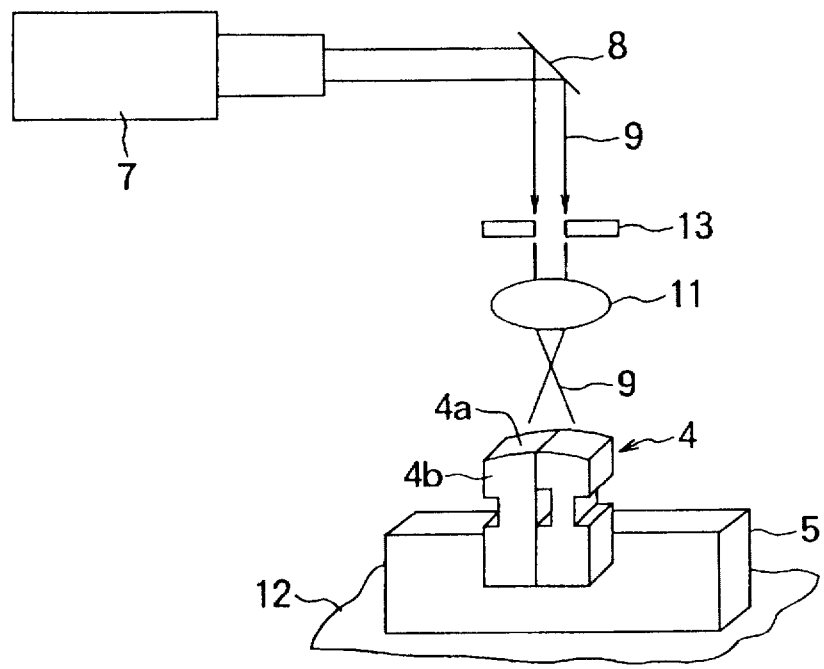
FIG. 4A is an explanatory diagram showing the process for machining the head chip of FIG. 1B into the configuration shown in FIG. 1C.
Figure 4B:
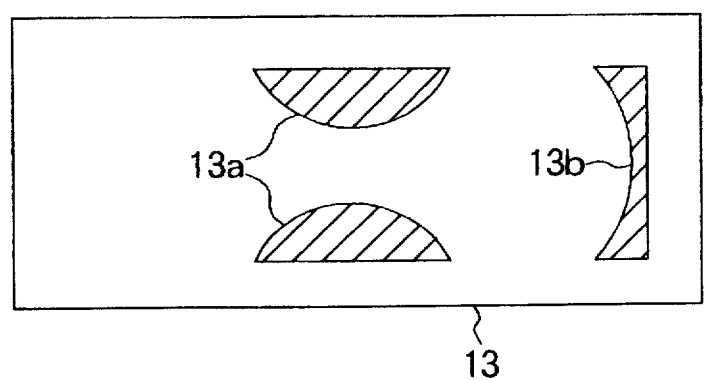
FIG. 4B is a plan view of a mask used in the process of FIG. 4A.

FIGS. 1A–1C, FIGS. 2A–2D, FIGS. 3A–3B and FIGS. 4A–4B relate to a method for manufacturing a magnet, it head according to Embodiment 1 of the present invention. FIGS. 1A–1C are perspective views generally showing the configurations of a head chip 4 at each machining step. FIGS. 2A–2D are perspective views generally showing the process of manufacturing the head chip 4 of FIG. 1A from a ferrite core block 1 and a gap material 2. FIG. 3A is an explanatory diagram showing the process of machining the head chip 4 of FIG. 1A into the configuration shown in FIG. 1B, and FIG. 3B is a plan view of a mask 10 used in FIG. FIG. 4A is an explanatory diagram showing the process of machining the head chip 4 of FIG. 1B into the configuration shown in FIG. 1C, and FIG. 4B is a plan view of a mask 13 used in FIG. 4A.

According to the manufacturing method of Embodiment 1, a ferrite core block 1 shown in FIG. 2A is first cut, from ferrite ingot (not shown) by the mechanical machining, and a layer of gap material 2 is formed on the designated surface of the ferrite core block 1, as shown in FIG. 2B, by the thin film formation technique such as vapor deposition technique. The gap material 2 is made from, for example, a compound of $SiO_2$ and non-magnetic metal or a compound of $SiO_2$ and glass. Next, another ferrite core block 1 (shown at right side in FIG. 2C) is pressed to the gap material 2 of the ferrite core block 1 (shown at left side in FIG. 2C), and both ferrite core blocks 1 are joined together by welding to form a head block 3 as shown in FIG. 2C. Next, as shown in FIG. 2D, the head block 3 is mechanically cut at the hatched portions to form a plurality of head chips 4. Next, as shown in FIG. 1A, the head chip 4 is fixed to a head base 5. In FIG. 1A, a reference numeral 4a designates a sliding surface of the head chip 4 that comes into contact with a recording medium (not shown) such as a magnetic tape, 4b designates a side surface of the head chip 4, and 6 designates a magnetic gap (hereinafter referred to simply as "gap") made of the gap material 2.

Figure 11:
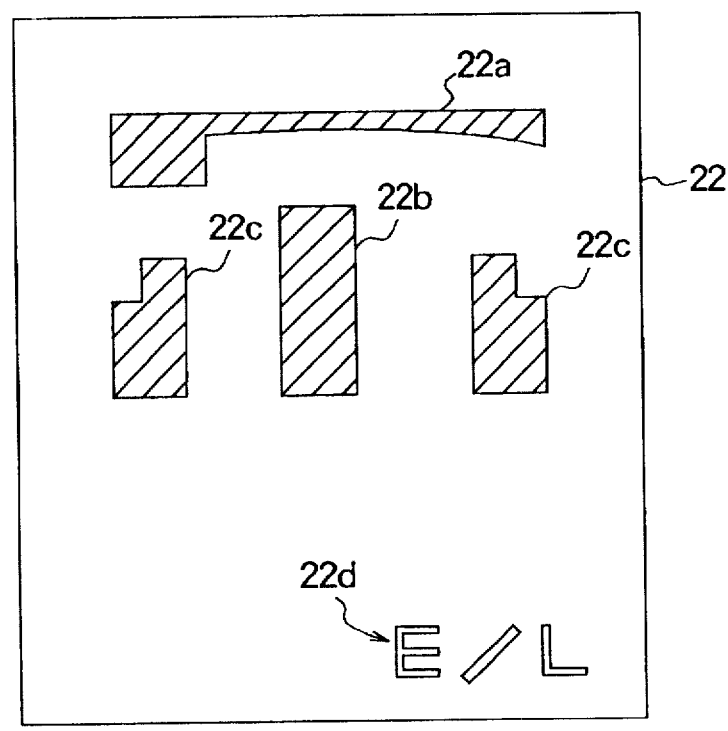
FIG. 11 is a plan view of a mask used in the process of FIG. 10.

Following is a description of the process by which the head chip 4 of FIG. 1A is machined into the configuration shown in FIG. 1B. This process is accomplished by means of the laser machining equipment, as shown in FIG. 3A. In FIG. 3A, a reference numeral 7 designates a laser source that emits laser beam 9, 8 designates a bend mirror that reflects the laser beam 9 emitted from the laser source 7 and changes the direction in which it proceeds, 10 designates a mask that is shown in FIG. 3B, 11 designates an image-forming lens that condenses the laser beam 9, and 12 designates a working stage to which the head base 5 with the head chip 4 is put or fixed. In FIG. 3B, hatched portions 10a, 10b and 10c provided in the mask 10 are slits that allow the passage of the laser beam B. The slit 10a is provided for the purpose of machining the head chip 4 and forming the curved sliding surface 4a which makes contact with the recording medium. The slit 10b is provided for the purpose machining the head chip 4 and forming a coil window the side surface 4b. The slits 10c are provided for the purpose of machining the head chip 4 and forming coil stopper grooves 4d which prevent the movement of a coil (not shown in FIGS. 1A to 1C), which is wound onto the head chip through the coil window 4c.

In the machining process, as shown in FIG. 3A, the head chip 4 fixed to the head base 5 is set on the working stage 12 so that the side surface 4b is facing upward, the mask 10 is placed in the light path of the laser beam 9, and then the laser beam 9 passes from the laser source 7 through the slits 10a, 10b and 10c of the mask 10 and the image-forming lens 11 to irradiate the side surface 4b of the head chip 4. By this means, the portion of the head chip 4 irradiated by the laser beam 9 is etched, thereby, as shown in FIG. 1B, forming a curved sliding surface 4a, a coil window 4c, and two coil stopper grooves 4d. Here, the curved configuration of the sliding surface 4a of the head chip 4 is generally referred to as "top R configuration".

Following is a description of the process by which the head chip 4 of FIG. 1B is machined into the configuration shown in FIG. 1C. This process is accomplished by the laser machining equipment, as shown in FIG. 4A. The equipment of FIG. 4A is equivalent to the equipment of FIG. 3A except that the mask 10 of FIG. 3A is replaced by the mask 13 of FIG. 4B. In FIG. 4B, hatched portions 13a and 13b provided in the mask 13 are slits that allow the passage of the laser beam 9. The slit 13a is provided for the purpose of forming the track grooves 4e that define the position and the width $T_W$ of the track of the sliding surface 4a, and the slit 13b is provided for the purpose of forming the portion of the head chip 4 that is near the sliding surface 4a into an arcuate chamfered portion 4f.

In the machining process, as shown in FIG. 4A, the head chip 4 fixed to the head base 5 is set on the working stage 12 so that the sliding surface 4a is facing upward, the mask 13 is placed in the light path of the laser beam 9, and then the laser beam 9 passes from the laser source 7 through the slits 13a and 13b of the mask 13 and the image-forming lens 11 to irradiate the sliding surface 4a of the head chip 4. By this means, the portion of the head chip 4 irradiated by the laser beam 9 is etched, thereby, as shown in FIG. 1C, forming a pair of semicylindrical track grooves 4e disposed facing each other, and the chamfered portion 4f that has an arcuate planar configuration.

As has been described above, in the manufacturing method of Embodiment 1, since the laser machining accomplished by irradiation of the head chip 4 by the laser beam 9 through the slits formed in the mask 10 or 13, the head chip 4 can be easily machined, even in complex configurations. Further, since the gap depth $G_d$ (shown in FIG. 1B) can be accurately set by the spacing between the slit 10a for machining the sliding surface 4a and the slit 10b for machining the coil window 4c and by the reduction ratio of the image-forming lens 11, i.e., the ratio by which the diameter of the laser beam 9 is reduced by the image-forming lens 11, it is possible to assure that, in magnetic heads manufactured by the identical process, the gap depth will always be kept constant.

Figure 5:
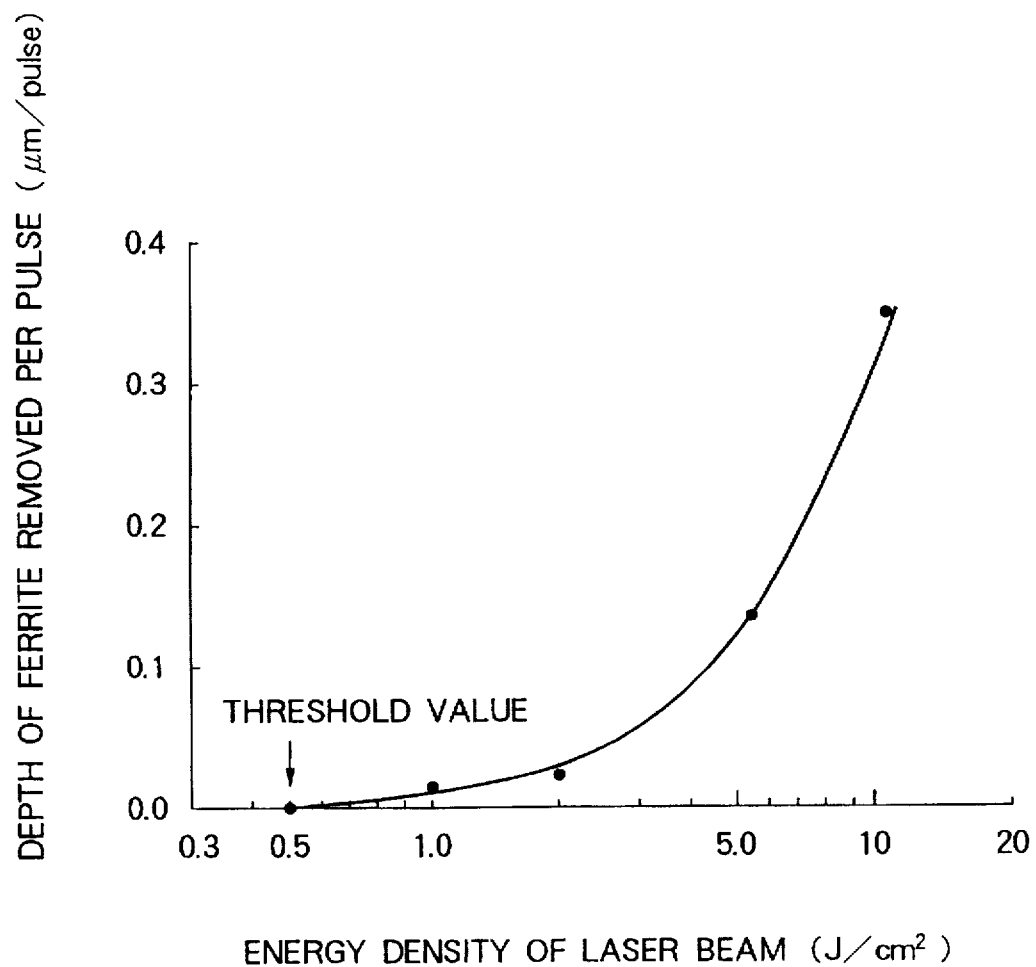
FIG. 5 is a graph showing the relationship between the energy density of the laser beam and the depth of ferrite removed per pulse.

When core pieces (shown as the numerals 4g and 4h in FIG. 1A) constituting the head chip 4 are made of ferrite, it is desirable that the laser source 7 be all excimer laser such as a KrF laser (wavelength 248 [nm]) and the pulse energy density of the laser beam emitted from the laser source 7 is not less than 0.5 [J/cm$^2$] which is the threshold value of the ferrite machining conditions shown FIG. 5. The laser source 7 may be an XeCl laser (wavelength 308 [nm]) or an ArF laser (wavelength 193 [nm]). Further, the laser source 7 may be a YAG laser which emits a laser beam having a short-pulse and high-peak output using a Q switch. Further, the laser source 7 may use higher harmonics of the YAG laser (e.g., double wave (wavelength 532 [nm]), three times wave (wavelength 355 [nm]) and four times wave (wavelength 266 [nm])). By shortening the wavelength of the laser beam, the formation of a heat affected layer by the heat of the laser machining can be inhibited. It is also possible to carry out the laser machining with the head chip 4 immersed in a fluid or reactive gas, thereby preventing the formation of a heat affected layer by the heat of the laser machining. It is also possible to use as the laser beam a continuous wave such as an Ar laser (wavelength: 450–530 [nm]), a YAG laser with a low output (several tens to several hundreds of milliwatts), or a higher harmonic of a YAG laser, thereby promoting a reaction for the removal of the heat affected layer.

It is also possible, depending on the power of the laser used, to eliminate image-forming lens 11, thereby enabling the laser machining to be carried out with the mask 10 or 13 in contact with the head chip 4.

Embodiment 2

Figure 6A:
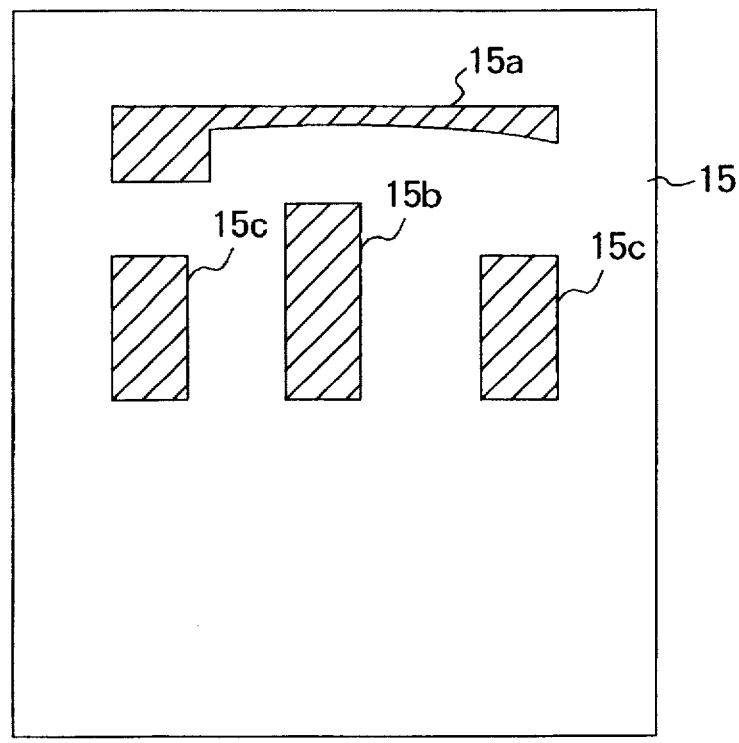
FIG. 6A is a plan view of a mask used in the laser machining of a side surface of a head chip according to the manufacturing method of Embodiment 2.
Figure 6B:
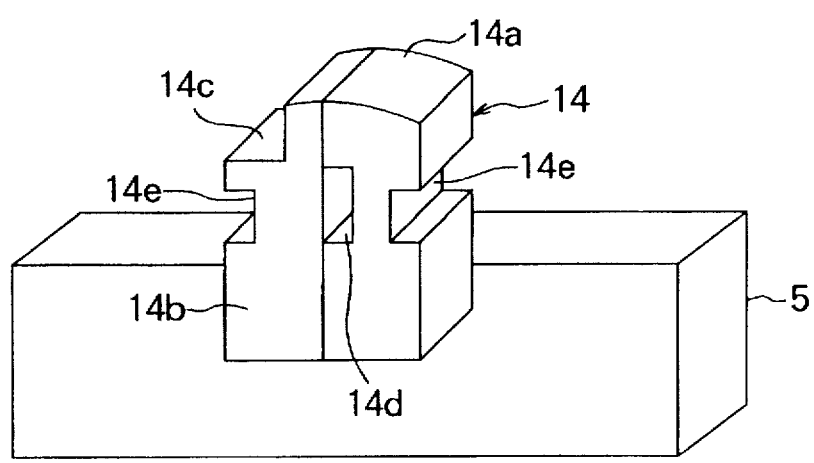
FIG. 6B is a perspective view generally showing a configuration of a head chip obtained by laser machining using the mask of FIG. 6A.
Figure 7A:
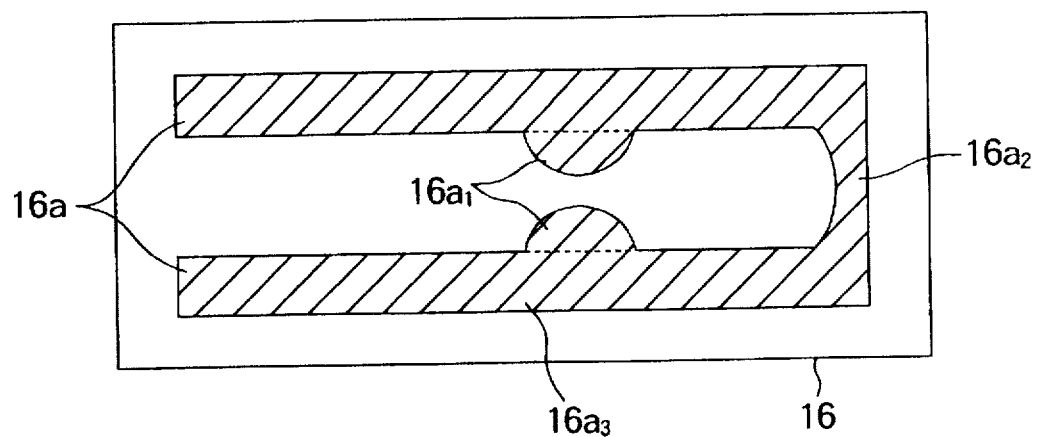
FIG. 7A is a plan view of a mask used in the laser machining of a sliding surface of a head chip according to the manufacturing method of Embodiment 2.
Figure 7B:
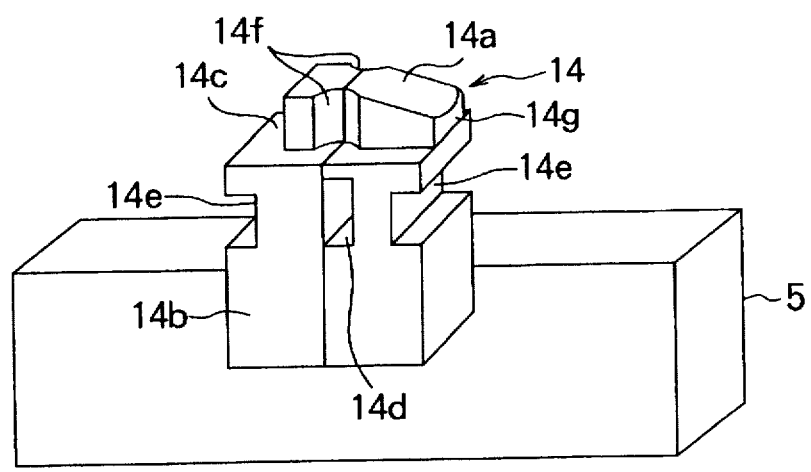
FIG. 7B is a perspective view generally showing a configuration of a head chip obtained by the laser machining using the mask of FIG. 7A.

FIGS. 6A–6B and FIGS. 7A–7B relate to a method for manufacturing a magnetic head according to Embodiment 2 off the present invention. FIG. 6A is a plan view of a mask 15 used in the laser machining or a side surface 14b off a head chip 14, and FIG. 6B is a perspective view generally showing the configuration of the head chip 14 obtained by the laser machining using the mask 15. FIG. 7A is a plan view of a mask 16 used in the laser machining of a sliding surface 14a of the head chip 14, and FIG. 7B is a perspective view generally showing the configuration of the head chip 14 obtained by the laser machining using the mask 16.

The manufacturing method of Embodiment 2 differs from the manufacturing method of Embodiment 1 already described solely in the respects that the mask 10 of Embodiment 1 shown in FIG. 3B is replaced by the mask 15 of FIG. 6A, and that the mask 18 of Embodiment 1 shown in FIG. 4B is replaced by the mask 16 of FIG. 7A. In FIG. 6A, n reference numeral 15a designates a slit for the purpose of forming the curved sliding surface 14a and a stepped portion 14c, 15b 14d in the side surface 14b of the head chip 14, and 15c designates a slit for the purpose of forming a pair of coil stopper grooves 14e in the head chip 14. In FIG. 7A, a reference numeral 16a designates a slit that allows the passage of the laser beam 9 to irradiate the sliding surface 14a of the head chip 14. The slit 16a comprises two sections $16a_1$ for the purpose of forming a pair of track grooves 14f in the head chip 14 that define the position and the width $T_W$ of the track, a section $16a_2$ for the purpose of forming a portion of the head chip 14 that is near the sliding surface 14a into an arcuate chamfered portion 14g, and a section $16a_3$ for the purpose of making the thickness of the head chip in the sliding surface 14a be thin, thereby forming a convex configuration in the sliding surface 14a.

According to the manufacturing method of Embodiment 2, as shown in FIG. 6B and FIG. 7B, the stepped portion 14c is machined in the head chip 14. By this means, when the magnetic head is mounted to a magnetic recording and reproducing device, the magnetic dust that is dislodged from the magnetic medium such as a magnetic tape are carried to this stepped portion 14c. Thus the accumulation of the magnetic dust at the sliding surface 14a and the occurrence of clogging is prevented.

Further, according to the manufacturing method of Embodiment 2, as shown in FIG. 7B, the laser machining is carried out so that the sliding surface 14a of the head chip 14 is narrowed. By this means, when the magnetic head is mounted to a magnetic recording and reproducing device, the area of the magnetic medium in contact with the magnetic head can be reduced, thereby enabling stable contact to occur between the magnetic medium such as a magnetic tape and the magnetic head. This kind of convex configuration of the sliding surface 14a is particularly suitable for an 8 mm type VCRs or a home digital VCRs, which use a thin magnetic tape with the thickness of 10 [μm] or less.

As has been described above, by the manufacturing method of Embodiment 2, the head chip 14 can be machined with high accuracy by the laser machining using the mask 15 or 16. Further, since a large number of machined portions can be formed easily productivity can be increased. Furthermore, in all respects other than those mentioned above, the method of Embodiment 2 is identical to that of Embodiment 1 already described.

Embodiment 3

Figure 8A:
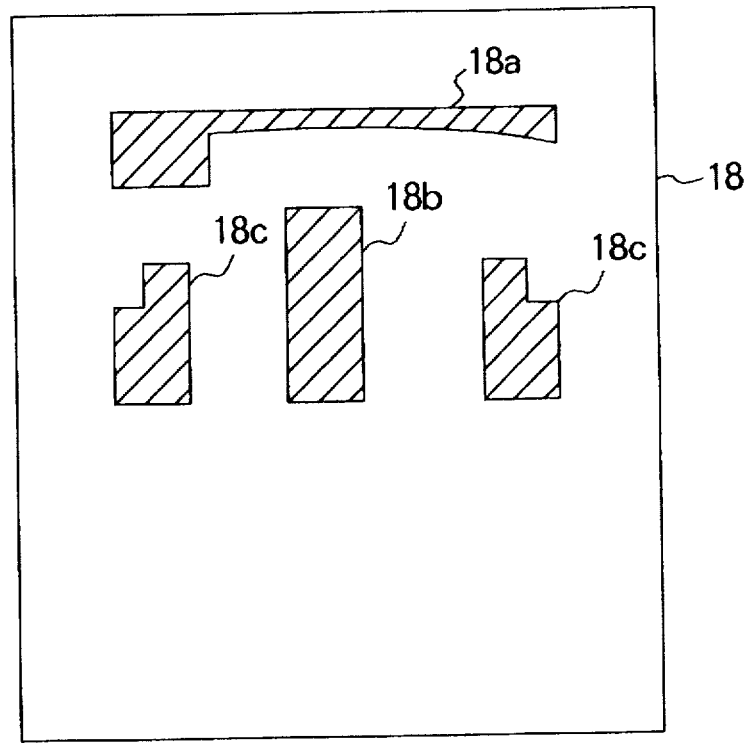
FIG. 8A is a plan view of a mask used in the laser machining of a side surface of a head chip according to the manufacturing method of Embodiment 3.
Figure 8B:
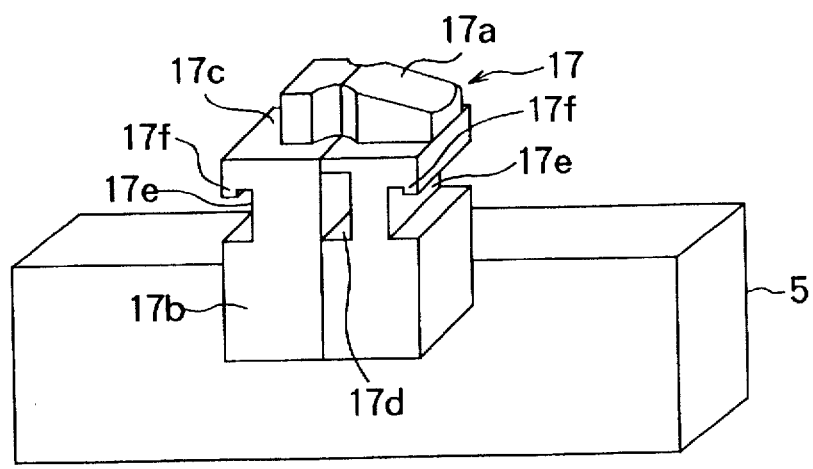
FIG. 8B is a perspective view generally showing a configuration of a head chip obtained by the laser machining using the mask of FIG. 8A and by the laser machining using the mask of FIG. 7A.

FIGS. 8A–8B relate to a method for manufacturing a magnetic head according to Embodiment 3 of the present invention. FIG. 8A is a plan view of a mask 18 used in the laser machining of a side surface 17b of a head chip 17, and FIG. 8B is a perspective view generally showing the configuration of the head chip 17 obtained by the laser machining using the mask 18 of FIG. 8A and by the laser machining using the mask 16 of FIG. 7A (Embodiment 2) already described.

The manufacturing method of Embodiment 3 differs from the manufacturing method of Embodiment 2 already described solely in the respect that the mask 15 of Embodiment 2 shown in FIG. 6A is replaced by the mask 18 of FIG. 8A. In FIG. 8A, a reference numeral 18a designates a slit for the purpose of forming the sliding surface 17a and the stepped portion 17c in the head chip 17, 18b designates a slit for the purpose of forming a coil window 17d in the head chip 17, and 18c designates two slits for the purpose of forming two coil stopper grooves 17e in the head chip 17.

According to the manufacturing method of Embodiment 3, as shown in FIG. 8B, hooks (or protuberances) 17f are formed for the respective coil stopper grooves 17e of the head chip 17, so that the coil stopper grooves 17e can be of L-shaped configuration.

Further, according to the manufacturing method Embodiment 3, the machining of complex configurations such as the L-shaped configuration can be accomplished more easily and in a shorter time than by the conventional mechanical machining, and without the occurrence of the splitting of the head chip or the chipping of the hooks. Further, in all respects other than those mentioned above, the method of Embodiment 3 is identical to that Embodiment 2 already described.

Figure 9A:
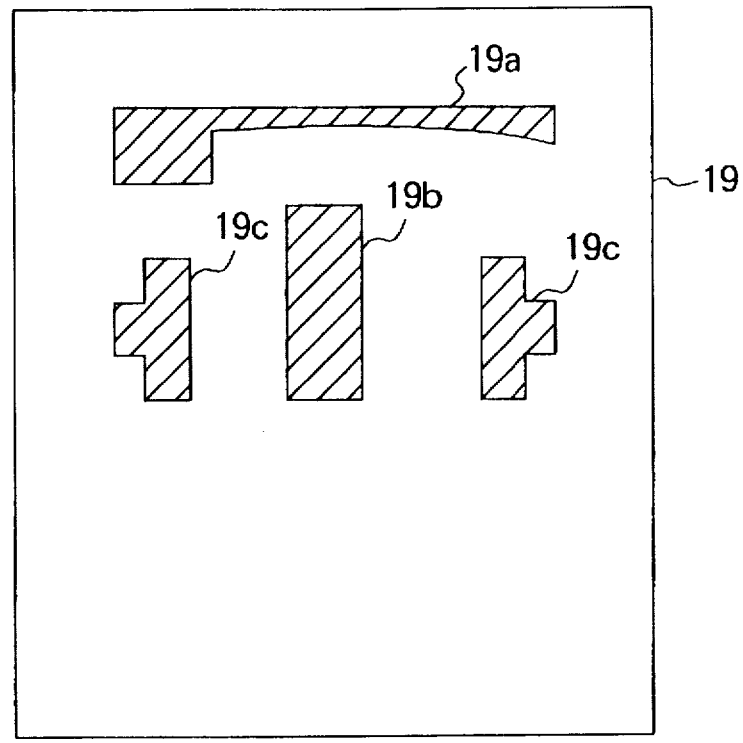
FIG. 9A is a plan view of a mask used in the laser machining of a side surface of a head chip according to the manufacturing method of Embodiment 3.
Figure 9B:
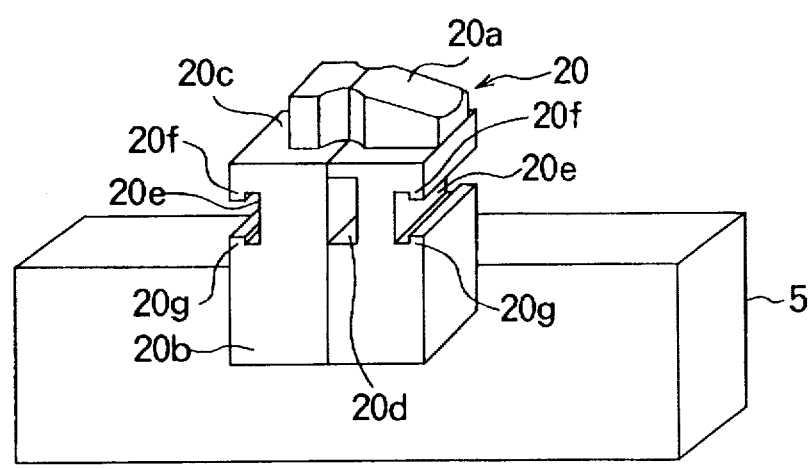
FIG. 9B is a perspective view generally showing a configuration of a head chip obtained by the laser machining using the mask of FIG. 9A and by the laser machining using the mask of FIG. 7A.

Further, while the above description concerned a case in which the hooks 17f were formed only at the upper part of the coil stopper grooves 17e, it is also possible, by the use of a mask 19 shown in FIG. 9A, to form hooks 20f and 20g at both the upper and lower parts of the respective coil stopper grooves 20e as shown in FIG. 9B. In FIG. 9A, a reference numeral 19 designates a slit for the purpose of forming a curved sliding surface 20a and a stepped portion 20c in the head chip 20, 19b designates a slit for the purpose of forming a coil window 20d in the head chip 20, and 19c designates slits for the purpose of forming stopper grooves 20e in the head chip 20.

Again, the above description concerns a case in which, by irradiating the head chip with a laser beam that has been condensed, the stopper grooves 17e or 20e of L-shaped configuration, the coil window 17d or 20d and the curved sliding surface 17a or 20a were machined at the same time. However, it is also possible to prepare separately a mask having both the slit 18b or 19b for the purpose of forming the coil window and the slit 18a or 19a for the purpose of forming the sliding surface, and a mask having the slits 18c or 19c for the purpose of forming the coil stopper grooves of L-shaped configuration, and to carry out the laser machining of the coil window 17d or 20d and the arcuate sliding surface 17a or 20a, and the laser machining of the coil stopper grooves 17e or 20e as separate processes.

Embodiment 4

Figure 10:
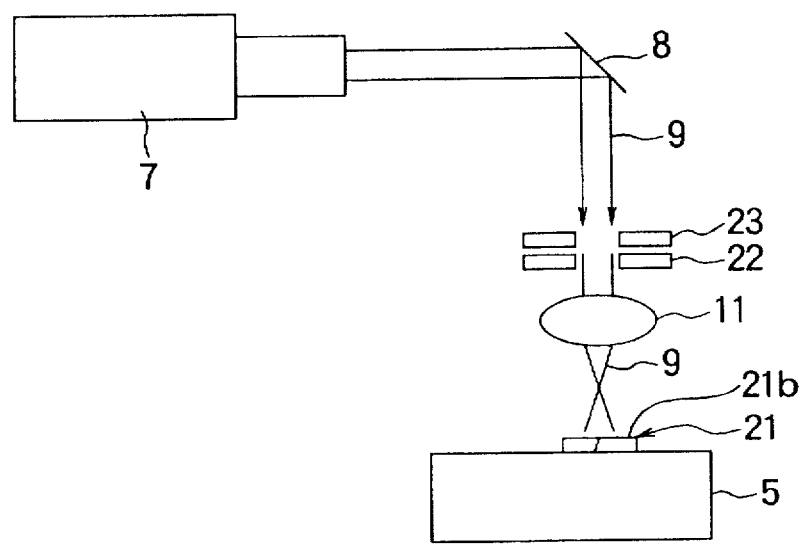
FIG. 10 is an explanatory diagram generally showing the process of machining a side surface of a head chip according to the manufacturing method of Embodiment 4.
Figure 12:
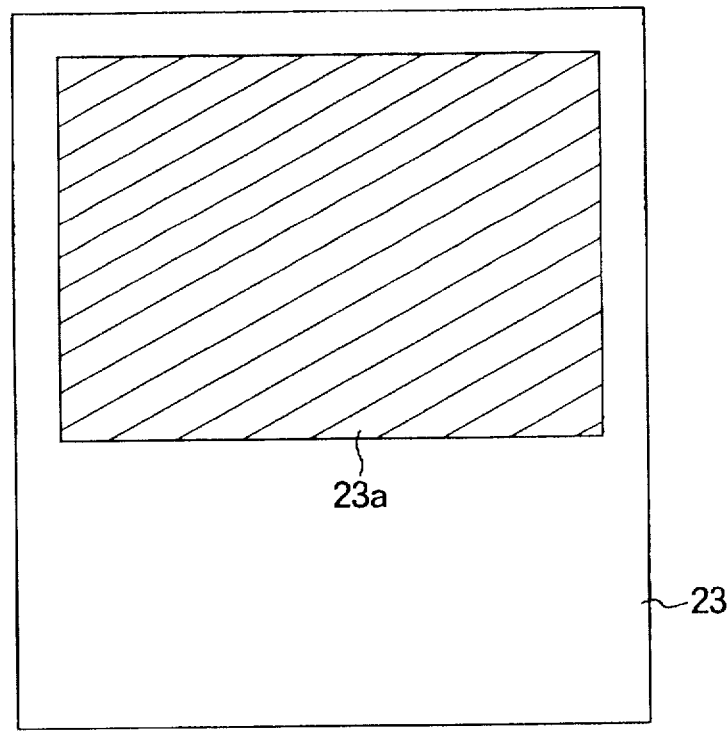
FIG. 12 is a plan view of another mask used in the process of FIG. 10.
Figure 13:
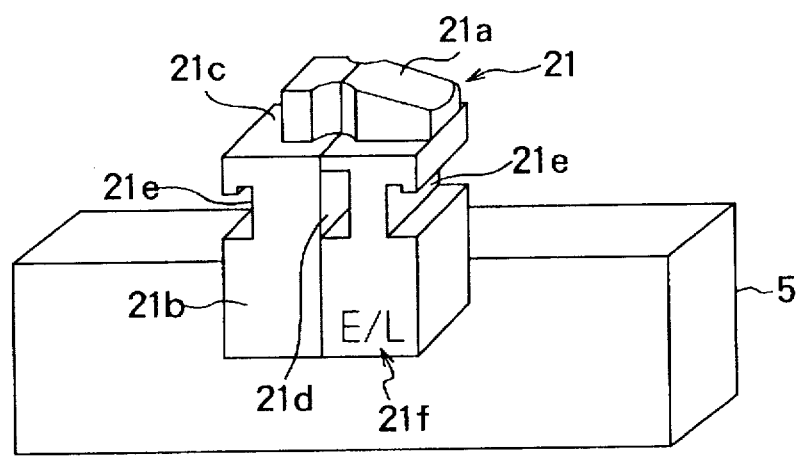
FIG. 13 is a perspective view generally showing a configuration of a tread chip, the side surface of which was first machined by the process of FIG. 10, and the sliding surface of which was subsequently machined using the mask of FIG. 6A.

FIG. 10 to FIG. 13 relate to a method for manufacturing a magnetic head according to Embodiment 4 of the present invention. FIG. 10 is an explanatory diagram showing the process of machining a side surface 21b of a head chip 21, which has the same configuration as the head chip 4 of FIG. 1A. FIG. 11 and FIG. 12 are plan views of a mask 22 and a mask 23 used in FIG. 10. FIG. 13 is a perspective view generally showing the configuration of the head chip 21, the side surface 21b of which was first machined using the masks 22 and 23, and a sliding surface 21a off which was subsequently machined using the mask 15 of FIG. 6A.

The manufacturing method of Embodiment 4 differs from the ease of Embodiment 3 already described in FIG. 8, solely in the following points. The first point is that, the mask 22 for machining the side surface 21b of the head chip 21 is further provided with a slit 22d for the purpose of imprinting a mark 21f consisting of characters or symbols on the side surface 21b of the head chip 21, in addition to a slit 22a for the purpose of forming the sliding surface 21a and a stepped portion 21c In the head chip 21, a slit 22b for the purpose of forming a coil window 21d in the head chip 21 and a slit 22c for the purpose of forming coil stopper grooves 21e in the head chips 21. The second point is that it also uses a separate mask 23. As shown in FIG. 12, the mask 23 has a large slit 23a so that the slits 22a, 22b and 22c of the mask 22 will not be obstructed. Accordingly when the mask 23 is superimposed on the mask 22, the slit 22d of the mask 22 is obstructed by the mask 23.

In Embodiment 4, the laser beam 9 is first irradiated through the slits 22a, 22b, 22c and 22d to the side surface 21b of the head chip 21 using the mask 22 only. When the mark 21f has been formed on the side surface 21b to a depth such that the mark 21f can be adequately recognized as characters, the separate mask 23 is superimposed on the mask 22. Then; the laser beam 9 is irradiated through the slits 22a, 22b and 22c of the mask 22 and the slits 23a of the mask 23 to the side surface 21b of the head chip 21. Thus, the sliding surface 21a, the stepped portion 21c, the coil window 21d and the coil stopper grooves 21e are formed on the head chip 21, while the laser machining of the mark is not carried out. In FIG. 11 and FIG. 13, the imprinted mark "E/L" signifies a left-azimuth head for the extended play (EP) mode used in VCRs of VHS system or 8 mm system.

Next, the laser machining of the sliding surface 21a is conducted using the mask 16 of FIG. 7A already described in Embodiment 2, the head chip 21 having the configuration shown in FIG. 13 can be obtained.

According to the method of Embodiment 4, since the mark 21f is imprinted on the side surface 21b of the head chip 21, the type of the head chip 21 can be easily recognized by looking at the side surface 21b of the head chip 21.

The above description concerns a case in which the mark 21f was machined together with the stopper grooves 21e, the coil window 21d and the curved sliding surface 21a by irradiating the head chip with the condensed laser beam 9. But, it is also possible to prepare separately a mask having a slit 22d for machining the mark 21f and a mask having the other slits 22a, 22b and 22c, and to carry out the laser machining of the coil window 21d, the curved sliding surface 21a and the coil stopper grooves 21e and the laser machining of the mark 21f as separate processes. The machining or the mark 21f may also be accomplished without using a mask, by scanning with a laser beam of small diameter.

Embodiment 5

Figure 14A:
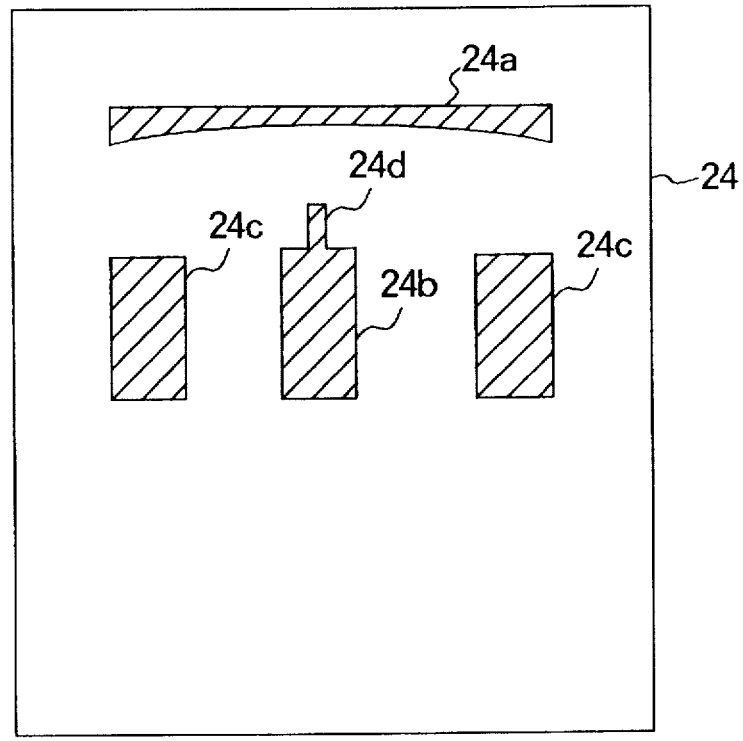
FIG. 14A is a plan view of a mask used in the laser machining of a side surface of a head chip according to the manufacturing method of Embodiment 5.
Figure 14B:
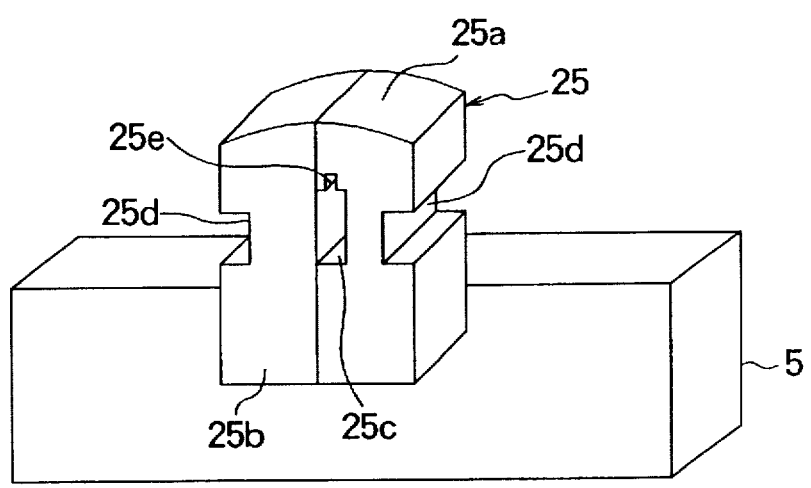
FIG. 14B is a perspective view generally showing a configuration of a head chip obtained by the laser machining using the mask of FIG. 14A.
Figure 15A:
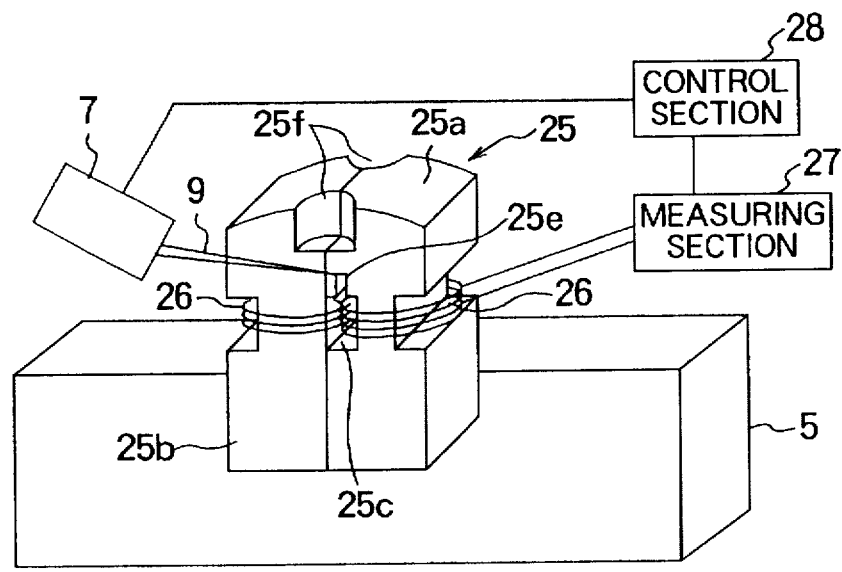
FIG. 15A is an explanatory diagram generally showing a configuration of an equipment for machining an apex groove in a head chip subsequent to formation of track grooves in the sliding surface.
Figure 15B:
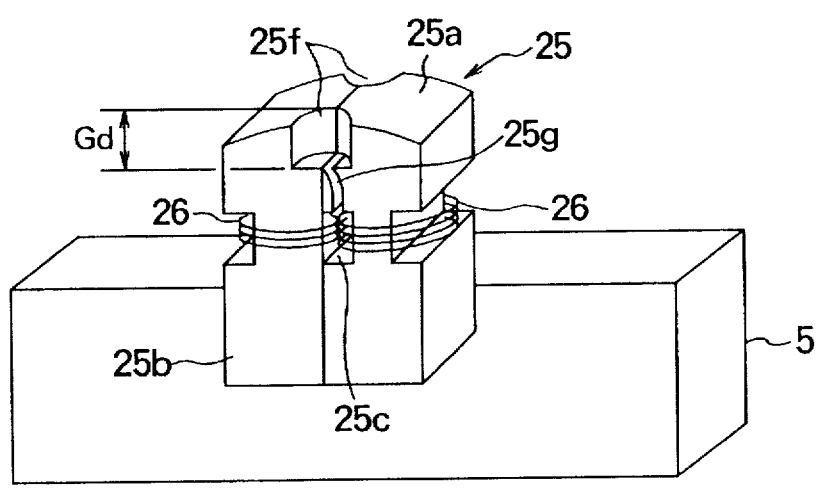
FIG. 15B is a perspective view generally showing a configuration of the head chip on which the apex groove has been formed.

FIGS. 14A–14B and FIGS. 15A–15B relate to a method for manufacturing a magnetic head according to Embodiment 5 of the present invention. FIG. 14A is a plan view or a mask 24 used in the laser machining of a side surface 25b or a head chip 25, and FIG. 14B is a perspective view generally showing the configuration of the head chip 25 obtained by the laser machining using the mask 24. FIG. 15A is an explanatory diagram showing the method for machining an apex groove 25g in the head chip 25 subsequent to the formation of track grooves 25f in a sliding surface 25a, and FIG. 15B is a perspective view generally showing the configuration of the head chip 25 in which the apex groove 25g has been formed.

In FIG. 14A, a reference numeral 24a designates a slit for forming the curved sliding surface 25a in the head chip 25, 24b designates a slit for forming the coil window 25e in the head chip 25, and 24c designates a slit for forming the coil stopper grooves 25d in the head chip 25. The slit, 24b of the mask 24 is provided with a portion 24d for the purpose of forming a notched groove 25e in the coil window 25c of the head chip 25. In FIG. 15A, a reference numeral 26 designates a coil, 27 designates a measuring section for measuring the magnetic characteristics of the head chip 25 using the coil 26, and 28 designates a control section that controls the on-off switching of the laser beam 9 and the positioning thereof with respect to the head chip 25 on the basis of data relating to the magnetic characteristics of the head chip 25 obtained from the measuring section 27.

According to the manufacturing method of Embodiment 5, the scanning of the laser beam 9 is accomplished on the basis of the magnetic characteristics of the head chip 25 obtained by the coil 26 and the measuring section 27, with the application of feedback control, so that the gap depth of the head chip 25 can be determined accurately. Also, as shown in FIG. 14B, if the notched groove 25e in the coil window 25c is made narrower than the diameter of the conductor of which a coil is composed, the problem of the conductor entering the notched groove 25e inadvertently can be eliminated. It is also possible, as shown in FIG. 15A, to begin the scanning of the laser beam 9 from the upper part of the notched groove 25e, thereby eliminating the undesirable irradiation of the coil 26 by the laser beam 9, which could occur if the notched groove 25e is not provided.

Embodiment 6

Figure 16A:
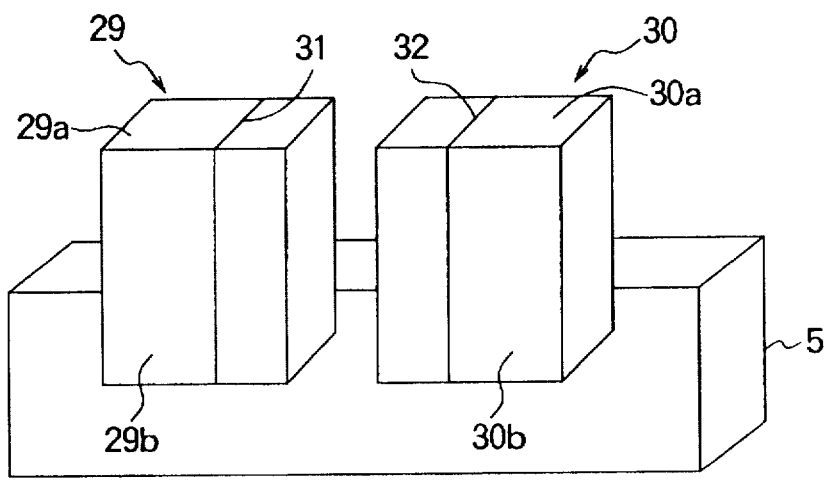
FIGS. 16A-16C are perspective views generally showing configurations of two head chips at selected machining steps in the manufacturing method of Embodiment 6.
Figure 16B:
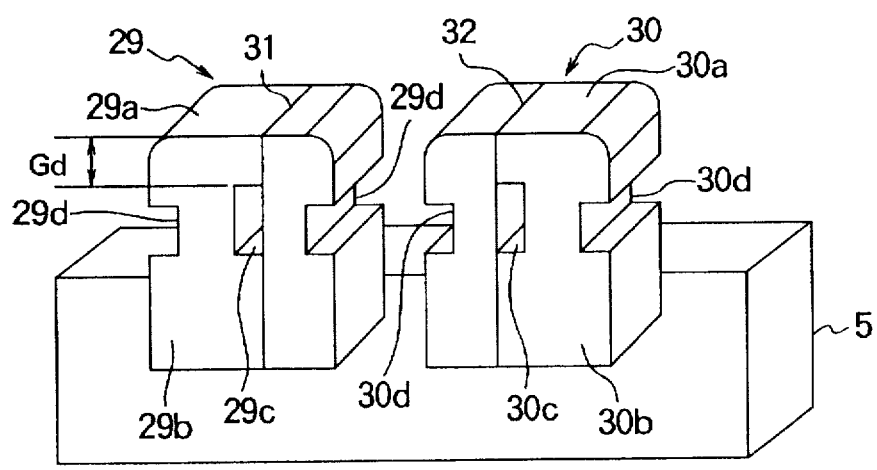
Figure 16C:
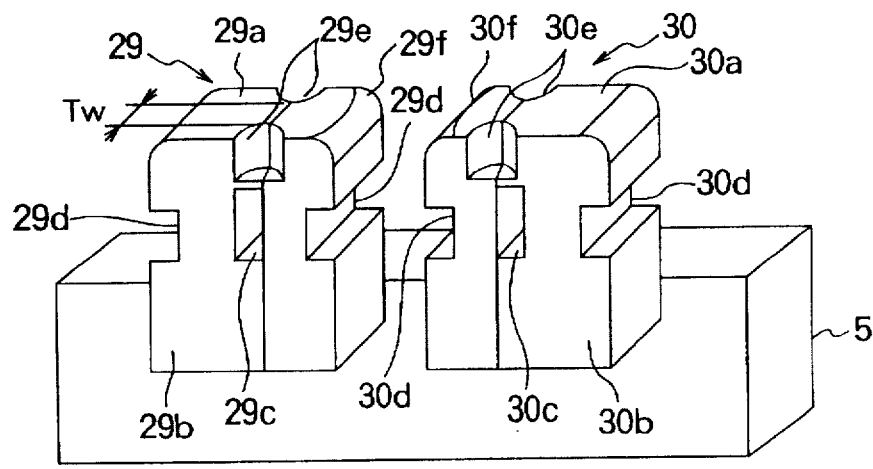
Figure 17A:
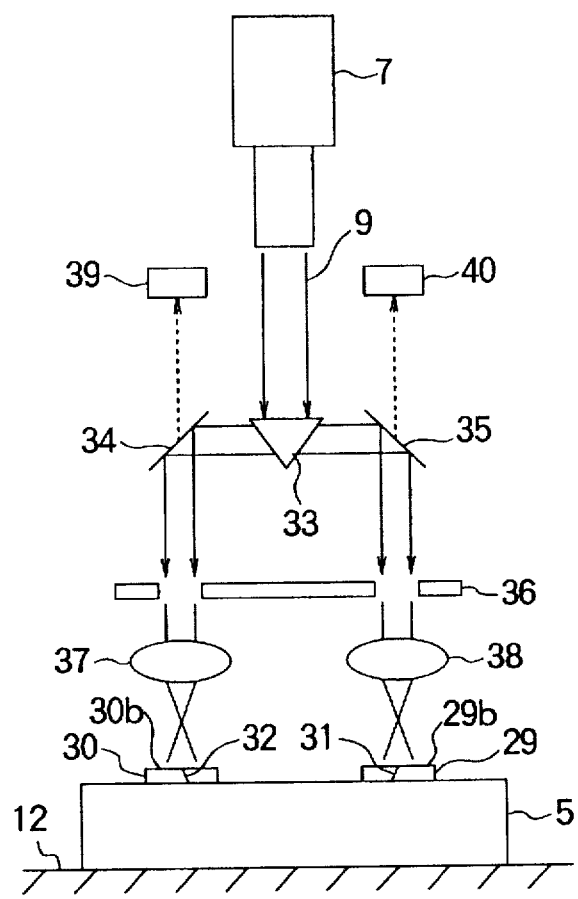
FIG. 17A is an explanatory diagram generally showing the process of machining the head chips of FIG. 16A into the configuration shown in FIG. 16B.
Figure 17B:
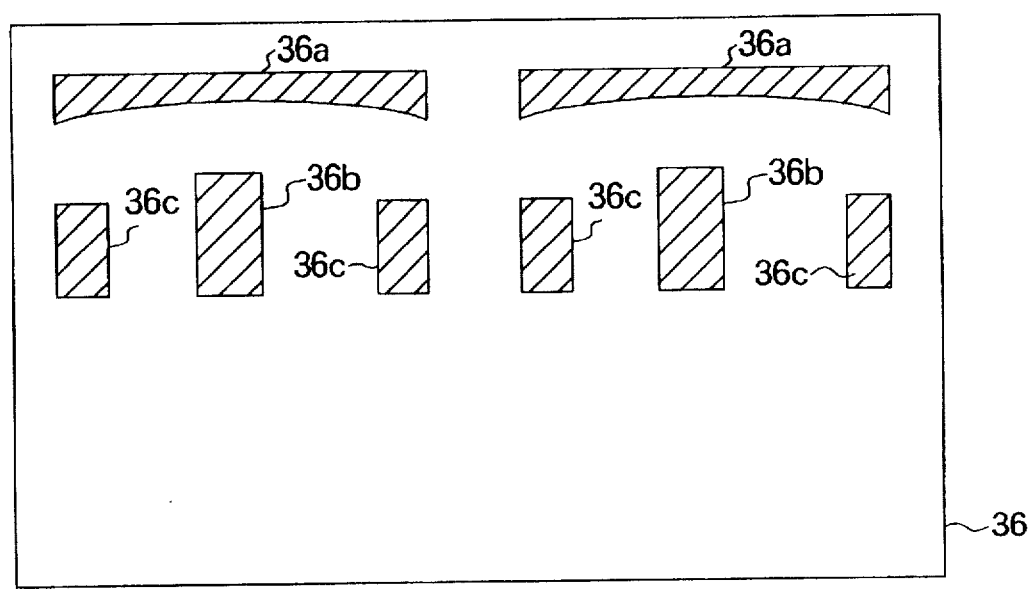
FIG. 17B is a plan view of a mask used in the process of FIG. 17A.
Figure 18A:
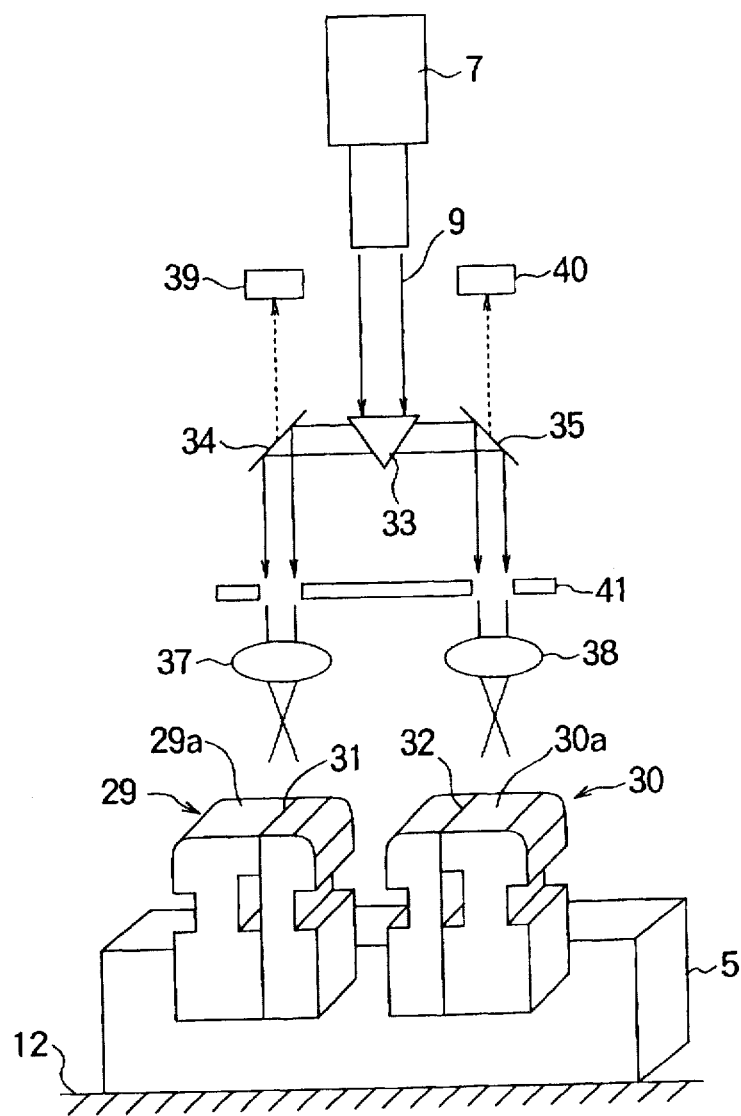
FIG. 18A is an explanatory diagram generally showing the process of machining the head chips of FIG. 16B into the configuration shown in FIG. 16C.
Figure 18B:
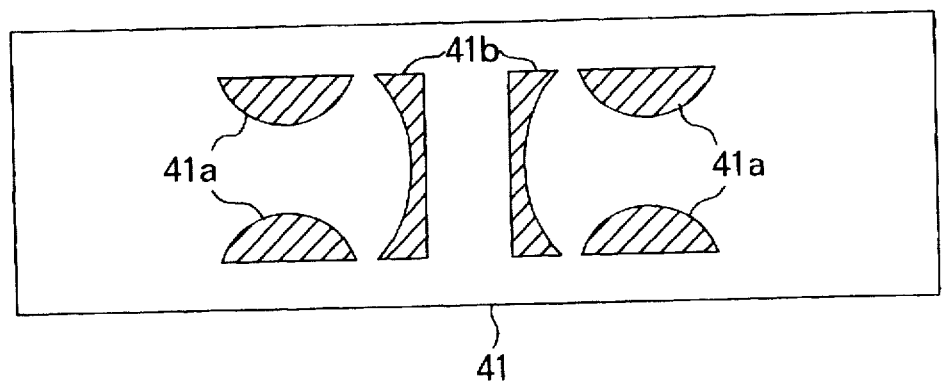
FIG. 18B is a plan view of a mask used in the process of FIG. 18A.

FIGS. 16A–16C, FIGS. 17A–17B and FIGS. 18A–18B relate to a method for manufacturing a magnetic head according to Embodiment 6 of the present invention. FIGS. 16A–16C are perspective views generally showing the configurations of head chips 29 and 30 at the selected machining steps in the manufacturing method of Embodiment 6. FIG. 17A is an explanatory diagram showing the process machining the head chips 29 and 30 of FIG. 16A into the configuration shown in FIG. 16B, and FIG. 17B is a plan view of the mask 36 of FIG. 17A. FIG. 18A is an explanatory diagram showing the process of machining the head chips 29 and 30 of FIG. 16B into the configuration shown in FIG. 16C, and FIG. 18B is a plan view of a mask 41 of FIG. 18A.

According to the manufacturing method or Embodiment 6, two head chips 29 and 30 are fixed to a head base 5. FIG. 16A, reference numerals 31 and 32 designate gaps, 29a and 30a designate sliding surfaces which are in contact with the recording medium, and 29b and 30b designate side surfaces of the head chips 29 and 30.

Following is a description of the process by which the head chips 29 and 30 of FIG. 16A are machined into the configuration shown in FIG. 16B. This process is accomplished by the laser machining equipment as shown FIG. 17A. In FIG. 17A, a reference numeral 7 designates a laser source, 33 designates a spectroscope for splitting laser beam 9 emitted from laser source 7 into two laser beams, 34 and 35 designate bend mirrors for changing the direction in which laser beams proceed, 36 designates a mask, 37 and 38 designate image-forming lenses, and 39 and 40 designate monitoring sections consisting of a microscope or the like for optically detecting the positions of the gaps 31 and 32 of the head chips 29 and 30. In FIG. 17B, hatched portions 36a, 36b and 36c are slits that allow the passage of the laser beam 9. The slits 36a is for machining of the sliding surfaces 29a and 30a of the head chips 29 and 30, the slits 36b are for machining the coil windows 29c and 30c in the head chips 29 and 30, and the slits 36c are for machining the coil stopper grooves 29d and 30d for preventing the movement of the coils wound thereon.

In the machining process, as shown in FIG. 17A, the head base 5 provided with the head chips 29 and 30 is set on the working stage 12 so that the side surfaces 29b and 30b of the head chips 29 and 30 are facing upward and the mask 36 is placed in the light path of the laser beam 9. Thus, the laser beams 9 pass through the slits 36a, 36b and 36c of the mask 36 and the image-forming lenses 37 and 38 to irradiate the side surfaces 29b and 30b of the head chips 29 and 30. By this means, the portion irradiated by the laser beam 9 is etched, thereby, as shown in FIG. 16B, forming curved sliding surfaces 29a and 30a, coil windows 29c and 30c, and coil stopper grooves 29d and 30d in the head chips 29 and 30.

Following is a description of the process by which the head chips 29 and 30 of FIG. 16B are machined into the configuration shown in FIG. 16C. This process is accomplished by the laser machining equipment shown in FIG. 18A. The compositions of FIG. 18A is the same as those of FIG. 17A except that the mask 36 is replaced by the mask 41 shown in FIG. 18B. In FIG. 18B, reference numerals 41a and 41b designate slits that allow the passage of the laser beam 9. The slits 41a are for forming the track grooves on the sliding surfaces 29a and 30a so that the track has the specified track width $T_W$ and is placed at a predetermined position. The slits 41b are for forming arcuate chamfered portions 29f and 30f at the portion near the sliding surfaces 29a and 30a of the head chips 29 and 30. In the machining process, as shown in FIG. 18A, the head base 5 provided with the head chips 29 and 30 is set on the working stage 12 so that the sliding surfaces 29a and 30a of the head chips 29 and 30 are facing upward, and the mask 41 is placed in the light path of the laser beams 9. Thus, the laser beams 9 from the laser source 7 pass through the slits 41a, 41b and 41c of the mask 41 and the image-forming lenses 37 and 38 to irradiate the sliding surfaces 29a and 30a of the head chips 29 and 30. By this means, the portion irradiated by the laser beam 9 is etched, thereby, as shown in FIG. 16C, forming, in the head chips 29 and semicylindrical track grooves 29e and 30e that determine the track width $T_W$ and the arcuate chamfered portions 29f and 30f. The polishing process and coil winding process are carried out thereafter.

If the power of the laser beam is set at adequate value, it is possible to eliminate the image-forming lenses 37 and 38, thereby enabling the laser machining to be carried out with the mask 36 or 41 in contact with the head chips 29 and 30.

The slits provided in the mask 36 or 41 need not necessarily be provided in the same mask, but may be formed in a plurality of masks. In this case it is necessary change masks and perform a plurality of laser irradiation steps.

Figure 19:
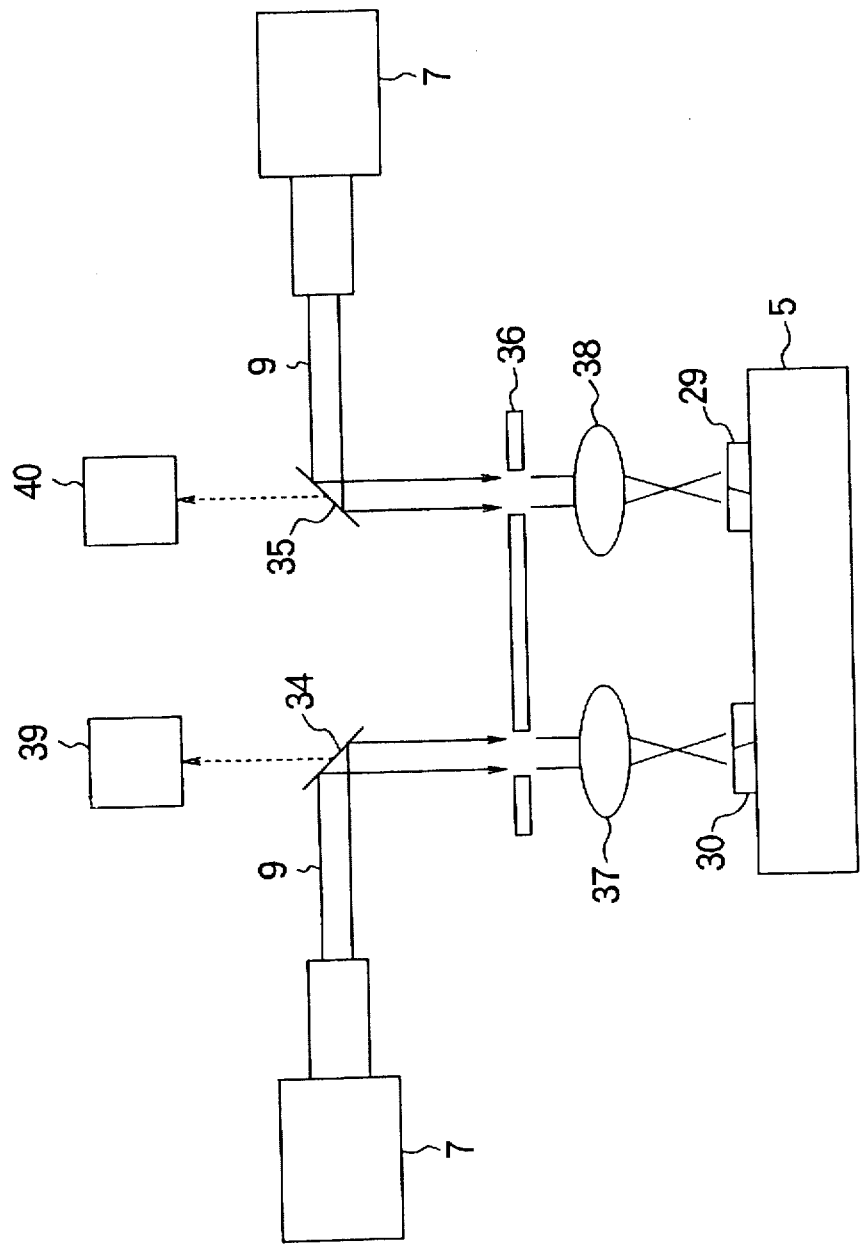
FIG. 19 is an explanatory diagram showing the process by means of the machining equipment that is provided with two laser sources.

While the above description concerns a case in which the laser beam 9 is split by the spectroscope 33, in cases in which, for reasons of laser beam power or the area to be irradiated, the splitting is not desirable, it is also possible to use the same laser beam to machine the head chips 29 and 30 in succession. It is also possible, as shown in FIG. 19, to provide two laser sources 7.

Figure 20A:
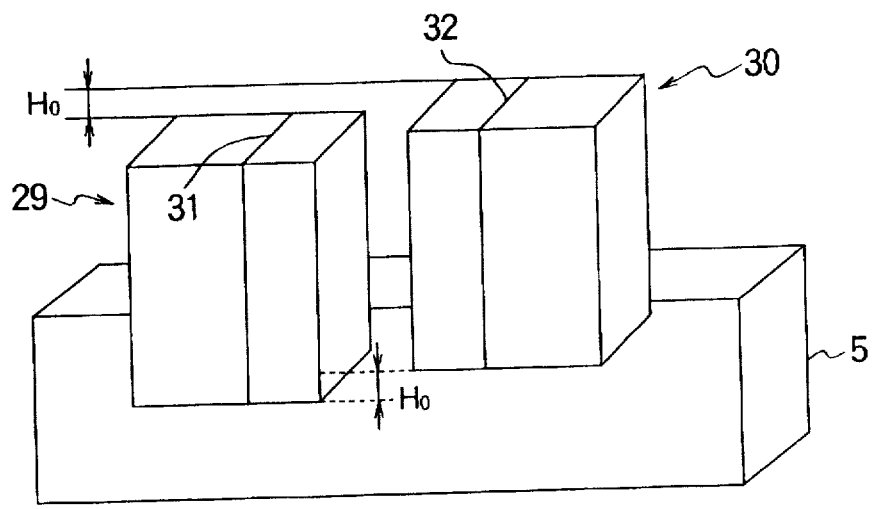
FIG. 20A is a perspective view showing the head chips mounted on a head base in which the heights of the head chips deviate by an amount $H_0$.
Figure 20B:
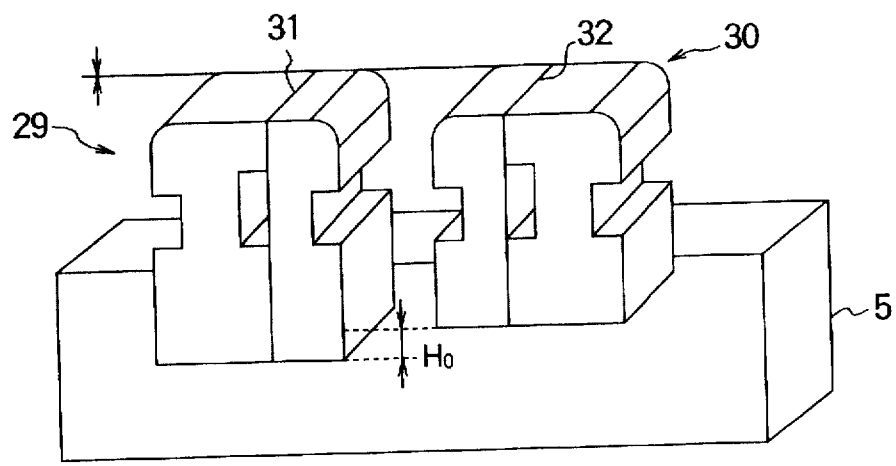
FIG. 20B is a perspective view showing the head chips that were brought to the same height after the laser machining.

As has been described above, in the manufacturing method of Embodiment 6, since the machining of the sliding surfaces 29a and 30a and the machining of the coil windows 29c and 30c of the head chips 29 and 30 are performed simultaneously, the gap depth $G_d$ of the head chip 29 coincides with that of the head chip 30 with high accuracy, it is possible to achieve the same performance for both head chips 29 and 30. Further, according to the manufacturing method of Embodiment 6, even if the heights of the head chips 29 and 30 mounted on the head base 5 deviate by amount $H_0$ as shown in FIG. 20A, the heights of the head chips 29 and 30 can be made the same after the laser machining as shown in FIG. 20B.

Figure 21:
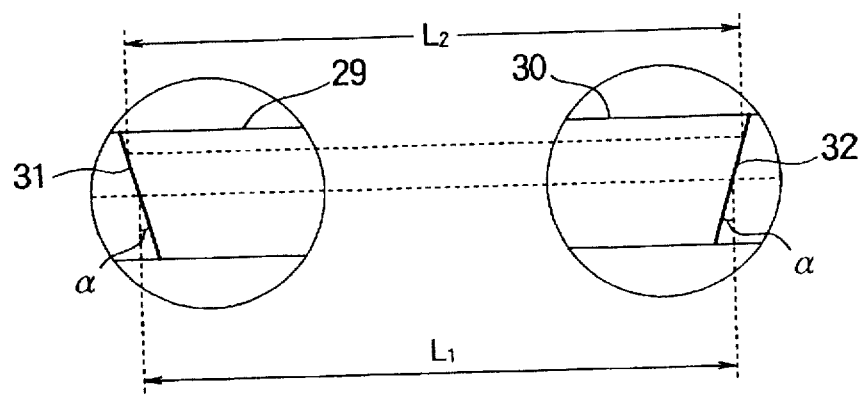
FIG. 21 is an explanatory diagram showing that, when an azimuth angle is imparted to each of the gaps, the distance between the gaps to the desired value can be adjusted.

Also, when the azimuth angles α of the gaps 31 and 32 are greater than 0°, it is possible to adjust the interval between the gaps 31 and 32 to the desired value (e.g. from $L_1$ to $L_2$ in FIG. 21). Specifically, in the process shown in FIG. 17A, the interval between the gaps 31 and 32 of the head chips 29 and 30 detected by monitors 39 and 40 (e.g., $L_1$ in FIG. 21) can be measured. Thus, if, in the track forming process in FIG. 18A, the positions where the track grooves are formed are shifted in the thickness direction the head chips 29 and 30, the interval between the gaps and 32 can be adjusted to the value $L_2$. Also, according to the manufacturing method of Embodiment 6, since the head chips 29 and 30 are not mounted on a rotating drum but are fixed to a head base 5, the advantage is obtained that the machining equipment does not become large in scale. In addition, when a machining error occurs, the time involved in removing the head chips 29 and 30 from the rotating drum is eliminated, resulting in an increase in productivity.

Embodiment 7

Figure 22A:
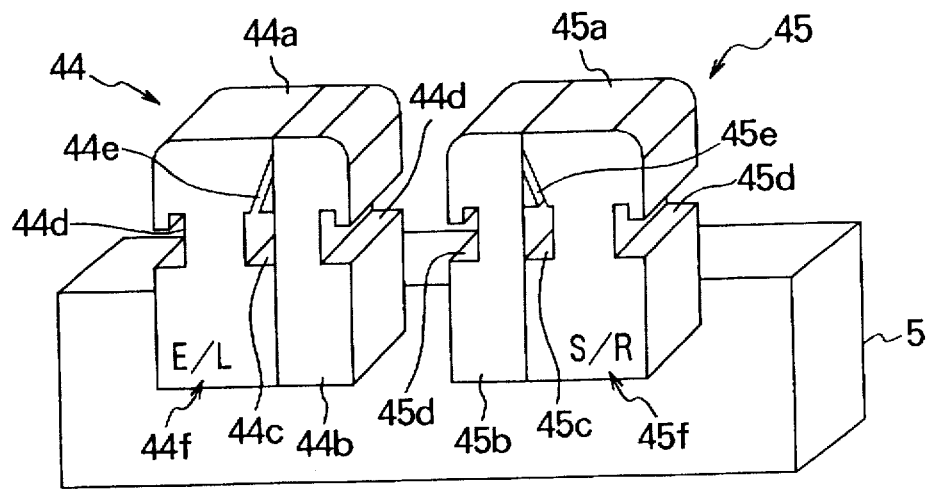
FIGS. 22A–22B are perspective views generally showing configurations of the head chips at selected machining steps in the manufacturing method of Embodiment 7.
Figure 22B:
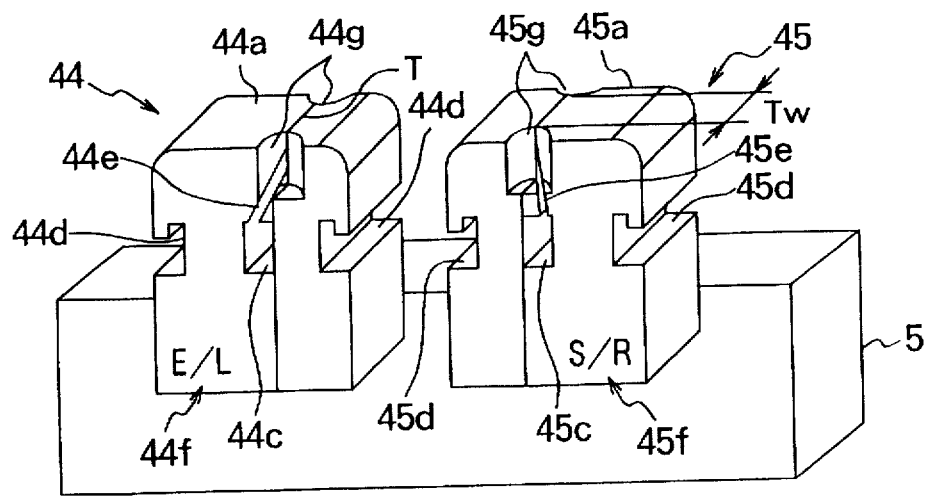
Figure 23:
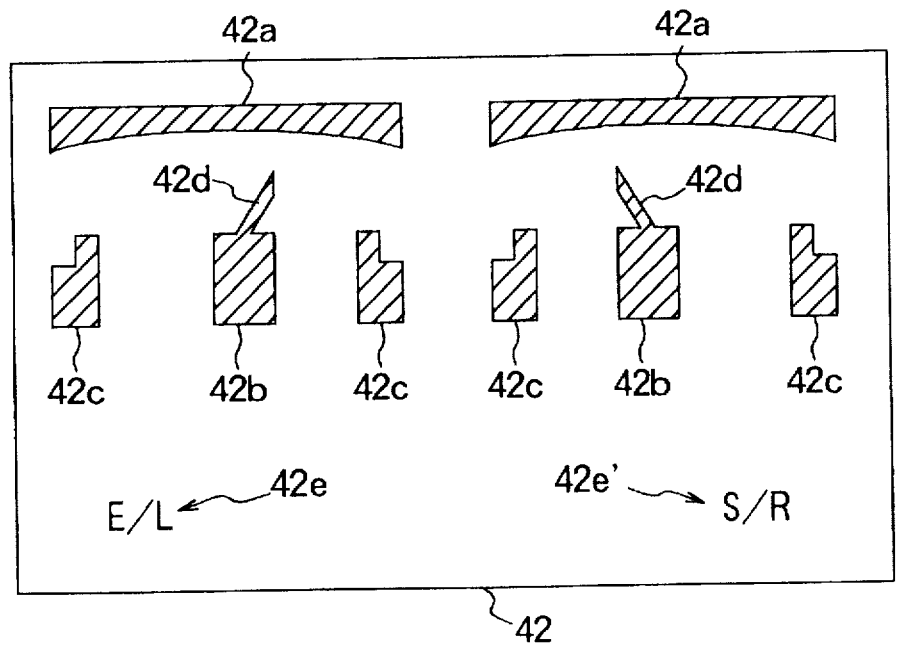
FIG. 23 is a plan view of a mask used in the process for machining the head chips of FIG. 16A into the configuration shown in FIG. 22A.
Figure 24:
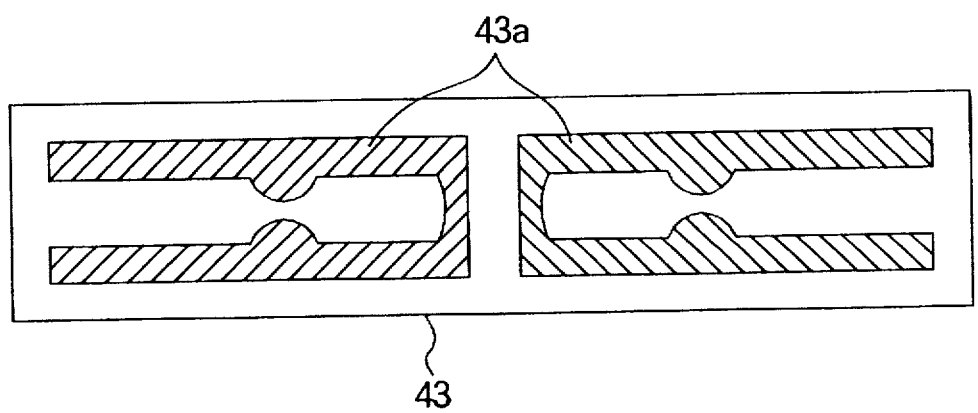
FIG. 24 is a plan view of a mask used in the process for machining the head chips of FIG. 22A into the configuration shown in FIG. 22B.

FIGS. 22A–22B, FIG. 23 and FIG. 24 relate to a method for manufacturing a magnetic head according to Embodiment 7 of the present invention. FIGS. 22A and 22B are perspective views generally showing the configurations of head chips 44 and 45 at the selected machining steps in the manufacturing method of Embodiment 7. FIG. 23 is a plan view of the mask 42 used in the equipment for machining the head chips of FIG. 16A into the configuration shown in FIG. 22A, and FIG. 24 is a plan view of the mask 43 used in the equipment for machining the head chips 44 and 45 of FIG. 22A into the configuration shown in FIG. 22B.

The manufacturing method of Embodiment 7 differs from the case of Embodiment 6 already described solely in the respects that the mask 36 used in the machining equipment of FIG. 17A is replaced by the mask 42 of FIG. 23, and the mask 41 used in the machining equipment of FIG. 18A is replaced by the mask 43 of FIG. 24.

In FIG. 23, hatched portions 42a, 42b and 42c designate slits that permit the passage of the laser beam 9. The slits 42a are for machining the curved sliding surfaces 44a and 45a in head chips 44 and 45, the slits 42b are for machining the coil windows 44c and 45c in the side surfaces 44b and 45b of the head chips 44 and 45, and the slits 42c; are for machining the coil stopper grooves 44d and 45d prevent movement of the coils wound thereon. Also, in FIG. 23, a reference numeral 42d designates slits for forming the apex grooves 44e and 45e which determine the gap depth, and 42e designates slits for forming the marks 44f and 45f on the side surfaces 44b and 45b of the head chips 44 and 45. In FIG. 24, hatched portions 43a are slits that allow the passage of the laser beam 9. The slits 43a are for the purpose of forming the track grooves 44g and 45g shown FIG. 22B, which form tracks of the track width $T_W$ on the sliding surfaces 44a and 45a. Furthermore, the imprinted mark 44f, consisting of the characters "E/L", signifies a left azimuth head for the extended play (EP) mode used in VCRs of VHS system or 8 mm system, and the imprinted mark 45f, consisting of the characters "S/R", signifies a right azimuth head for the standard play (SP) mode. In all respects other than those mentioned above, the method of Embodiment 7 is identical to that of Embodiment 6 already described.

Embodiment 8

Figure 25:
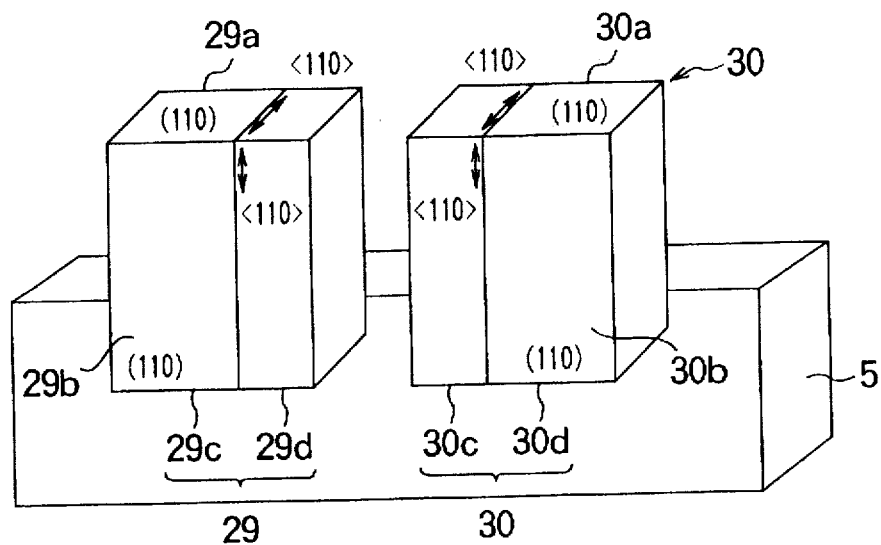
FIG. 25 is an explanatory diagram showing the crystal plane orientation of ferrite core pieces constituting the head chip in the manufacturing method of Embodiment 8.
Figure 26:
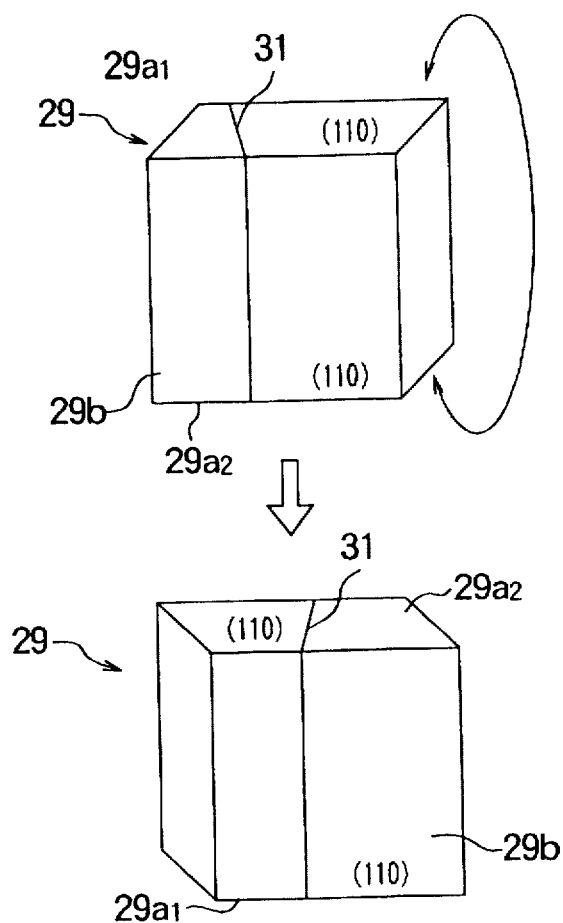
FIG. 26 is an explanatory diagram showing that if the head chip is reversed 180 degrees so that its sliding surfaces are reversed top to bottom, it is possible to obtain two types of head chip having opposite azimuth angles.

FIG. 25 and FIG. 26 relate to a method for manufacturing a magnetic head according to Embodiment 8 of the present invention. FIG. 25 is an explanatory diagram showing the orientation of the crystal plane off ferrite when the core pieces constituting the head chips 29 and 30 are composed of ferrite. In FIG. 25, reference numerals 29a and 30a designate sliding surfaces of the head chip 29 and and 29b and 30b designate the side surfaces of the head chip 29 and 30.

Ferrite varies in its physical properties depending on its orientation of the crystal plane. For example, the (110) planes contain an axis of easy magnetization and are suitable for the side surfaces of the heads chip. The (100) planes and the (110) planes have outstanding wear resistance and are suitable for the sliding surfaces that come into contact with the magnetic tape. The (111) planes and the (211) planes suffer little machining distortion and suitable for the surfaces forming gaps. These matters are disclosed, for example, on page 15 of "Main points of Technology for Machining the Magnetic Head" (i.e., "Jikiheddo Kako Gijyutu No Yoten" in Janpanese) published by the Nihon Kogyo Gijutsu Center and supervised by Hirotomo Hagiwara. Thus, by using the (110) planes for the sliding surfaces 29a and 30a and for the side surfaces 29b and 30b, as shown in FIG. 25, it is possible to manufacture a head chip that is superior in magnetic permeability and wear resistance. This offers the advantage that, since the machining characteristics when machining the sliding surfaces 29a and 30a and when machining the side surfaces 29b and 30b are the same, the need to change the conditions of the laser beam used during the machining is eliminated.

According to the manufacturing method of Embodiment 8, the sliding surfaces 29a and 30a of the head chip are of the (110) plane. Thus in case that the head chips 29 are cut so as to have an azimuth angle imparted to gap 31, it is possible to obtain, from the same head block (the material designated by reference numeral 3 in FIG. 2D), two types of tire head chip having opposite azimuth angles by reversing the sliding surface $29a_1$ and the sliding surface $29a_2$ by 180° (top to bottom), as shown in FIG. 26. This not only improves productivity, but makes it possible, when mounting a plurality of magnetic heads on the same head base or the same rotating drum, to use the head chips that were taken from the same head block. This reduces deviations in magnetic characteristics among the magnetic heads, thereby providing the advantage that the need to select from among the head chips of varying magnetic characteristics (or recording and reproducing characteristics) those head chips whose characteristics matched is eliminated, and the pairing operation, in which head chips of matching characteristics are assembled together is simplified.

Embodiment 9

Figure 27A:
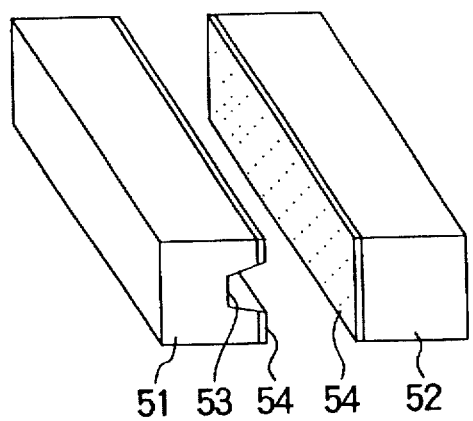
FIGS. 27A–27C are perspective views showing the processes by which a plurality of head chips are cut from one pair of ferrite blocks in the manufacturing method Embodiment 9.
Figure 27B:
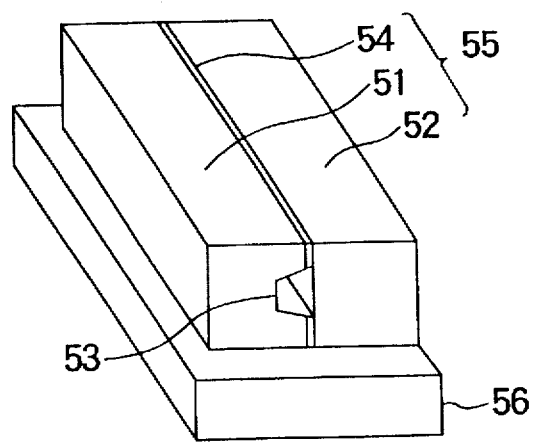
Figure 27C:
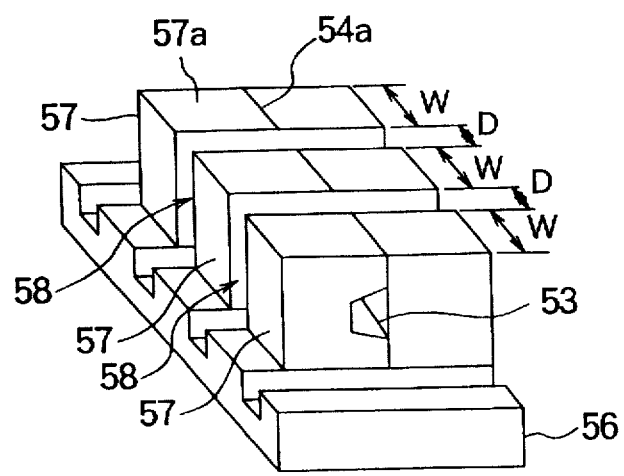
Figure 28A:
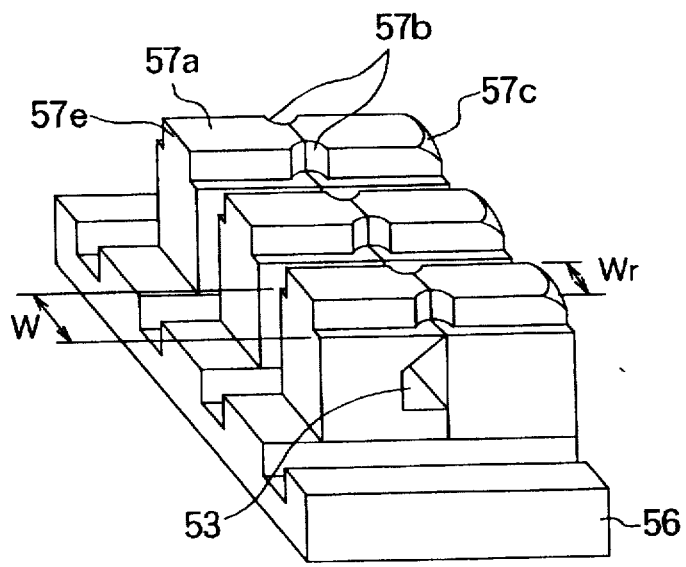
FIGS. 28A–28B are a perspective view and a side view of the configuration after the laser machining of the sliding surface of the head chip of FIG. 27C.
Figure 28B:
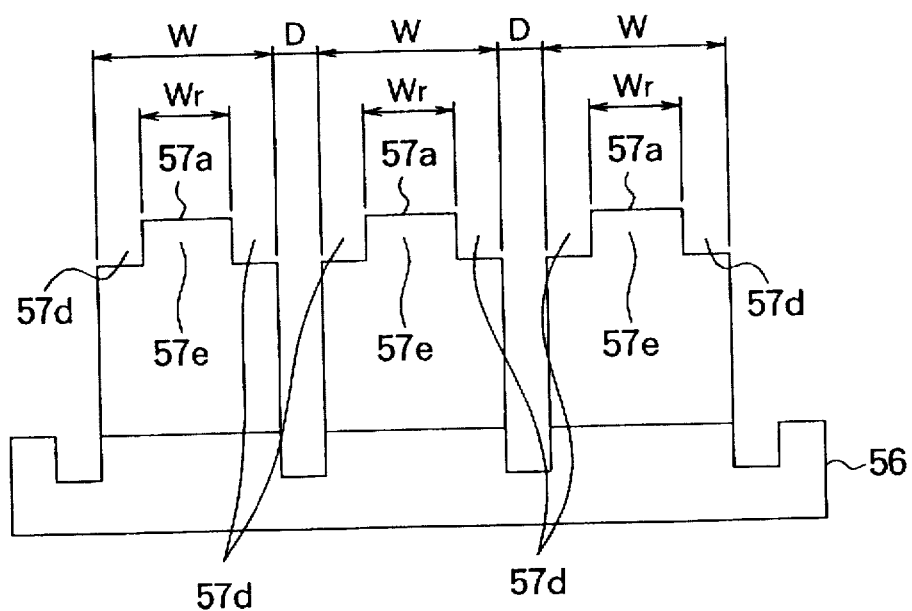
Figure 29A:
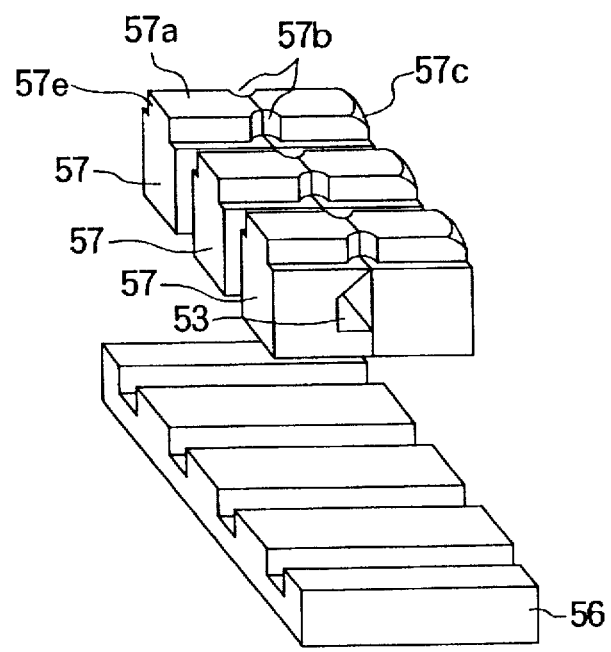
FIG. 29A is a perspective view showing the situation in which the head chips are detached from the head base of FIG. 28A.
Figure 29B:
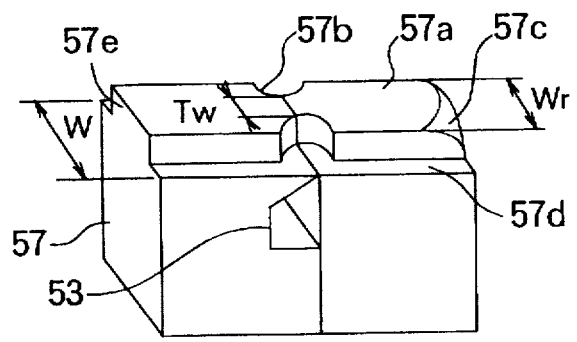
FIG. 29B is a perspective view showing a single head chip enlarged.
Figure 30:
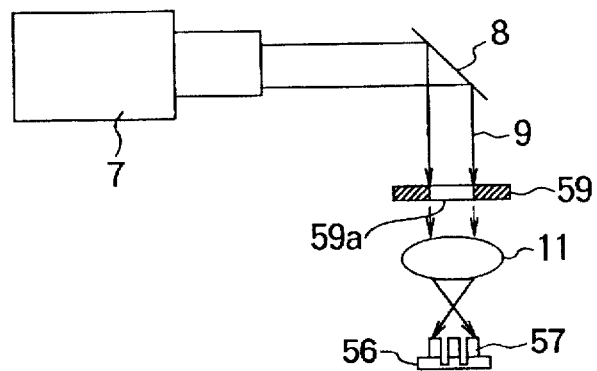
FIG. 30 is an explanatory diagram showing the process of the laser machining for forming the configuration of FIG. 28A.
Figure 31A:
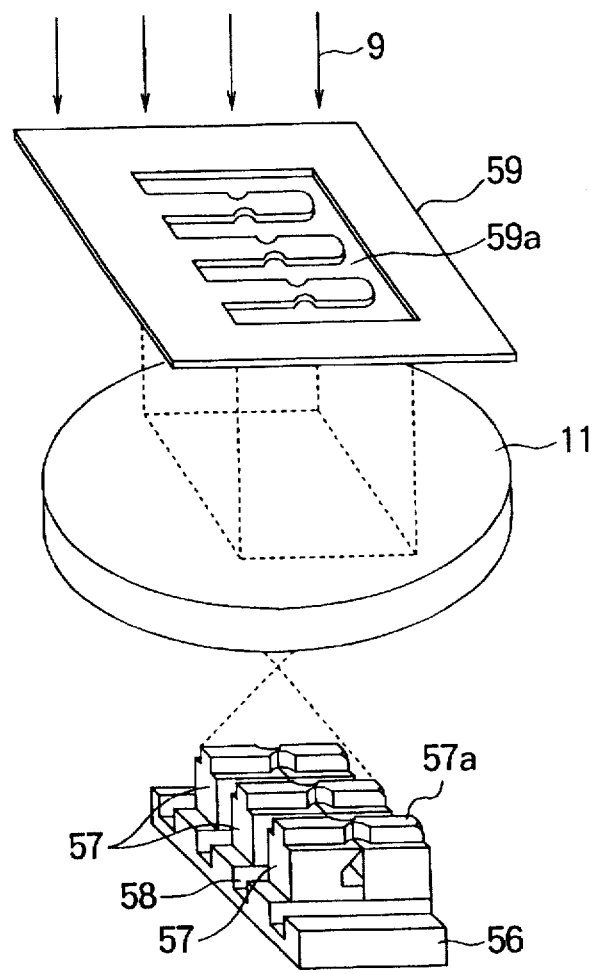
FIG. 31A is an explanatory diagram showing the process of machining by means of the laser machining equipment shown in FIG. 30.
Figure 31B:
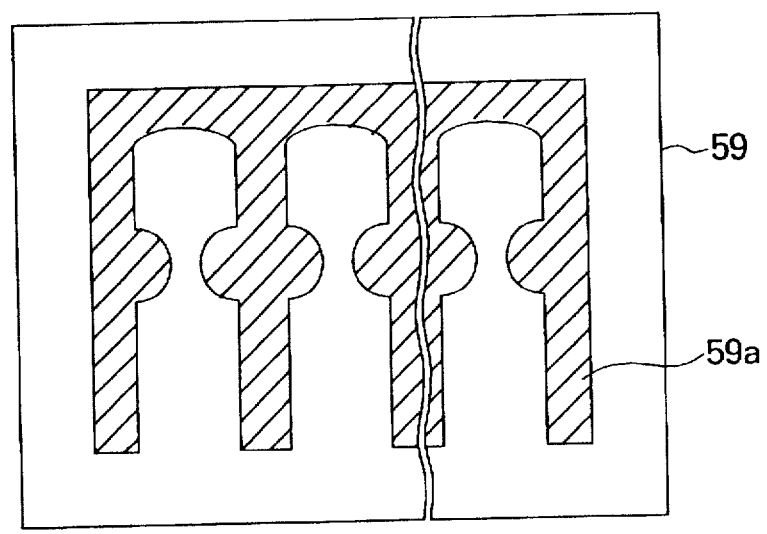
FIG. 31B is a plan view of a mask used in the process of FIG. 31A.

FIGS. 27A–27C, FIGS. 28A–28B, FIGS. 29A–29B, FIG. 30 and FIGS. 31A–31B relate to a method for manufacturing a magnetic head according to Embodiment 9 of the present invention. FIGS. 27A–27C are perspective views showing the processes by which a plurality of head chips 57 are cut from a head block 55 comprising one pair of ferrite core blocks 51 and 52. FIG. 28A is a perspective view of the configuration after the laser machining of the sliding surfaces 57a of the head chips 57 of FIG. 27C, and FIG. 28B is a front view of the head chips shown in FIG. 28A. FIG. 29A is a perspective view showing tire situation in which the head chips 57 are detached from the head base 56 of FIG. 28A, and FIG. 29B is a perspective view showing the same head chip 57 enlarged. FIG. 30 is an explanatory diagram showing the process of machining the head chips 57 of FIG. 27C into the configuration of FIG. 28A. FIG. 31A is an explanatory diagram showing the process of machining shown in FIG. 30, and FIG. 31B is a plan view of the mask 59 used in FIG. 31A.

First, as shown in FIG. 27A, ferrite core blocks 51 and 52 made of a ferromagnetic substance are prepared, and a coil window 53 is formed in one of the ferrite core blocks (i.e., ferrite core block 51) by mechanical machining. Next, a layer of non-magnetic gap material 54 is formed on each of the joint surfaces of the ferrite core blocks 51 and 52 by vacuum film deposition technique. Then the ferrite core blocks 51 and 52 are joined with the interposed gap material 54 to form the head block 55. Then, as shown in FIG. 27B, the head block 55 is bonded onto a cutting substrate 56, by means of wax or other organic bonding agent. The wax used may be a type containing rosin, beeswax, ester gum and paraffin (for example, Sky Wax (brand name) manufactured by Nikkaseiko Co., Ltd.), or a type containing rosin, denatured acrylic resin, higher alcohol and fatty acid (for example, Shift Wax 5605 (brand name) manufactured by Nikkaseiko Co., Ltd.). The organic bonding agent may be a cyano-acrylate bonding agent (for example, Aron Alpha (brand name) manufactured by Toa Gosei Kagaku kogyo Co., Ltd.), or an α-cyano-acrylate bonding agent (for example, Cemedine 300 (brand name) manufactured by Cemedine Co., Ltd. or Sky Bond (brand name) manufactured by Nikkaseiko Co., Ltd.). When wax is used, the head block 55 and the substrate 56 are heated to a temperature of approximately 100° C. to 150° C., coated with wax, laminated together, and cooled to room temperature to allow the wax to harden. When an organic bonding agent is used, the bonding agent is applied at room temperature to the head block 55 and the substrate 56, which are then joined together, and the bonding agent is hardened by drying.

Next, the head block 55 shown in FIG. 27B is cut to form the plurality of head chips 57 shown in FIG. 27C. The plurality of cutting grooves 58 formed in the cutting process are of constant width D. As shown in FIG. 27C, the width D is determined in such a way that the thickness of the head chips 57 is a constant value W. The cutting grooves 58 are formed to have a depth such that the cutting grooves 58 penetrate completely through the head block 55 to reach the cutting substrate 56. For reasons of working accuracy and productivity, the cutting grooves 58 may appropriately be formed by the mechanical machining using a wire saw or a rotating blade, but the method of forming the cutting grooves 58 is not limited to the mechanical machining, but may involve the laser machining, ion beams machining, and so on.

Next, a laser beam is irradiated on the head chips 57 shown in FIG. 27C to form a plurality of track grooves 57b on the sliding surfaces 57a of the plurality of head chips 57, and chamfered portions 57c on the end of the sliding surfaces 57a. Thus the head chips 57 have the configuration shown in FIG. 28A. The portion between a pair of track grooves 57b in FIG. 28A constitutes the track which has the track width of $T_W$ as shown in FIG. 29B. As shown in FIG. 28B, which shows the side view of FIG. 28A, the machining of a pair of cutaway portions 57d in the sliding surface 57a results in the formation of a protuberant portion 57e, thereby making the width $W_r$ of the sliding surface 57a smaller than the thickness W of the head chip 57.

This laser machining is accomplished by the process shown in FIG. 30 and FIGS. 31A–31B. The laser beam 9 is emitted from the laser source 7 and reflected by the bend mirror 8. Then, after passing through the slit 59a of the mask 59, the laser beam 9 is condensed by the image-forming lens 11 and is irradiated on the sliding surface 57a of the head chip 57. Since the portions irradiated by the laser beam 9 in accordance with the pattern of the mask 59 are removed, a plurality of track grooves 57b, chamfered portions 57c at the end of the sliding surface 57a, and cutaway portions 57e can be machined simultaneously and in a short period of time. Further, in FIGS. 27A–27C and FIGS. 28A–28B, three head chips 57 are illustrated, but these figures show only one example. Four or even more head chips 57 can be machined by the laser beam. It is therefore possible to replicate the pattern of the mask 59 the number of times corresponding to the number of the head chips 57 that are to be formed.

If the power of the laser beam is set at adequate value, it is possible to eliminate the image-forming lens 11, thereby enabling the laser machining to be carried out with the mask 59 in contact with the head chip 57. The laser source of Embodiment 9 is the same as that of Embodiment 1.

Next, the head chips 57 and the cutting substrate 56 are heated so that a plurality of head chips 57 are separated from the cutting substrate 56 as shown in FIG. 29A. When the bond is made by wax, heating is accomplished by immersing the head chips 57 and the cutting substrate 56 in hot water. If at this time a dilute aqueous solution of the cleansing agent at elevated temperature is used, the machining residue adhering to the head chips 57 may be washed away in the same process. When the bond is made by organic bonding agent, heating is accomplished by immersion in a solution of diluted solvent. Heating may also be accomplished by bringing the cutting substrate 56 into direct contact with a heater or by irradiating a low-power laser beam to the joint between the head chips 57 and the substrate 56. After separation, the head chips 57 are as shown in FIG. 29B. The coil-winding process and polishing process are carried out thereafter.

According to the manufacturing method of Embodiment 9, once cutting grooves 58 have been formed, the laser machining is applied only to those portions requiring high dimensional accuracy, thereby reducing the volume of material to be removed by the laser machining. Thus, it is possible to prevent both the degradation in the magnetic characteristics of the head chip 57 caused by the heat of the laser machining and the deterioration in the linearity of the machined surface due to the accumulation of laser heat during machining. Also, since the head chips 57 are separated from the substrate 56 by heating, the manufacturing process is simpler than when separation is by mechanical machining, the manufacturing time required shorter, making possible an increase in productivity. Specifically, the mechanical machining was difficult, to accomplish when the material used for the head chip is ferrite, which is hard and friable, but the laser machining can be accomplished easily and high productivity obtained.

Figure 32:
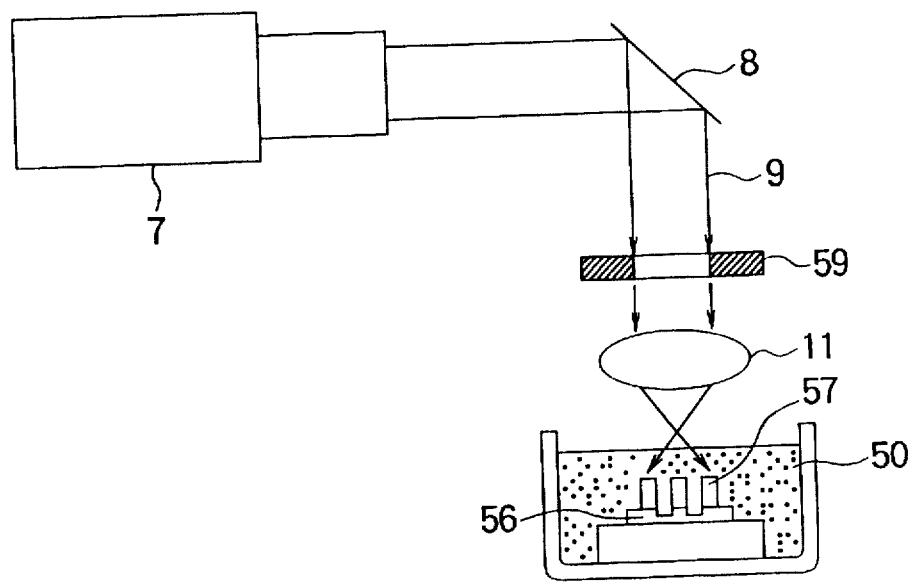
FIG. 32 is an explanatory diagram showing the process in which the head chip and the head base are subjected to the laser machining while immersed in the machining fluid.

The above description concerns a case in which the laser machining is carried out in air, but the present invention is not limited to this case. The laser machining may also be carried out by immersing the head chips 57 and the cutting substrate 56 into the liquid 50 for the laser machining, as shown in FIG. 32. When the liquid 50 is water or pure water, the heat accumulating in the head chips 57 during the laser machining can be efficiently removed, thereby preventing degradation in the magnetic characteristics of the core piece due to heat. Further, when a phosphoric acid or a KOH solution is used as the liquid 50 for the laser machining, it is possible to obtain, in addition to a cooling effect, an acceleration of the machining rate. This is because the material under the laser machining reacts chemically with the phosphoric acid or the KOH solution so that only the portions heated by the laser beam are partially etched. Further, since the residual stress in the surface machined by the laser beam can be removed by the etching, the effect, that the degradation of the magnetic characteristics of the core pieces constituting the head chip is prevented, is obtained. To increase this effect, the liquid 50 for the laser machining may also be circulated within its container. By these methods, the machining rate can be accelerated, thereby improving productivity and making possible the manufacture of a magnetic head having superior characteristics of the electromagnetic transduction.

Figure 33:
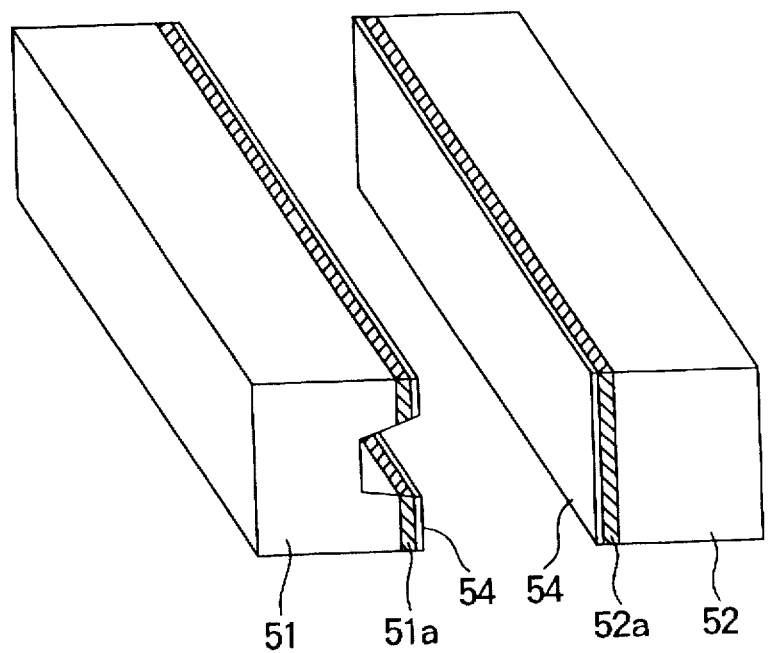
FIG. 33 is a perspective view showing the situation which a head block is formed using ferrite core blocks to which are connected metal magnetic films.

Furthermore, in Embodiment 9 described above, it is equally possible, instead of the ferrite core blocks 51 and 52 of FIG. 27A, to use the ferrite core blocks 51 and 52 to which the metal magnetic films 51 $a$ and 52$a$ have been bonded by vacuum thin film formation technique, as shown in FIG. 33. By using as the metal magnetic films 51 $a$ and 52 $a$ a metal having a large saturated magnetic flux density, such as sendust, cobalt-based amorphous, Fe-based microcrystalline materials, or the like, appropriate recording of information can be carried out even on recording media having a high coercive force, enabling magnetic recording and reproducing at a high recording density.

Embodiment 10

Figure 34A:
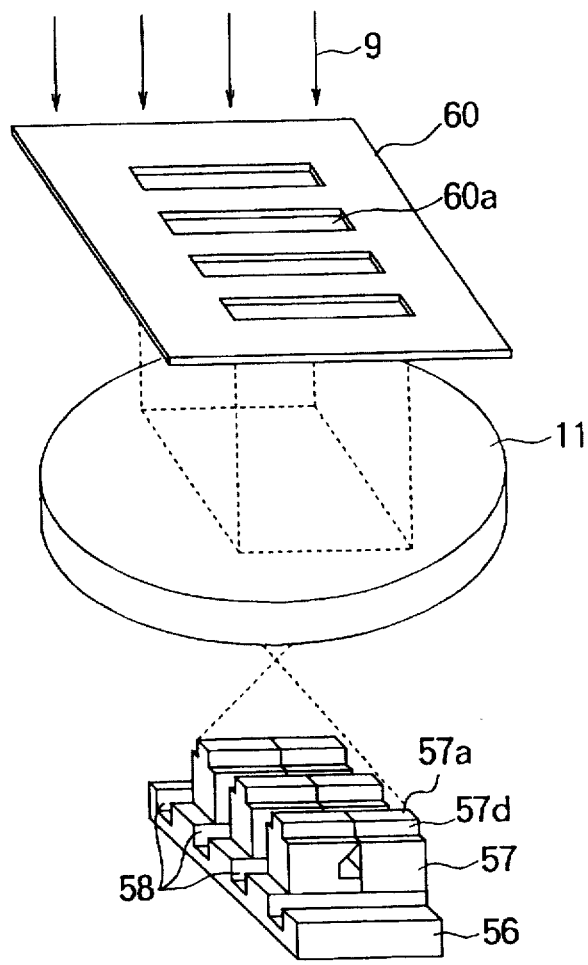
FIG. 34A is an explanatory diagram showing the process in which the head chips are subjected to the laser machining according to the manufacturing method of Embodiment 10.
Figure 34B:
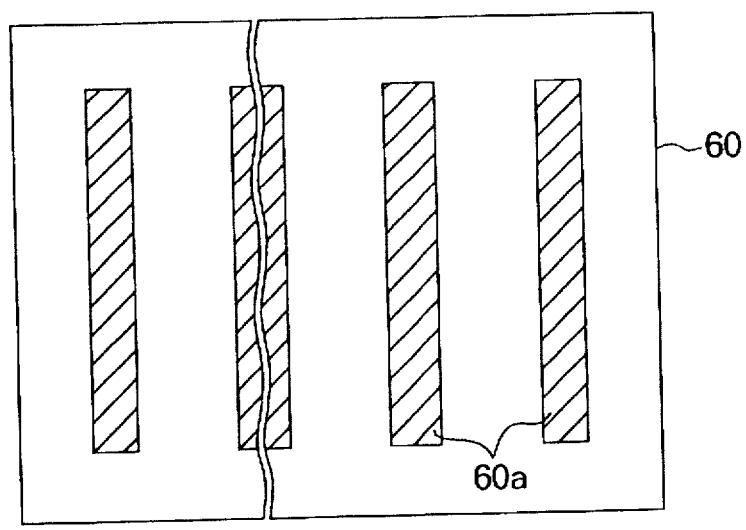
FIG. 34B is a plan view of a mask used in the process of FIG. 34A.
Figure 36A:
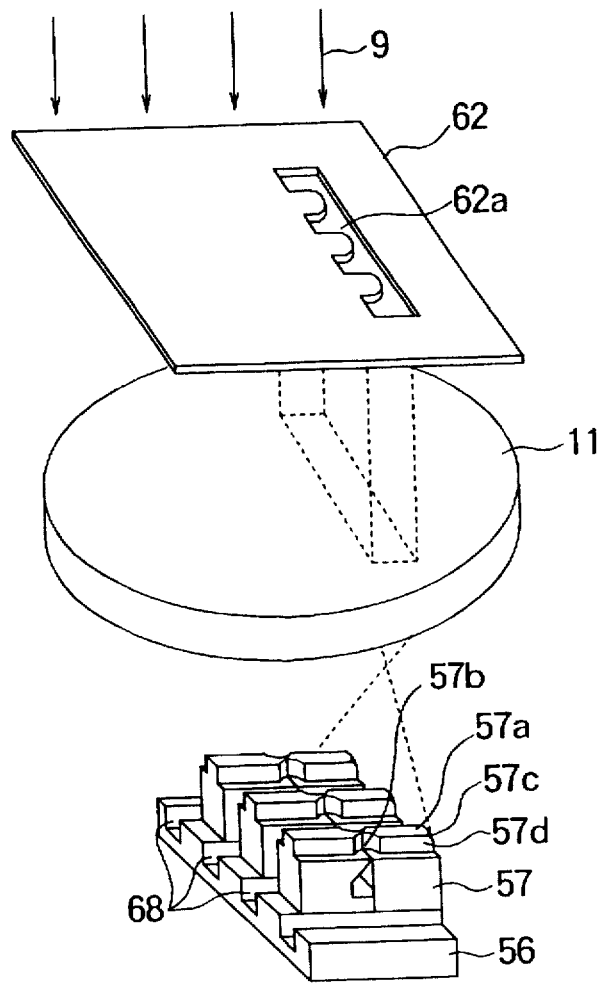
FIG. 36A is an explanatory diagram showing the process in which the head chips shown in FIG. 35A are subjected the laser machining.
Figure 36B:
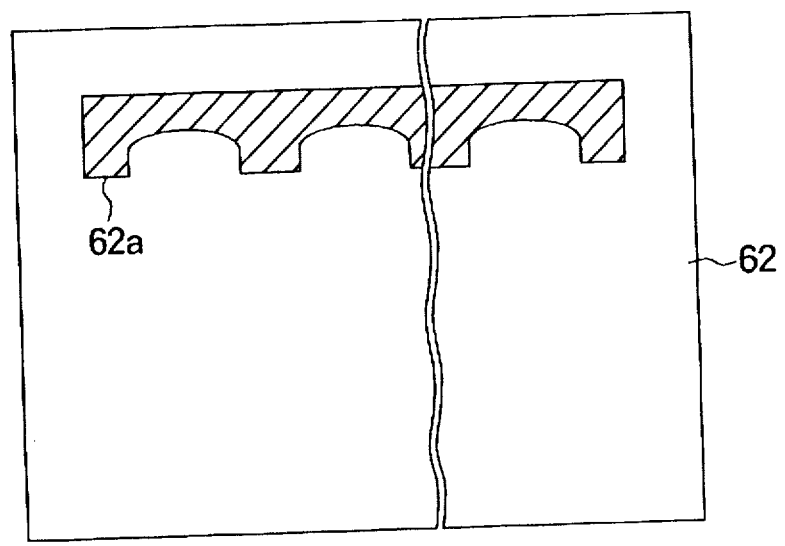
FIG. 36B is a plan view of a mask used in the process of FIG. 36A.

FIGS. 34A–34B, FIGS. 35A–35B and FIGS. 36A–36B relate to a method for manufacturing a magnetic head according to Embodiment 10 of the present invention. FIG. 34A is an explanatory diagram showing the process in which the head chips 57 of FIG. 27C are subjected to the laser machining, and FIG. 34B is a plan view of the mask 60 of FIG. 34A. FIG. 35A is an explanatory diagram showing the process in which the head chips 57 of FIG. 34A are subjected to the laser machining, and FIG. 35B is a plan view of the mask 61 of FIG. 35A. FIG. 36A is an explanatory diagram showing the process in which the head chips 57 of FIG. 35A are subjected to the laser machining, and FIG. 36B is a plan view of the mask 62 of FIG. 36A.

As shown in FIGS. 34A–34B, FIGS. 35A–35B and FIGS. 36A–36B, the manufacturing method of Embodiment 10 differs from the method of Embodiment 9 solely in the respect that three masks are used instead of the single mask used in Embodiment 9.

After the plurality of cutting groves 58 shown in FIG. 27C are formed in the head block 55 shown in FIG. 27B, the mask 60 shown in FIG. 34B is placed in the light path of the laser beam 9, as shown in FIG. ;34A. The laser beam 9 then passes through the plurality of slits 60$a$ provided in the mask 60 to impinge on the sliding surfaces 57$a$ of the head chips 57, thereby forming a plurality of cutaway portions 57$d$. The mask 60 is then replaced by the mask 61 of FIG. 35B, and by irradiating the head chip 57 with the laser beam 9 through a plurality of slits 61$a$, as shown in FIG. 35A, a plurality of track grooves 57$b$ are formed. The mask 61 is then replaced by the mask 62 of FIG. 36B and by irradiating the head chip 57 with the laser beam 9 through a plurality of slits 62$a$, as shown in FIG. 36A, a plurality of chamfered portions 57$c$ are formed on the ends of the sliding surfaces 57$a$ of the head chips 57.

According to the manufacturing method of Embodiment 10, the machining conditions of the laser beam 9 such as power of the laser beam, iterative rate of the pulses of the laser beam, interval of the pulses of the laser beam and the like, can be set for each individual configuration to be machined. Thus the depth of machining can be optimized for each individual configuration, yielding higher dimensional accuracy in the depth direction than can be obtained using the manufacturing method of Embodiment 9.

Specifically in the laser machining of the track grooves 57$b$, where the track width $T_w$ is small and degradation due to the heat of the laser beam readily occurs, it is possible, according to the manufacturing method of Embodiment 10, to optimize the machining conditions of the laser beam 9 for each configuration to be machined, thereby manufacturing a magnetic head with superior magnetic characteristics.

While the above description concerns a case in which machining is accomplished using the masks 60, 61 and 62 in that sequence, the present invention is not limited to that sequence. The laser machining may be carried out using the masks in any sequence. In all respects other than those mentioned above, Embodiment 10 is identical to Embodiment 9 already described.

Embodiment 11

Figure 37:
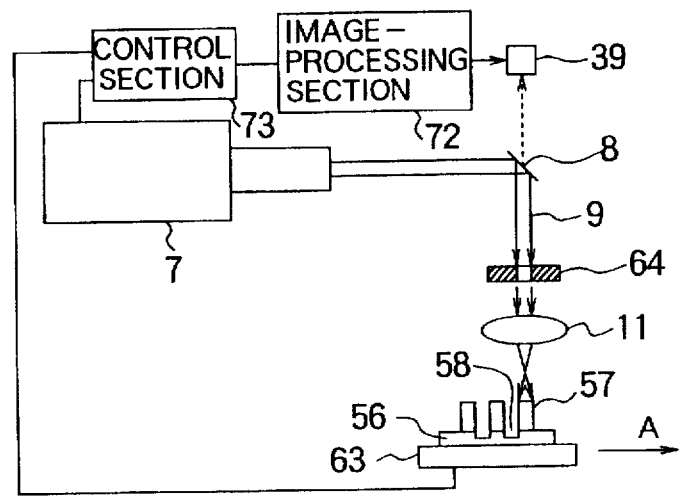
FIG. 37 is a structural diagram showing the general configuration of the laser machining equipment used in the manufacturing method of Embodiment 11.
Figure 38:
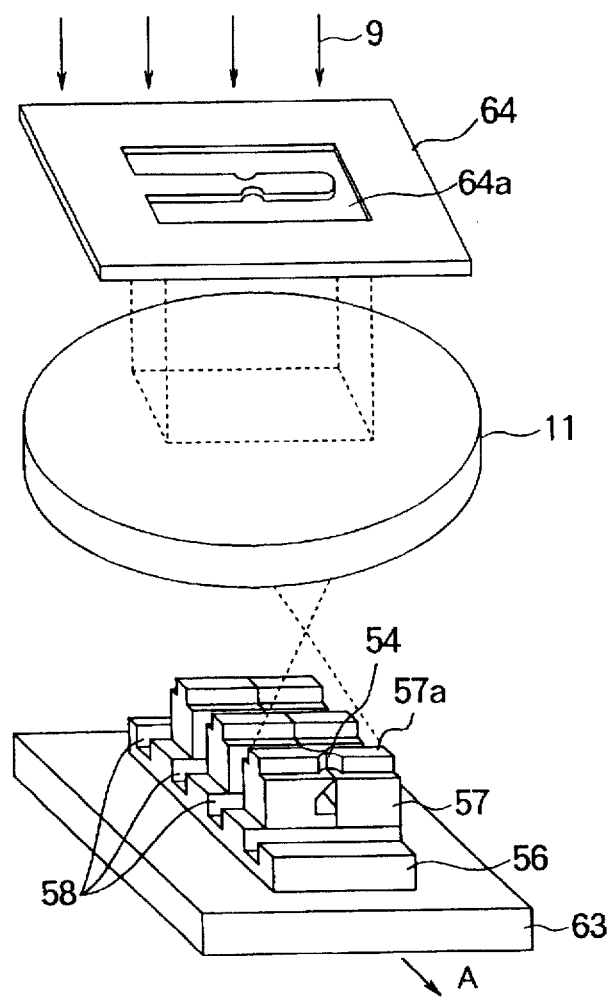
FIG. 38 is an explanatory diagram showing the process in which the laser machining is conducted by the manufacturing method of Embodiment 11.
Figure 39:
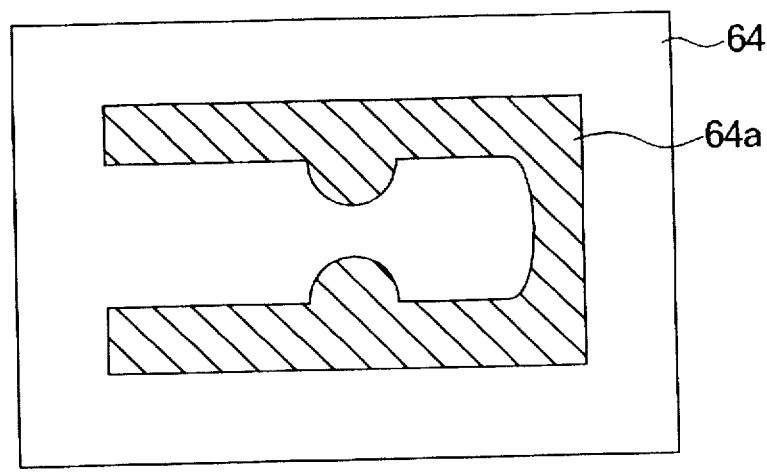
FIG. 39 is a plan view of a mask shown in FIG. 37 and FIG. 38.
Figure 40:
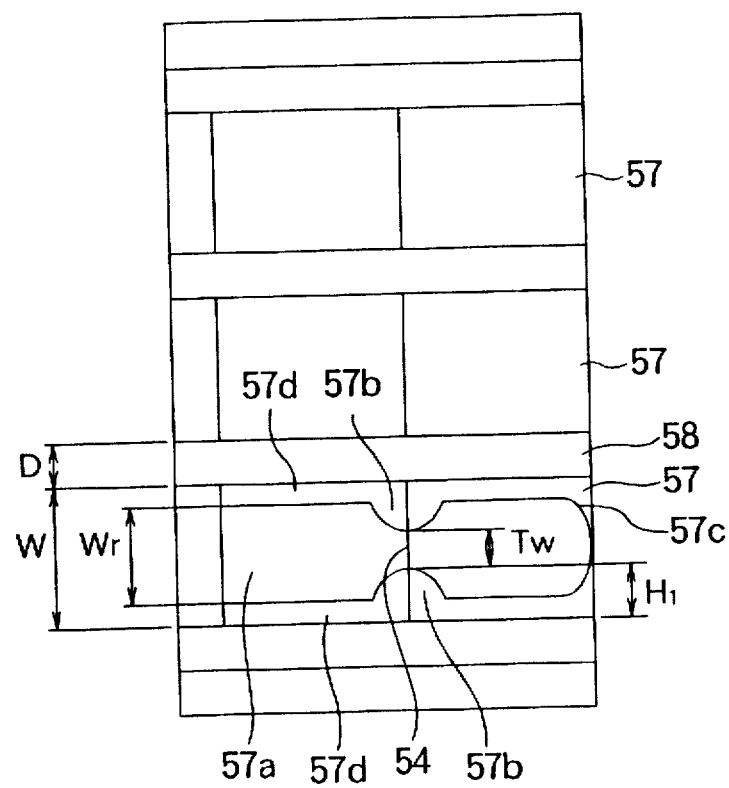
FIG. 40 is a plan view of the head chip of FIG. 38.

FIG. 37 to FIG. 40 relate to a method for manufacturing a magnetic head according to Embodiment 11 of the present invention. FIG. 37 is a structural diagram generally showing the compositions of the laser machining equipment, and FIG. 38 is an explanatory diagram showing the process in which the laser machining is accomplished. FIG. 39 is a plan view of the mask 64 shown in FIG. 37 and FIG. 38, and FIG. 40 is a plan view of the head chip 57 shown in FIG. 38.

In FIG. 37, a reference numeral 39 designates a monitoring section having a microscope, and 72 designates an image-processing section for detecting the positions of the cutting grooves 58 and the head chips 57 on the movable working stage 63 on the basis of image data from the monitoring section 39. Further, a reference numeral 73 designates a control section for controlling the positioning of the movable working stage 63 on which the head chips 57 are mounted and the positioning of the laser optical system on the basis of the position of the cutting grooves 58 and the gap 54 as detected by the image-processing section 72. In FIG. 39, the slit 64a provided in the mask 64 is for the purpose of forming a pair of track grooves 57b, the chamfered portion 57c at the end of the sliding surface 57a, and a pair of cutaway portions 57d in the same process.

In the manufacturing method of Embodiment 11, the plurality of head chips 57 fixed to the cutting substrate 56 are first manufactured according to the sequence shown in FIGS. 27A–27C.

Next, the cutting substrate 56 is fixed on the movable working stage 63. Next, on the basis of the position of the cutting groove 58 and the gap 54 as measured by the monitoring section 39 which carries out image recognition, the control section 73 controls the positioning of the movable working stage 63 on which the head chip 57 is mounted and the positioning of a laser optical system including the laser source 7, the bend mirror 8, the mask 64 and the image-forming lens 11. The sliding surface 57a of the head chip 57 is then irradiated with the laser beam 9 form therein the track grooves 57b, the chamfered portion 57c on the sliding surface end, and the cutaway portion 57d. By this method, simply moving the movable working stage 63 to position the head chip 57, and positioning the laser optical system (the position irradiated by the laser beam or the position of the image-forming lens or the like) makes it possible to determine accurately distance $H_1$ from the cutting groove 58 to the track groove 57b, as shown in FIG. 40.

Figure 57:
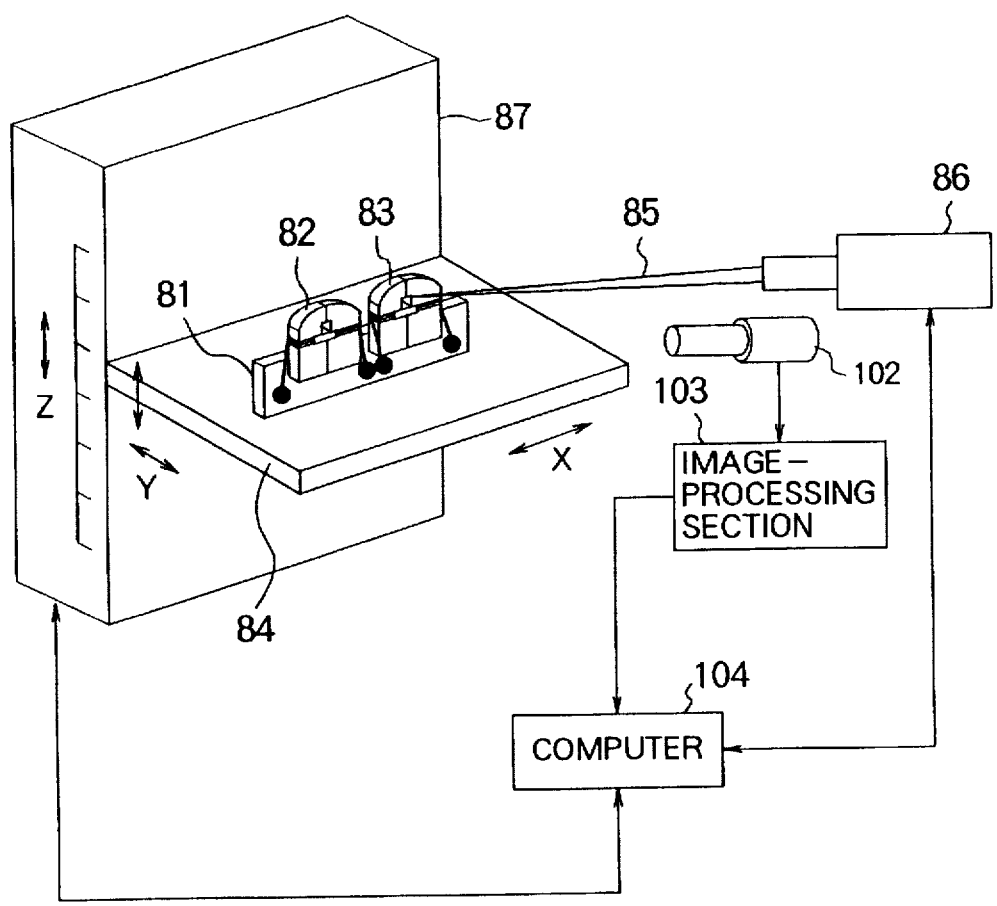
FIG. 57 is a structural diagram generally showing the machining equipment for accomplishing the manufacturing method of Embodiment 17.

Next, the movable working stage 63 is moved in the direction A in FIG. 57 and FIG. 38 until the adjacent head chip 57 is directly beneath the mask 64. The laser optical system is positioned, and the laser beam 9 is then irradiated through the slit 64a in the mask 64. By this means, on the sliding surface 57a of the adjacent head chip 57, there are formed the track grooves 57b, the chamfered portion 57c and the cutaway portion 57d. Similarly, the movement of the movable working stage 63 in the direction A and the irradiation of the laser beam to the next adjacent and subsequent head chips 57 can be carried out in sequence, thereby forming, in the sliding surface 57a of the head chip 57, the track grooves 57b, the chamfered portion 57c and the cutaway portion 57d. By means of the above processes, the laser machining of each of the head chips 57 is completed, producing the configuration shown in FIGS. 28A–28B. Subsequent processes are identical to those of Embodiment 9.

According to the manufacturing method of Embodiment 11, since the position of the mask 64 can be determined with respect to each of the cutting grooves individually, the distance $H_1$ from the cutting groove 58 to the track grooves 57b can be kept constant for each of the head chips 57. Thus when the head chip 57 is mounted to a rotating drum using one of the cutting grooves 58 as a reference point, the position of the track groove as determined by height $H_1$ can be kept constant, thereby eliminating the process by which height is adjusted, which is required in conventional systems.

Further, in the method of Embodiment 11, although the time required is longer than in the method of Embodiment 10, in which a plurality of track grooves 57b, chamfered portions 57c and cutaway portions 57d are formed simultaneously, both the size of the laser optical system and the output power of the laser can be reduced, resulting in the advantage that the laser machining can be accomplished with more compact equipment. In addition, since the area irradiated by a single laser beam is smaller, the machining error due to aberration and the like of the image-forming lens 11 can be reduced, thereby resulting in higher dimensional accuracy.

While the description above concerns a method for machining in which the head chips 57 are moved, it is also possible to accomplish machining analogously by moving the laser optical system, including the mask 64 and the image-refining lens 11.

Further, while the description above concerns a case which the position of the head chip 57 is measured on the basis of the image data of the monitoring section 39, the position of the head chip 57 may be measured by another method in which at least the position of the side surface the head chip can be detected.

Embodiment 12

Figure 41A:
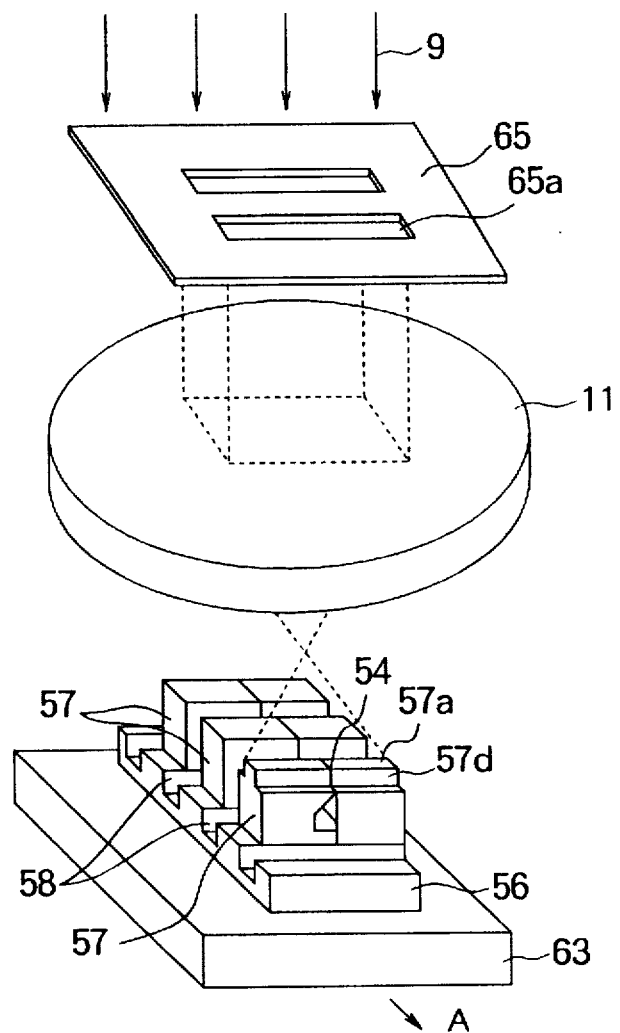
FIG. 41A is an explanatory diagram showing the process in which the head chips of FIG. 27C are subjected to the laser machining according to the manufacturing method Embodiment 12.
Figure 41B:
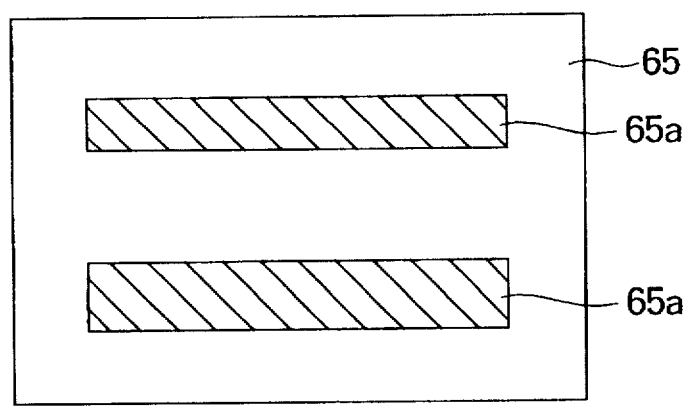
FIG. 41B is a plan view of a mask used in FIG. 41A.
Figure 42A:
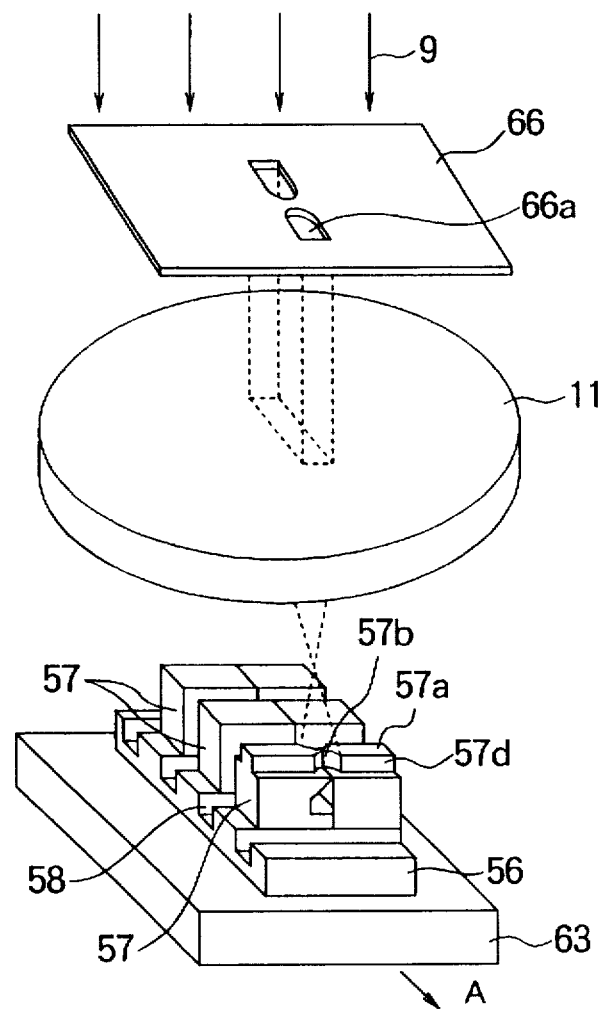
FIG. 42A is an explanatory diagram showing the process in which the head chips of FIG. 41A are subjected to laser machining.
Figure 42B:
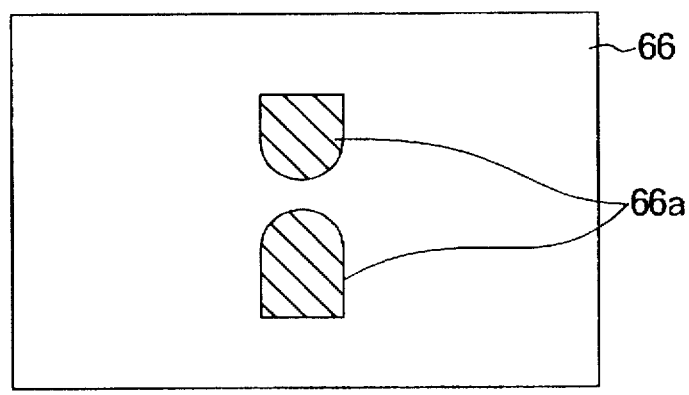
FIG. 42B is a plan view of a mask used in FIG. 42A.
Figure 43A:
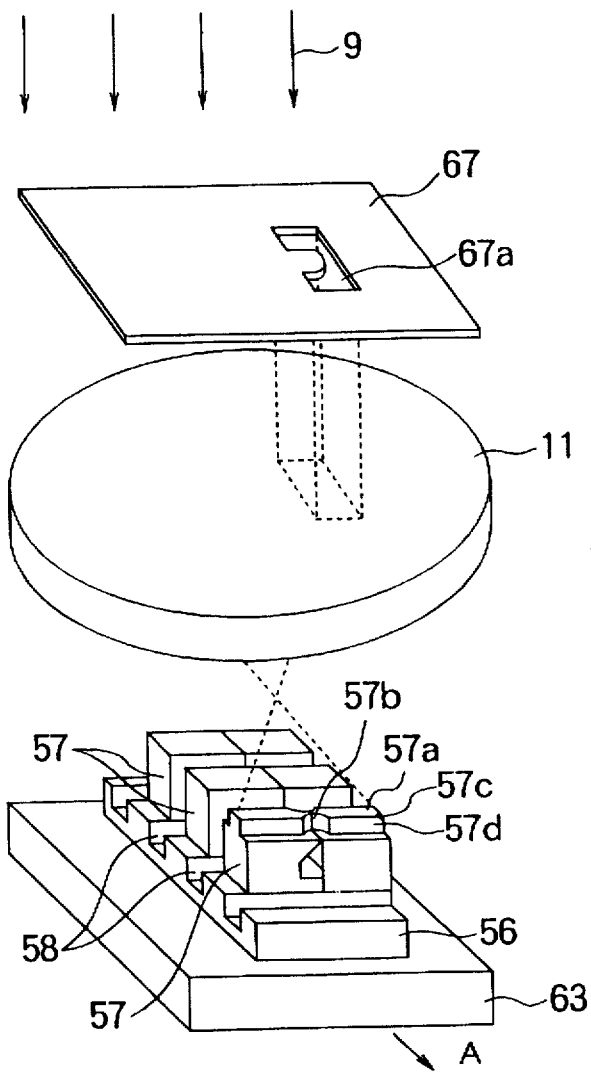
FIG. 43A is an explanatory diagram showing the process in which the head chips of FIG. 42A are subjected to the laser machining.
Figure 43B:
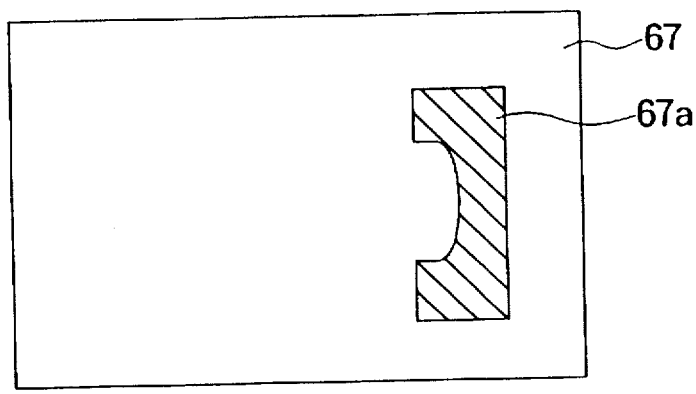
FIG. 43B is a plan view of a mask used in FIG. 43A.

FIGS. 41A–41B, FIGS. 42A–42B and FIGS. 43A–43B relate to a method for manufacturing a magnetic head according to Embodiment 12 of the present invention. FIG. 41A is an explanatory diagram showing the process by which the head chips 57 of FIG. 27C are subjected to the laser machining, and FIG. 41B is a plan view of the mask 65 FIG. 41A. FIG. 42A is an explanatory diagram showing the process in which the head chips 57 shown in FIG. 41A are subjected to the laser machining, and FIG. 42B view of the mask 66 of FIG. 42A. Pig. 43A is an explanatory diagram showing the process in which the head chips 57 shown in FIG. 42A are subjected to the laser machining, and FIG. 43B is a plan view of the mask 67 of FIG. 43A.

As shown in FIGS. 41A–42B, FIGS. 42A–42B and FIGS. 43A–43B, the manufacturing method of Embodiment 12 differs from the case of Embodiment 11 solely in the respect that the laser machining of Embodiment 12 is accomplished us three masks 65, 66 and 67, instead of the mask 64 Embodiment 11.

Following is a description of the manufacturing method of Embodiment 12. First, as shown in FIG. 27C, a plurality of cutting grooves 58 are formed on the head block, thereby forming a plurality of head chips 57. Next, as shown FIG. 41A, the cutting substrate 56, on which a plurality head chips 57 are mounted, is fixed on the movable working stage 63. The head chip 57 and the laser optical system are positioned in a manner analogous to that of Embodiment 11, using the position of the cutting grooves 58 and the gap 54 of the head chip 57 as a reference point. Next, as shown FIG. 41A, the mask 65, in which are provided a plurality of slits 65a, and the laser beam 9 is passed through the slits 65a to impinge on the sliding surface 57a of the head chip 57, thereby forming a plurality of cutaway portions 57d. Next, the movable working stage 63 is moved in the direction A, and the remaining head chips 57 are machined in an analogous manner.

Next, the mask 65 is replaced by the mask 66 which is provided with the slits 66a for the purpose of machining a plurality of track grooves 57b as shown in FIG. 42A, and laser beam 9 is irradiated through the slits 66a to the head chip 57, thereby forming a plurality of track grooves 57b. Next, the movable working stage 63 is moved in the direction A, and the remaining head chips 57 are machined in analogous manner.

Next, the mask 66 is replaced by the mask 67 which provided with the slit 67a for the purpose of machining a plurality of chamfered portions 57c as shown in FIG. 43A, and the laser beam 9 is irradiated through the slit 67a to the head chips 57, thereby forming a plurality off chamfered portions 57c. Next the movable working stage 63 is moved in direction A, and the remaining head chips 57 are machined an analogous manner.

According to the method of Embodiment 12, by positioning the head chip 57 and the laser optical system, the distance $H_1$ from the cutting groove 58 to the track groove 57b can be made with high precision. Further, since the position of the mask 66 can be determined with respect to each of the cutting grooves individually, the distance $H_1$ from the cutting groove 58 to the track grooves 57b can be kept constant for each of the head chips 57. Thus when the head chip 57 is mounted to a rotating drum using one of the cutting grooves 58 as a reference point, the position of the track groove as determined by height $H_1$ can be kept constant, thereby eliminating the process by which height is adjusted, which is required in conventional systems.

Further, although the time required in the method of Embodiment 12 is longer than in the method of Embodiment 10 in which a plurality of track grooves 57b, chamfered portions 57c and cutaway portions 57d are formed simultaneously, both the size of the laser optical system and the output power of the laser beam are reduced, resulting in the advantage that laser machining can be accomplished with more compact equipment. In addition, since the area irradiated by a single laser beam is smaller, the machining error due to aberration and the like of the image-forming lens 11 can be reduced, thereby resulting in higher dimensional accuracy.

While the description above concerns a method in which the head chips 57 are moved for the laser machining, it is also possible to accomplish the laser machining analogously by moving the laser optical system including the masks and the image-forming lens 11.

In accordance with the manufacturing method of Embodiment 12, the machining conditions of the laser beam 9, such as the power of the laser beam 9, the iteration rate of the pulse of the laser beam 9, the interval of the pulse of the laser beam and the like, can be set for each individual configuration to be machined. Thus the depth or machining can be optimized for each individual configuration, yielding higher dimensional accuracy in the depth direction.

Specifically in the laser machining of the track grooves 57b, where the track width $T_W$ is small and degradation due to the heat of the laser beam readily occurs, it is possible, according to the manufacturing method of Embodiment 12, to optimize each of the machining conditions of laser beam 9, thereby obtaining a magnetic head with superior magnetic characteristics.

While the above description concerns a case in which the laser machining is accomplished using the masks 65, 66 and 67 in that sequence, the present invention is not limited to that sequence, and the laser machining may be carried out using the masks in any sequence. In all respects other than those mentioned above, Embodiment 12 is identical to the Embodiment 11 already described.

Embodiment 13

Figure 44A:
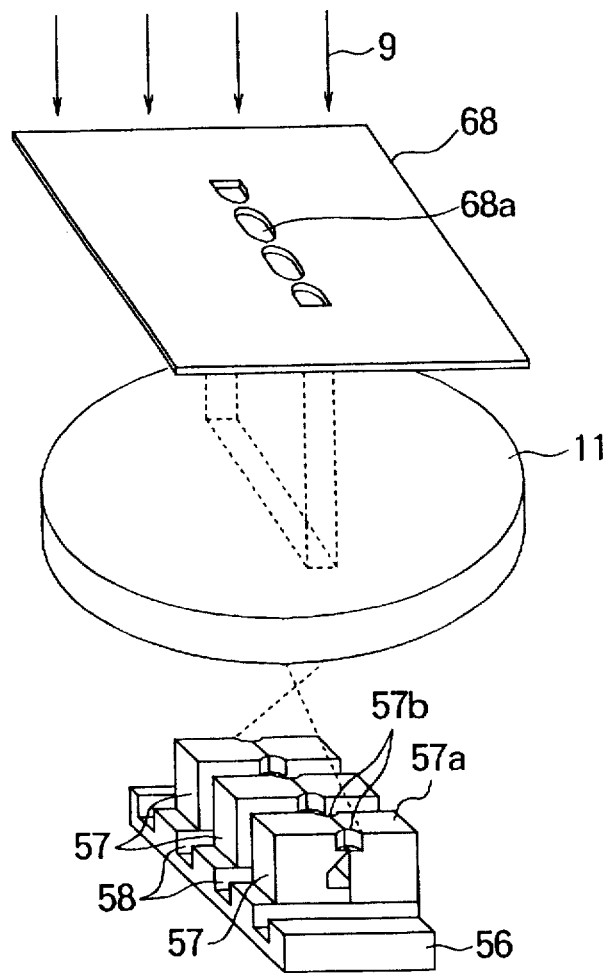
FIG. 44A is an explanatory diagram showing the process in which the head chips of FIG. 27C are subjected to the laser machining according to the manufacturing method of the Embodiment 13.
Figure 44B:
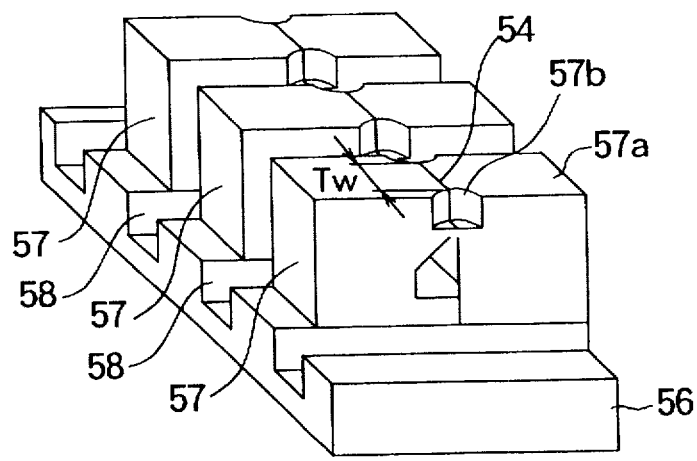
FIG. 44B is a perspective view showing the head chip after the laser machining of FIG. 44A.

FIGS. 44A–44B relate to a method for manufacturing a magnetic head according to Embodiment 13 of the present invention. FIG. 44A is an explanatory diagram showing the process in which the head chips of FIG. 27C are subjected to the laser machining, and FIG. 44B is a perspective view showing the head chips after the laser machining.

The track grooves of the head chip define the width $T_W$ of the track that carries out the recording and reproducing of the signal, and constitute an indispensable structure. However, the cutaway portions (indicated in FIGS. 41A, 42A and 43A by a reference numeral 57d), which serve to reduce the width of the sliding surface 57a (the thickness of the head chip 57 in the sliding surface 57a), thereby stabilizing contact between the magnetic head and the magnetic tape, and the chamfered portion at the end of the sliding surface (indicated in FIGS. 41A, 42A and 43A by a reference numeral 57c), which serves to prevent the reproducing of unwanted interference signals occurring at the end of the sliding surface, are not indispensable structures. Thus it is possible, even with a magnetic head which has neither a chamfered portion on the end of the sliding surface nor a cutaway portion shown in FIG. 44B, to provide satisfactory recording and reproducing image quality as a magnetic head for a VCR (e.g., VHS system VCR) in which the recording density is comparatively low.

The manufacturing method of Embodiment 13 is a method for machining the track grooves only using the laser beam. The machining processes of Embodiment 13 differs from those of Embodiment 9 solely in the respect that the mask 59 of Embodiment 9 is replaced by the mask 68 of FIG. 44A. FIG. 44A, a reference numeral 68a designates slits formed in mask 68.

By this method, the track grooves 57b may be machined using a single mask 69, so that the laser beam machining conditions can be optimized and high dimensional accuracy can be obtained.

Figure 45:
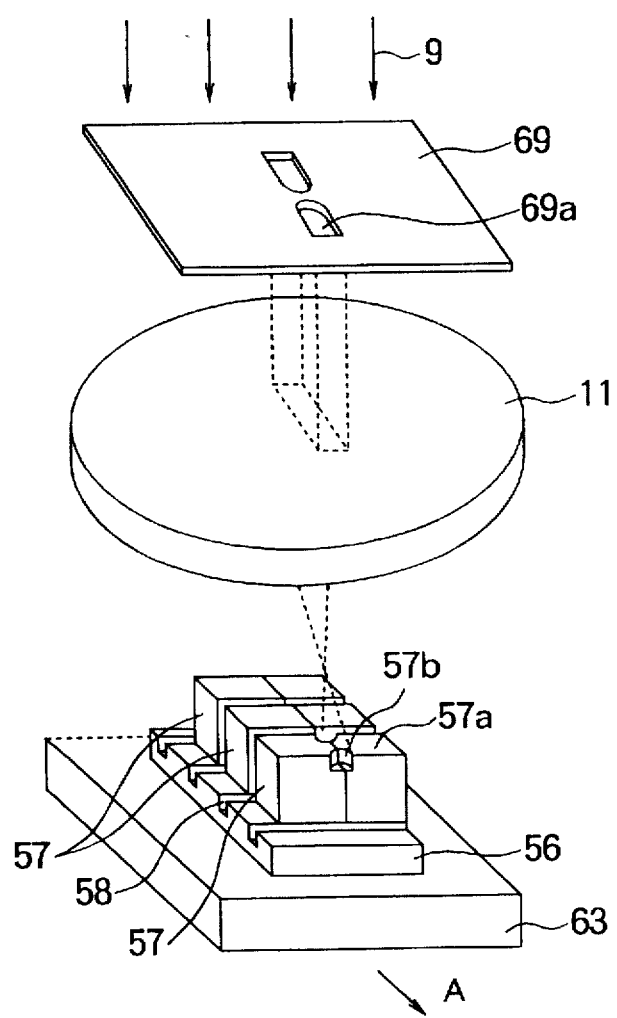
FIG. 45 is an explanatory diagram showing the process in which the head chips of FIG. 27C are subjected to the laser machining according to the manufacturing method of the Embodiment 13 using another mask.

It is equally possible in forming the head chips 57 FIG. 44B to subject each of the head chips 57 to laser machining individually in sequence, by using the mask 69 in which a pair of slits 69a are provided as shown in FIG. 45 and moving the working stage 63.

Embodiment 14

Figure 46A:
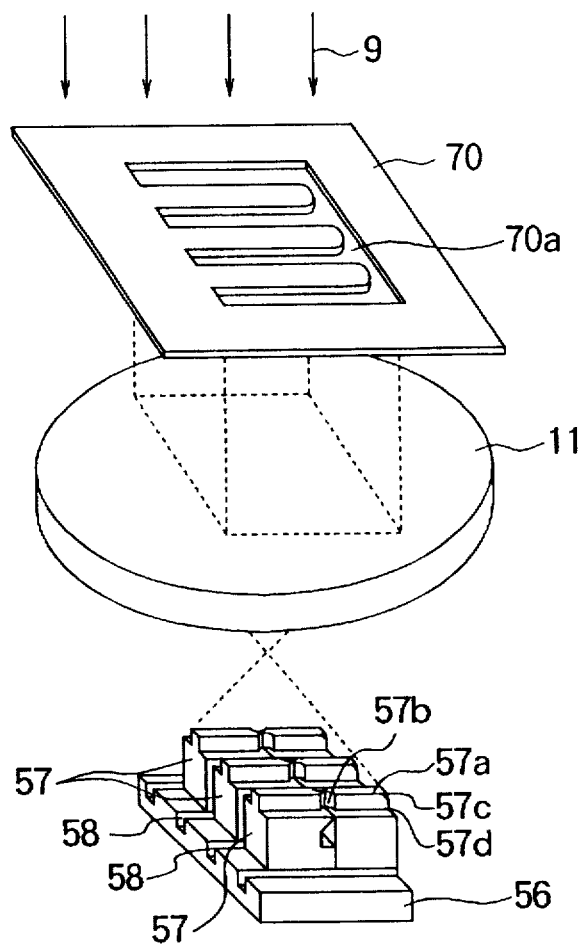
FIG. 46A is an explanatory diagram showing the process in which the head chips are subjected to the laser machining according to the manufacturing method of Embodiment 14.
Figure 46B:
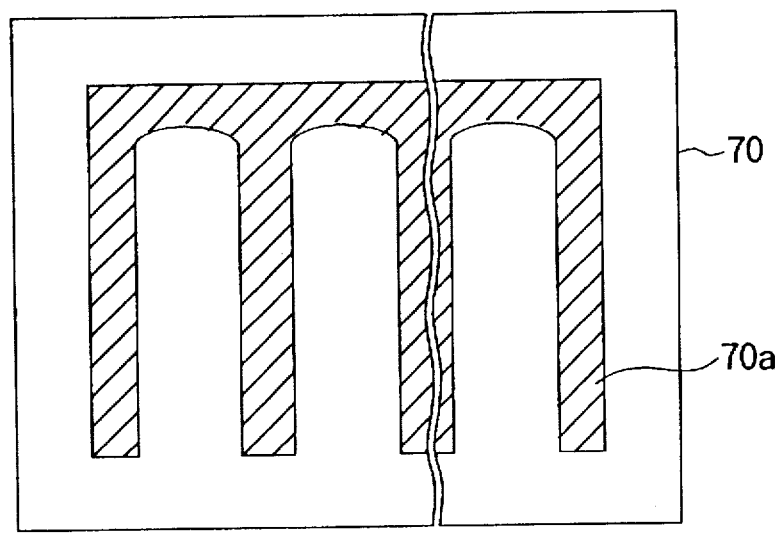
FIG. 46B is a plan view of a mask used in FIG. 46A.

FIGS. 46A–46B relate to a method for manufacturing a magnetic head according to Embodiment 14 of the present invention. FIG. 46A is an explanatory diagram showing the process of the laser machining, and FIG. 46B is a plan view of the mask 70 of FIG. 46A.

While the above-described Embodiment 10 (FIGS. 34A–34B through FIGS. 36A–36B) concerns a case in which three masks are used, corresponding to each of the three configurations to be formed on the sliding surface 57a of the head chips 57, it is equally possible to accomplish the laser machining by using the mask 68 (shown in FIGS. 44A–44B) and the mask 70 in sequence. The mask 70, which is provided with the slit 70a, is shown in FIGS. 46A–46B. In this case, the laser machining can be accomplished under differing conditions for the the track grooves, for which requirements of dimensional accuracy are stringent (approximately ±1 [μm] in VHS system VCR) and for the chamfered and cutaway portions, for which accuracy is less demanding (approximately ±5 [μm] to ±10 [μm] for VHS system VCR), thereby allowing the magnetic head to be produced efficiently, in accordance with the performance required. Except for the above-described points, Embodiment 14 is identical with Embodiment 10.

Embodiment 15

Figure 47A:
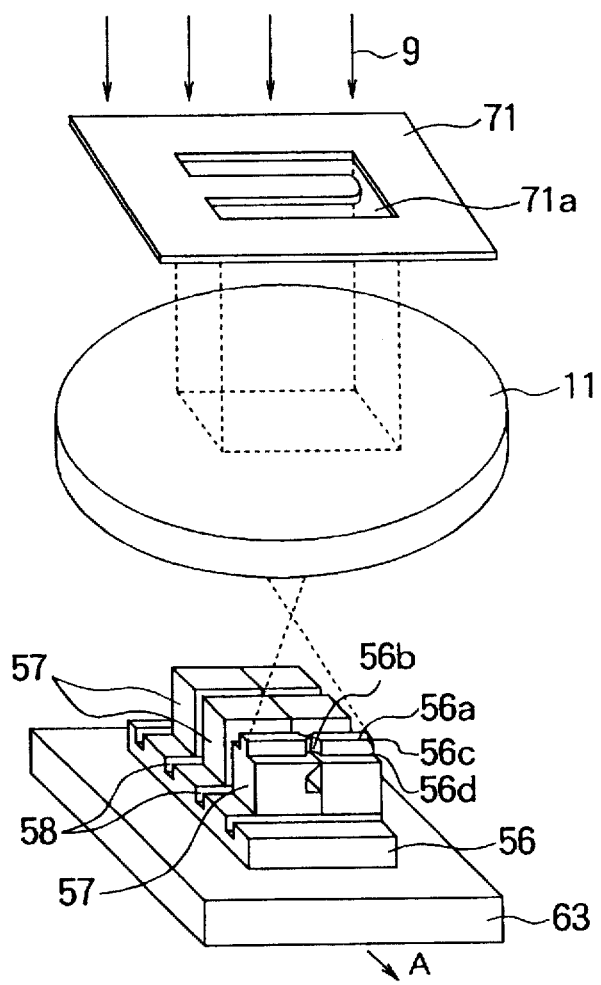
FIG. 47A is an explanatory diagram showing the process in which the head chips are subjected to the laser machining according to the manufacturing method of Embodiment 15.
Figure 47B:
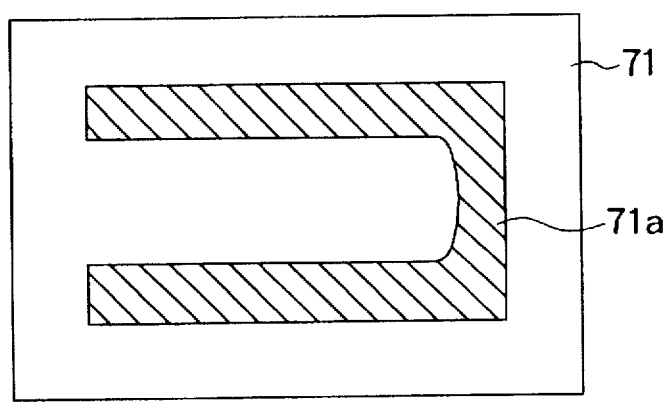
FIG. 47B is a plan view of a mask used in FIG. 47B.

FIGS. 47A–47B relate to a method for manufacturing a magnetic head according to Embodiment 15 of the present invention. FIG. 47A is an explanatory diagram showing the process of the laser machining, and FIG. 47B is a plan view of a mask 71 of FIG. 47A.

While the above-described Embodiment 12 (FIGS. 41A–41B through FIGS. 43A–43B) concerns a case in which three masks are used, corresponding to each of the three configurations to be formed on the sliding surface 57a of the head chips 57, it is equally possible to accomplish the laser machining by using the mask 66 (shown in FIG. 42A), and the mask 71 in sequence. The mask 71, which is provided with the slit 71, is shown in FIG. 47B. In this case, the laser machining can be accomplished under differing conditions for the the track grooves, for which requirements of dimensional accuracy are stringent (approximately ±1 [μm] in VHS system VCR) and for the chamfered portion and cutaway portion, for which accuracy is less demanding (approximately ±5 [μm] to ±10 [μm] for VHS system VCR), thereby allowing the magnetic head to be produced efficiently, in accordance with the the performance required. In all respects other than those mentioned above, Embodiment 15 is identical to Embodiment 12 already described.

Embodiment 16

Figure 48:
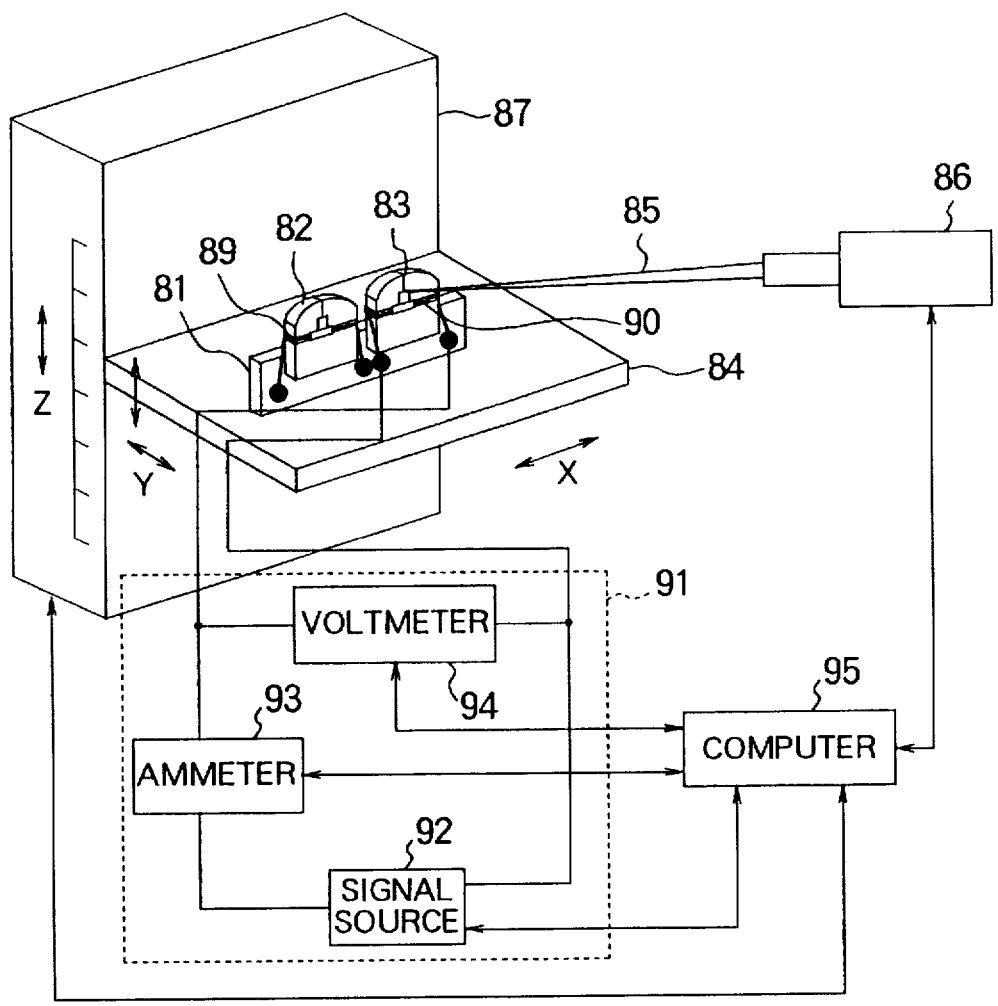
FIG. 48 is a structural diagram showing the machining equipment for accomplishing the manufacturing method Embodiment 16.

FIG. 48 is a structural diagram showing the laser machining equipment for accomplishing a method for manufacturing a magnetic head according to Embodiment 16 of the present invention. As shown in FIG. 48, the laser machining equipment comprises a working stage 84 on which is mounted a head base 81 provided with head chips 82 and 83, a laser source 86 for irradiating the head chips 82 and 83 with the laser beam 85, and a moving mechanism 87 that moves the working stage 84 in a vertical direction (direction Z) or in a horizontal direction (direction X or Y) in order to change the position at which the laser beam 85 impinges on the head chip 82 or 83. Here, the laser source 86 has a function similar to that of the laser source 7 described Embodiment 1 (FIGS. 3A–3B). This laser machining equipment further comprises a measuring section 91 connected to the coil 89 or 90 wound on the head chip 82 or 83 through the coil windows respectively. The measuring section 91 measures the gap depth of the gap 88 in the head chips 82 and 83 electrically. The measuring section 91 comprises a signal source 92 that applies an alternating current to the coils 89 and 90 wound on the head chips 82 and 83, an ammeter 93 that measures the current flowing in the coils 89 and 90 when the alternating current is applied thereto, converts that data into digital form and stores it internal memory, and a voltmeter 94 that measures the voltage generated at time two ends of the coils 89 and 90 when alternating current is applied thereto, converts that data into digital form, and stores it in internal memory. This laser machining equipment is further provided with a computer 95 that processes the digital data output by the ammeter 93 and the digital data output from the voltmeter 94 to find time magnetic characteristics of the core pieces constituting the head chips 82 and 83 and effective gap depth of the head chips 82 and 83. The computer 95 then, on the basis of the data relating to the effective gap depth that resulted from arithmetic processing, outputs signals for controlling the on-off switching of the laser beam 85 to the laser source 86, and signals for controlling the position of the working stage 84 to the moving mechanism 87.

Figure 49:
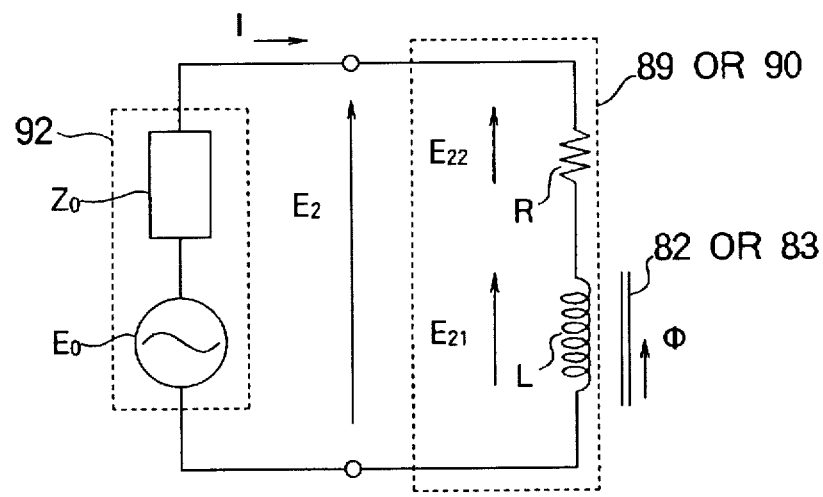
FIG. 49 is an equivalent circuit diagram of the measuring section of FIG. 48.

FIG. 49 is an equivalent circuit diagram of the measuring section 91 of FIG. 48. In FIG. 49, a reference character L designates the inductance component of the coil 89 or 90, R designates the resistance component of the coil 89 or 90, $E_0$ designates the internal impedance of the signal source 92, I designates the current flowing in the coil 89 or 90, Φ designates the magnetic flux passing through the core pieces, $E_2$ designates the voltage generated between the two ends of the coil 89 or 90, $E_{21}$ designates the voltage generated by inductance component L, and $E_{22}$ designates the voltage generated by the resistance component R. If it is here assumed that the coil 89 or 90 has number N of turns, it is possible to express voltage $E_{21}$ generated by inductance component L by means of Equation (1), and voltage $E_{22}$ generated by resistance component R by means of Equation (2). Voltage $E_2$ generated at the two ends of the coil 89 or 90 may be expressed by means of Equation (3).

$$E_{21}=N\times(d\Phi/dt) \quad (1)$$

$$E_{22}=I\times R \quad (2)$$

$$E_2=E_{21}+E_{22}=N\times(d\Phi/dt)+I\times R \quad (3)$$

where dΦ/dt is the time differentiation of the magnetic flux Φ. If we then solve Equation (3) for the magnetic flux Φ, we obtain $$\Phi=(1/N)\times\int(E_2-I\times R)dt+k \quad (4)$$

where k is a constant.

Again, magnetomotive force NI may be expressed by Equation (5).

$$NI=N\times I \quad (5)$$

Figure 50:
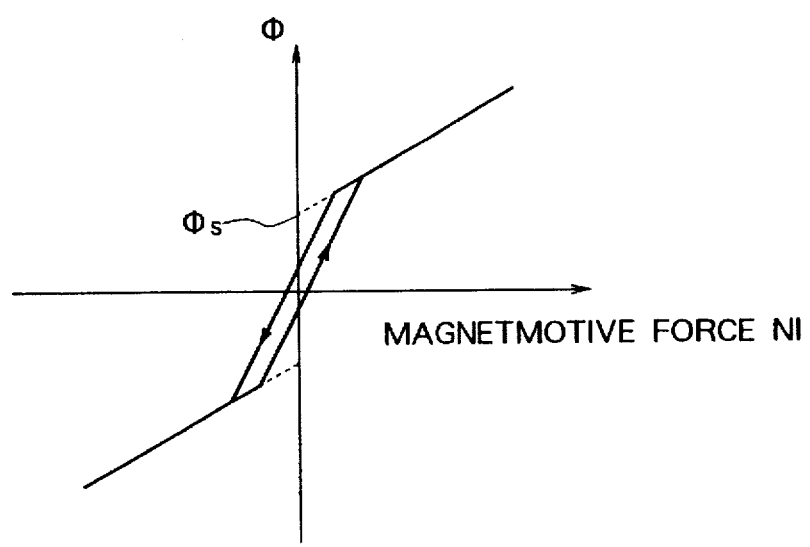
FIG. 50 is a graph showing one example of the relationship between the magnetic flux $\Phi$ and the magnetomotive force NI.

If the number N of turns of the coil 89 or 90 and the resistance component R are first found from Equation (4) and Equation (5), the waveform of the current flowing in the coil 89 or 90 can be measured by the ammeter 93 and at the same time the waveform of voltage $E_2$ generated at the two ends of the coil 89 or 90 can be measured by the voltmeter 94. It is then possible, by means of arithmetic processing by the computer 95 based on the measured data, to find the waveforms of the magnetic flux Φ and the magnetomotive force NI. FIG. 50 shows a graph showing one example of the relationship between magnetic flux Φ and magnetomotive force NI, which constitutes a hysteresis loop.

Figure 51:
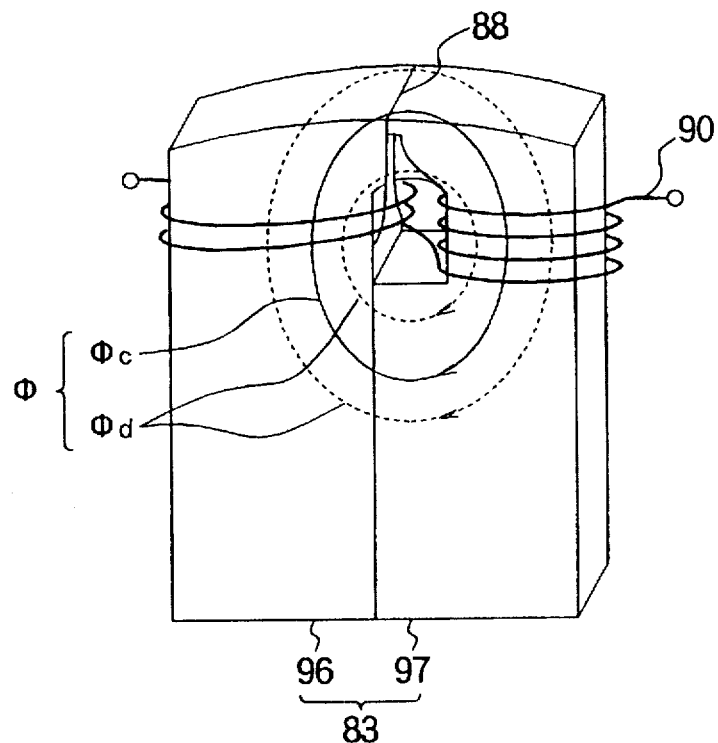
FIG. 51 is a conceptual diagram showing the magnetic flux $\Phi$ within the head chip.

FIG. 51 is a conceptual diagram showing the magnetic flux Φ within the head chip 83. In FIG. 51, a reference character $\Phi_c$ designates the magnetic flux that leaks outside core pieces 96 and 97 constituting the head chip 83 due to the fact that the area of the joint between core pieces 96 and 97 is small at the gap 88, and $\Phi_d$ designates the magnetic flux that does not leak from the core pieces 96 and 97. Thus the value of the magnetic flux Φ intersecting in the coil 90 is equal to the value of leaked flux $\Phi_c$ plus unleaked flux $\Phi_d$. Thus the magnetic flux Φ as shown in FIG. 50 represents a superimposition of the characteristics of the leaked flux $\Phi_c$ shown in FIG. 52 and the characteristics of the unleaked flux $\Phi_d$ shown in FIG. 53.

Figure 52:
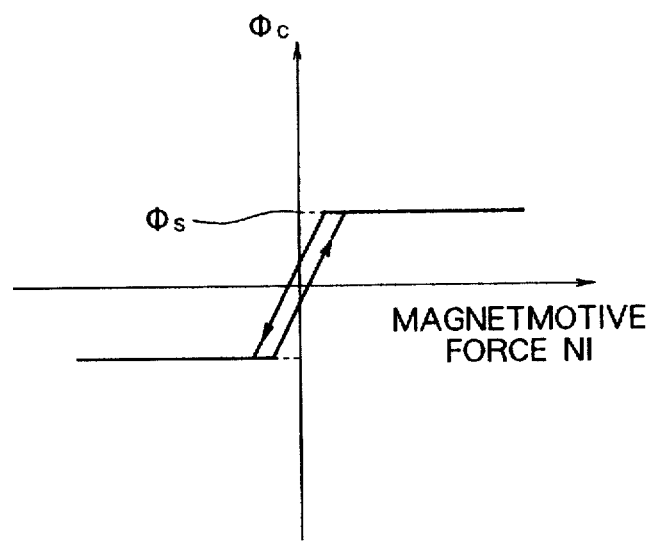
FIG. 52 is a graph showing the characteristics of the magnetic flux $\Phi_c$ that leaks from the head chip.
Figure 53:
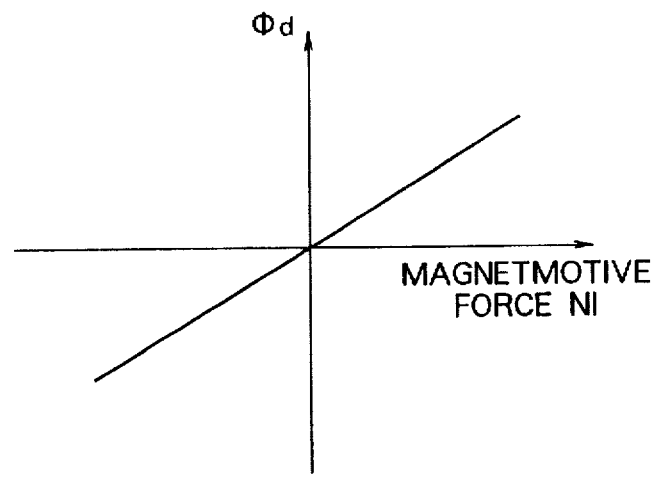
FIG. 53 is a graph showing the characteristics of the magnetic flux $\Phi_d$ that does not leak from the head chip.

In FIG. 52, however, the leaked magnetic flux $\Phi_c$ becomes saturated at magnetic flux $\Phi_S$. This saturation magnetic flux $\Phi_S$ may be found from the intrinsic saturation magnetic flux density $B_S$ of the material used for core pieces 96 and 97 and the area S of the gap 88 (i.e., area of the joint) between the core pieces 96 and 97 in accordance with Equation (6)

$$\Phi_S = B_S \times S \quad (6)$$

Further, in the graph of FIG. 50 showing measured results, the saturation magnetic flux $\Phi_S$ represents the point at which the linear extrapolation of the linear portion subsequent to the saturation of the magnetic flux $\Phi_d$ that does not leak from the gap 88 intersects with the vertical axis (NI=0).

In cases in which the joint area is rectangular, the area S off the surface of the gap 88 may be represented by the following Equation (7)

$$S = T_W \times G_d \quad (7)$$

where $T_W$ is the thickness of the head chips 82 and 83 and $G_d$ is the gap depth. From Equation (7) and Equation (6), the gap depth $G_d$ may be found using Equation (8)

$$G_d = S/T_W = \Phi_S/(T_W \times B_S) \quad (8)$$

Saturation magnetic flux $\Phi_S$ in Equation (8) can be obtained as described above, the track width $T_W$ (which may be identical to the head chip thickness) can be measured with good accuracy by an optical or other method. Since has a value that is determined by the material used and does not change due to machining, the saturation magnetic flux density $B_S$ can be measured in advance. Thus if the saturation magnetic flux density $B_S$, the track width $T_W$, and the number N of turns of coils 89 and 90 are all resolved, the effective gap depth of the magnetic head can be found by arithmetic processing of the results of the electrical measurements described above.

As described above, since the computer 95 continuously monitors the gap depth and controls the on-off switching the laser beam 85, the scanning speed when the laser beam 85 is scanned to change the position irradiated, and the position of the working stage 84, the laser machining of the gap depth of the head chip can be accomplished with high accuracy. This measurement of the gap depth and the control of the laser beam can be accomplished using a general purpose interface bus (GPIB) system or other system for transmitting signals between the computer and the measuring instruments, making it possible to accomplish the laser machining of the apex grooves that determine the gap depth by automatic operation.

Figure 54:
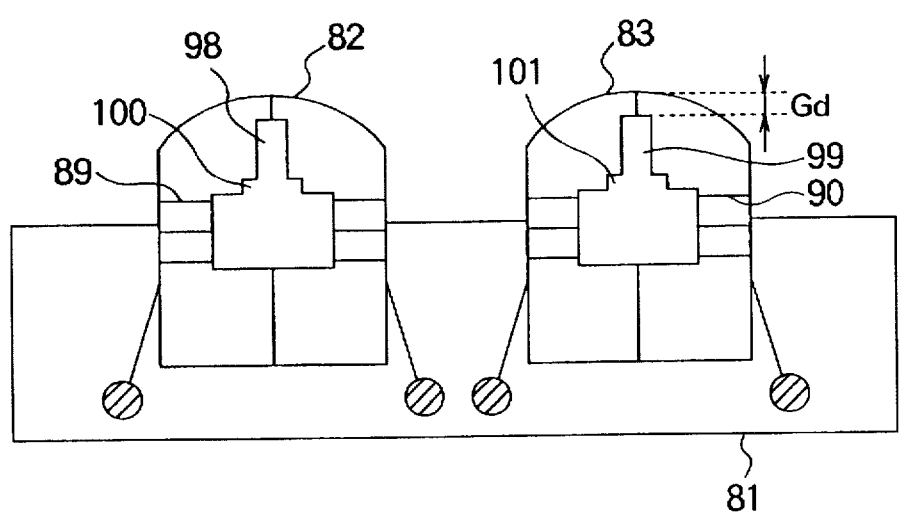
FIG. 54 is a diagram generally showing one example the figure of the head chips manufactured according to a manufacturing method of Embodiment 16.

FIG. 54 generally shows one example of a magnet, it head manufactured according to a manufacturing method of Embodiment 16. In FIG. 54, a reference character $G_d$ designates gap depth, reference numerals 98 and 99 designate apex grooves formed by the laser beam 85, and 100 and 101 designate notched grooves. FIG. 54 shows a case in which two head chips 82 and 83 are fixed to a single head base 81 but the present invention is not thus limited, and there may be any number of head chips fixed to a single head base 81. It is also possible that notched grooves 100 and 101 may, after the laser machining, be integrated to the apex grooves 98 and 99 and become unrecognizable. In addition, the notched grooves 100 and 101 perform the function preventing the problem that the coil inadvertently enters the apex grooves 98 and 99, but are unnecessary when the coil window is large.

Figure 55:
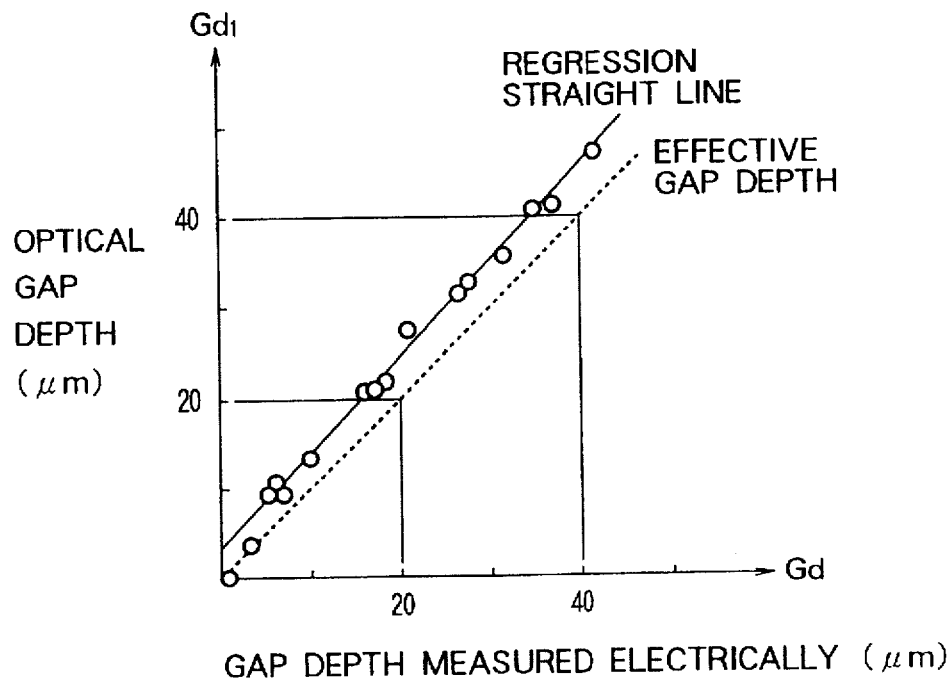
FIG. 55 is a graph showing the relationship between the optical gap depth $G_{d1}$ of a head chip (using a magnetic core piece of ferrite) and the effective gap depth $G_d$.

FIG. 55 shows a graph showing the relationship between the optical gap depth $G_{d1}$ of the head chip (using a core piece of ferrite) and the effective gap depth $G_d$, where the optical gap depth $G_{d1}$ is a value obtained when the gap depth was measured optically by the microscope, and the effective gap depth $G_d$ is the value for the gap depth obtained based on the electrical measurements described above. In FIG. 55, the solid line shows a regression straight line (method of least squares) for investigating the correlation between the both gap depths, and the broken line shows the effective gap width $G_d$ obtained according to Embodiment 16. As can be seen from FIG. 55, the optical gap depth $G_{d1}$ is several micrometers larger than the effective gap depth due to the influence of a deteriorated layer. Thus it will be appreciated that in manufacturing a magnetic head using the method in which the optical gap depth $G_{d1}$ is used, it will be difficult to obtain heads of superior magnetic characteristics and reliability when the designed gap depth is 10 [μm] or less.

While the above description concerned a case in which the working stage 84 was moved, it is equally possible change the position of laser irradiation by moving the laser source 86.

Figure 56:
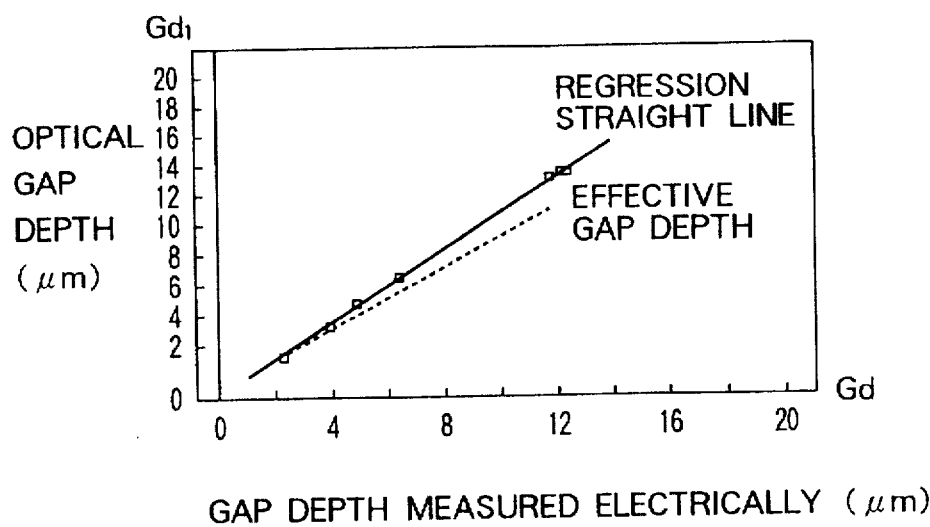
FIG. 56 is a graph showing the relationship between the optical gap depth $G_{d1}$ of a MIG head chip (using a magnetic core piece of ferrite) and the effective gap depth $G_d$.

Further, while the above description concerns a case in which the head chip consists of the ferrite core pieces and the gap only, the present invention is not thus limited. It is equally possible to apply the manufacturing method shown in FIG. 48 for the machining of an MIG head, in which a film of sendust alloy (Fe—Al—Si) is applied between the gap and the core pieces, in which case the relationship between the optical gap depth $G_{d1}$ and the effective gap depth $G_d$ is as shown in FIG. 56. Also in Equation (8), which is used to find the effective gap depth $G_d$, the saturation magnetic flux density $B_S$ of sendust may be taken as 1.0 [T] (tesla), but when, the method used to form the sendust film results in minute variations in the value of saturation flux density $B_S$, it is desirable to obtain separate measurements of the saturation flux density, not of the bulk material but of the film, and substitute this value into Equation (8). It is also possible to consider using other materials, such as amorphous materials typified by Co—Zr—Nb or microcrystalline materials such as Fe—Ta—N and the like, to all of which the method of Embodiment 16 is applicable.

Embodiment 17

FIG. 57 is a structural diagram generally showing the laser machining equipment for accomplishing the method for manufacturing a magnetic head according to Embodiment 17 of the present invention. In Embodiment 17, those structures identical with or analogous to those of Embodiment 16 shown in FIG. 48 are designated by the same reference numerals. The equipment of Embodiment 17 comprises an optical monitoring section 102 such as a microscope, an image-processing section 103 that processes the image signal output from the monitoring section 102, and a computer 104 that finds the gap depths $G_d$ of the head chips 82 and 83 on the basis of the processed image signal, and then sends control signal for conducting the on-off switching of the laser beam 85 to the laser source 86 on the basis or the gap depth obtained, and a position signal for moving the working stage 84 to the moving mechanism 87. The manufacturing method of Embodiment 17 is not particularly effective in cases in which the core pieces are deteriorated by heat energy of the laser beam. 85. It is, however, effective cases in which deterioration of the core pieces do not occur due to the heat energy of the laser beam dependent on the conditions under which the laser beam is used or the magnetic material making up the head chips, and in such cases, since the optical gap depth is the same as effective gap depth $G_d$. The method of Embodiment 17 offers an advantage over Embodiment 16 in that the laser machining equipment is of simpler structure. In all respects other than those mentioned above, Embodiment 17 is identical to Embodiment 16 already described.

Figure 58:
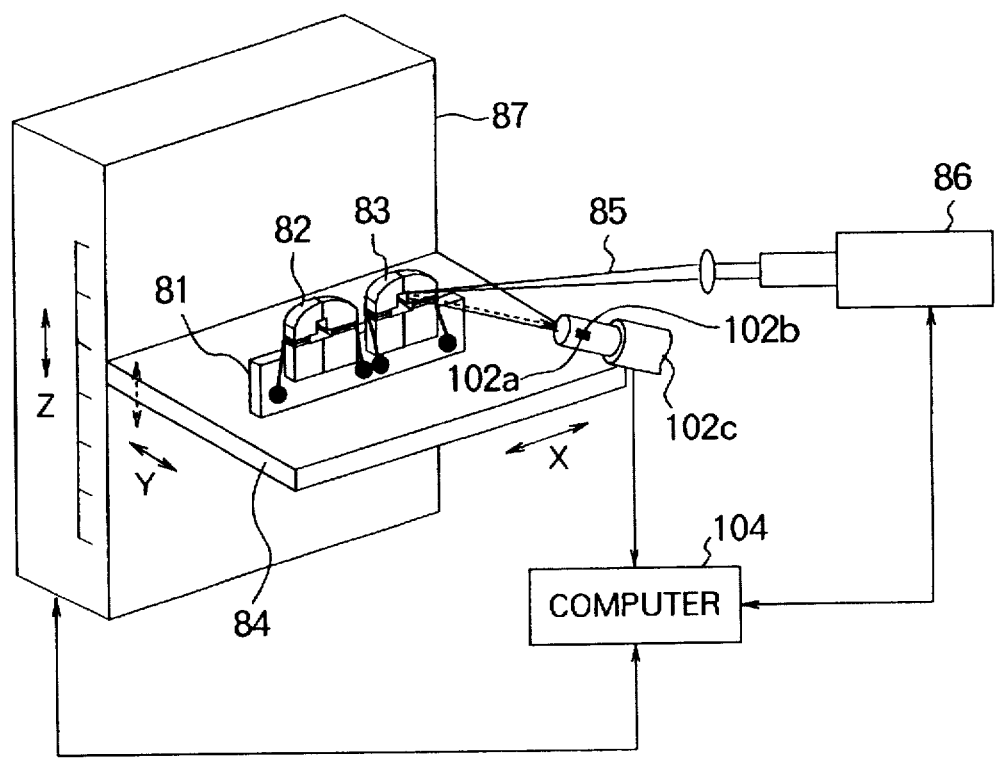
FIG. 58 is a structural diagram showing another equipment for accomplishing the manufacturing method of Embodiment 17.

It is also possible to provide, instead of the monitoring section 102 and the image-processing section 103 of FIG. 57, a detection device 102c including, as shown in FIG. 58, a light-emitting device 102a to irradiate a specific part of the head chips 82 and 83 with a light, and a photodetector 102b to detect the light reflected from the head chips 82 and 83. In this case, the machining of the apex grooves may be terminated when the photodetector 102b can no longer detect the reflected light.

Figure 59:
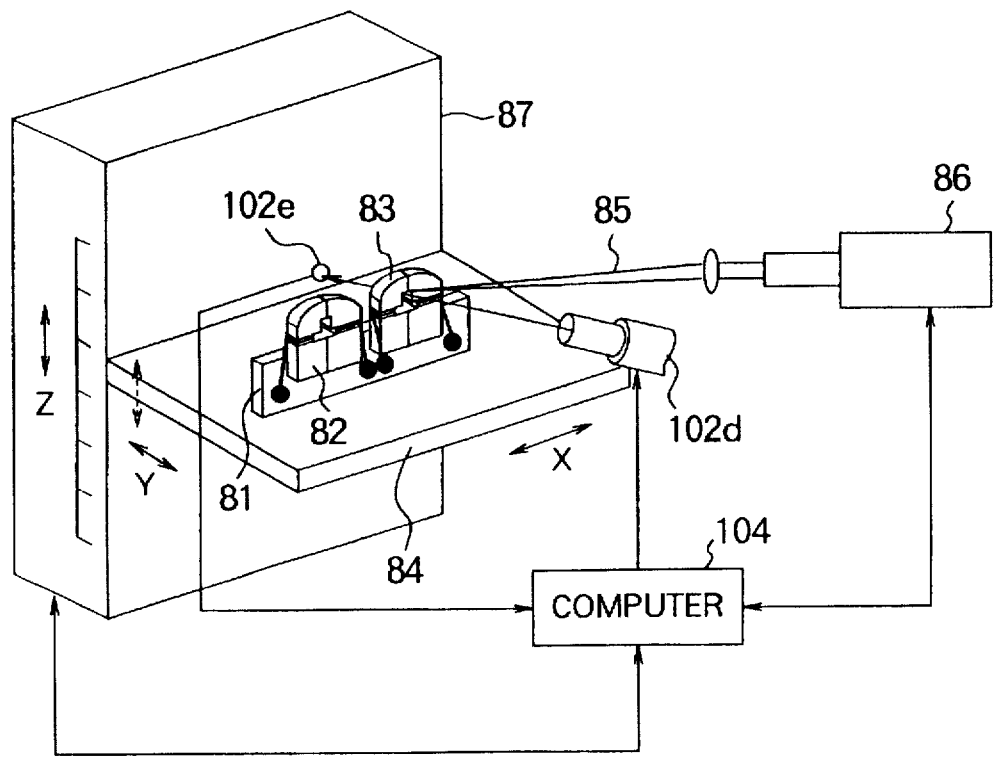
FIG. 59 is a structural diagram showing still another equipment for accomplishing the manufacturing method of Embodiment 17.

It is also possible to provide, instead of the monitoring section 102 and the image-processing section 103 of FIG. 57, a light-emitting section 102d to irradiate a specific part of the head chips 82 and 83 with light, and a detector section 102e to detect light that passes from the head chips 82 and 83 through the apex grooves, as shown in FIG. 59. In this case, the machining of the apex grooves may be terminated when the detector section 102e detects the light passing through from the light-emitting section 102d.

Embodiment 18

Using the manufacturing methods of Embodiments 1 to 17, it is possible to produce any of the head chips shown in FIG. 60 to FIG. 65.

In FIG. 60 through FIG. 65, a reference numeral 105 designates a head chip, 106 and 107 designate core pieces constituting the head chip 105, and 108 designates a gap. A reference numeral 109 designates a coil window, 110 and 113–117 designate apex grooves that determine the depth $G_d$ of the gap 108, and 111 and 112 designate coil stopper grooves. Each of the head chips 105 shown in FIG. 60 through FIG. 65 have the coil window 109 formed only in the core piece 107. Since the apex groove 110 is made long and thin, the area of the bond between the core pieces 106 and 107 is made larger and the bonding strength is increased.

Figure 60:
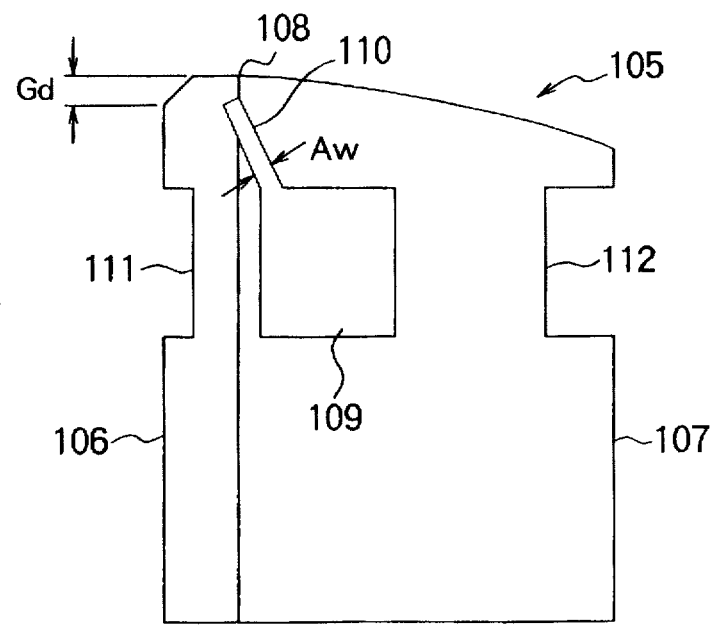
FIG. 60 is a side elevation of a head chip having an apex groove according to Embodiment 18.

In the head chip 105 of FIG. 60, the width $A_W$ or the apex groove 110 is made to be, for example, 80 [μm], which is smaller than the diameter of a single conductor or a coil. By forming the apex groove 108 in this way, the problem that the conductors inadvertently enter the apex groove 108 during the process of winding the coil through the coil window 109 can be prevented.

Figure 61:
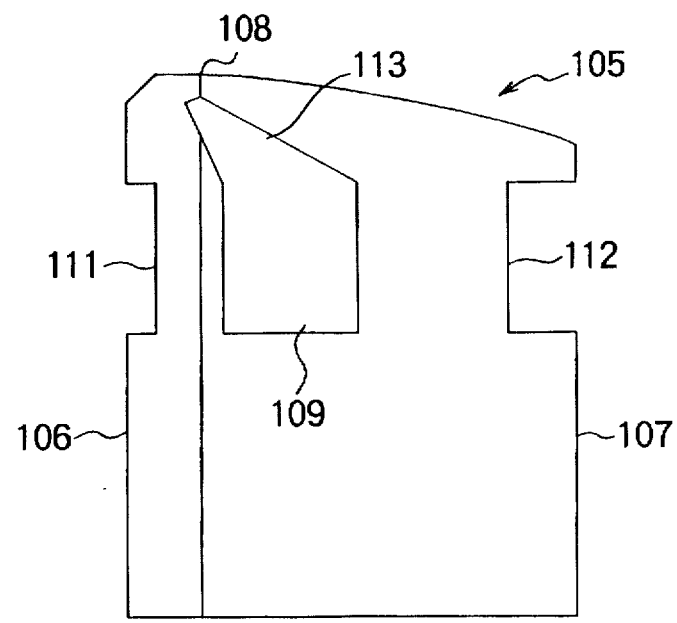
FIG. 61 is a side elevation of a head chip having an another apex groove according to Embodiment 18.
Figure 62:
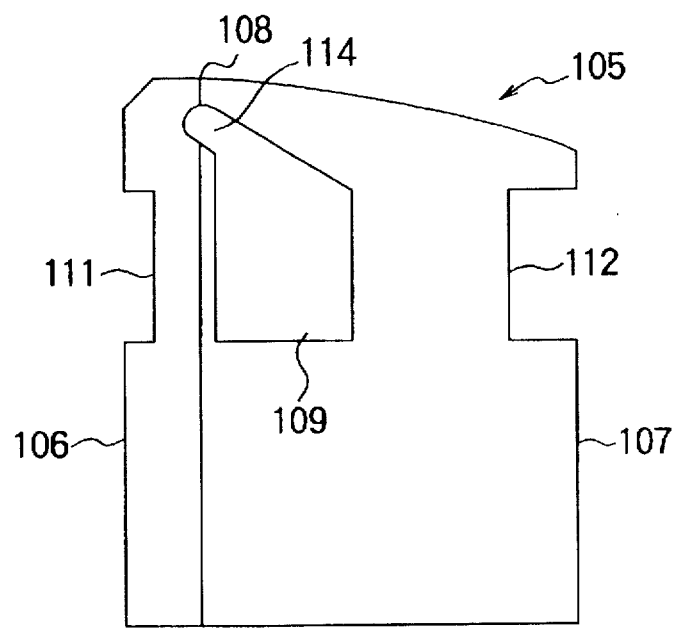
FIG. 62 is a side elevation of a head chip having a yet another apex groove according to Embodiment 18.

In the head chip 105 of FIG. 61 or FIG. 62, the apex groove 108 is so formed as to become wider as it approaches the coil window 109. In this case, since inductance L off the magnetic head is lower than when the apex grooves 113 and 114 are narrower, It is possible to raise the resonant frequency F indicated by Equation (9) and produce a magnetic head that is suitable for the recording and reproducing of wideband signals.

$$F=1/\{2\pi(L\cdot C)^{1/2}\} \quad (9)$$

In equation (9) C is capacitance. Here, inductance L depends on the configuration of the head chip 105 and the number of turns in the coil. Since a decrease in coil turns, which would result in a drop in reproducing output, is undesirable, it is recommendable that a configuration which reduces leakage inductance be selected.

Measurements of the inductance of the head chips of FIG. 60 and FIG. 61 were made, when setting the track width at 45 [μm] and the gap depth $G_d$ at 25 [μm] and winding a coil of 21 turns. The result was an inductance of 1.9 [μm] at 1 [MHz] for the head chip of FIG. 60 (the width $A_W$ of the apex groove 110 is 80 [μm]), and an inductance of 1.6 [μH] at 1 [MHz] for the head chip of FIG. 61. It will thus be appreciated that the inductance is approximately 15% lower in the case shown in FIG. 61.

Figure 63:
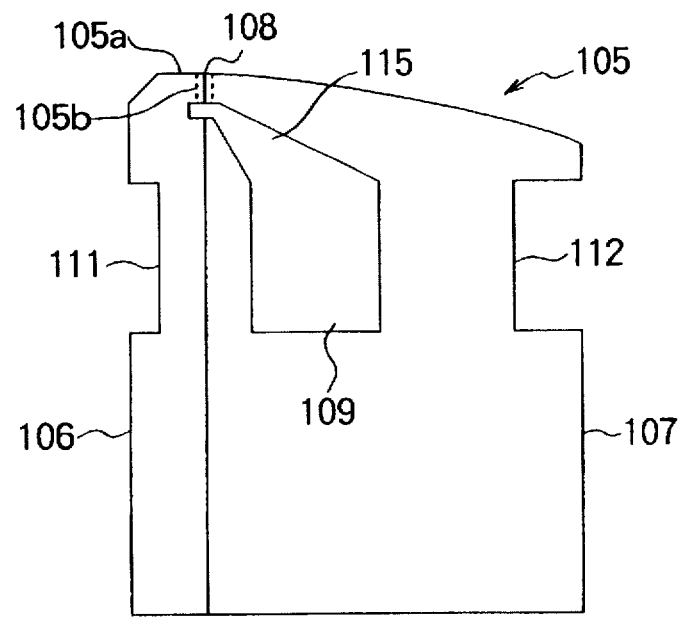
FIG. 63 is a side elevation of a head chip having a yet another apex groove according to Embodiment 18.
Figure 65:
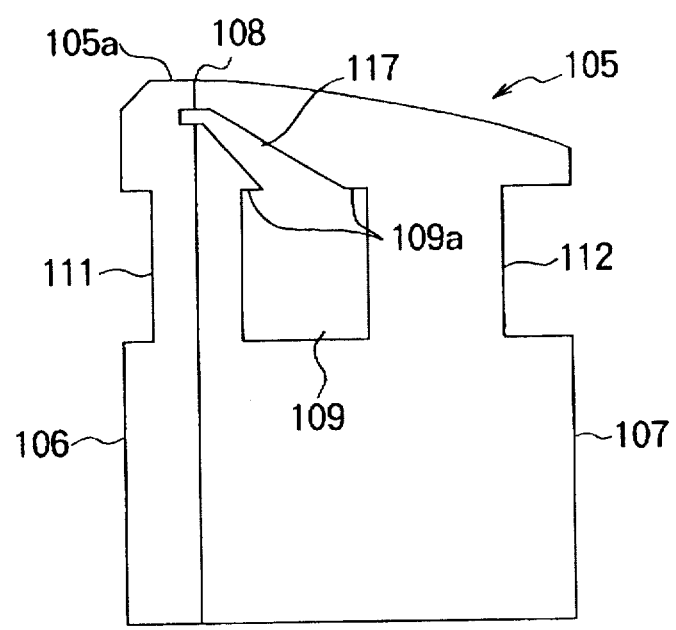
FIG. 65 is a side elevation of a head chip having a yet another apex groove according to Embodiment 18.

As shown in FIG. 63 or FIG. 65, the apex grooves 115 and 117 may be provided with a portion that is substantially parallel to the sliding surface 105a of the head chip 105. In this case, when forming a track groove as designated by broken lines 105b in FIG. 63 by means of the laser machining, the track groove 105b may easily be made to communicate with the apex grooves 115 and 117. By this means, it is possible to prevent the problem such as a short-circuit due to the remaining the adhering magnetic material of track groove 105b adhering at the bottom of the track groove 105b after laser machining such that the track groove 105b does not communicate with the apex grooves 115 and 117.

Figure 64:
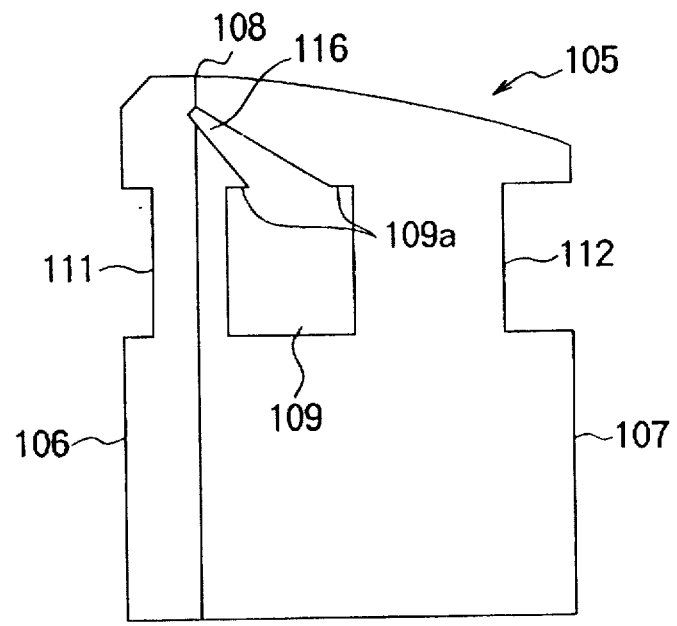
FIG. 64 is a side elevation of a head chip having a yet another apex groove according to Embodiment 18.

Further, as shown In FIG. 64 or FIG. 65, it is also possible to adopt a configuration in which angles 109a are left at the both sides of the points where the coil windows 109 are connected to the apex grooves 116 and 117. In this case, it is possible to prevent the problem that conductors inadvertently enter the apex grooves 116 and 117 during the process of winding the coil through the coil window 109.

Embodiment 19

Figure 66A:
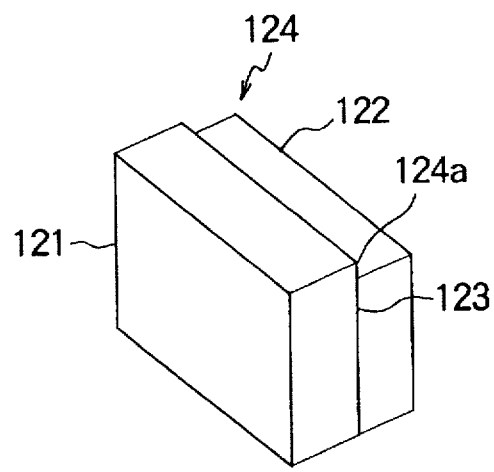
FIGS. 66A–66C are perspective views showing selected machining steps in the manufacturing method of Embodiment 19.
Figure 66B:
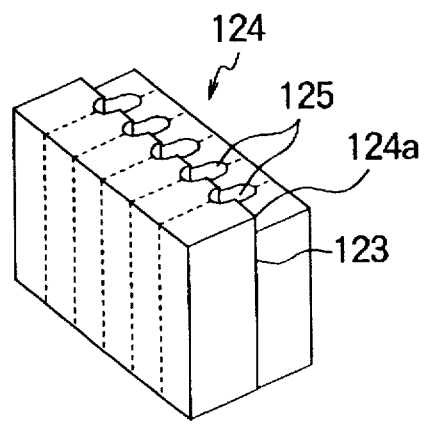
Figure 66C:
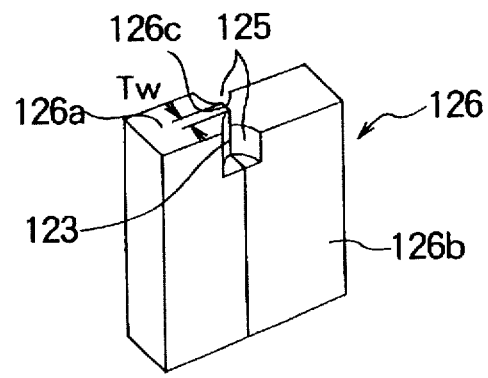
Figure 67A:
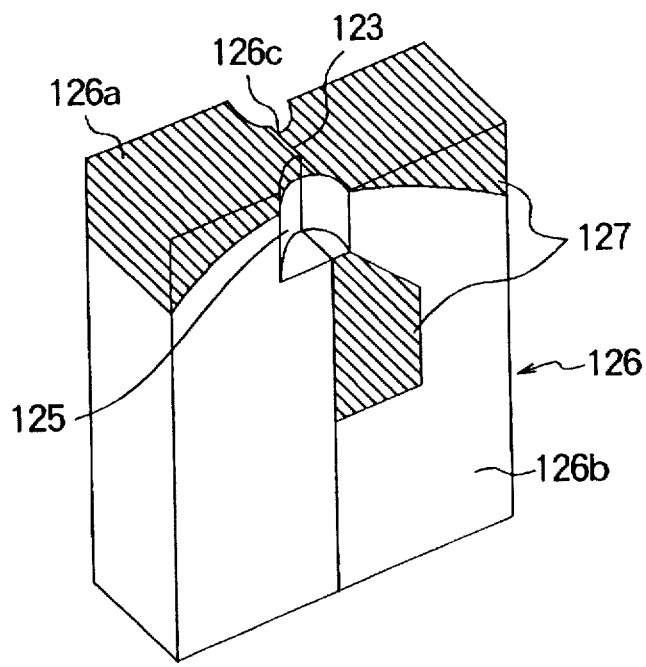
FIG. 67A is a perspective view showing, by means of hatching, the portions removed by the laser machining of the head chip.
Figure 67B:
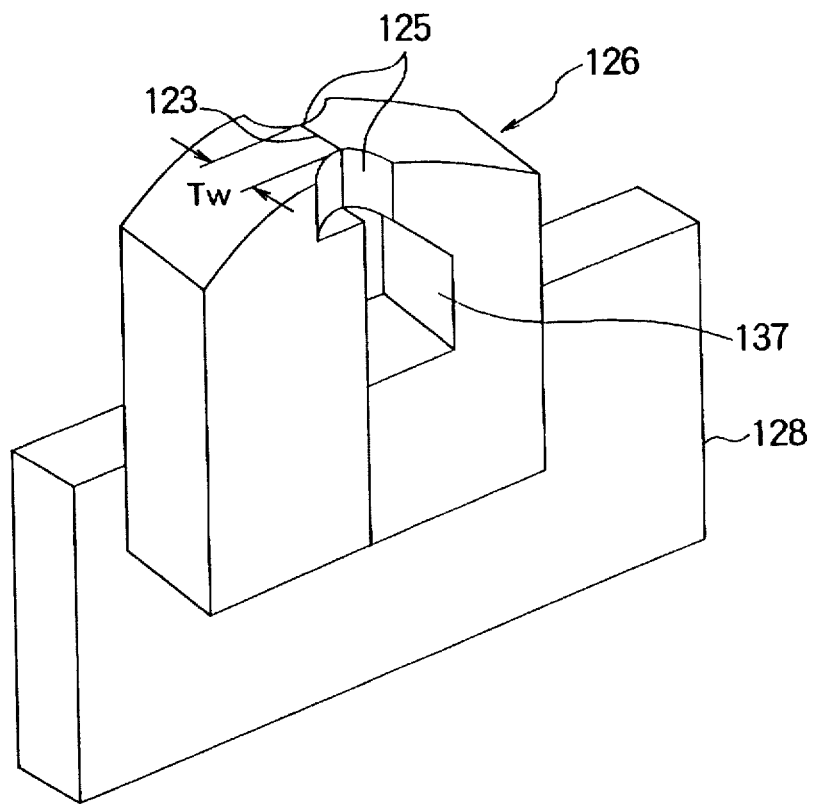
FIG. 67B is a perspective view showing a configuration of the head chip after mounting on the head base and the laser machining.
Figure 68A:
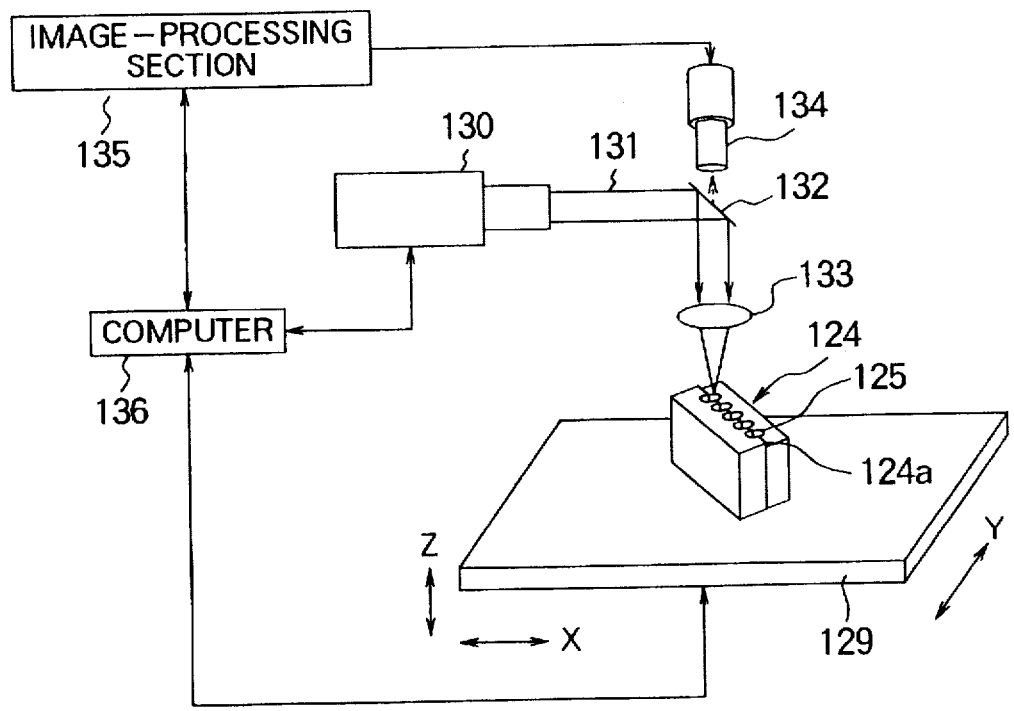
FIG. 68A is a structural diagram showing the equipment for accomplishing the laser machining of FIGS. 66A–66C.

FIGS. 66A–66C, FIGS. 67A–67B and FIGS. 68A–68B relate to a method for manufacturing a magnetic head according to Embodiment 19 of the present invention. FIG. 66A is a perspective view showing the situation in which a pair of ferrite core blocks 121 and 122 of unequal height are joined across the gap 123 to form a head block 124. FIG. 66B is a perspective view showing the situation in which the track grooves 125 are formed by the laser machining, and FIG. 66C is a perspective view showing the situation in which the portions shown by broken lines are cut by the laser machining, thereby separating the head chip 126. FIG. 67A is a perspective view showing, by means of hatching, the portions to be removed by the laser machining of the head chip 126, and FIG. 67B is a perspective view showing the configuration of the head chip 126 after mounting on the head base 128 and the laser machining. FIG. 68A is a structural diagram showing the laser machining equipment for accomplishing the laser machining shown in FIGS. 66A–66C, and FIG. 68B is a structural diagram showing the laser machining equipment for accomplishing the laser machining as shown in FIGS. 67A–67B.

Figure 68B:
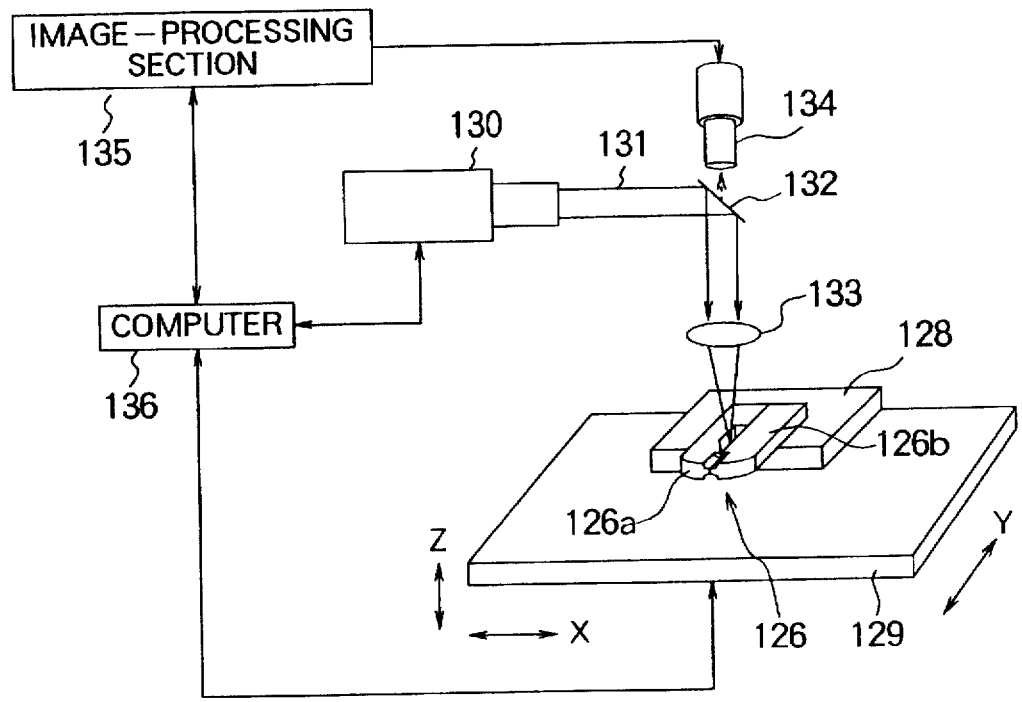
FIG. 68B is a structural diagram showing the equipment for accomplishing the laser machining of FIGS. 67A–67B.

In FIGS. 68A–68B, a reference numeral 129 designates a working stage on which the head block 124 or a head chip 126 obtained by cutting and separating from the head block 124 is mounted. This working stage is provided with a mechanism allowing it to move in the directions X, Y and Z. Further, in FIGS. 68A–68B, a reference numeral 130 designates a laser source irradiating the laser beam 131, 132 designates a bend mirror that reflects the laser beam 131, changing the direction in which it proceeds, and 133 designates an image-forming lens that condenses the laser beam 131. Further, a reference numeral 134 designates a monitoring section such as a microscope that optically detects a step 124a of the head block 124 or a step 126c of the head chip 126, 135 designates an image-processing section that processes image signals output from the monitoring section 134, and 136 designates a computer that, on the basis of the position of the steps 124a and 126c obtained from the image-processing section 135, controls the on-off switching of the laser beam 131 and the position irradiated by the laser beam 131. The laser source 130 is of the same type described in Embodiment 1. In the event that the laser machining is carried out in liquid or reactive gas in order to reduce the effect of heat of the magnetic material or promote the reaction for removing the heat affected layer, it is equally possible to use an Ar laser (wavelength 450 [nm]–530 [nm])

of low output (several tens to several hundreds of milliwatts), a YAG laser, the higher harmonic of a YAG laser or the like.

Following is a description of the manufacturing method of Embodiment 19. The head block 124 with the step 124a of FIG. 66A is produced by substantially the same process used in describing Embodiment 1 and shown in FIGS. 2A–2C. Specifically, a pair of ferrite core blocks 121 and 122 are cut and separated from a ferrite ingot, and the height of ferrite core block 122 is reduced by from several [μm] to 200 [μm] by means of grinding of the lower surface thereof. Next, the pair of ferrite core blocks 121 and 122 are butted together across the gap 123, forming a head block 124 with a step 124a in the sliding surface thereof.

Following is a description of the process by which the head chip 126 shown in FIG. 66C is obtained from the head block 124 of FIG. 66A. First, the head block 124 is placed on the working stage 129 with the sliding surface, which is the surface of the head block 124 having the step 124a, facing upward. The monitoring section 134, which is connected to the image-processing section 135, monitors the machined surface of the head block 124 from above the working stage 129, this image data is input to image-processing section 135, and the position of the step 124a of the head block 124 (position of the gap 123) is detected by the image-processing section 135. The computer 136 outputs a control signal based on this positional data simultaneously to both the laser source 130 and the working stage 129, and based on the position of the step 124a, controls the time and position of irradiation by the laser beam 131. Ferrite material is evaporated or sublimated from that portion irradiated by the laser beam 124 by means of heat energy or electron energy. Thus track grooves 125 are formed by irradiation by means of laser beam 131 in accordance with the configuration that it is desired to machine. These track grooves 125 are then formed sequentially at the specified spacing by moving the working stage 129 and applying the laser beam 131, which has been reflected by the bend mirror 132 and condensed by the lens 133, to the gap 123 portion of the head block 124 accordance with the track width desired.

Next, the head block 124, in which the track grooves 125 have been formed either by the laser machining or the mechanical machining, is cut at the positions shown by broken lines shown in FIG. 66B to obtain a plurality of head chips 126, one of which is shown in FIG. 66C. The configuration of the track grooves 125 is defined in terms of a predetermined depth from the sliding surface 126a the head chip 126, and is semicylindrical. In the cutting process shown In FIG. 66B, the head block 124 may be cut diagonally to rather than at right angles to the gap 123, thereby imparting to the gap 123 an azimuth angle that is greater than 0°. As shown in FIG. 66C, the step 126c is formed in the sliding surface 126a for the head chip 126, and the track width $T_W$ is formed to the desired value by means of the track grooves 125.

Following is a description of the process by which the laser-irradiated portions shown by hatched portions 127 in FIG. 67A are removed. First, the head chip 126 is fixed a head base 128. Next, the head base 128, to which the head chip 126 is fixed, is placed on the movable working stage 129 of the laser machining equipment with the side surface 126b of the head chip 126 facing upward, as shown in FIG. 68B. The monitoring section 134 monitors the side surface 126b of the head chip 126 from above the working stage 129, and the image data output from the monitoring section 134 is input to the image-processing section 135. The image-processing section 135 performs image processing on the basis of the image data, and the computer 136 detects the position of the step 126c (position of gap 123) of the head chip 126. Based on the data on the position of the step 126c, the computer 136 outputs a signal for controlling the on-off switching of the laser beam 131 from the laser source 130, and a stage positioning control signal to the working stage 129. The portion of the head chip 126 that is irradiated by the laser beam 131 is etched away, forming a curved sliding surface 126a with no step and a coil window 137 as shown in FIG. 67B.

As has been explained above, in the processes for the laser machining of the head block 124 and the head chip 126 of the manufacturing method of Embodiment 19, the position of the step 124a of the head block 124 or the step 126c of the head chip 126 is detected optically, and the laser machining is carried out with reference to the position of these steps 124a or 126c. Since recognizing the reference position by means of the monitoring section 134 and image-processing section 135 is both easier and more positive than recognizing a stepless gap which is difficult to detect optically, by means of Embodiment 19, a head chip of high dimensional accuracy can be obtained.

It is recommendable that, in the laser machining of the coil window 137, the top of the coil window 137 be positioned so as to be above the deepest part of the track grooves 125, as shown in FIG. 67B. This is because the track grooves 125 will positively communicate with the coil window 137 during the processes following the machining of the coil window, and the bottom of the track grooves will be removed. After this core piece material adhering to the sliding surface of the head chip 126 may be removed by grinding as required, a coil (not shown in FIG. 67B) is wound through the coil window 137, completing the magnetic head.

The VCR using VHS system normally have a magnetic head in which two head chips are mounted to a single head base, but for clarity of description, the example given above involves a single head chip mounted to a single head base.

Embodiment 20

Figure 69A:
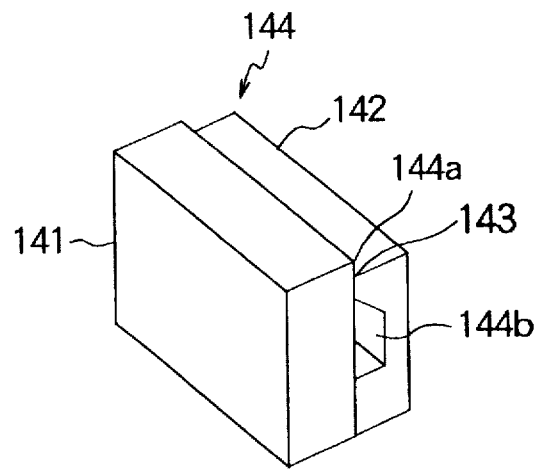
FIGS. 69A–69C are perspective views showing the selected machining steps in the manufacturing method Embodiment 20.
Figure 69B:
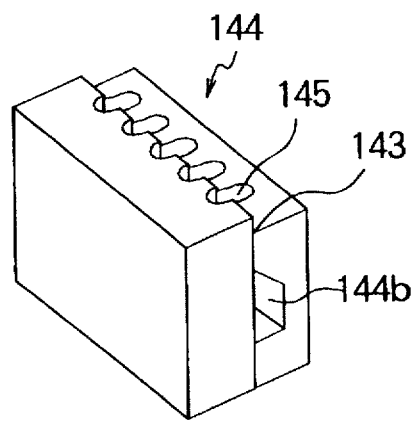
Figure 69C:
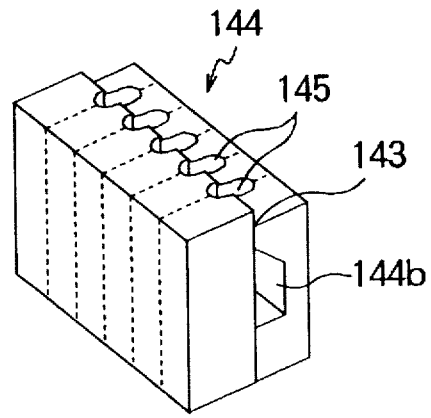
Figure 70:
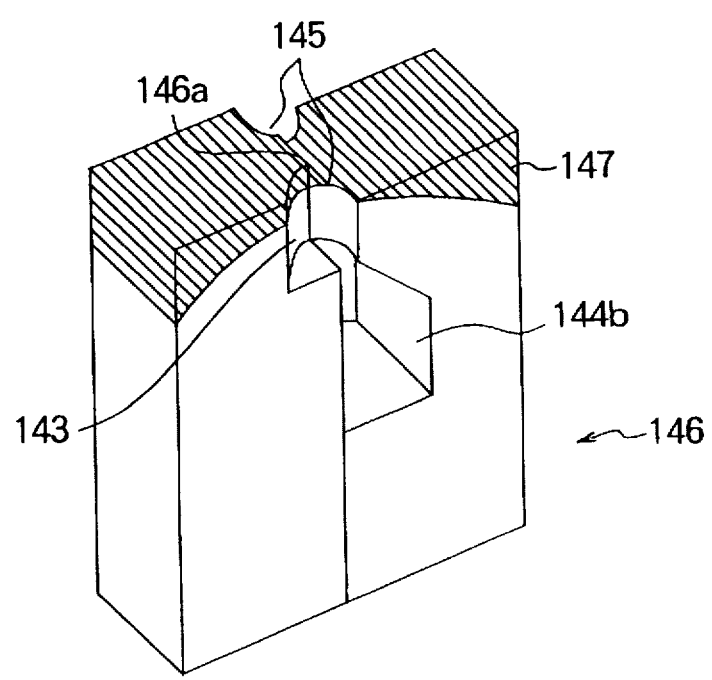
FIG. 70 is a perspective view showing, by means of hatching, the portion removed by the laser machining of the head chip cut and separated in the manufacturing method of Embodiment 20.

FIGS. 69A–69C and FIG. 70 relate to a method for manufacturing a magnetic head according to Embodiment 20 of the present invention. FIG. 69A is a perspective view showing the situation in which a pair of ferrite core blocks 141 and 142 of differing heights are butted across a gap 143 to form a head block 144 having a step 144a, FIG. 69B is a perspective view showing the situation in which the track grooves 145 are formed by the laser machining, and FIG. 69C is a perspective view showing, by means of broken lines, the positions for cutting by the laser machining. FIG. 70 is a perspective view showing, by means of hatching, portion 147 to be removed by the laser machining of the head chip that has been cut and separated.

The manufacturing method of Embodiment 20 differs from Embodiment 19 already described solely in the respects that a head block 144 with a step 144a as shown in FIG. 69A is formed prior to the process by which ferrite core blocks 141 and 142 are joined, a coil window 144b is formed in one ferrite core block 142 by the mechanical machining, and that, as shown in FIG. 70, the laser machining of the head chip 146 is used only in forming a curved sliding surface for the head chip 146. In all respects other than those mentioned above, Embodiment 20 is identical to Embodiment 19.

In Embodiment 20, the position of the gap 143 can be accurately detected by means of the step 144a of the head block 144 or the step 146a of the head chip 146 in the laser machining of the track grooves 145 or the laser machining of the sliding surface. Thus if the position irradiated by the laser beam is adjusted with reference to this step position, the laser machining can be accomplished with high accuracy. And since a coil window 144b has already been formed in the head chip 146, time process of machining the large area of the coil window 144b by means of the laser beam is eliminated, and machining time is shorter than in the case of Embodiment 19.

Further, since the colt window 144b has already been formed in the head chip 146, the curved sliding surface of the head chips 146 can be machined by abrasion or grinding subsequent to cutting and separation, further shortening the machining time.

Embodiment 21

Figure 71A:
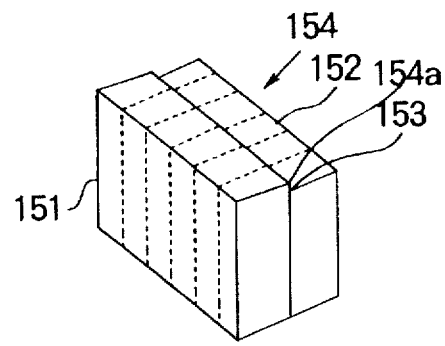
FIGS. 71A–71B are perspective views showing the machining steps by which the head chip is cut and separated by the manufacturing method of Embodiment 21.
Figure 71B:
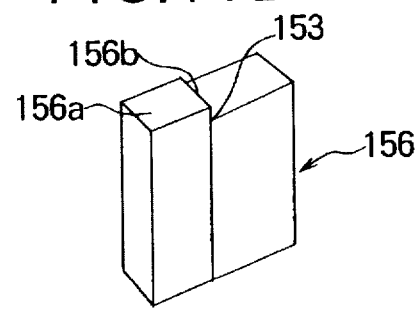
Figure 72:
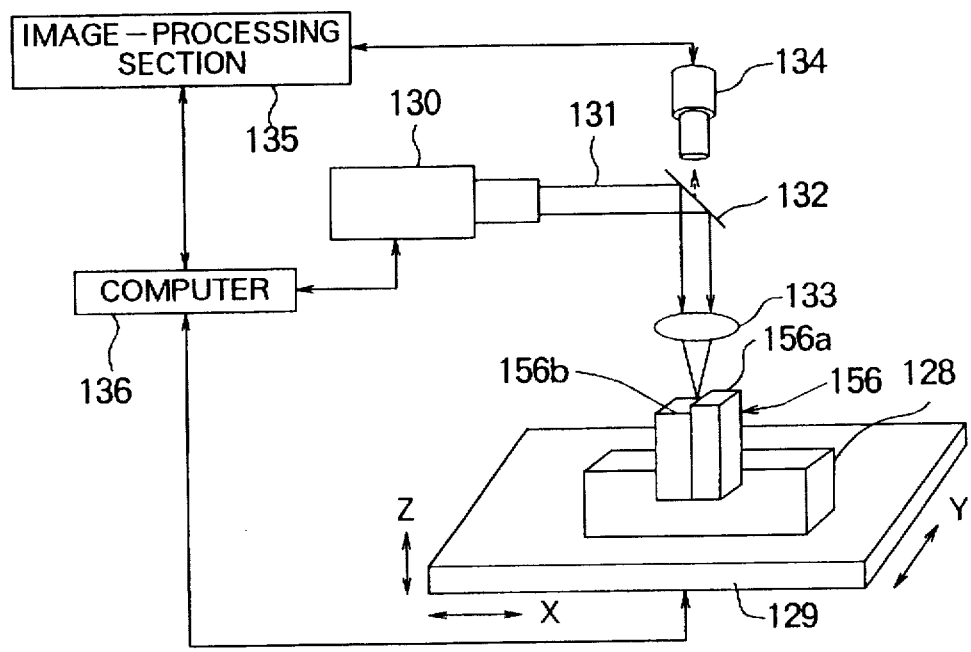
FIG. 72 is a structural diagram showing the equipment for the laser machining of a head chip by the manufacturing method of Embodiment 21.

FIGS. 71A–71B and FIG. 72 relate to a method for manufacturing a magnetic head according to Embodiment 21 of the present invention. FIG. 71A is a perspective view showing the cutting positions of a head block 154 comprising a pair of ferrite core blocks 151 and 152 and a gap 153 by the broken lines, and FIG. 71B is a perspective view showing one of head chips 156 that has been cut and separated. FIG. 72 is a structural diagram showing the laser machining equipment for machining the head chip 156.

The manufacturing method of Embodiment 21 differs from that of Embodiment 19 already described solely in the respect that subsequent to the process by which the head chips 156 with the steps 156b are cut from the head block 154 with the step 154a by the laser machining or the mechanical machining, the track grooves (grooves corresponding to reference numeral 125 in FIG. 66C) are formed in the sliding surface 156a of the head chip 156 by the machining equipment shown in FIG. 72.

In Embodiment 21, the position of the gap 153 can be accurately detected by means of the step 154a of the head block 154 or the step 156b of the head chip 156 in the laser machining of the track grooves or the laser machining of the sliding surface. Thus, if the position irradiated by the laser beam is adjusted with reference to these step positions, the laser machining can be accomplished with high accuracy. Also, in Embodiment 21, the machining of the track grooves is carried out on head chips 156 subsequent to cutting and separation. Thus even if some error should arise in the thickness of the head chips 156 during the process of cutting the stepped head block 154, the track grooves can be machined at any desired position on a head chip 156, providing the advantage that higher accuracy with respect to track groove position can be obtained than with the manufacturing method of Embodiment 19.

Embodiment 22

Figure 73A:
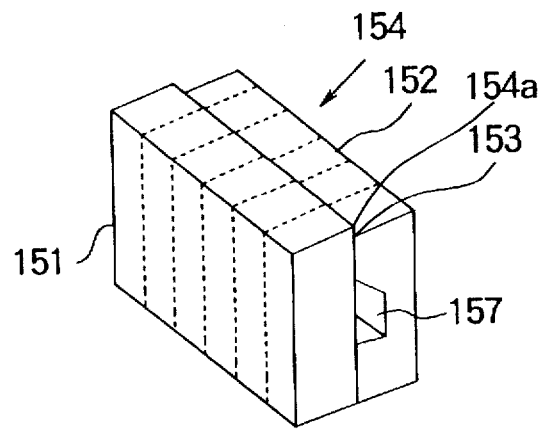
FIGS. 73A–73C are perspective views showing the selected machining steps in the manufacturing method of Embodiment 22.
Figure 73B:
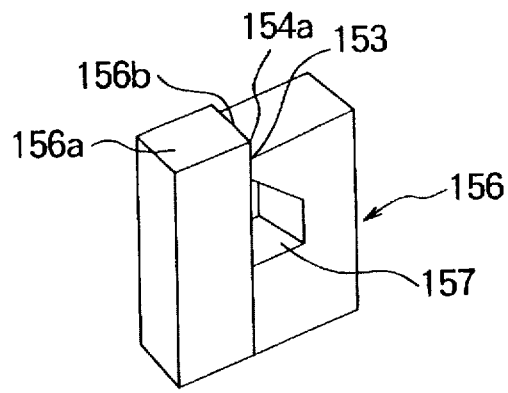
Figure 73C:
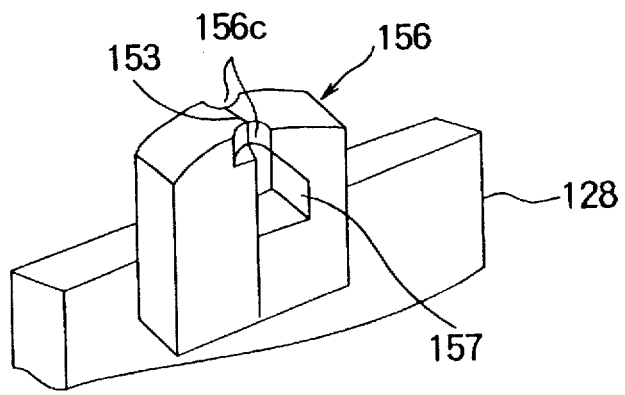

FIGS. 73A–73C relate to a method for manufacturing a magnetic head according to Embodiment 22 of the present invention. FIG. 73A is a perspective view showing the cutting positions of the head block 154, which comprises a pair of ferrite core blocks 151 and 152 and a gap 153, by the broken lines, FIG. 73B is a perspective view showing a head chip 156 that has been cut and separated, and FIG. 73C is a perspective view showing the configuration of a head chip 156 after the laser machining.

The manufacturing method of Embodiment 22 differs from that of Embodiment 20 already described solely in the respect that after the head chips 156 with the steps 156b have been cut from the lead block 154 with the step 154a by the laser machining or the mechanical machining, the track grooves 156c are formed in the sliding surface 156a of the head chip 156 by the machining equipment shown in FIG. 72.

In Embodiment 22, the position of the gap 153 can be accurately detected by means of the step 154a of the head block 154 or the step 156b of the head chip 156 in the laser machining of the track grooves or the laser machining of the sliding surface. Thus if the position irradiated by the laser beam is adjusted with reference to the position of the step 154a or 156b, the laser machining can be accomplished with high accuracy. Also, in Embodiment 22, the machining of the track grooves 156c is carried out on the head chips 156 subsequent to cutting and separation. Thus even it some error should arise in the thickness of the head chips 156 during the process of cutting the stepped head block 154, the track grooves can be machined at any desired position the head chip 156, providing the advantage that higher accuracy with respect to track groove position can be obtained than with the manufacturing method of Embodiment 20.

Figure 74:
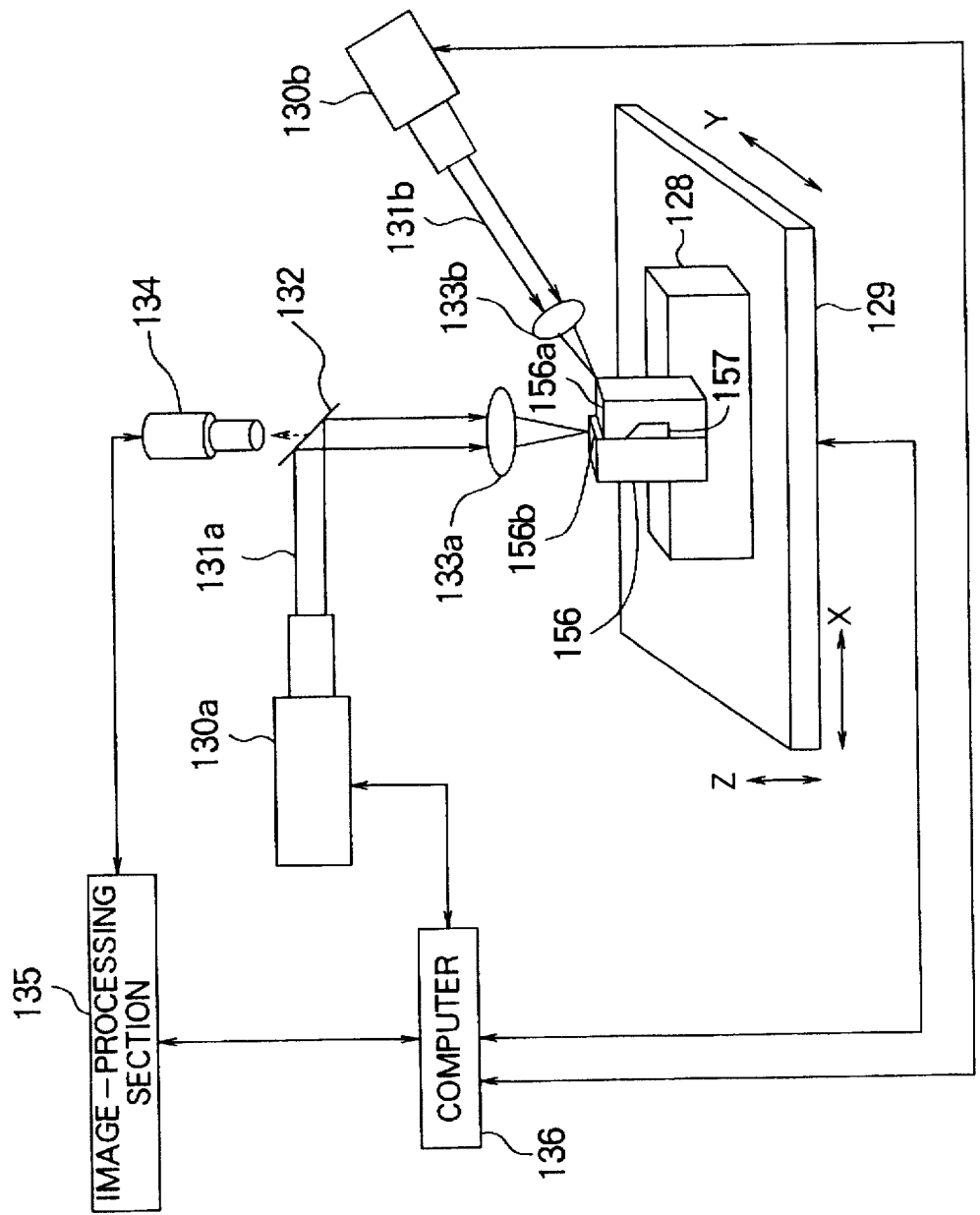
FIG. 74 is a structural diagram showing another machining equipment used in the manufacturing method of Embodiment 22.

The above description relates to a case in which the laser machining is accomplished by the laser machining equipment shown in FIG. 72, but it is also possible, as shown in FIG. 74 to accomplish the laser machining of the head chip 156 by means of two laser beams 131a and 131b emitted by two laser sources 130a and 130b and passing through two image-forming lenses 133a and 133b, respectively. In this case, using two laser beams 131a and 131b, it is possible to accomplish simultaneously the machining of track grooves 156c and the machining of coil window 157 or the curved sliding surface for a head chip 156 that is fixed to stage 129, providing the advantage that machining time can be reduced.

Embodiment 23

Figure 75:
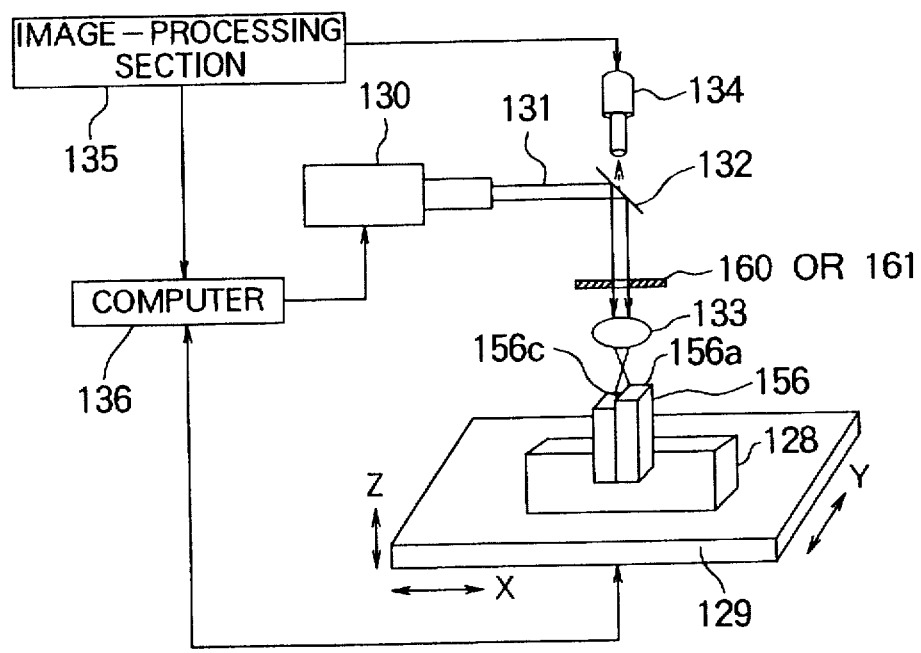
FIG. 75 is a structural diagram showing the equipment for machining the sliding surface of a head chip by the manufacturing method of Embodiment 23.
Figure 76A:
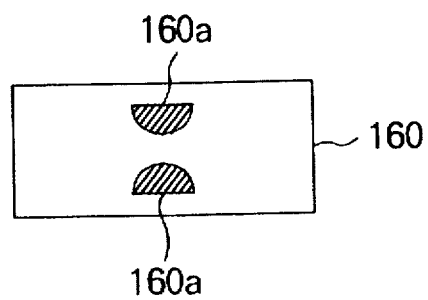
FIG. 76A is a plan view showing one example of a mask used in the machining equipment of FIG. 75.
Figure 76B:
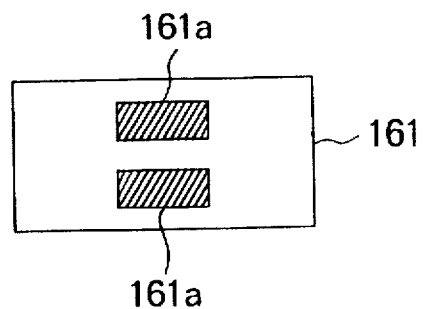
FIG. 76B is a plan view showing another example of a mask used in the machining equipment of FIG. 75.
Figure 77A:
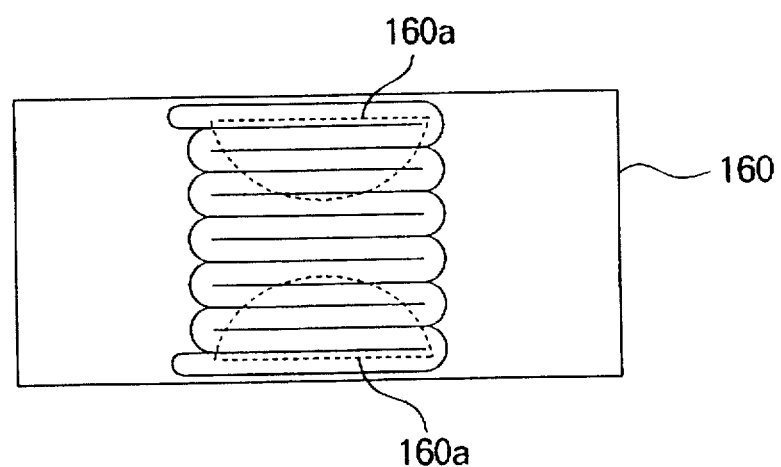
FIG. 77A is an explanatory diagram showing one example of the scanning method of the condensed laser beam spot.
Figure 77B:
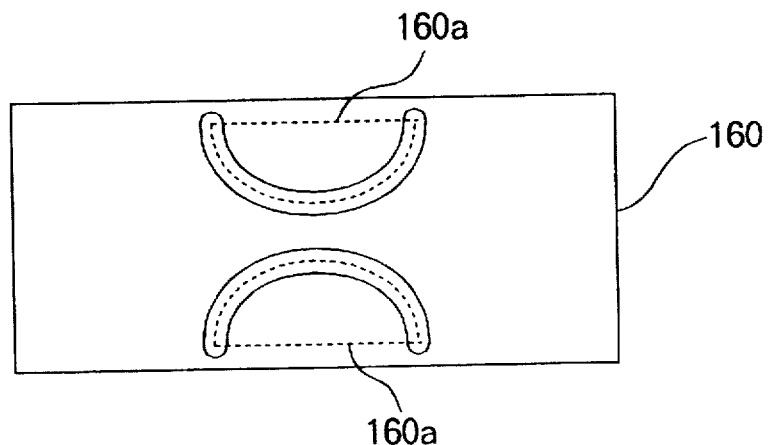
FIG. 77B is an explanatory diagram showing another example of the scanning method of the condensed laser beam spot.
Figure 78:
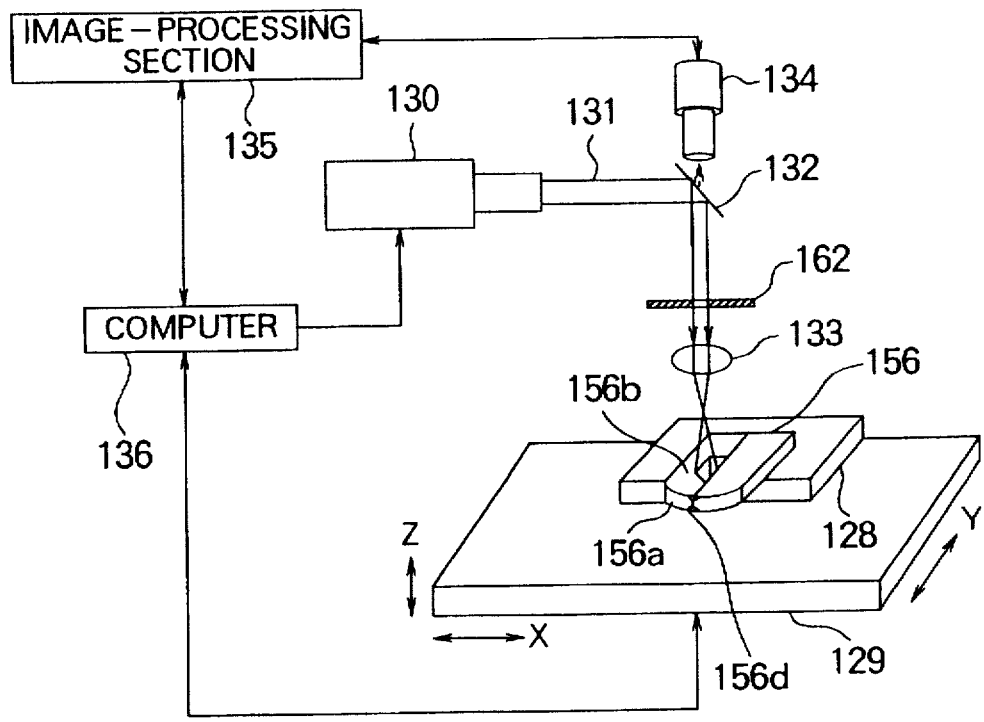
FIG. 78 is a structural diagram showing the equipment for machining the side surface of the head chip by means the manufacturing method of Embodiment 23.
Figure 79:
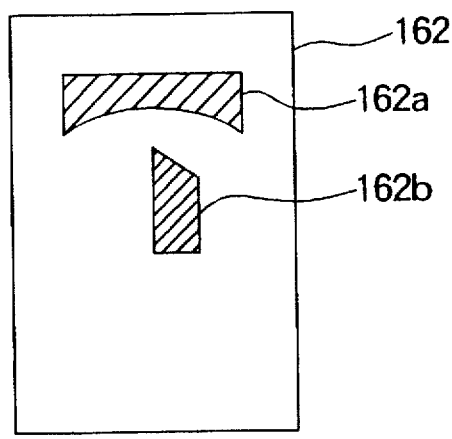
FIG. 79 is a plan view of the mask used in the machining equipment of FIG. 78.

FIG. 75, FIGS. 76A–76B, FIGS. 77A–7713, FIG. 78 and FIG. 79 relate to a method for manufacturing a magnetic, head according to Embodiment 23 of the present invention. FIG. 75 is a structural diagram showing the laser machining equipment for machining the sliding surface 156a of the head chip 156, and FIGS. 76A–76B are plan views of the masks 160 and 161 used in the laser machining equipment of FIG. 75. FIGS. 77A–77B are explanatory diagrams showing a scanning method of the condensed laser beam spots. FIG. 78 is a structural diagram showing the laser machining equipment for machining a side surface 156b of the head chip 156, and FIG. 79 is a plan view of a mask 162 used in the laser machining equipment of FIG. 78. In FIG. 75 and FIG. 78, structures identical with structures in FIG. 72 are designated by the same reference numerals.

For the machining of the track grooves in Embodiment 23, the masks 160 or 161 are placed in the light path of the laser beam 131 from the laser source 130, as shown in FIG. 75.

Next, the head chip 156 is placed on the movable working stage 129 in such a way that the sliding surface 156a faces upwards. Then the position of the step 156c of the head chip 156 (i.e., position of the gap) is detected by the monitoring section 134 and the image-processing section 135, and the working stage 129 is moved on the basis of data for the position of the step 156c.

Then the sliding surface 156a of the head chip 156 is irradiated by the laser beam 131 through either the slits 160a or the slits 161a of the mask 160 or 161. The laser beam 131 scans in a zigzag pattern as shown, for example, in FIG. 77A, so that only the laser light passing through the slits 160a reaches the sliding surface 156a, and the portion that is irradiated by the laser beam 131 is etched away. It is equally possible for the laser beam scan to begin from a scan along the boundary of the slit 160a, as shown in FIG. 77B. It is also possible to irradiate using not a condensed laser beam but a laser beam that has a large beam diameter and covers the whole of the slit 160a.

Next, the laser machining of the side surface 156b of the head chip 156, in which the track grooves 156d have been formed, is carried out. In the laser machining of the side surface, the mask 162 is placed in the tight path of the laser beam 131 from the laser source 130, as shown in FIG. 78.

Next, the head chip 156 is placed on the working stage 129 in such a way that the side surface 156b faces upwards. Next, the position of the step 156c of the head chip 156 (i.e., position of gap) is detected by the monitoring section 134 and the image-processing section 135, and the working stage 129 is moved on the basis of data for the position of the step 156c.

Then the side surface of the head chip 156 is irradiated by the laser beam 181 through the slits 162a and 162b of the mask 162. The laser light passing through the slits 162a and 162b reaches the side surface 156b, the portion that is irradiated by the laser beam 131 is etched away, and the curved sliding surface and the coil window are formed. At this time the laser machining is also carried out in the same way as in FIG. 78.

Since, according to Embodiment 23, the position of the head chip 156 with respect to the mask can be regulated, as described above, on the basis of the position of the step, accurate laser machining of the desired position on the head chip 156 is possible. Also, in the laser machining by laser transcription using the mask, batch etching can be carried out, providing an advantage over the laser machining by line-scanning without the mask when forming complex configurations. In addition, working accuracy can be regulated solely by the dimensional accuracy or the slits formed in the mask and by the focusing of the laser beam, so that machining of high accuracy can be carried out.

The masks 160 and 161 are normally made of metal having high reflectivity to the laser beam. It is possible, for example, to use a dielectric mask, in which a pattern of metal film is formed on a dielectric material having a laser beam transmittivity of 99% or more.

Figure 80:
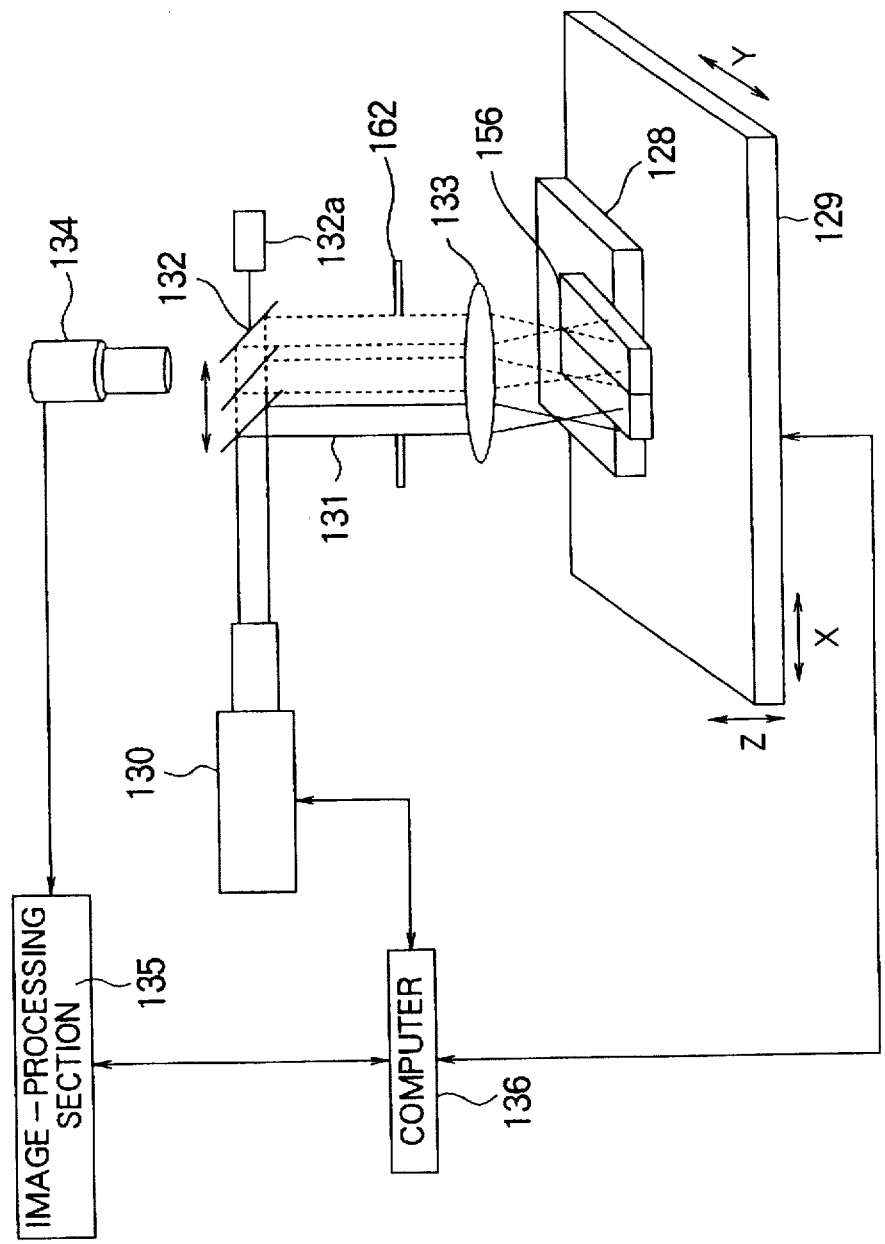
FIG. 80 is a structural diagram showing another equipment for machining the side surface of the head chip by means of the manufacturing method of Embodiment 23.

The above description relates to a case in which the laser beam 131 scans, but it is also possible to hold the laser beam 131 stationary, and machine the track grooves and other features by moving the head chip 156. It is also possible, as shown in FIG. 80, to scan the laser beam 131 by moving the bend mirror 132 using the moving mechanism 132a.

Embodiment 24

Figure 81A:
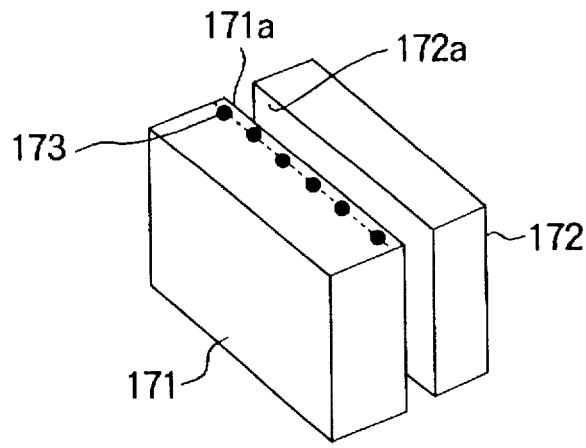
FIGS. 81A–81C are perspective views showing the selected machining steps in the manufacturing method of Embodiment 24.
Figure 81B:
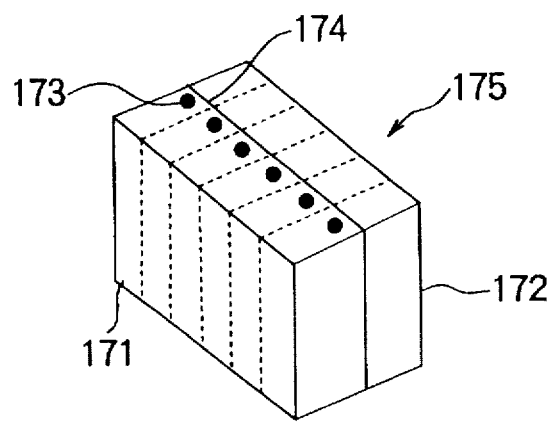
Figure 81C:
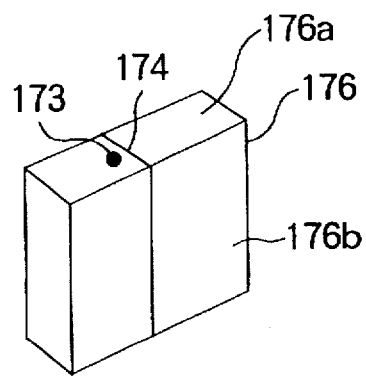

FIGS. 81A–81C and FIG. 82 relate to a method for manufacturing a magnetic head according to Embodiment 24 of the present invention. FIG. 81A is a perspective view showing the situation in which marks 173 have been applied at a specific distance away from either of contact surfaces 171a and 172a of the ferrite core blocks 171 and 172. FIG. 81B is a perspective view showing the head block 175 formed by joining the ferrite core blocks 171 and 172 across the gap 174, and FIG. 81C is a perspective view showing the situation in which the head block 175 has been cut to form a head chip 176. FIG. 82 is a structural diagram showing the laser machining equipment for machining the track grooves using the mark 173 as a reference point.

In FIG. 82, structures identical with structures in FIG. 72 are designated by the same reference numerals. The manufacturing method of Embodiment 24 differs from that of Embodiment 21 shown in FIGS. 71A–71B and FIG. 72 solely in the respect that the position irradiated by the laser beam 131 is controlled using as a reference point not a step, but the mark 173 applied to the head chip 176. In the manufacturing method of Embodiment 24, since the gap 174 is too small to be positively detected by optical means, the position to be irradiated by the laser beam 131 is determined on the basis of the mark 173, which is easily detected optically. This provides the advantage of higher dimensional accuracy for the laser machining and easier laser machining. In all respects other than those mentioned above, Embodiment 24 is identical to Embodiment 21 already described.

Figure 83:
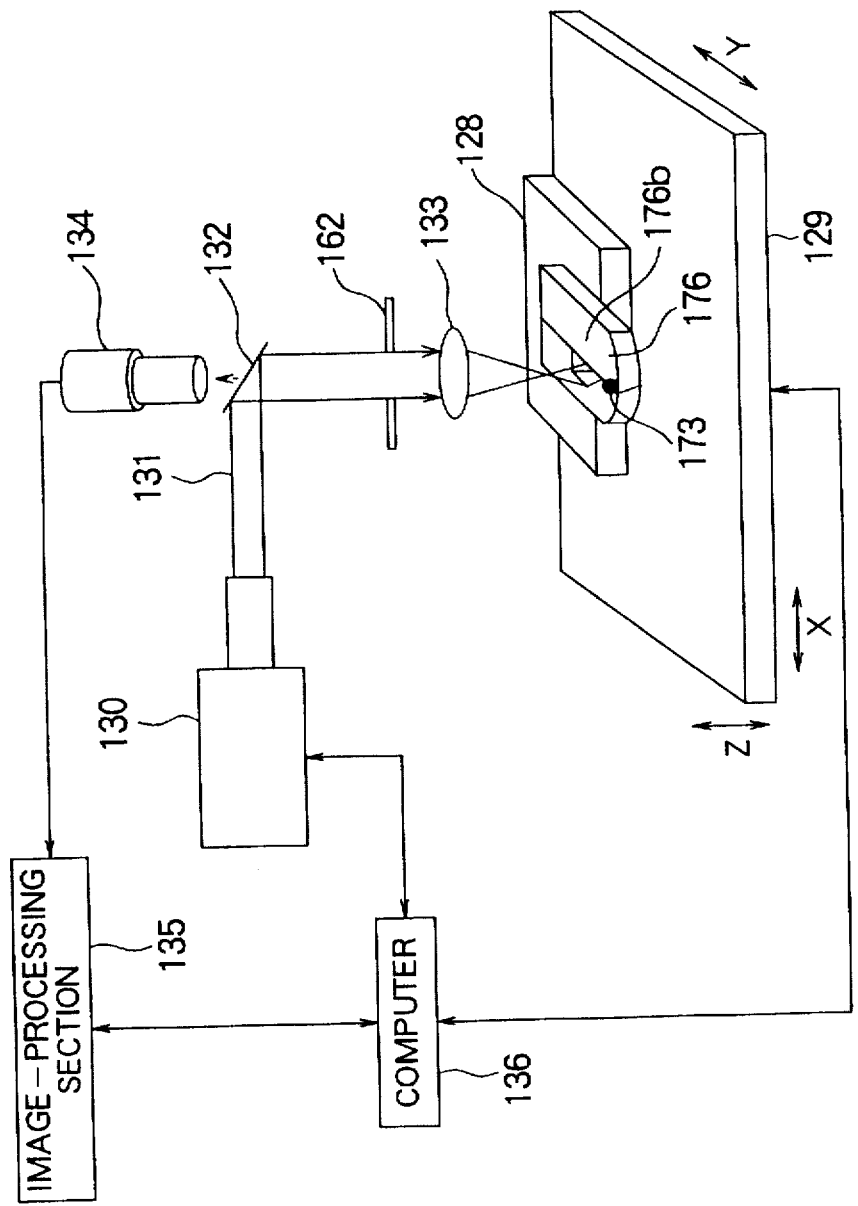
FIG. 83 is a structural diagram showing the equipment for machining the coil window according to the manufacturing method of Embodiment 24, using a mark applied to the head chip as a reference point.
Figure 84:
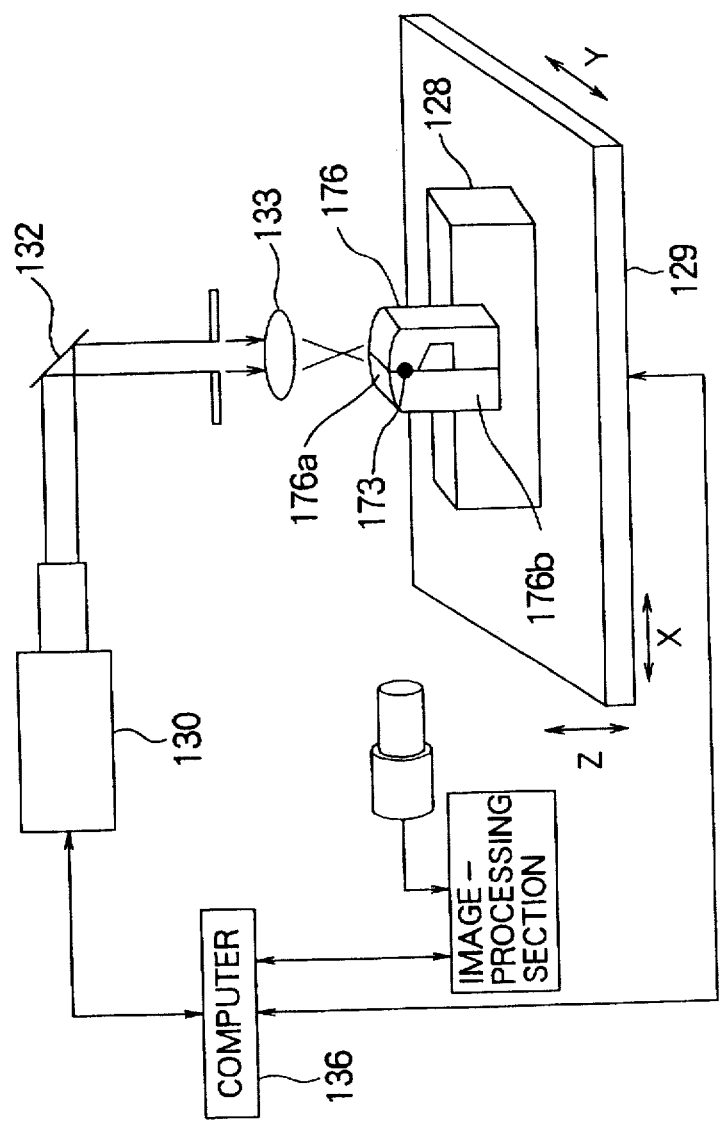
FIG. 84 is a structural diagram showing another equipment for machining the track grooves according to the manufacturing method of Embodiment 24, using a mark applied to the head chip as a reference point.
Figure 85A:
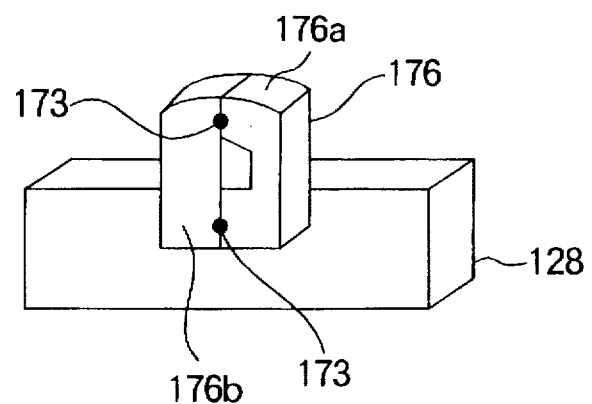
FIGS. 85A–85B are perspective views showing two marks applied to the head chip.
Figure 85B:
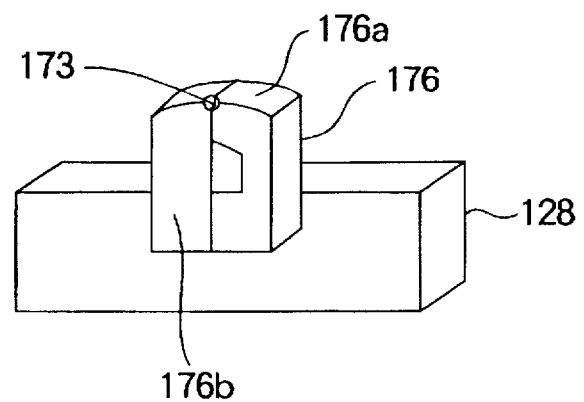

And while the above description concerns a case in which the mark 173 is applied to the sliding surface 176a of the head chip 176, the present invention is not limited. It is equally possible, as shown for example in FIG. 83, to apply the mark 173 to the side surface 176b of the head chip 176, to recognize the mark 173 by a monitoring section 134 consisting of a microscope or the like and an image-processing section 135, to regulate the position of the head chip 176 on the basis of the identified position, and then to carry out machining of the coil window and the curved sliding surface. It is also possible, as shown in FIG. 84, to accomplish the machining track grooves in sliding surface 176a of the head chip 176 by the movable working stage 129 on the basis of detection data for the mark 173 on the side surface 176b of the head chip 176, thereby establishing the position of head chip 176. It is also possible, as shown in FIG. 85A to provide two marks 173 on the side surface 176b of the head chip 176. In this case, the position of the head chip can be controlled using the line connecting the two marks 173 as reference points. It is also possible, as shown in FIG. 85B, to provide the mark 173 above the gap a position on the head chip that is to be removed by machining of the track grooves.

Embodiment 25

Figure 86A:
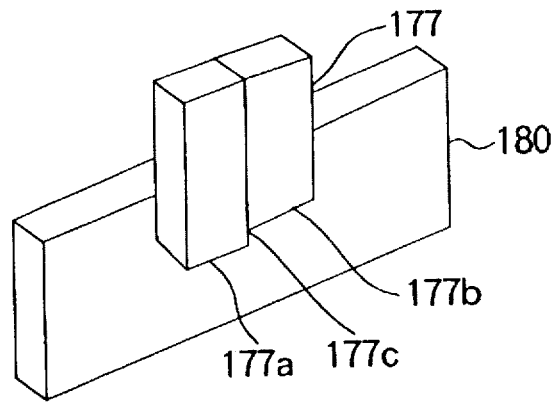
FIGS. 86A–86C are perspective views each showing head chips with a step according go the manufacturing method of Embodiment 25.
Figure 86B:
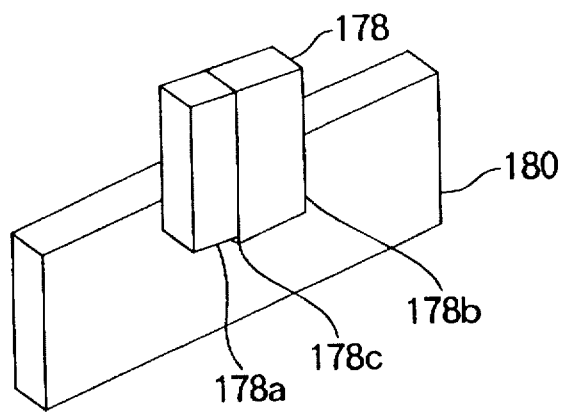
Figure 86C:
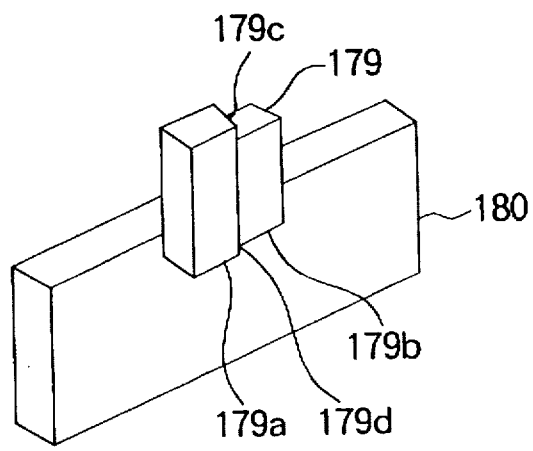

FIGS. 86A–86C relate to a method for manufacturing a magnetic head according to Embodiment 25 of the present invention. FIG. 86A is a perspective view showing a case in which a step 177c is provided on the joint side of a head base 180 for the head chip 177, which is constituted of core pieces 177a and 177b. FIG. 86B is a perspective view showing a case in which a step 178c is provided on the joint side of a head base 180 for the head chip 178, which is constituted of the core pieces 178a and 178b, and in which the narrower core piece 178a is shortened. FIG. 86C is a perspective view showing the situation in which the steps 179c and 179d are provided on top and bottom surfaces of the head chip 179, which is constituted of the core pieces 179a and 179b.

The manufacturing method of Embodiment 25 differs from that of Embodiment 24 solely in the respects that steps 177c, 178c and 179d are formed on the side on which at least head chips 177, 178 and 179 are fixed to the head base 180, and that the position on the head chip 177, 178 or 179 irradiated by the laser beam is determined on the basis of a step, not a mark. By means of Embodiment 25, even if material is removed to form the sliding surface of the head chip 177, 178 or 179, the steps 177c, 178c or 179d showing the gap position does not disappear, with the result, that constant optical detection of the step 177c, 178c and 179d is possible and the position irradiated by the laser beam can be set using this gap as reference point. Again, in a case in which the narrower core piece 178a is shortened, as shown in FIG. 86B, the area of the joint between the head base 180 and the head chip 178 can be enlarged, increasing the strength of adhesion. Again, if steps are provided on both top and bottom of the head chip 179, as shown in FIG. 86C, offering the advantage that, by the joining off the two steps, the gap position can be detected more exactly. In all respects other than those mentioned above, Embodiment 25 is identical to Embodiment 24.

Embodiment 26

Figure 87A:
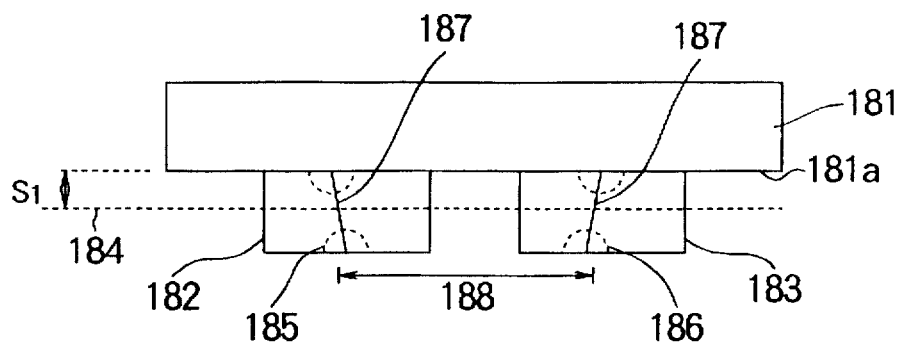
FIGS. 87A–87B are explanatory diagrams showing a method of changing the distance between the gaps according to the manufacturing method of Embodiment 26.
Figure 87B:
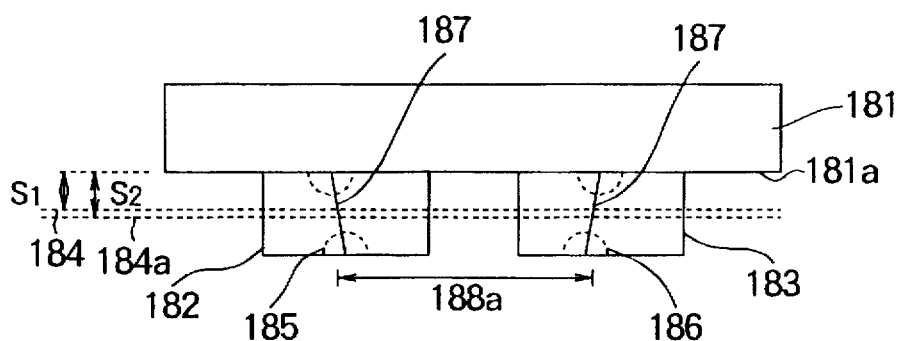

FIGS. 87A–87B relate to a method for manufacturing a magnetic head according to Embodiment 26 of the present invention. In Embodiment 26, two head chips 182 and 183 are fixed to a surface 181a of a head base 181. Also the position at which track grooves 185 and 186 are formed is determined by setting a reference line 184 (a line at a distance $S_1$ from the surface 181a) that determines track position. This Embodiment 26 differs from Embodiment 24 solely in the respect that the position of laser irradiation is determined on the basis of the surface 181a of the head base 181.

It is also possible, in cases in which an azimuth angle is imparted to the gaps 187, to set the track reference line 184 using the surface 181a of the head base 181 as the reference point and to set the distance 188 between the gaps of the two head chips 182 and 183 to the desired value, so that the position of reference line 184 can be shifted to that of the reference line 184a (the line at a distance $S_2$ from surface 181a) as shown in FIG. 87B. At this time, the distance between gaps is the distance designated by reference numeral 188a in FIG. 87B. In all respects other than those mentioned above, Embodiment 26 is identical to Embodiment 24.

Embodiment 27

Figure 88:
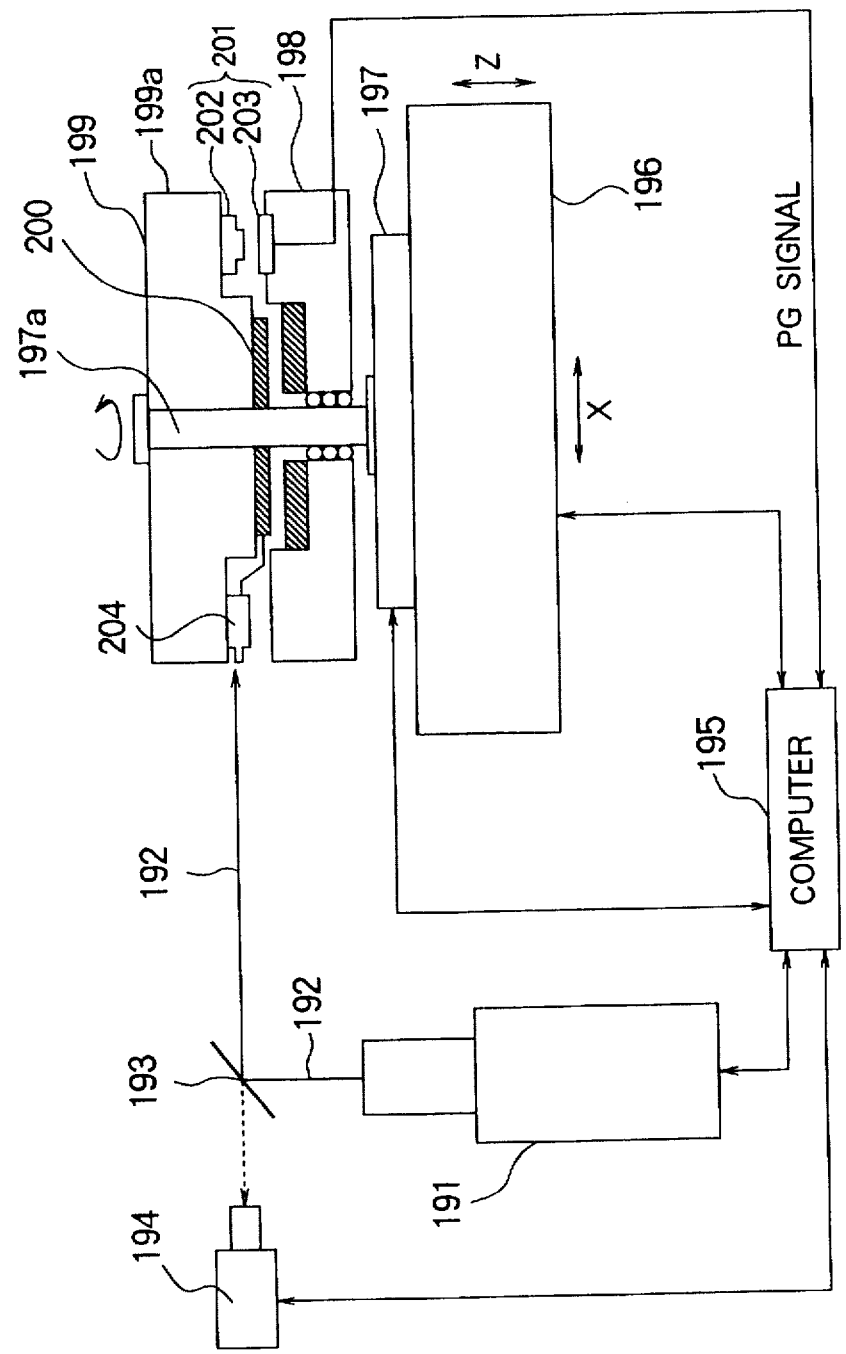
FIG. 88 is a structural diagram generally showing the machining equipment for accomplishing the manufacturing method of Embodiment 27.
Figure 89:
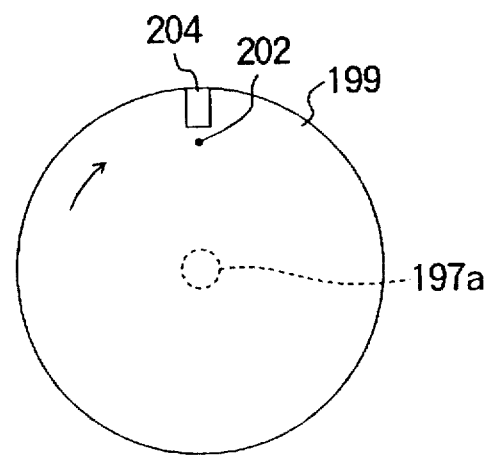
FIG. 89 is a plan view showing one example of the position for mounting a head chip and a PG magnet on a rotating drum.
Figure 90:
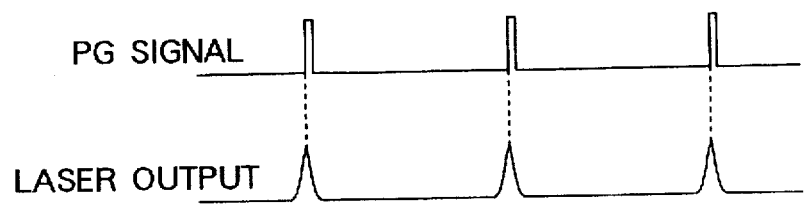
FIG. 90 is a timing chart showing the timing of the PC signal detected by a PG coil and of the laser output from the laser source in the manufacturing method of FIG. 88 and FIG. 89.
Figure 91:
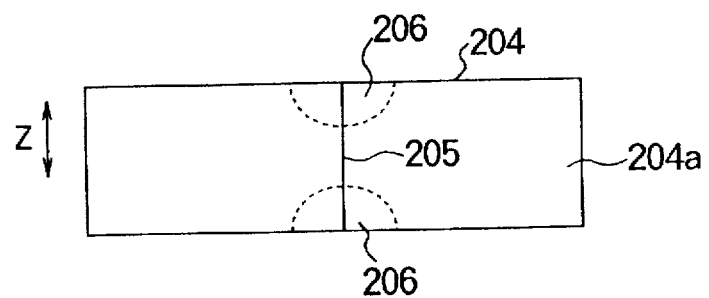
FIG. 91 is a plane view of a head chip showing, by means of broken lines, the position of the track grooves formed on the sliding surface thereof.
Figure 92:
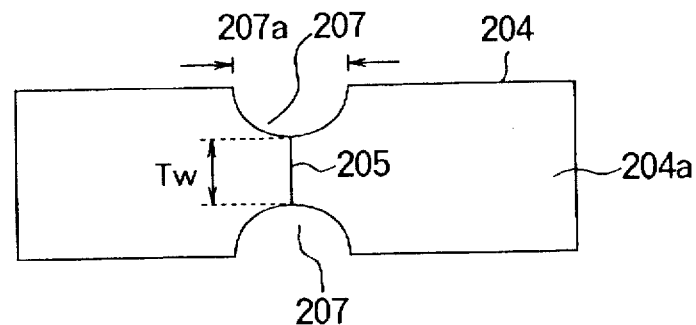
FIG. 92 is a plane view of the sliding surface into which the track grooves have been machined according to Embodiment 27.

FIG. 88 through FIG. 96 relate to a method for manufacturing a magnetic, head according to Embodiment 27 of the present invention. FIG. 88 is a structural diagram showing the general features of the laser machining equipment for accomplishing the manufacturing method Embodiment 27. FIG. 89 is a plan view of one example of the position for mounting, on the rotating drum 199, a head chip 204 and a pulse generator (PG) magnet 202 for detecting the position of the head chip 204. FIG. 90 is a timing chart showing the timing of the PG signal detected by PG coil 203 and the laser output from the laser source 192. FIG. 91 is a front view of the head chip 204 showing, by means of broken lines, the position of the track grooves 206 formed on the leading end of the sliding surface 204a, and FIG. 92 is a front view of the sliding surface 204a into which the track grooves 207 have been laser machined.

In FIG. 88, a reference numeral 191 designates a laser source for emitting the laser beam 192, 193 designates a bend mirror that reflects the laser beam 192 and changes the direction in which it proceeds, 194 designates a monitoring section such as a microscope or other, and 195 designates a computer that serves as a control section. A reference numeral 196 designates a movable working stage that moves, for example, in the vertical direction (direction Z) or in a horizontal direction (direction X or Y), 197 designates a motor installed on the working stage 196, 198 designates a fixed drum, 199 designates a rotating drum that is mounted on the spindle 197a of the motor 197 facing the fixed drum 198, 200 designates a rotary transformer, and 201 designates a pulse generator consisting of PG magnet 202 and PG coil 203.

In Embodiment 27, the head chip 204 is machined in the following sequence. First, the head chip 204 is mounted on the rotating drum 199 so that the sliding surface 204a faces outward, and the rotating drum 199 is mounted to the spindle 197a of the motor 197. By this means the rotating drum 199 is disposed facing the fixed drum 198, as actually used a recording and reproducing device.

Then, by driving the motor 197, the spindle 197a and the rotating drum 199 mounted thereto are rotated at the desired number of revolutions per minutes (rpm). For example, as shown in FIG. 89, the PG magnet 202 is mounted to the rotating drum 199 at the same angular position as the head chip 204. In this case, when the PG magnet 202 passes the position of the PG coil 203, a PG signal indicating the position of the head chip 204 is generated in the PG coil 208. The computer 195 causes a light source lamp (not shown) incorporated in the monitoring section 194 to be turned on stroboscopically in synchronization with the PG signal. Thus, when the rotating drum 199 is rotating, the position of the head chip 204 mounted to the rotating drum 199 (for example, the position in the direction Z in FIG. 91) can be confirmed by the monitoring section 194. In the event that the head chip 204 is not in the desired position, the working stage 196 is moved to bring the head chip 204 to the desired position.

Next, as shown in FIG. 90, the irradiation of the laser beam 192 from the laser source 191 is triggered by the PG signal generated by the PG coil 203. On-off switching of the laser beam 192 is controlled by the computer 195. As shown in FIG. 91, the irradiation of the laser beam to the head chip 204 is carried out so as to remove portions (portions 206 surrounded by broken lines) of the gap 205. By this means, as shown in FIG. 92, track grooves 207 are formed, thereby forming a track having a track width $T_W$.

Figure 93:
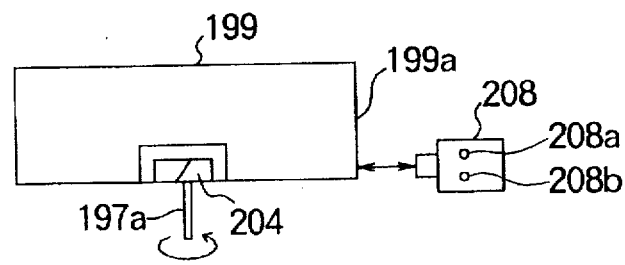
FIG. 93 is an explanatory diagram showing a method of measuring the period of rotation that can be used in the manufacturing method of Embodiment 27.
Figure 94:
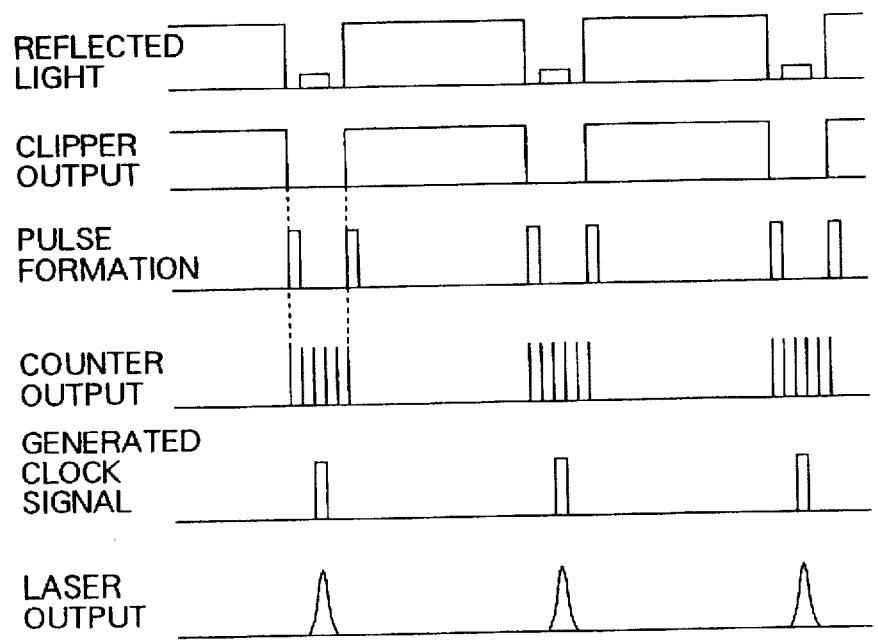
FIG. 94 is a timing chart showing the period of laser irradiation using the measurement signal of FIG. 93.

Although the above description concerns a case in which the PG signal generated by the PG coil 203 is used for the purpose of timing the revolution of the rotating drum 199 and the irradiation of the laser beam 192, the present invention is not thus limited. For example, in a case in which a side surface 199a of the rotating drum 199 is formed of material with high reflectivity such as aluminum or other material, it is equally possible to mount an optical detecting device incorporating a light emitter 208a and a photodetector 208b disposed facing the side surface 199a of the rotating drum 199, as shown in FIG. 93. In this case, it is possible to detect the position of the head chip 204 by detecting the timing at which a quantity of the light reflected from the side surface 199a of the rotating drum 199 drops, as shown in FIG. 94. Then, as shown in FIG. 94, the quantity of the reflected light is converted to a voltage, and the weak light reflected from the head chip 204 is clipped by the clipper circuit. Then pulse formation is applied to the falling edge and the rising edge of the clipper output, the period between the pulses is counted by a counter, and a clock signal corresponding to the gap position is generated. This clock signal triggers the irradiation of the laser beam.

The rotational speed of the rotating drum 199 varies according to a type of the recording and reproducing system, ranging from 1800 [rpm] (30 [Hz] or [pps]) for VHS system VCR to 9000 [rpm] (150 [Hz] or [pps]) for digital system VCR. Here, pps signifies pulses per second. The conditions required of the laser beam is that it produce an output power capable of machining the magnetic material and that it be able to irradiate at a repetitive frequency of 30 [pps] to 150 [pps] or more. Lasers that satisfy these conditions may be excimer lasers typified by XeCl laser (wavelength 308 [nm]), KrF laser (wavelength 248 [nm]) and ArF laser (wavelength 193 [nm]), as well as solid-state lasers such as the fundamental wave of YAG laser (wavelength 1064 [nm]) and second harmonic of YAG laser (wavelength 532 [nm]). It has been disclosed, for example, on page 100 of "Laser Processing" written by Chiyoe Yamanaka, published by Nikkei Gijutsu Tosho K.K. In Japan, that in a continuously pumped Nd:YAG laser repetitive pulse oscillation using a Q-switch, the upper limit of the number of repetitions was 50 [KHz]. Although the average output power of the Nd:YAG laser is 100 [W] or less, according to the investigations of the present inventors, ferrite can be machined with a laser beam with the energy of about 1 [W].

Again, for example, in forming the track width to the configuration shown in FIG. 92, the head chip 204 moves during the irradiation of the laser beam, if laser pulse widths are too long, grooves formed by the laser beam will extend in the direction opposite to the direction of motion of the head chip 204. Normally, however, if the width 207a of track grooves 207 becomes excessively small, it will begin to function as a gap, so that it is so formed as to be 10 [μm] at least. Thus since the pulse width of Nd:YAG lasers is 150 [nm] to 200 [nm], the distance of movement of the position of laser irradiation is only about 2 [nm], even when rotating at a relative speed of 10 [m/s], and the problem of track groove width becoming excessively great does not occur. The fact that a laser beam of the specifications required by Embodiment 27 are practically attainable, may be appreciated from the specifications sheet of excimer laser for industrial use (Lambda 3000: KrF and XeCl) manufactured by Lambda Physik Corporation, which is disclosed page 185 of "Laser Processing" mentioned above. Due to this specification, the maximum repetitive frequency is 400 [Hz] for KrF laser and 500 [Hz] for XeCl laser. Pulse widths are 26 [ns] for KrF laser and 30 [ns] for XeCl laser, which is an order of magnitude smaller than the Nd:YAG laser referred to above, and even more desirable for laser machining. In terms of output power, the maximum stabilized energy per pulse is 400 [mJ] for KrF laser and 500 [mJ] for XeCl laser. As a result of an investigation of conditions for machining ferrite using a KrF laser with an irradiating beam diameter of 30 [μm], it was found that in terms of energy density per unit area, machining was possible from approximately 0.5 [J/cm$^2$], and preferably about 6 [J/cm$^2$] was required. Put another way, even at 6 [J/cm$^2$], the energy applied to the whole of the area irradiated, at approximately $4.2 \times 10^{-2}$ [mJ], was fully sufficient for machining, so that from the standpoint of laser output as well, excimer lasers satisfy the requirements of Embodiment 27.

Figure 95:
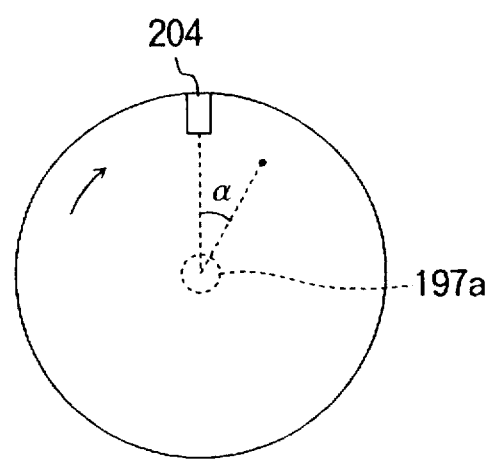
Figure 96:
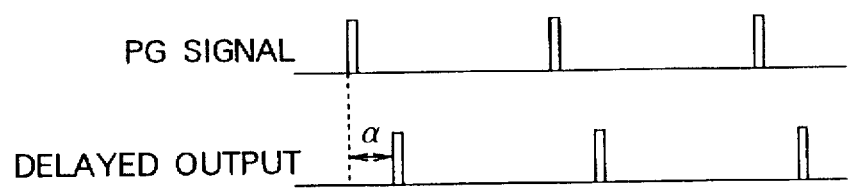

Further, the aforementioned PG magnet 202 need not be mounted at the same angular position as the head chip 204. As shown in FIG. 95, if it is mounted at a position that is offset by an angle α from the position of the head chip, the position of the head chip 204 can be detected, as shown in FIG. 96, by delaying the PG signal by a phase difference corresponding to the angle α.

Embodiment 28

Figure 97:
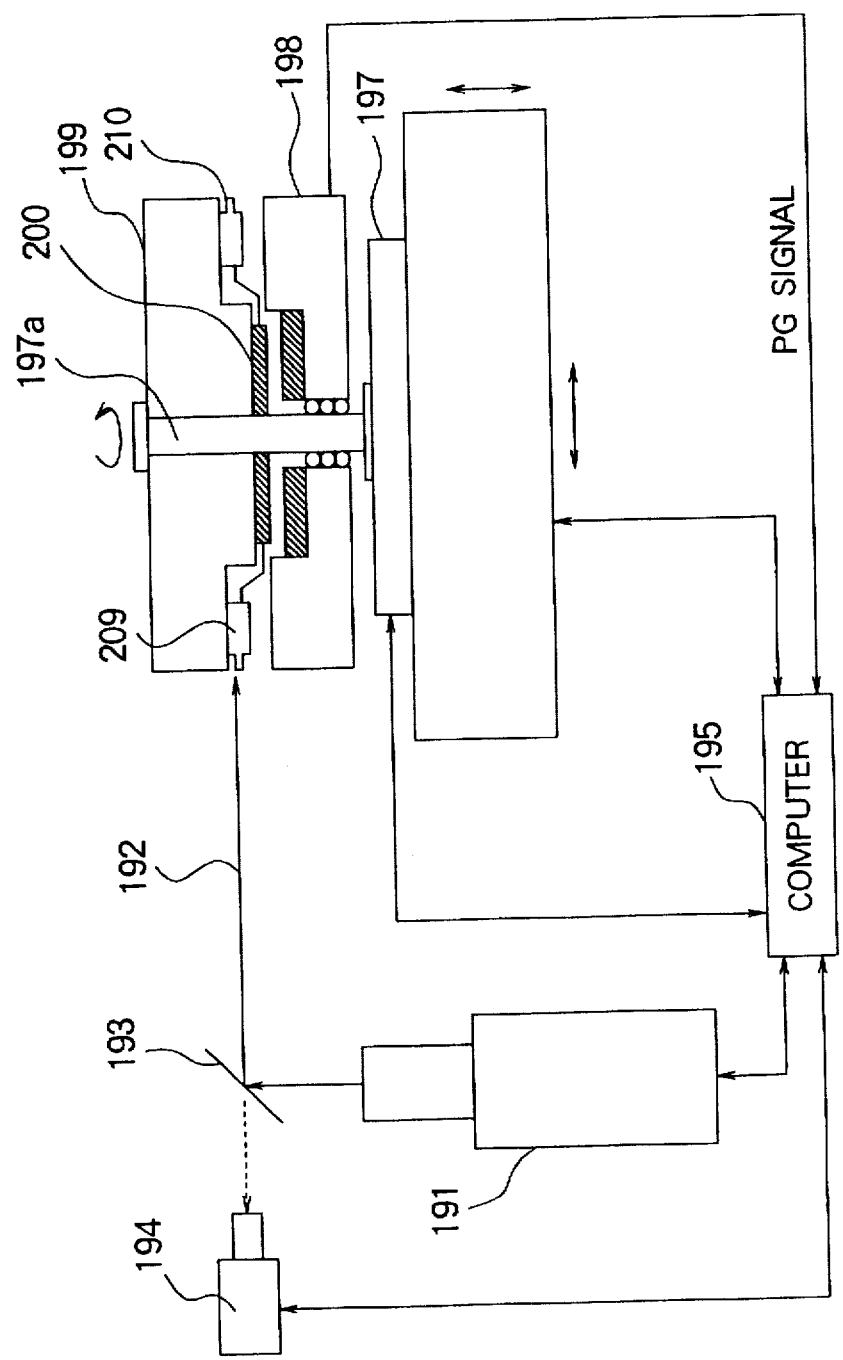
Figure 98A:
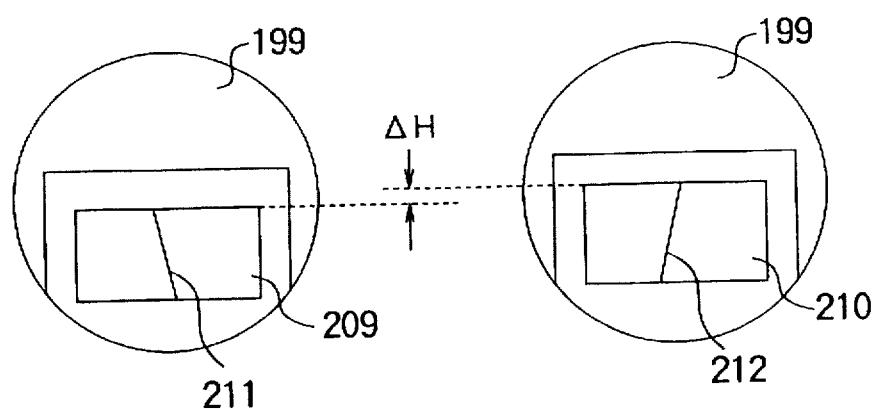
Figure 98B:
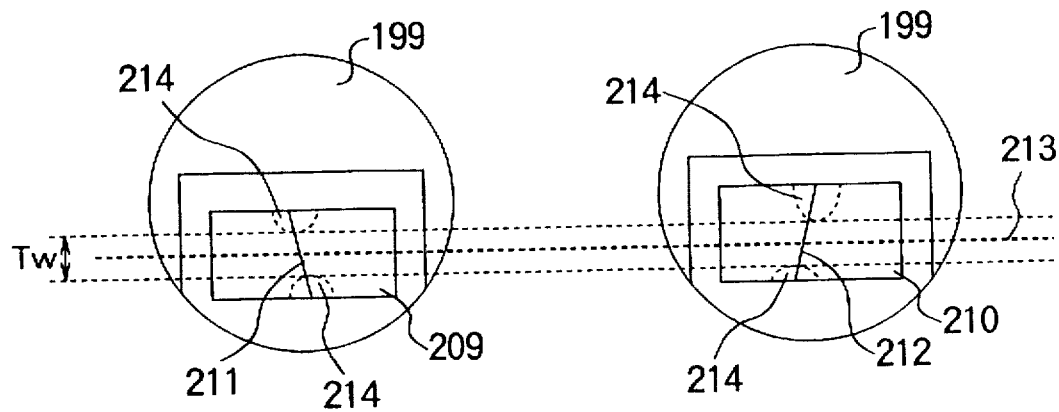
Figure 99:
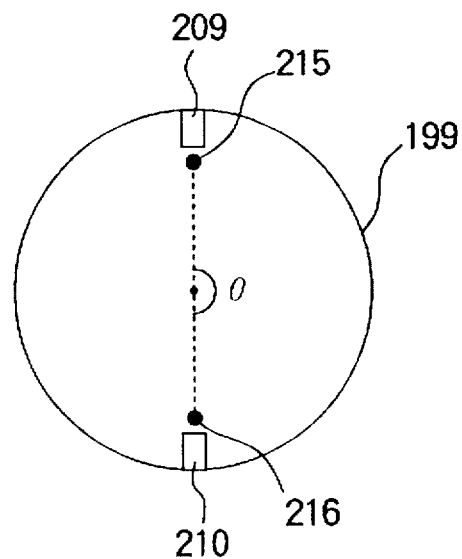
Figure 100:
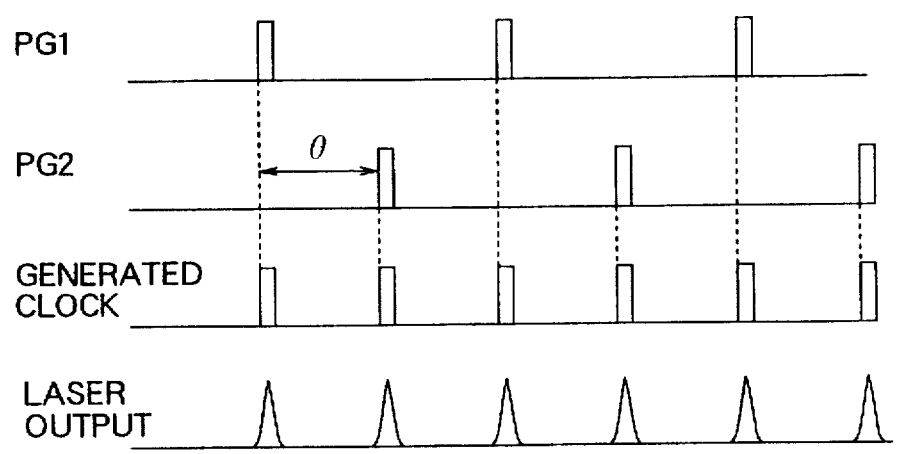

FIG. 97 through FIG. 100 relate to a method for manufacturing a magnetic head according to Embodiment 28 of the present invention. FIG. 97 is a structural diagram showing the general features of equipment for machining two head chips 209 and 210 mounted on the rotating drum 199. FIGS. 98A and 98B are explanatory diagrams showing the positions for machining the track grooves of two head chips 209 and 210. FIG. 99 is a plan view showing the disposition of two head chips 209 and 210 and two PG magnets 215 and 216 on the rotating drum 199. FIG. 100 is a timing chart showing the relationship between the PG$_1$ signal, PG$_2$ signal and laser beam output.

The machining equipment of Embodiment 28 shown in FIG. 97 differs from that of Embodiment 27 shown in FIG. 88 solely in the respect that there are two head chips 209 and 210 mounted on the rotating drum 199, and in terms of the nature of the control exercised by the computer 195. The output signals generated by the PG coil (corresponding to reference numeral 203 of FIG. 88) consist of a PG$_1$ signal produced by the PG magnet 215 and a PG$_2$ signal produced by the PG magnet 216.

In the manufacturing method of Embodiment 28, the relative difference ΔH in the positions of the head chips 209 and 210 (the positional offset in the head chip thickness direction) is first monitored by the monitoring section 194.

The appearance of the head chips as monitored by the monitoring section 194 is shown in FIGS. 98A and 98B. In FIG. 98A, an azimuth angle is imparted to the gaps 211 and 212 of the head chips 209 and 210. Then a reference line 213 shown in FIG. 98B is established so that the track (track width T$_W$) that is formed on the two head chips 209 and 210 will be positioned at the same height, determining the irradiation position 214 of the laser beam description given here relates to a case in which time track position on the two head chips 209 and 210 are the same, but the track position may be intentionally offset.

Next, irradiation of the laser beam 192 from the laser source 191 is triggered, as shown in FIG. 100, by the PG$_1$ and PG$_2$ signals generated in the PG coil 203 (see FIG. 88). On-off switching of the laser beam 192 is controlled by the computer 195. Laser beam irradiation of the head chip 209 is carried out to remove a portion of gap 205 (surrounded by broken lines in FIG. 98B). By this means, a track having a track width T$_W$ is formed.

Figure 101:
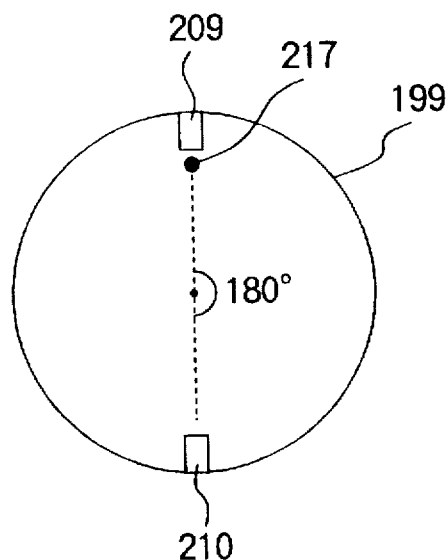
Figure 102:
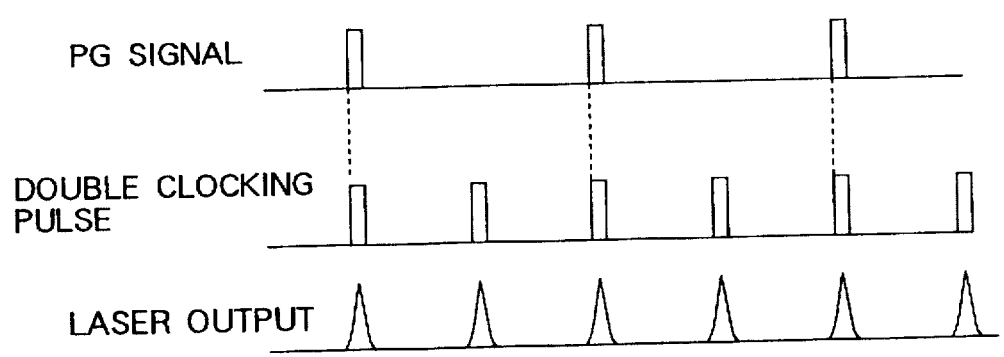

Ordinarily, VCRs have a pair of magnetic heads 209 and 210, mounted symmetrically at θ=180°, as shown in FIG. 99. In this case, it is possible to provide only one PG magnet 217 as shown in FIG. 101 and to estimate the position at which the head chips 209 and 210 are mounted by double clocking the PG output signal produced by a single PG coil as shown in FIG. 102.

Figure 103:
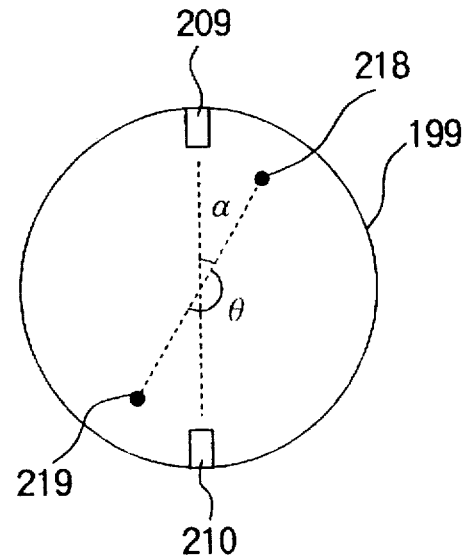
Figure 104:
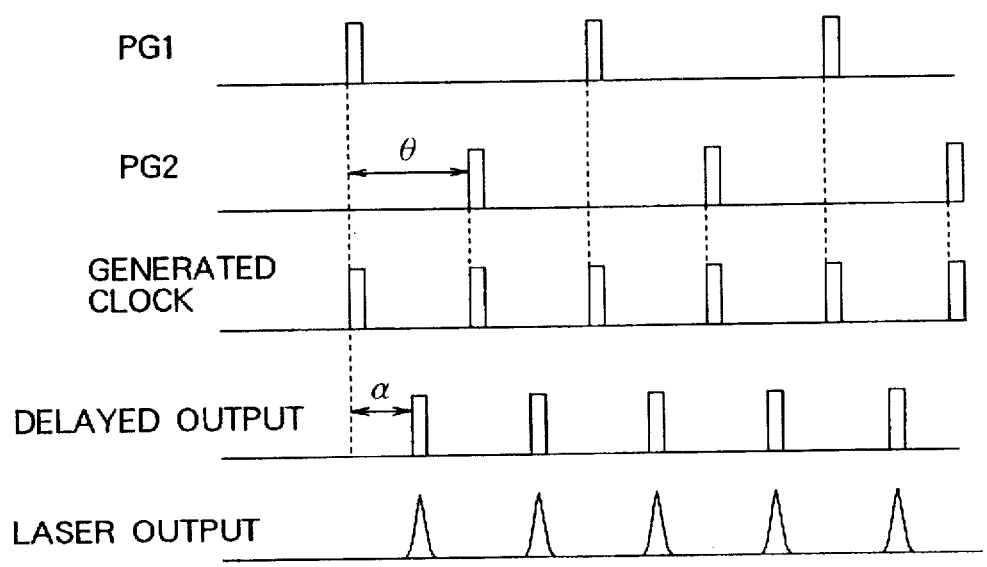

FIG. 103 shows a case in which the mounting positions of PG magnets 218 and 219 are offset by an angle α from those of the head chips 209 and 210. In this case, laser irradiation may be delayed by a time equivalent to angle α, as shown in FIG. 104.

Similarly, head chip position can be detected when a plurality of pairs of head chips (four or more) are disposed on a single rotating drum.

Figure 105:
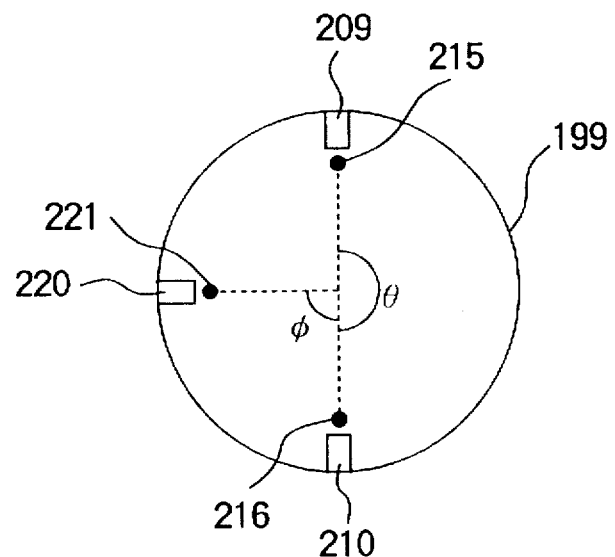

Also it is equally possible, on a rotating drum 199 that is provided with one pair of head chips 209 and 210, to dispose a further head chip 220, as shown in FIG. 105. This type of disposition is adopted to provide a pair recording and reproducing heads and an erasing head, or to add a head for special playback.

When the head chips 209 and 210 are disposed as shown in FIG. 105, PG magnets 215, 216 and 221 are mounted corresponding, respectively, to the head chips 209, 210 and 220. It is possible, however, to adopt other methods of detection, such as a method in which timing is generated from the signal produced by a single pulse generator and the angular difference at which the head chips are disposed, again using optical detection as shown in Embodiment 27.

Figure 106:
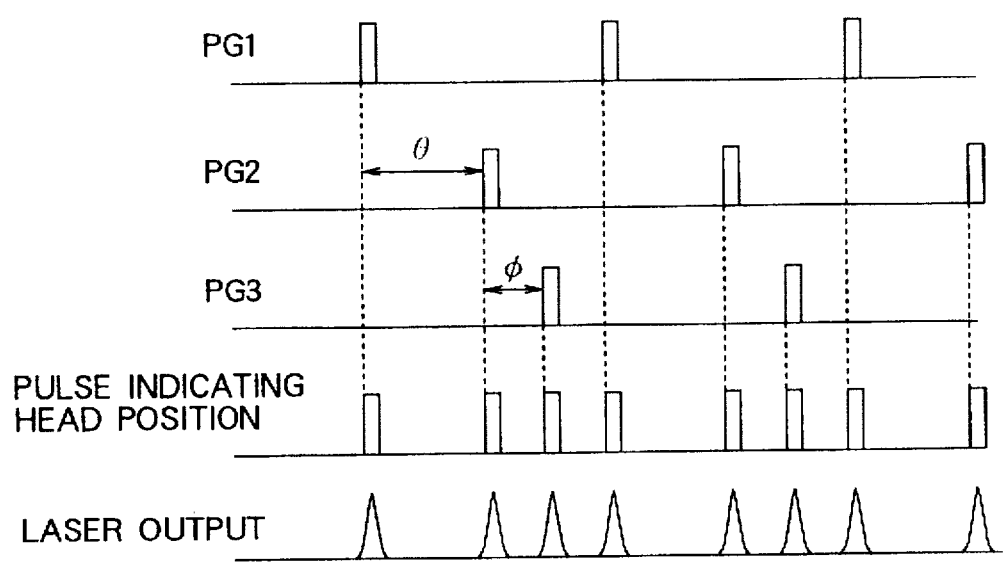

For example, in a case in which a PG magnet is mounted for each of the head chips, laser irradiation is carried out by generating the head position signals shown in FIG. 106. Depending on the value of angle φ in FIG. 106, the repetitive frequency of the laser must be made faster than the rotational period of the rotating drum 199. For example, when φ=90°, four times the rotational period is required, and when φ=45°, eight times the rotational period is required. As has been stated in Embodiment 27, the YAG laser is capable of repetitive irradiation up to a maximum of 50 [KHz], and this is suitable for the manufacturing method of Embodiment 28.

Even excimer lasers, with a repetition of 400 [Hz]–500 [Hz], may be applied to the manufacturing method Embodiment 28 by reducing the rotational period of the rotating drum 199.

Although the above description concerns a case in which the oscillating frequency of the laser is an integer multiple of the rotational speed of the rotating drum 199, the present invention is not thus limited. It is equally possible, as shown in FIG. 107 to have the rotational speed of the rotating drum 199 twice the laser irradiation period, so that laser irradiation of the head chip is carried out once during the time in which the rotating drum 199 rotates twice. In this case the signal that shows head chip position is divided into half the frequency and laser irradiation is carried out at the divided frequency. This method has the advantage that is unnecessary to use lasers of particularly high frequency. Also, in the case of the laser machining, degradation of the properties of the material due to heat energy presents a problem, but since the head chip is irradiated only once in a plurality of rotations of the rotating drum 199, the laser machining can be carried out while the portion being machined is cooled by rotation, and heat degradation inhibited.

Embodiment 29

FIG. 108 relates to a method for manufacturing a magnetic head according to Embodiment 29, and shows a signal indicating head chip position and the timing of laser irradiation. In Embodiment 29, the timing of laser beam irradiation is slightly delayed for every three pulses of the PG signal indicating the head chip position. However, since the number of laser beam pulses to be applied to a given point is determined by the depth to be machined and the material of the head chip, the number of pulses is not limited to three. By means of the manufacturing method of Embodiment 29, complex configurations can be machined without scanning the laser beam, by intentionally offsetting the timing of laser irradiation during machining.

For example, to remove the portion 222 of the sliding surface of the head chip 209 that is enclosed by broken lines in FIG. 109A, laser beam irradiation is applied four times at different timing to both the top and bottom of track 211, using as a reference the PG signal showing the position of the head chip 209. By this means, the sliding surface of the head chip 209 is broadly removed as shown in FIG. 109B, so that the track groove 223 is formed and a magnetic head having an elongated track length $T_L$ can be obtained.

By delaying the irradiation timing of the laser beam as shown in FIG. 108 and by moving the working stage on which the rotating drum 199 provided with the head chip 209 is mounted, it is also possible to machine the sliding surface of the head chip 209 diagonally. In FIG. 110A. For example, both side portions 211a of the gap 211 are machined as shown in FIGS. 109A and 109B by delaying the irradiation timing of the laser beam, but the machining of the portions 211b from the track to the side surface is carried out diagonally by changing the height of the working stage while gradually delaying the irradiation timing of the laser beam. The configuration of the sliding surface of the head chip 209 produced by this method is shown in FIG. 110B.

It is equally possible, by similarly changing the height of the working stage while gradually delaying the irradiation timing of the laser beam, to accomplish laser machining while changing the position irradiated by the laser beam, as shown by broken lines in FIG. 111A. In this case, track grooves 225 of diagonal configuration are formed, as shown in FIG. 111B.

Thus the manufacturing method of Embodiment 29 offers advantages over the method in which complex configurations are machined by scanning the laser beam with respect head chip 209, which is moved by the rotation of a rotating drum in that the problem of poor focusing is eliminated and machining is easier.

Embodiment 30

FIG. 112, FIG. 113, FIGS. 114A–114B and FIGS. 115A–115B relate to a method for manufacturing a magnetic head according to Embodiment 30 of the present invention. In the manufacturing method of Embodiment 30, the irradiation intensity is changed during machining of the head chip. In Embodiment 30, four head chips 226, 227, 228 and 229 are mounted as shown in FIG. 112 at 90° intervals on the rotating drum 199. Here, the head chips 226 and 228 are constituted from a pair of ferrite pieces and gap material as shown In FIG. 114A, and head chips 227 and 229 are MIG heads in which, as shown in FIG. 115A, metal magnetic films 230 and 231 are disposed on the respective facing surfaces of ferrite pieces 227a and 227b, and gap material 232 is disposed between metal magnetic films 230 and 231.

FIG. 113 shows the irradiation timing of the laser beam and laser beam irradiation intensity during head chip machining. In Embodiment 30, the PG signal produced by the PG coil is first multiplied by four, and used as the signal indicating the position of the head chips 226, 227, 228 and 229 to trigger laser beam irradiation. In this case, the head chips 226 and 228 (for example the ferrite heads) and the head chips 227 and 229 (the MIG heads) arrive alternately at the position of laser irradiation, the conditions of laser irradiation are arranged to suit the material used in each pair of head chips. And although the laser beam irradiation intensity is here decreased for the MIG head, the reverse might occur, depending on the material used.

It is also possible, in machining heads of the same material, when, for example track widths differ, to reduce changes in the properties of the track portion by weakening the laser beam intensity for the heads with the narrower tracks.

Embodiment 31

FIGS. 116A–116B and FIGS. 117A–117B relate to a method for manufacturing a magnetic head according to Embodiment 31. In the manufacturing method of Embodiment 31, the diameter of the laser beam is changed during machining.

FIG. 116A is an explanatory diagram showing the diameter of the laser beam with which the sliding surface of the head chip 204 is irradiated, and a reference numeral 234 designates the portion irradiated by the laser beam. FIG. 116A, the machining of the vicinity of gap 205 is machined by a laser beam of small diameter, thereby forming a gently sloped track. With respect to those portions other than formation of the track, where detailed machining required, large amounts of material are removed with a large-diameter beam to form track grooves 235. FIG. 116B shows the configuration of the sliding surface of the head chip after machining.

FIG. 117A is an explanatory diagram showing the diameter of the laser beam with which the sliding surface the head chip 204 is irradiated. In Embodiment 31, material is removed with the diameter of laser beam 234 being increased sequentially from the vicinity of the gap outwards. By means of this sort of laser irradiation, trapezoidal track grooves 236 can be formed, as shown in FIG. 117B. In this example, the slope of the end of track grooves 236 is different in angle from the azimuth angle of the gap 205, with the result that crosstalk and other noise can be reduced.

Embodiment 32

FIG. 118 is a structural diagram showing the general features of the machining equipment for accomplishing the method for the manufacture of a magnetic head according to Embodiment 32. In Embodiment 32, the laser beam is directed to the work being machined using a mask provided with slits.

In FIG. 118, structures identical with structures in FIG. 97 are designated by the same reference numerals. In FIG. 118, a reference numeral 237 designates an image-forming lens and 238 designates a mask provided with slits. The mask 238 used here for machining the tracks of the head chips 209 and 210 is shown, for example, in FIGS. 76A and 76B.

This method, is superior in productivity to line-scanning of the laser beam, in that it makes possible batch laser etching of the desired pattern images, so that complex configurations can be machined. And since working accuracy is determined by the mask accuracy and focusing, it is also superior to the methods using laser beam scanning in terms of machining dimensional accuracy. Synchronization between the period of rotation of the rotating drum 199 and the irradiation period of the laser beam is accomplished in the same manner as in Embodiment 28 already described.

Embodiment 33

FIG. 119 and FIGS. 120A–120B relate to a method for manufacturing a magnetic head according to Embodiment 33 of the present invention. In FIG. 119, structures identical with structures in FIG. 118 are designated by the same reference numerals. In FIG. 119, a reference numeral 240 designates a rotating mask, 241 designates a spindle supporting the center of the rotating mask 240, and 242 designates a motor connected to the spindle 241.

In the manufacturing method of Embodiment 33, rotating mask is rotated is synchronization with the rotation of rotating drum 199. FIGS. 120A and 120B show examples of the rotating mask 240. FIG. 120A shows the mask 240, which is used when four head chips are disposed at right angles on the rotating drum 199, and are provided with four slits for track groove machining. FIG. 120B shows as a further example of the mask in FIG. 119a mask 241, which is used when two head chips are disposed oppositely separated by an angle of 180° on the rotating drum 199.

In Embodiment 33, even when laser beam irradiation is continuous, the laser beam irradiates the head chip only while the laser beam is passing through a slit, and at all other times is reflected, so that continuously pumped lasers, such as, for example Nd:YAG lasers, can be used.

Further, in Embodiment 33, control is exercised so that the mask 240 or 241 is always synchronized with the rotating drum 199, and so that the slit 240a or 241a always encounters the head chip at the same timing. Accordingly even if laser beam irradiation should occur at erroneous timing, it will be reflected by the rotating mask 240, so that the laser beam cannot impinge on the rotating drum 199 causing damage thereto.

Further, in Embodiment 33, when magnetic heads differing machining configurations are mounted on the same rotating drum, the laser machining can be carried out using a single mask by providing it with a plurality of slits of different configurations.

Embodiment 34

FIGS. 121A–121C and FIGS. 122A–122B relate to a method for manufacturing a magnetic head according to Embodiment 34 of the present invention. Here, FIGS. 121A–121C are perspective views showing the configurations of a head chip at selected machining steps, and FIGS. 122A–122B are explanatory diagrams showing the method of machining a head chip.

First, the process by which the head chip 251 shown in FIG. 121A is formed is the same as the process shown FIGS. 2A–2D. Then the head chip 251 is joined to a head base 252.

Following is a description of the process by which head chip 251 of FIG. 121A is machined to the configuration of FIG. 121B. First, the head chip 251 is mounted on the working stage 253 in such a way that its side surface 251b faces upwards. Next, the laser beam 255 emitted from the laser source 254 is reflected by the bend mirror 256 and passes through the image-forming lens 257 to impinge on the side surface 251b of the head chip 251. The portion of the head chip 251 irradiated by the laser beam 255 is etched away to form the coil window 251c, as shown in FIG. 121B.

Following is a description of the process by which the head chip 251 of FIG. 121B is machined to the configuration of FIG. 121C. First, as shown in FIG. 122B, the head chip 251 is mounted on the working stage 253 in such a way that its sliding surface 251a faces upwards. Next, the sliding surface 251a of the head chip 251 is irradiated by the laser beam 255, forming, as shown in FIG. 121C, a pair of semicylindrical track grooves 251d that determine track width. Here, track grooves 251d are formed in such a way that they communicate from the sliding surface 251a to the coil window 251c. After that, the process of grinding the sliding surface 251a to the desired configuration and the coil winding process are carried out.

As described above, by first forming the coil window 251c and then making the track grooves 251d communicate with the coil window 251 according to the manufacturing method Embodiment 34, the adherence and accumulation of dissolved magnetic material at the inner surfaces of track grooves 251d can be prevented. That is to say, if, as shown in FIG. 121C, the diameter of track grooves 251d (i.e., the maximum length $L_T$ in the width direction of the head chip) is made smaller than the length $L_W$ of the coil window 251c in the width direction of the head chip, track grooves 251d will communicate with coil window 251c and no bottom surface track grooves 251d will be formed, thereby preventing the accumulation of dissolved material on the inner surfaces track grooves 251d.

As one of the methods of laser machining described above, there is a method in which the condensed spot 255a of the laser beam 255 is scanned in a zigzag, as shown in FIGS. 123A–123B. It is also possible to adopt a method in which, as shown in FIG. 124, a spot 255a of laser beam 255 is scanned along the boundary of the portion to be removed.

Also, as one of the methods of laser machining described above, there is a method in which the masks 258 and 259 provided with the slits 258a and 259a are used, and the head chip 251 is irradiated by the laser beam 255 through the slits 258a and 259a, as shown in FIGS. 125A–125B and FIGS. 126A–126B. In this case it is possible either to carry out laser beam irradiation by scanning with the spot of a small-diameter laser beam, as shown in FIGS. 123A–123B, or to irradiate the whole of the area to be machined through the slits 259a of the mask 259 as shown FIGS. 126A–126B.

When the laser source used to machine the track grooves in the sliding surface of a ferrite head is a YAG laser with an energy density of 13 [J/cm$^2$] and a pulse width of 6 [ns], the problem occurs that the track portion melts under the effect of laser beam heat and the gap opens widely, as shown in FIG. 127A. For this reason it is desirable that the track grooves be machined one side at a time, in which case the tracks can be formed comparatively regularly in the sliding surface, as shown In FIG. 127B. Here, the track width T$_W$ is approximately 50 [μml]. And when the laser source used to machine the track grooves in the sliding surface of a ferrite head is an excimer (KrF) laser with an energy density of 6 [J/cm$^2$], and track grooves are machined simultaneously on both sides of the head chip, the track grooves can be formed regularly in the sliding surface, as shown in FIG. 128. This indicates that for track machining, where submicron-order accuracy is required, excimer lasers are the most suitable. The time required using a YAG laser to machine the track grooves is approximately 4 [sec] when machining both sides simultaneously and approximately 8 [sec] when machining one side at a time, and the time required using an excimer laser to machine both track grooves simultaneously is approximately 1 [sec]. Thus from the standpoint of machining time too, an excimer laser advantageous in track groove machining.

In improving productivity by installing separate laser machining equipment for machining the track grooves and the coil window, a combination consisting of an excimer laser for track machining, where accurate machining dimensions are required, and either a YAG or an excimer laser for machining the coil window from the side surface, may be considered. In such a case, the use of a YAG laser for machining from both sides offers the advantage that the complete installation can be configured more cheaply.

Embodiment 35

FIGS. 129A–129C are perspective views that relate to a method for manufacturing a magnetic head according to Embodiment 35 of the present invention, and show the configurations of a head chip at selected machining steps.

First, the head chip 261 having a coil window 261c formed by the mechanical machining is formed and joined to the head base 252 as shown in FIG. 129A.

Following is a description of the process by which the head chip 261 of FIG. 129A is machined to the configuration of FIG. 129B. First, as shown in FIG. 129A, the head chip 261 is mounted on the working stage 253 of FIG. 126A for example in such a way that its side surface 261b faces upwards. Next, the laser beam 255 emitted from the laser source 254 is reflected by the bend mirror 256 and passes through image-forming lens 257 impinge on the side surface 261b of the head chip 261. The portion of the head chip 261 irradiated by the laser beam 255 is etched away to form the apex groove 261d as shown FIG. 129B.

Following is a description of the process by which head chip 261 of FIG. 129B is machined to the configuration of FIG. 129C. First, as shown in FIG. 129B, the head chip 261 is mounted on the working stage 253 in such a way that its sliding surface 261a faces upwards. Next, the sliding surface 261a of the head chip 261 is irradiated by the laser beam 255, forming, as shown in FIG. 129C, a pair of semicylindrical track grooves 261e that determine track width. Here, the track grooves 261e are formed in such a way that they communicate from the sliding surface 261a to the apex groove 261d. After that, the process of grinding the sliding surface 261a to the desired configuration and the coil winding process are carried out.

As described above, by first forming the apex groove 261d and then making the track grooves 261e communicate with the apex groove 261d according to the manufacturing method of Embodiment 35, the adherence and accumulation of dissolved magnetic material to the inner surfaces of the track grooves 261e can be prevented. That is to say, if, as shown in FIG. 129C, the diameter of track grooves 261e (i.e., the maximum length $L_T$ in the width direction of the head chip) is made smaller than the length of the apex groove 261d in the width direction of the head chip, the track grooves 261e will communicate with the apex groove 261d and no bottom surface of the track grooves 261e will be formed, thereby preventing the accumulation of dissolved material on the inner surfaces of the track grooves 261e.

The manufacturing method of Embodiment 35 has the further advantage that, since only the apex groove 261e, which determines the depth of the gap 262, is machined using laser beam, the laser machining can be accomplished in a shorter time than with the method in which the whole of the coil window 261c is formed by the laser machining. With respect to the conditions of laser irradiation, Embodiment 35 is identical to the Embodiment 34 already described.

Embodiment 36

FIGS. 130A–180C relates to a method for manufacturing a magnetic head according to Embodiment 36 of the present invention. Here, FIGS. 130A–130C are perspective views showing the configurations of a head chip 271 at selected machining steps.

First, the process by which the head chip 271 shown in FIG. 130A is formed is the same as the process shown FIGS. 2A–2D. After that, the head chip 271 is joined to the head base 252.

Following is a description of the process by which the head chip 271 of FIG. 130B is machined to the configuration of FIG. 130C. First, as shown In FIG. 123B, the head chip 271 is mounted on the working stage 253, as illustrated in FIG. 126A for example, in such a way that its sliding surface 271a faces upwards. Next, the sliding surface 271a of the head chip 271 is irradiated by laser beam 255, forming, as shown in FIG. 130B, a pair semicylindrical track grooves 271d that determine the track width.

Following is a description of the process by which head chip 271 of FIG. 130B is machined to the configuration FIG. 130C. First, as shown in FIG. 123A, head chip 271 is mounted on the working stage 253 in such a way that, its side surface 271b faces upwards. Next, the laser beam 255 emitted from the laser source 254 is reflected by the bend mirror 256 and passes through the image-forming lens 257 to irradiate on the side surface 271b of the head chip 271. The portion of the head chip 271 irradiated by the laser beam 255 is etched away to form coil window 271c, as shown in FIG. 130C. The track grooves 271d communicate from the sliding surface 271a to the coil window 271c. After that, the process of grinding the sliding surface 271a to the desired configuration and the coil winding progress are carried out.

As described above, by first forming the track grooves 271d and then forming the coil window 271c in such a way that the track grooves 271d communicate with the coil window 271c according to the manufacturing method of Embodiment 36, the adherence and accumulation of dissolved magnetic material to the inner surfaces of the track grooves 271d can be prevented. That is to say, if, as shown in FIG. 130C, the diameter of the track grooves 271d (i.e., the maximum length $L_T$ in the width direction of the head chip) is smaller than the length $L_W$ of the coil window 271c in the width direction of the head chip, the track grooves 271d will communicate with coil window 271c, and no bottom surface of the track grooves 271d will be formed, thereby preventing the accumulation of dissolved material on the inner surfaces of the track grooves 271d. Except for the above-described points, the method of Embodiment 36 is identical to that of Embodiment 34 already described.

Embodiment 37

FIGS. 131A–131B relate to a method for manufacturing a magnetic head according to Embodiment 37 of the present invention, and are perspective views showing the configurations of a head chip at selected machining steps.

Following is a description of the process by which the head chip of FIG. 130A is machined to the configuration of FIG. 131A. First, the head chip 281 is mounted on the working stage In such a way that its sliding surface 281a faces upwards. Next, the sliding surface 281a of the head chip 281 is irradiated by the laser beam 255, forming, as shown in FIG. 131A, a pair of semicylindrical track grooves 281d that determine track width.

Following is a description of the process by which head chip 281 of FIG. 131A is machined to the configuration of FIG. 131B. First, as shown in FIG. 131A, the head chip 281 is mounted on the working stage 253 of FIG. 126A for example in such a way that its side surface 281b faces upwards. Next, the laser beam 255 emitted from the laser source 254 is reflected by the bend mirror 256 and passes through image-forming lens 257 to impinge on the side surface 281b of the head chip 281. The portion of the head chip 281 irradiated by the laser beam is etched away to form the coil window 281c and the apex groove 281e, as shown in FIG. 131B. At this time, the track grooves 281d communicate from the sliding surface 281a to the apex groove 281e. After that, the process of grinding the sliding surface 281a to the desired configuration and the coil winding process are carried out.

As described above, by first forming the track grooves 281d and then forming the apex groove 281e in such a way that the track grooves 281d communicate with the apex groove 281e according to the manufacturing method of Embodiment 37, the adherence and accumulation of dissolved magnetic, material to the inner surfaces of the track grooves 271d can be prevented. That is to say, if, as shown in FIG. 131B, the diameter of the track grooves 281d (i.e., the maximum length in the width direction of the head chip) is made smaller than the length of the apex groove 281e in the width direction of the head chip, the track grooves 281d will communicate with the apex groove 281e, and no bottom surface of the track grooves 281d will be formed, thereby preventing the accumulation of dissolved material on the inner surfaces of track grooves 281d. Except for the above described points, the method of Embodiment 37 is identical to that of Embodiment 34 already described.

What is claimed is:

1. A method of manufacturing a magnetic head, by which a curved sliding surface of a head chip for making contact with a recording medium and a penetrating window of a side surface of said head chip for determining a gap depth are formed by machining said head chip using a laser beam, said head chip being formed by bonding together a pair of core pieces across a magnetic gap, the method comprising the steps of placing said head chip on a working stage;

disposing a first mask in a light path of a laser beam from a laser source toward said side surface, said first mask being provided with a first slit for forming said curved sliding surface of said head chip and a second slit for forming said penetrating window of said side surface of said head chip; and irradiating said side surface through said first and second slits of said first mask with the laser beam to form said curved sliding surface and said penetrating window in said head chip.

2. The method of claim 1, further comprising the step of mounting a plurality of said head chips on a single head base, prior to said step of placing said head chip on said working stage, said first mask being provided with a plurality of said first slits and a plurality of said second slits respectively corresponding to the plurality of said head chips fixed to said head base, said step of irradiating comprising irradiating side surfaces of the plurality of said head chips with the laser beam passed through the plurality of said first slits and the plurality of said second slits of said first mask.

3. The method of claim 1, wherein said penetrating window comprises a coil window through which a coil passes and an apex groove which determines said gap depth.

4. The method of claim 1, wherein said penetrating window comprises a coil window through which a coil passes and a notched groove which extends from said coil window toward said curved sliding surface, said method further comprising the step of irradiating said side surface of said head chip with the laser beam to form an apex groove which extends from said notched groove toward said curved sliding surface.

5. The method of claim 1, wherein said first mask is further provided with at least one of third to fifth slits, said third slit for forming a coil stopper groove in said side surface of said head chip to prevent movement of a coil, said fourth slit for forming a stepped portion in an end of said curved sliding surface of said head chip, and said fifth slit for imprinting a mark including a character or a figure on said side surface of said head chip, during said step of irradiating, the laser beam from said laser source passes through said first to fifth slits provided in said first mask and impinges on said side surface of said head chip.

6. The method of claim 5, wherein said third slit of said first mask is of an L-shaped configuration to form a hook that protrudes toward the inside of said coil stopper groove.

7. The method of claim 5, wherein said step of irradiating comprises the steps of impinging the laser beam from said laser source through said first to fifth slits of said first mask on said head chip;

subsequently disposing a second mask in a light path of the laser beam so as to block off said fifth slit; and subsequently impinging the laser beam from said laser source through said first to fourth slits of said first mask on said head chip.

8. The method of claim 1, comprising, after said step of irradiating, the further steps of winding a coil through said penetrating window onto said head chip; and subsequently moving said working stage or a light path of the laser beam from said laser source based on a value of the gap depth, which is measured based on magnetic characteristics of said head chip obtained by applying a specified electrical signal to said coil, to form an apex groove that determines the gap depth.

9. The method of claim 7, further comprising the steps of:

disposing a third mask provided with a slit for forming, in said curved sliding surface of said head chip, at least one track groove for determining track width, cut away portions for decreasing a thickness of said head chip at said curved sliding surface, and a chamfered portion for rendering an end of said curved sliding surface of said head chip arcuate; and subsequently impinging the laser beam from said laser source through said slit of said third mask on said curved sliding surface of said head chip to form in said curved sliding surface of said head chip said at least one track groove, said cut away portions and said chamfered portion.

10. The method of claim 9, wherein a plurality of head chips are mounted on a single head base and an azimuth angle is imparted to each gap of said plurality of head chips, said step of impinging the laser beam through said third mask comprising the steps of measuring positions of the gaps by optical measurement; and moving respective positions of formation of said track grooves in a thickness direction of said plurality of head chips based on the positions measured during the optical measurement so that a distance between the gaps become a predetermined value.

11. The method of claim 1, wherein the laser beam is produced by a laser selected from a group consisting of an excimer laser, a YAG laser, an Ar laser, and other high-power and high-frequency lasers.

12. The method of claim 1, wherein the laser beam irradiation is accomplished while said head chip is immersed in fluid selected from a group consisting of water, KOH solution, and phosphoric acid solution.

13. The method of claim 1, wherein said core pieces forming said head chip comprise monocrystalline ferrite, and both of said curved sliding surface and said side surface of said head chip are (110) plane.

14. A method of manufacturing a magnetic head comprising the steps of impinging a laser beam from a laser source on a side surface of a head chip which is formed by butting together a pair of core pieces across a magnetic gap, to form a penetrating window; and subsequently impinging the laser beam from the laser source on a sliding surface of said head chip to form track grooves that extend from said sliding surface to said penetrating window, a maximum length of said track grooves in an advancing direction of a magnetic recording medium in contact with said sliding surface of said head chip being less than a width of said penetrating window in the advancing direction.

15. The method of claim 14, wherein said penetrating window is a coil window through which a coil passes.

16. The method of claim 14, wherein said penetrating window is an apex groove which defines a track width and track position.

17. The method of claim 14, wherein a spot of the laser beam is condensed and scanned at machining positions.

18. The method of claim 14, wherein said steps of impinging comprise:

disposing a mask in a light path of the laser beam to pass the laser beam through slits of said mask;

condensing the laser beam passed through the slits of said mask; and scanning the condensed laser beam on said head chip in a zigzag configuration.

19. The method of claim 14, wherein said steps of impinging comprise:

disposing a mask in a light path of the laser beam to pass the laser beam through slits of said mask; and irradiating said head chip with the laser beam passed through the slits of said mask.

20. The method of claim 19, wherein said head chip and said mask are moved with respect to the laser beam.

21. A magnetic head manufactured by a method comprising the steps of:

impinging a laser beam from a laser source on a side surface of a head chip which is formed by butting together a pair of core pieces across a magnetic gap, to form a penetrating window; and subsequently impinging the laser beam from the laser source on a sliding surface of said head chip to form track grooves that extend from said sliding surface to said penetrating window, a maximum length of said track grooves in an advancing direction of a magnetic recording medium in contact with said sliding surface of said head chip being less than a width of said penetrating window in the advancing direction.

22. A method of manufacturing a magnetic head comprising the steps of:

impinging a laser beam from a laser source on a sliding surface of a head chip which is formed by butting together a pair of core pieces across a magnetic gap, to form track grooves having a predetermined depth; and subsequently impinging the laser beam from the laser source on a side surface of said head chip to form a penetrating window such that said track grooves extend from said sliding surface to said penetrating window, a maximum length of said track grooves in an advancing direction of a magnetic recording medium in contact with said head chip being less than a width of said penetrating window in the advancing direction.

23. The method of claim 22, wherein said penetrating window is a coil window through which a coil passes.

24. The method of claim 22, wherein said penetrating window is an apex groove which defines a track width and track position.

25. The method of claim 22, wherein a spot of the laser beam is condensed and scanned at machining positions.

26. The method of claim 22, wherein said steps of impinging comprise:

disposing a mask in a light path of the laser beam to pass the laser beam through slits of said mask;

condensing the laser beam passed through the slits of said mask; and scanning the condensed laser beam on said head chip in a zigzag configuration.

27. The method of claim 22, wherein said steps of impinging comprise:

disposing a mask in a light path of the laser beam to pass the laser beam through slits of said mask; and irradiating said head chip with the laser beam passed through the slits of said mask.

28. The method of claim 27, wherein said head chip and said mask are moved with respect to the laser beam.

29. A magnetic head manufactured by a method comprising the steps of:

impinging a laser beam from a laser source on a sliding surface of a head chip which is formed by butting together a pair of core pieces across a magnetic gap, to form track grooves having a predetermined depth; and subsequently impinging the laser beam from the laser source on a side surface of said head chip to form a penetrating window such that said track grooves extend from said sliding surface to said penetrating window, a maximum length of said track grooves in an advancing direction of a magnetic recording medium in contact with said sliding surface of said head chip being less than a width of said penetrating window in the advancing direction.

* * * * *